(12) United States Patent
Igarashi et al.

(10) Patent No.: US 7,510,113 B2
(45) Date of Patent: Mar. 31, 2009

(54) BILLING SYSTEM, AND DEVICE CONSTITUTING SAME

(75) Inventors: Yoichiro Igarashi, Kawasaki (JP);
Chizu Hamasaki, Kawasaki (JP);
Hiroyuki Taniguchi, Kawasaki (JP);
Masaaki Takase, Kawasaki (JP);
Mitsuaki Kakemizu, Kawasaki (JP);
Masaaki Wakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1396 days.

(21) Appl. No.: 10/162,806

(22) Filed: Jun. 5, 2002

(65) Prior Publication Data

US 2002/0188562 A1    Dec. 12, 2002

(30) Foreign Application Priority Data

Jun. 7, 2001   (JP)   ............................. 2001-172291
Mar. 11, 2002  (JP)   ............................. 2002-064671
May 17, 2002   (JP)   ............................. 2002-142602

(51) Int. Cl.
*G07F 19/00* (2006.01)

(52) U.S. Cl. ........................ 235/379; 235/375; 705/40

(58) Field of Classification Search ................ 235/379, 235/375; 705/5, 26, 40
See application file for complete search history.

(56) References Cited

U.S. PATENT DOCUMENTS 5,867,780 A     2/1999   Malackowski et al.
5,982,891 A *  11/1999   Ginter et al. ................... 705/54

FOREIGN PATENT DOCUMENTS

| EP | 0 924 630   | 6/1999  |
|----|-------------|---------|
| JP | 2000332750  | 11/2000 |
| WO | 97/40634    | 10/1997 |
| WO | WO 98/21676 | 5/1998  |
| WO | WO 00/19677 | 4/2000  |

OTHER PUBLICATIONS

Mitsuhiro Nakamura, et al. "Towards a dawn of QoS Market" The Institute of Electronics, Information and Communication Engineers, Technical report of IEICE, Nov. 19, 1999.
European Search Report dated Jun. 4, 2007, from the corresponding European Application.
Notification on Reasons for Refusal dated Jan. 23, 2007 for corresponding Japanese Application JP 2002-142602.
Partial European Search Report dated Apr. 17, 2007,from the corresponding European Patent Application as EP 02 01 2373.

* cited by examiner

*Primary Examiner*—Karl D. Frech
(74) *Attorney, Agent, or Firm*—Katten Muchin Rosenman LLP

(57) ABSTRACT

A billing system is disclosed which performs processing in order to provide service to user terminals, and which performs billing for the service provided to the user terminals. In this billing system, user billing profiles UBP are stored in a user billing profile registration unit, by service type and in user terminal units; a billing condition generation unit within a service provider server compares the user billing profile UBP corresponding to a specified service type and to a user terminal with a server billing profile SBP to generate billing conditions, and a billing condition setting unit of a foreign agent sets the billing conditions in a billing unit; and based on the billing conditions thus set, the billing unit executes billing processing for each user terminal.

8 Claims, 86 Drawing Sheets

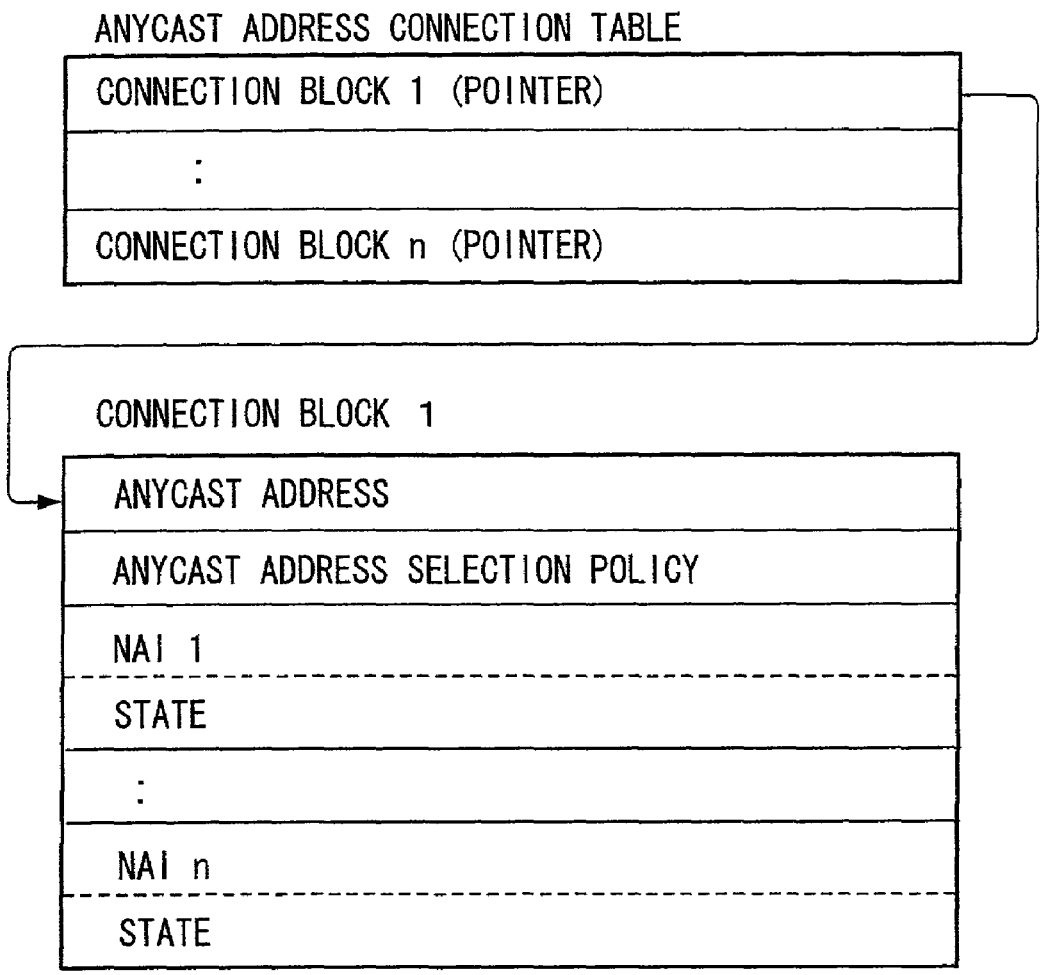

FIG. 8

| TRANSMISSION ORIGIN ADDRESS | TRANSMISSION ORIGIN PORT | RECEIVER ADDRESS | RECEIVER PORT | ENCAPSULATION | CARE-OF ADDRESS | TOS |
|---|---|---|---|---|---|---|
| 111.100.100.101 | . | 222.200.100.123 | . | xx | 333.300.100.0 | XX |
|  | . | 222.200.100.133 | . | xx | 333.300.100.0 | YY |

FIG. 9

| TRANSMISSION ORIGIN ADDRESS | TRANSMISSION ORIGIN PORT | RECEIVER ADDRESS | RECEIVER PORT |
|---|---|---|---|
| 111.100.100.102 | . | 222.200.100.201 | . |
| . | . | 222.200.100.202 | . |

FIG. 13

AAAH SERVICE CONTROL TRANSACTION

| CONTROL BLOCK 1 |
|---|
| ⋮ |
| CONTROL BLOCK n |

CONTROL BLOCK 1

| SESSION ID |
|---|
| MN NAI |
| SESSION TRANSACTION TABLE |
| SERVICE PROFILE TABLE |

SESSION TRANSACTION TABLE  — TD1

| HA ADDRESS |
|---|
| AAAF ADDRESS |
| SESSION TIMER |

SERVICE PROFILE TABLE  — TD2

| SERVICE TYPE (ANYCAST) |
|---|
| SERVICE TYPE (PACKET FILTERING) |
| REGULATION APPLICATION POLICY |
| REGULATION ADDRESS 1 |
| APPLICATION CONDITIONS |
| ⋮ |
| REGULATION ADDRESS n |
| APPLICATION CONDITIONS |
| SERVICE TYPE (DIFF-SERV TRANSMISSION) |
| DIFF-SERV APPLICATION POLICY |
| TRANSMISSION ORIGIN ADDRESS 1 |
| TRANSMISSION ORIGIN PORT 1 |
| TOS1 |
| ⋮ |
| TRANSMISSION ORIGIN ADDRESS n |
| TRANSMISSION ORIGIN PORT n |
| TOSn |
| SERVICE TYPE (DIFF-SERV RECEPTION) |
| DIFF-SERV APPLICATION POLICY |
| TRANSMISSION DESTINATION ADDRESS 1 |
| TRANSMISSION DESTINATION PORT 1 |
| TOS 1 |
| ⋮ |
| TRANSMISSION DESTINATION ADDRESS n |
| TRANSMISSION DESTINATION PORT n |
| TOS n |

FIG. 14

SERVICE CONTROL DATABASE

| USER PROFILE 1 |
|---|
| : |
| USER PROFILE n |

| USER PROFILE 1 |
|---|
| NAI |
| SERVICE TYPE (PACKET FILTERING) |
| REGULATION APPLICATION POLICY |
| REGULATION ADDRESS 1 |
| APPLICATION CONDITIONS |
| : |
| REGULATION ADDRESS n |
| APPLICATION CONDITIONS |
| SERVICE TYPE (DIFF-SERV TRANSMISSION) |
| DIFF-SERV APPLICATION POLICY |
| TRANSMISSION DESTINATION ADDRESS |
| TRANSMISSION DESTINATION PORT |
| TOS |
| : |
| TRANSMISSION DESTINATION ADDRESS n |
| TRANSMISSION DESTINATION PORT n |
| TOSn |
| SERVICE TYPE (DIFF-SERV RECEPTION) |
| DIFF-SERV APPLICATION POLICY |
| TRANSMISSION ORIGIN ADDRESS 1 |
| TRANSMISSION ORIGIN PORT 1 |
| TOS 1 |
| : |
| TRANSMISSION ORIGIN ADDRESS n |
| TRANSMISSION ORIGIN PORT n |
| TOS n |

FIG. 20

| MOBILE NODE NAI | AAAH IP ADDRESS |
|---|---|
| 1111@ ACCESS NETWORK 1, DOMAIN 1 | 10. 10. 10. 1 |
| 2222@ ACCESS NETWORK 1, DOMAIN 1 | 10. 10. 10. 2 |
| 1111@ ACCESS NETWORK 2, DOMAIN 1 | 10. 10. 20. 1 |
| 1111@ ACCESS NETWORK 1, DOMAIN 2 | 10. 20. 10. 1 |
| 1111@ ACCESS NETWORK 1, DOMAIN 3 | 10. 30. 10. 1 |
| 1111@ ACCESS NETWORK 1, DOMAIN 4 | 10. 40. 10. 1 |
| ⋮ | ⋮ |

FIG. 21

| AGENT IP ADDRESS | AGENT NAI PREFIX |
|---|---|
| 10. 10. 10. 10 | ACCESS NETWORK 1. DOMAIN 1 |
| 10. 10. 20. 10 | ACCESS NETWORK 2. DOMAIN 1 |
| 10. 20. 10. 10 | ACCESS NETWORK 1. DOMAIN 2 |
| 10. 30. 10. 10 | ACCESS NETWORK 1. DOMAIN 3 |
| 10. 40. 10. 10 | ACCESS NETWORK 1. DOMAIN 4 |
| ⋮ | ⋮ |

FIG. 23A

UBF

| CONDITION ID | ITEM | EXAMPLE OF SPECIFIC VALUES |
|---|---|---|
| 1 | QoS (TRANSMISSION SPEED AND SIMILAR) | 64kbps, 512kbps |
| 2 | TIME | 8:00~17:00 |
| 3 | PERMITTED BILLING METHODS | PACKET VOLUME, AAA AUTHENTICATION SESSION UNITS, TIME |
| 4 | PERMITTED INFORMATION AMOUNT | ¥2000 MONTHLY |

FIG. 23B

SBF

| SERVICE ID | CONDITION 1: QoS | CONDITION 2: TIMES FOR SERVICE PROVISION | CONDITION 3: BILLING METHOD | CONDITION 4: FEE UNIT |
|---|---|---|---|---|
| 0001 | 64kbps | 0:00~24:00 | PACKET VOLUME | ¥10 |
| 0002 | 128kbps | 13:00~17:00 | AAA AUTHENTICATION | ¥250 |
| 0003 | 256kbps | 23:00~25:00 | TIME | ¥550 |
| 0004 | 512kbps | 8:00~17:00 | PACKET VOLUME, OR TIME | PACKE: ¥5 TIME: ¥10/MINUTE |

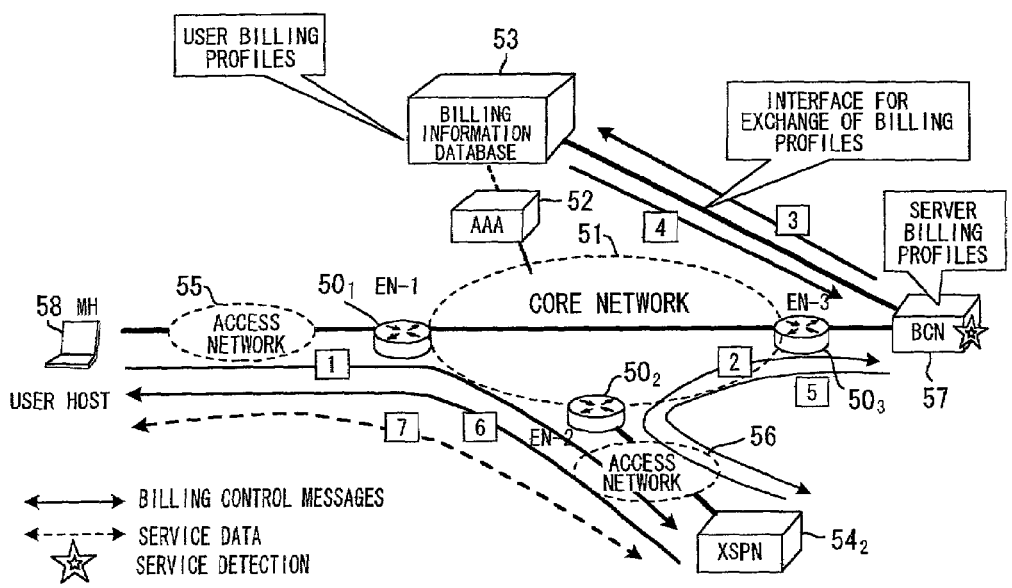

| | MESSAGE NAME | TRANSMISSION DIRECTION | USE | PARAMETER |
|---|---|---|---|---|
| 1 | BILLING PROFILE REQUEST | BCN → BILLING INFORMATION DATABASE | REQUESTS A USER BILLING PROFILE FOR THE USER IN QUESTION. USES AN NAI AS INFORMATION FOR USER IDENTIFICATION. | NAI (NETWORK ACCESS IDENTIFIER) |
| 2 | BILLING PROFILE REPLY | BILLING INFORMATION DATABASE→ BCN | SENDS RESULTS OF BILLING CONDITION ACQUISITION AND USER BILLING PROFILE. | RESULT CODE (NORMAL, ABNORMAL) REASON VALUE (MESSAGE ABNORMAL, NO SUCH SUBSCRIBER) BILLING PROFILE |

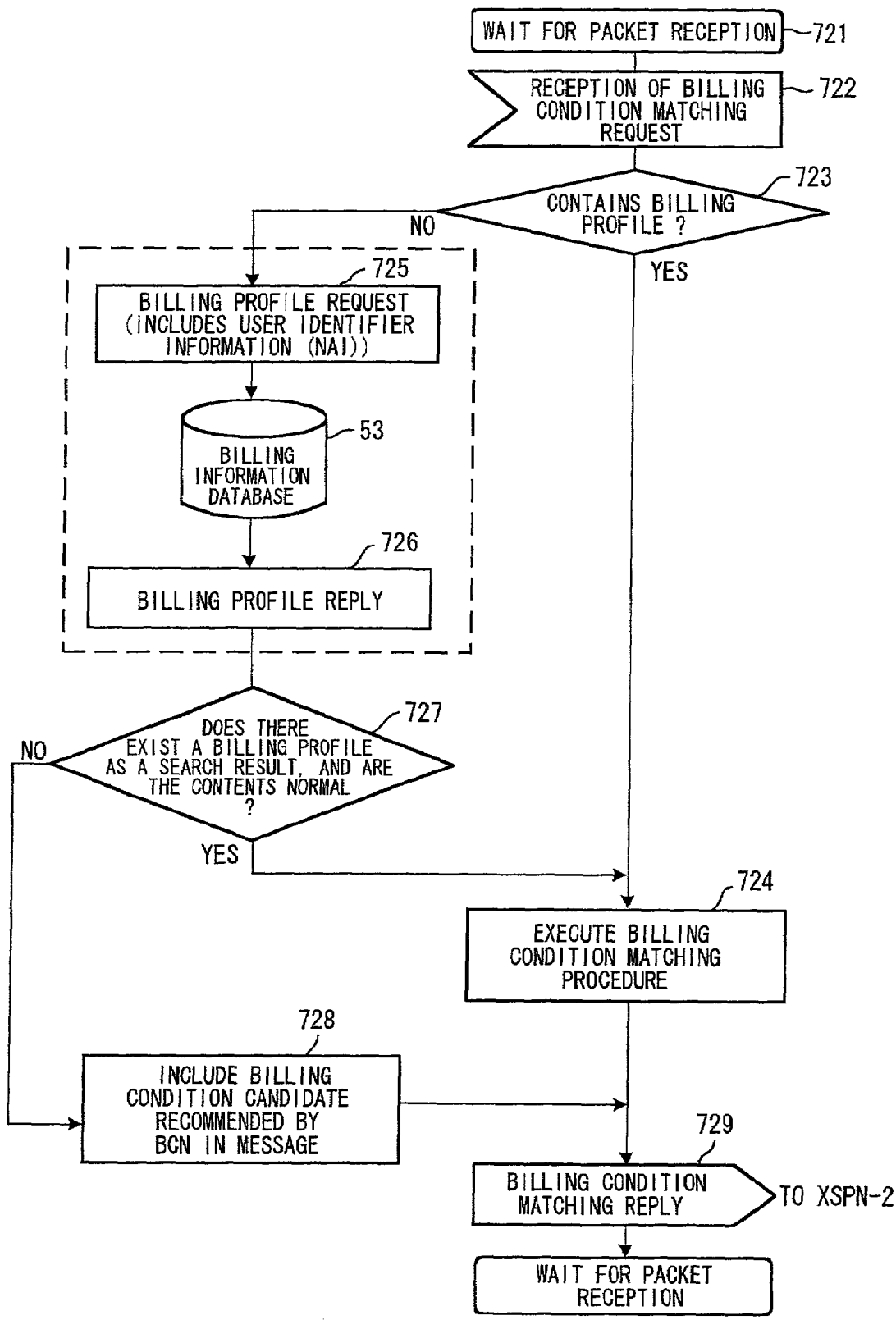

FIG. 58

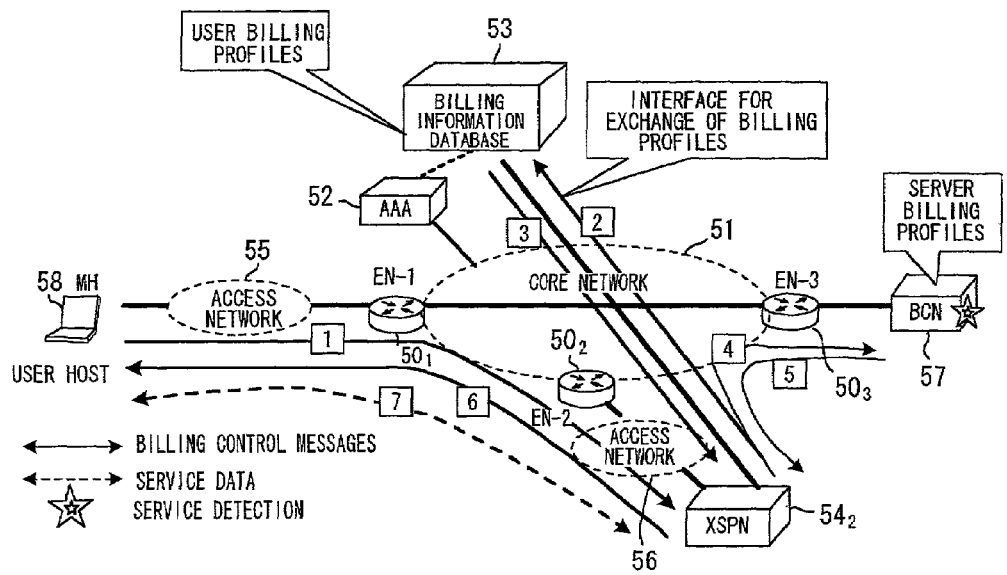

FIG. 59

| | MESSAGE NAME | TRANSMISSION DIRECTION | USE | PARAMETER |
|---|---|---|---|---|
| 1 | BILLING PROFILE REQUEST | XSPN → BILLING INFORMATION DATABASE | REQUESTS A USER BILLING PROFILE FOR THE USER IN QUESTION. USES AN NAI AS INFORMATION FOR USER IDENTIFICATION. | NAI (NETWORK ACCESS IDENTIFIER) |
| 2 | BILLING PROFILE REPLY | BILLING INFORMATION DATABASE → XSPN | SENDS RESULTS OF BILLING CONDITION ACQUISITION AND USER BILLING PROFILE. | RESULT CODE (NORMAL, ABNORMAL) REASON VALUE (MESSAGE ABNORMAL, NO SUCH SUBSCRIBER) BILLING PROFILE |

FIG. 62

| CONDITION TYPE | CONTENTS |
|---|---|
| BASIC PORTION | STIPULATES INFORMATION NECESSARY FOR BILLING SERVICE SPECIFIED BY THE USER. |
| SERVICE-DEPENDENT PORTION | ATTRIBUTES OF BILLING CONDITIONS PREPARED BY A CARRIER PERFORMING PROXY BILLING, IN CONSIDERATION OF SERVICE CONVENIENCE. EXISTS SEPARATELY FOR EACH USER CONTRACT SERVICE. |
| XSP-DEFINED PORTION | STIPULATED WHEN THE XSP SPECIFIES UNIQUE ATTRIBUTES NOT IN THE ABOVE SERVICE-DEPENDENT PORTION. |

FIG. 63

| CONDITION ID | CONDITION NAME | CONTENTS | POSSIBLE VALUES | REQUIRED ? |
|---|---|---|---|---|
| 000 | ENTERPRISE CODE | INFORMATION IDENTIFYING THE CARRIER WITH WHOM THE USER HAVING THE BILLING PROFILE HAS CONTRACTED | CHARACTER STRING CAPABLE OF IDENTIFYING THE CONTRACTING ENTERPRISE | REQUIRED |
| 001 | APPLICATION TYPE | SPECIFIES APPLICATION FOR BILLING | 0: NOT SPECIFIED<br>1: ONLY CATEGORY SPECIFIED<br>2: APPLICATION SPECIFIED | REQUIRED; MULTIPLE SPECIFICATIONS POSSIBLE |
| 002 | XSP ENTERPRISE IDENTIFIER CODE | WHEN THE USER HAS SPECIFIED AN XSP FOR A SERVICE CONTRACT, SPECIFIES THE XSP ENTERPRISE. IF NOT SPECIFIED, AN XSP RECOMMENDED BY THE CARRIER IS USED. | 0: NOT SPECIFIED<br>1: ONLY CATEGORY SPECIFIED<br>2: XSP INDIVIDUALLY SPECIFIED | REQUIRED |
| 003 | SERVICE NAME | IF AN XSP IDENTIFIER CODE IS SPECIFIED, THE SERVICE TO BE USED IS SPECIFIED. | UNIQUE MANAGEMENT NUMBER SYSTEM WITHIN THE XSP | NECESSARY ONLY WHEN SPECIFYING 2 IN ID 002 |
| 004 | PRIORITIZED CONDITIONS | WHEN PERFORMING BILLING CONDITION MATCHING PROCESSING, IF THERE ARE OTHER PRIORITIZED ITEMS, THEY ARE SPECIFIED. | CONDITION ID EXAMPLE | OPTIONAL. IF UNSPECIFIED FOLLOWS SPECIFICATION PRIORITY OF XSP |
| 005 | TRANSMISSION QUALITY | SPECIFIES TRANSMISSION SPEED. A SPECIFIC BIT-RATE, OR PERMISSIBLE RANGE | 0: PACKET UNITS<br>1: AUTHENTICATION TIME UNITS | MULTIPLE SPECIFICATIONS POSSIBLE, IN ORDER OF PRIORITY |
| 006 | TIME CONDITIONS | IF SERVICE CONDITIONS VARY WITH THE TIME, DESIRED HOURS ARE SPECIFIED HERE. | START TIME (1)<br>END TIME (1)<br>START TIME (2)<br>END TIME (2)<br>: (MULTIPLE SPECIFICATIONS POSSIBLE) | OPTIONAL, IF UNSPECIFIED NO TIME CONDITIONS USED |
| 007 | BILLED INFORMATION | SPECIFIES OBSERVED INFORMATION REQUIRED FOR BILLING. (EXAMPLE: PACKET FLOW, AUTHENTICATION EXPIRATION DATE) | 0: NUMBER OF CONSUMED PACKETS<br>1: CONNECTED AUTHENTICATION TIME | REQUIRED |
| 008 | BILLING UNITS | AMOUNT OF USE CORRESPONDING TO MESSAGE RATE | 0: 100 PACKETS/MESSAGE RATE<br>1: 30 SECONDS/MESSAGE RATE | REQUIRED IF ID 0006 SPECIFIED |
| 009 | UPPER LIMIT TO BILLED AMOUNT | UPPER LIMIT TO BILLED AMOUNT, PER MONTH, OR PER SERVICE SESSION | 0: NOT SPECIFIED<br>XXXXX (AMOUNT): UPPER LIMIT | OPTIONAL |
| 010 | PRIORITY PARAMETER | OF THE ABOVE, ITEMS GIVEN PRIORITY IN BILLING CONDITION MATCHING PROCESSING | CONDITION ID | OPTIONAL, IF UNSPECIFIED, XSP PRIORITY ORDER USED |
| 011 | (INDIVIDUALLY DEFINED) | EXAMPLE: CONTENT DELIVERY METHOD | EXAMPLE: RESPONSE PRIORITY<br>EXAMPLE: BILLING CONDITION PRIORITY | OPTIONAL |

FIG. 66A

SPECIFIED USER BILLING PROFILES (CONDITIONS
SIMPLIFIED FOR PURPOSES OF EXPLANATION)

| CONDITION NAME | DESIRED TRANSMISSION RATE (U1) | OBJECT OF BILLING (U2) | DESIRED DISPLAY SIZE (U3) |
|---|---|---|---|
| SPECIFIED VALUE | 128kbps | NUMBER OF PACKETS | 800 × 600 |

FIG. 66B

SERVER BILLING PROFILE
(CONDITIONS SIMPLIFIED FOR PURPOSES OF EXPLANATION)

| CONDITION NAME | TRANSMISSION SPEED PROVIDED (S1) | OBJECT OF BILLING (S2) | DISPLAY SIZE OFFERED (S3) |
|---|---|---|---|
| SPECIFIED VALUE | EITHER OF THE FOLLOWING TWO PROVIDED:<br>(1) 256kbps<br>(2) 512kbps | EITHER OF THE TWO FOLLOWING OFFERED:<br>(1) CONNECTED TIME UNITS<br>(2) CONTENT UNITS | 800 × 600 DOTS |

FIG. 67A

COMPARISON RESULTS

| COMPARISON OBJECT | COMPARISON RESULTS | EVALUATION VALUE COMPLETE MATCH IS 0; FOR INCOMPLETE MATCH, VALUES LESS THAN 0 IN DESCENDING ORDER, STARTING WITH VALUES CLOSEST TO DESIRED VALUE |
|---|---|---|
| COMPARISON OF CONDITIONS U1 AND S1 | CONDITIONS DO NOT MATCH AS REPLACEMENT CONDITIONS, THE FOLLOWING PRESENTED FIRST CANDIDATE: 256 kbps SECOND CANDIDATE: 512 kbps | FIRST CANDIDATE : -1 SECOND CANDIDATE : -2 |
| COMPARISON OF CONDITIONS U2 AND S2 | CONDITIONS DO NOT MATCH AS REPLACEMENT CONDITIONS, THE FOLLOWING PRESENTED FIRST CANDIDATE: CONNECTION TIME UNITS SECOND CANDIDATE: CONTENT UNITS | FIRST CANDIDATE : -1 SECOND CANDIDATE: -2 |
| COMPARISON OF CONDITIONS U3 AND S3 | COMPLETE MATCH | 0 |

FIG. 67B

"ADJUSTED BILLING CONDITIONS" PRESENTED TO USER (ASSUMPTION: ORDER OF PRIORITY OF FOLLOWING CONDITIONS FOLLOWS ORDER IN TABLE)

| CONDITION | CONDITIONS PRESENTED | SUM OF EVALUATION VALUES (NOT PRESENTED TO USER) |
|---|---|---|
| RECOMMENDED CONDITIONS 1 | TRNSMISSION SPEED: 256 kbps OBJECT OF BILLING: CONNECTED TIME SCREEN DISPLAY SIZE: 800×600 DOTS | (-1)+(-1)+ 0 = -2 |
| RECOMMENDED CONDITIONS 2 | TRANSMISSION SPEED: 512 kbps OBJECT OF BILLING: CONNECTED TIME SCREEN DISPLAY SIZE: 800×600 DOTS | (-1)+(-2)+ 0 = -3 |

FIG. 68

| CONDITION ID | CONDITION NAME | SPECIFIED VALUE |
|---|---|---|
| 000 | ENTERPRISE CODE | COMPANY A |
| 001 | APPLICATION TYPE | STREAMING RECEPTION |
| 002 | XSP ENTERPRISE IDENTIFIER CODE | COMPANY B |
| 003 | SERVICE NAME | SECURED DOWNLINK BANDWIDTH |
| 004 | PRIORITIZED CONDITION | FEE CONDITION (LOW PRICE) HAS A HIGH PRIORITY |
| 005 | TRANSMISSION QUALITY | 1Mbps |
| 006 | TIME CONDITIONS | NONE |
| 007 | OBJECT FOR BILLING | NUMBER OF PACKETS RECEIVED |
| 008 | BILLING UNITS | 0.0001 YEN/PACKET |
| 009 | UPPER LIMIT TO BILLED AMOUNT | NONE SPECIFIED |
| 010 | PRIORITY PARAMETER | CONDITION ID |

FIG. 69

| CONDITION ID | CONDITION NAME | SPECIFIED VALUE |
|---|---|---|
| 000 | SERVICE IDENTIFIER | STREAMING |
| 001 | SUPPORTING CARRIERS | COMPANY A, COMPANY C |
| 002 | XSP ENTERPRISE IDENTIFIER CODE | COMPANY B |
| 003 | SERVICE NAME | SECURED DOWNLINK BANDWIDTH |
| 004 | PRIORITIZED CONDITION | TRANSMISSION QUALITY, HAS A HIGH PRIORITY |
| 005 | TRANSMISSION QUALITY | 1: 300 Kbps<br>2: 1 Mbps<br>3: 3 Mbps |
| 006 | TIME CONDITIONS | NONE |
| 007 | OBJECT FOR BILLING | NUMBER OF PACKETS RECEIVED |
| 008 | BILLING UNITS | 1. 0.0001 YEN/PACKET, 300 kbps<br>2. 0.0003 YEN/PACKET, 1 Mbps<br>3. 0.001 YEN/PACKET, 3 Mbps |
| 009 | UPPER LIMIT TO BILLED AMOUNT | NONE SPECIFIED |
| 010 | PRIORITY PARAMETER | CONDITION ID |

FIG. 70

| CONDITIONS | CONDITIONS PRESENTED | (REFERENCE) SUM OF EVALUATION VALUES (NOT PRESENTED TO USER) |
|---|---|---|
| RECOMMENDED CONDITIONS 1 | TRANSMISSION RATE: 300Kbps<br>BILLING UNITS: 0.0001 YEN/PACKET | $(-1) + 0 = \underline{-1}$ |
| RECOMMENDED CONDITIONS 2 | TRANSMISSION RAT: 1Mbps<br>BILLING UNITS: 0.0003 YEN/PACKET | $0 + (-1) = \underline{-1}$ |
| RECOMMENDED CONDITIONS 3 | TRANSMISSION RATE: 3Mbps<br>BILLING UNITS: 0.001 YEN/PACKET | $(-1) + (-1) = \underline{-2}$ |

| NAI | IP ADDRESS | BILLING CONDITIONS BY SERVICE | BILLING CONDITION IDENTIFIER | LIFETIME | SERVICE STATE |
|---|---|---|---|---|---|
| User1@domain1 | 10.10.10.5 | AAA | XXX1 | 10 MIN | PROVIDED |
| | | BBB | XXX2 | 10 MIN | HALTED |
| | | CCC | XXX3 | 10 MIN | HALTED |

FIG. 73

| GROUP IDENTIFIER (ONE ASSIGNED PER GROUP OF CANDIDATES OF BILLING CONDITION IDENTIFIERS) | BILLING CONDITION IDENTIFIER (VALUES UNIQUELY INDICATING INDIVIDUAL SETS OF BILLING CONDITIONS) | MANAGEMENT STATE FLAG (PROVISIONAL REGISTRATION IN USE, OTHER (SITUATION UNKNOWN, ETC)) | EXPIRATION DATE (TIME REMAINING UNTIL NEXT UPDATE) |
|---|---|---|---|
| 10000223 | 0×10000F | PROVISIONAL REGISTRATION | 350 SECONDS |
| 10000223 | 0×100034 | IN USE | 225 SECONDS |
| 10000789 | 0×1000B8 | IN USE | 35 SECONDS |

EXAMPLE OF BILLING CONDITION IDENTIFIER MANAGEMENT TABLE WITHIN EN

FIG. 86

| | MESSAGE NAME | DIRECTION OF MESSAGE TRANSMISSION | USE |
|---|---|---|---|
| ① | BILLING INITIATION REQUEST | XSPN → BILLING ENGINE | REQUESTS INITIATION OF BILLING OPERATION UNDER THE RELEVANT CONDITIONS, BY SENDING BILLING CONDITION DATA TO THE BILLING ENGINE |
| ② | BILLING INITIATION REPLY | BILLING ENGINE → XSPN | REPLY TO A BILLING INITIATION REQUEST. HOWEVER, THE REPLY IS ISSUED ONLY WHEN SPECIFIED IN THE BILLING INITIATION REQUEST MESSAGE. THIS MESSAGE GIVES NOTIFICATION OF THE RESULT OF BILLING CONDITION DATA SETTING (COMPLETED, ERROR, ETC). |
| ③ | BILLING HALT REQUEST | XSPN → BILLING ENGINE | REQUESTS THAT THE BILLING ENGINE HALT A BILLING OPERATION CURRENTLY BEING EXECUTED. THE BILLING CONDITION IDENTIFIER CORRESPONDING TO THE BILLING CONDITIONS TO BE HALTED IS ATTACHED TO THIS MESSAGE. |
| ④ | BILLING HALT REPLY | BILLING ENGINE → XSPN | WHEN A REPLY IS SPECIFIED IN A BILLING HALT REQUEST, THIS MESSAGE IS RETURNED. THE CONTENT RETURNED IS THE RESULT OF HALTING THE BILLING OPERATION. |
| ⑤ | BATCH SETTLEMENT INFORMATION PRESENTATION | BILLING ENGINE → SETTLEMENT INFORMATION SERVER → XSPN | AUTONOMOUSLY SENT BY THE BILLING ENGINE (BILLING ENGINE CONTROL FUNCTION UNIT) ON RECEIPT OF A BILLING HALT REQUEST MESSAGE. |
| ⑥ | SERIAL SETTLEMENT INFORMATION PRESENTATION | BILLING ENGINE → SETTLEMENT INFORMATION SERVER → XSPN | DIFFERS FROM A BATCH SETTLEMENT INFORMATION PRESENTATION MESSAGE IN THAT IT IS SENT AFTER A FIXED PERIOD, BASED ON CONTRACT CONDITIONS WITH THE XSP. |
| ⑦ | SETTLEMENT INFORMATION APPROVAL | XSPN → SETTLEMENT INFORMATION SERVER → BILLING ENGINE | REPLY MESSAGE COMMON TO BATCH/SERIAL SETTLEMENT INFORMATION PRESENTATION MESSAGES; APPROVED OR REJECTED (INCLUDES REASON IN CASES OF DEFICIENCY IN BILLING CONTENT). |

BILLING SYSTEM, AND DEVICE CONSTITUTING SAME

BACKGROUND OF THE INVENTION

1. Field of the Invention

This invention relates to a billing system, and to devices constituting this billing system, including a billing condition determination server, mobile nodes, and router device.

2. Description of the Related Art

The rapid expansion of the Internet has resulted in a sharp increase in IP packet traffic. Further, the spread of cellular telephones has been accompanied by standardization under International Mobile Telecommunications 2000 (IMT-2000), and it is anticipated that high-speed IP communications in a mobile environment will continue to expand. Despite this rapid technological change, technologies enabling faster IP communications, that is, QoS at individual terminals, as well as network-wide load distribution of WWW servers, cannot be described as sufficiently mature given the anticipated demand.

The present invention provides a billing method necessary to perform billing according to service details in the IP service control mechanism of an IP network which includes a mobile environment, and which enables service management and execution in terminal (subscriber) units. That is, the present invention provides a billing method to perform billing for individual terminals connected to the Internet, and in units of the services provided to these terminals.

Further, the present invention provides a billing method for billing services which continuously provide information from a plurality of servers. Businesses are emerging which offer integrated services which utilize geographically distributed server groups, as one form of new information delivery service employing networks. Specifically, in contrast with existing car navigation systems which preserve map information in storage devices within automotive systems, these services distribute map information for required regions, such as the vicinity of the current location, via a network. In this type of service, while there is one map information provider, the servers and other equipment providing services are distributed geographically, and map information to be distributed to each server is retained separately. In other words, there exist servers which handle the delivery of information related to different regions. This configuration aims at improvement of the response time for users when distributing maps and other information, data sizes of which are anticipated to increase, as well as alleviation of network traffic and distribution of map server loads. It is necessary to establish a billing method for billing services which continuously provide information from such a plurality of servers; the present invention concerns such a billing method.

PBN (Policy-Based Networking)

A framework for control of IP networks under the concept of PBN (Policy-Based Networking) is being proposed by a group centered on Cisco, 3Com, and other U.S. vendors. In PBN, a policy server sets network operation policies in routers and other network equipment groups, and the network equipment groups achieve QoS and provide other services by referring to these policies. However, when the setting of policies for each mobile node is considered, it is necessary to set policies for all network equipment groups for which there is a possibility of accommodating mobile nodes when policies are appended or modified, so that the volume of processing to set policies over the entire network is increased. Further, in order to apply information provided by PBN to basic services prescribed for Mobile IP or similar, it has been necessary to prepare specifications and study implementation for the purpose of application to the respective services. In other words, with PBN, it is difficult to provide different service control, such as QoS control, for each user or terminal. Hence the applicant of this application proposes an "integrated IP service control architecture" which provides IP services customized for each user or terminal on the Internet.

Integrated IP Service Control Architecture

As one requirement made of the Internet, it is anticipated that with the advancing diversification of applications and terminal capacity, well-defined service control functions for each user will become necessary. However, the Internet in its current state, or with the above-described PBN, cannot be said to have sufficient functions to provide IP services customized to individual users. Features of the above "integrated IP service control architecture" proposed by the applicant of this application are: (1) IP services customized to each user are provided; (2) by regarding stationary terminals as mobile nodes with mobility 0, and enhancing the location registration functions that are essential to mobile communications, the control for services to both stationary terminals and mobile nodes is executed under the base of mobile communication; and, (3) procedures and data (service control data) necessary for service control are stored only in a necessary device in the network at the time of location registration, and these are used during packet transfer to perform service control. Where implementation of this architecture is concerned, deployment to the Internet will be made possible by adopting the Mobile IP now being studied by the IETF (Internet Engineering Task Force).

In other words, the "integrated IP service control architecture" enables provision of IP services customized for each user/terminal, without differentiating between stationary and mobile nodes, and is characterized by:

(1) control technology which integrates stationary and mobile nodes;

(2) function separation technology which takes ease of deployment into consideration;

(3) technology for delivery of control information, applying location registration and location query procedures; and, (4) technology for standardization of service profiles.

The control technology integrating stationary and mobile nodes (1) regards stationary terminals as mobile nodes with mobility=0, and exercises control independent of IP network type (packet transfer method, stationary/mobile, and similar) The technology for function separation which considers ease of deployment (2) is technology which separates a layer into a service control layer and IP packet transfer layer, enabling independent development and deployment of each layer. The technology for control information delivery (3) is technology for the delivery of service control information (service profiles and location information) only to equipment related to packet transfer, upon location registration of a terminal on the network. The technology for standardization of service profiles (4) provides editing functions to the user himself, linked with a policy-based network management system.

Foundation of an Integrated IP Service Control Architecture

In the following, the (1) layer structure, (2) service control method, (3) Mobile IP principle, (4) application to Mobile IP (service profile delivery procedure), and (5) application to Mobile IP (service execution procedure) for the "integrated IP service control architecture" which is the foundation of this invention are explained.

(1) Layer Structure

FIG. 91 is a figure explaining the layer structure of the integrated IP service control architecture; the layer is separated into a service control layer SCL and an IP packet transfer layer PTL. In the service control layer SCL are provided a service profile database (also called a service control database) SPDB; a position information database PIDB; and a server SV which executes IP service control functions. Service control information for individual subscribers (terminals, such as for example quality control information (QoS), is registered at the time of contract in the service profile database SPDB, and position information indicating the current position of each subscriber, based on location registration from user terminals, is registered in the position information database PIDB. The server SV manages information for each of the databases, and distributes position information and service profile information to the edge routers ERT1, ERT2, ERT3 of the IP packet transfer layer PTL as necessary. The IP packet transfer layer PTL is positioned in the core network NW and in the vicinity of the core network, and accommodates numerous user terminals; it comprises edge routers ERT1 to ERT3 which execute specific service control, such as for example quality control services.

The server SV of the service control layer SCL (a) manages the terminal location (which router accommodates the terminal) and the service profile set in the terminal, (b) executes service control based on the service profile set in the terminal in question, and (c) distributes the location information and service profiles of prescribed terminals to edge routers. An edge router ERT of the IP packet transfer layer PTL (a) requests location registration of the service control layer SCL, (b) saves, in cache memory, the location information and service profile of the destination terminal distributed from the service control layer SCL, and (c) after saving this information, executes service control and communicates with the destination terminal based on the service profile rules stored in cache memory (cache execution function), without the mediation of the service control layer SCL.

(2) Service Control Method

FIG. 92 explains the service control method in the integrated IP service control architecture.

① The terminal MN1 (IP address: IP#M1) issues a location registration request message to the server SV of the IP service control layer SCL via the edge router ERT1. By this means, the server SV registers the IP address (IP#F1) of the router ERT1 accommodating the terminal corresponding to the terminal MN1 (IP#M1) in the position information database PIDB. The destination port number and quality control information QoS are already registered in the service profile database SPDB in association with the terminal MN1 (IP#M1). In an example, the port number 80 is an HTTP (hypertext transfer protocol) port and a high QoS (for example, high priority) is set, while port number 25 is an SMTP (simple mail transfer protocol) port, and a low QoS (for example, low priority) is set.

② In this state, when the terminal MN2 (IP#M2) first sends a data packet to the terminal MN1 (IP#M1), the data packet passes through the service control functions of the server SV, services are executed, and the packet arrives at the terminal MN1 (IP#M1). That is, the edge router ERT2 accommodating the terminal MN2 queries the server SV for the location and service profile of the terminal MN1, and based on the location information/service control information obtained, the server SV transmits the packet from the terminal MN2 (IP#M2) to the terminal MN1 (IP#M1).

③ Then, the server SV transmits the location information and service profile of the terminal MN1 (IP#M1) to the edge router ERT2 accommodating the terminal MN2 (IP#M2), as described above. The edge router ERT2 stores the transmitted information in its internal cache memory, and then refers to the location information and service profile stored in cache memory to communicate with the terminal MN1 (IP#M1).

④ After delivery of the service profile to the edge router ERT2 by the server SV, when a packet is issued from the terminal MN2 (IP#M2) to the terminal MN1 (IP#M1), the edge router ERT2 independently executes service control of the terminal MN1 and performs transmission, without the mediation of the server SV.

(3) Mobile IP Principle

FIG. 93 is a figure explaining the principle of Mobile IP. NW is the core network, ISP-1 is the home network for the terminal MN1, HA is the edge router (called the home agent) performing unified management of the home network IPS-1 of the terminal MN1, ISP-2 is an external network other than the home network, connected to the core network NW, FA is an edge router (foreign agent) performing unified management of the external network ISP-2, and AAAS is an AAA server executing authentication, authorization, and accounting processing. Mobile IP is a protocol which supports the movement of terminals in an IP network. In IP networks prior to Mobile IP, IP addresses allocated to each terminal were fixed in the number system within a specific network, and were valid only in this network; it was in essence impossible to bring these to another network. Mobile IP makes this possible.

In other words:

① The terminal MN1 moves from the home network ISP-1 to an external network ISP-2.

② When the terminal MN1 moves to the external network ISP-2, it sends a location registration request message to the foreign agent FA. By this means, the foreign agent FA requests authentication of the terminal MN1 by the AAA server.

③ When the AAA server completes authentication of the terminal MN1, it requests registration of the destination location by the home agent HA managing the terminal MN1 on the home network ISP-1 of the terminal MN1.

④ The home agent HA, having received the registration request message, recognizes the IP address (IP#f.a) of the edge router (foreign agent FA) managing the destination network ISP-2 as the destination (location) of the terminal MN1, and simultaneously creates internally a mobile connection table MCTB as location information for the terminal MN1; subsequently this table is used to manage the location of the terminal MN1. When location registration is completed, the home agent HA sends a registration reply message to the AAA server.

⑤ The AAA server relays the registration reply message, with the foreign agent FA as the destination, and the foreign agent FA notifies the terminal MN1 of the completion of location registration. Subsequently, data packets sent to the terminal MN1 are sent back to the terminal MN1 on the visited network ISP-2 via the HA/FA. In other words, packets sent to the terminal MN1 arrive, via normal routing, at the home agent HA of the home network ISP-1. The home agent HA refers to the mobile connection table MCTB, recognizes the location of the terminal MN1, and employs IP tunneling technology to compel forwarding of the packet to the foreign agent FA; the foreign agent FA then sends the packet to the terminal MN1.

(4) Example of Application to Mobile IP (Service Profile Delivery Procedure)

FIG. 94 is a figure explaining an example of application to Mobile IP (service profile delivery procedure); the AAA server is provided with IP service control functions, and at the time of location registration the service profile is distributed to the home agent HA and foreign agent FA by the AAA server. The AAA server also distributes the location information to the home agent HA. A summary of the procedure for delivery of the service profile is as follows.

① The mobile node MN (Mobile Node) sends a location registration request to the foreign agent FA as a result of movement. The foreign agent FA relays this location registration request to the AAA server.

② Upon receiving the location registration request, the AAA server registers this in the position information database PIDB, and retrieves the service profile for the mobile node MN from the service profile database SPDB.

③ The AAA server sends the retrieved service profile, together with the location information, to the home agent HA. The home agent HA stores these in internal cache memory. As a result, subsequently the home agent HA can acquire the location information and service profile for subordinate mobile nodes MN by referencing cache memory, without querying the AAA server.

④ When location registration is complete, the home agent HA sends a registration reply message to the AAA server.

⑤ In this way, the AAA server distributes the service profile of the mobile node MN to a foreign agent FA, and the foreign agent FA stores this service profile in internal cache memory.

⑥ Also, the foreign agent FA notifies the mobile node MN of the completion of location registration.

By this means, subsequently the foreign agent FA can execute a prescribed service and send packets from the terminal MN to another terminal, without querying the AAA server for the service profile or location information. Also, the home agent HA can perform the prescribed service and send packets addressed to the mobile node MN.

(5) Example of Application to Mobile IP (Service Execution Procedure)

FIG. 95 is a figure explaining an example of application to Mobile IP (service execution procedure). To summarize service execution, the home agent HA executes the service on a packet addressed to the mobile node, and the foreign agent FA executes the service on a packet issued by the mobile node. That is:

① A data packet sent from a prescribed communication node (communication node) CN to the mobile node MN arrives at the home agent HA of the mobile node MN via the edge router ERT3, is here subjected to the prescribed service, and is then sent to the foreign agent FA via the core network NW. In other words, a packet addressed to the mobile node MN is subjected to services based on the service profile held by the home agent HA.

② A packet sent from the mobile node MN to a prescribed communication node CN, on passing through the foreign agent FA of the mobile node MN, is subjected to prescribed service control based on the service profile, after which the packet is sent to the communication node CN via the edge router ERT3.

By means of the "integrated IP service control architecture" proposed above, contract conditions for service control can be set for each stationary/mobile node, and IP services (for example, bandwidth assurance or QoS control) or similar can be provided. As a result, by associating network resource usage fees with contract conditions, profits can be expected to be consistent with equipment investments.

Current Billing Technology

At present, fee systems to which subscribers make payments in Internet connection services which include stationary and mobile nodes, other than fixed-amount billing, fall into the following two categories:

(1) Billing based on packet flow and connection time
(2) Billing based on information/content service However, the service contract conditions of current service providers mainly stipulate fixed-amount billing for a contract period or similar. Introduction of a new billing mechanism such as billing based on meter rate would require the distributed deployment, in routers or other equipment in the network, of functions for calculation of service usage fees (for example, number of packets consumed); in this environment, it is difficult for an independent service provider, and in particular a new small-scale service provider to construct a meter rate-based billing mechanism with the expectation of an appropriate return on investment.

The Emergence of ASPs (Application Service Providers)

At present, ASP (Application Service Provider) businesses are appearing in various areas, and are offering various solutions. One basic conception of ASPs is as businesses which provide, via a network, package software or services which previously had been sold separately on a per-terminal basis, with fees charged according to quantity used (usage time, and/or data volume). A wide range of services are provided by ASPs, and proposed categories extend from groupware to ordinary package software. Because it is thought that the users of ASPs are often motivated by a desire to save money by paying only an amount corresponding to the actual amount of use, not intending to use the product sufficiently to justify a purchase, it is anticipated that there is a demand for meter rate-based billing and for a variety of other billing methods.

Current State of Fees for Mobile Nodes

There has been remarkable growth in data services other than voice communication for mobile nodes, and in particular for cellular phones. More specifically, these data services consist of connection to the Internet; however, services utilizing this communication foundation are nearly all information services provided on a monthly basis or purchases of goods (mobile commerce). They are characterized in that services are provided on the occasion of agreement to pay a fixed amount, regardless of the amount of information used on the network or similar; payments are not made on the basis of content, including the needs of individual users or the circumstances of data delivery over the network.

In light of the above, an operation mode is practical in which the network operator introduces volume-based billing or some other new billing mechanism, provided as general-purpose functions to the service provider. By this means it becomes possible to apply diverse billing methods, thereby activating competition among service providers. Further, if network operators act as proxy in the collection of fees, users need not conclude individual fixed contracts with service providers, and can utilize services with peace of mind, while entry of content providers into the market can be facilitated.

The Need for Strategic Billing

At present, with attempts being made to integrate all manner of information communication means into the Internet protocol (IP), activation in future of competition between competitors is anticipated as a result of thriving IP service businesses. Conceivable elements serving to differentiate such competitors include (1) differentiation of service contents (customization, specialized functions and similar), and (2) the provision of strategic pricing plans. In particular, (2) is important for ASP services, for which meter rate-based billing systems are effective, and can contribute to intensified competition among a plurality of businesses offering similar services.

Conditions Facilitating the Emergence of New and Superior Services

Hereafter, in order that highly original services may appear on the Internet as bandwidth grows, it will be necessary to establish the following foundations:

(a) Provision of a choice of various billing methods, in order to activate competition among service providers (b) Facilitation of market entry by content providers, through the proxy collection of fees by billing businesses In other words, these foundations are regarded as necessary for the emergence of highly original services. One reason for the success of i-mode is said to have been the proxy billing for content in a simple manner. If billing technology satisfying the requirements of these two foundations can be established, by linking this billing technology with technology for control of contract services in terminal units, it will become possible to set various fees not only for each terminal, but also by service type. Effective equipment investments can be made by network operators, and competition between service providers can be stimulated.

In an IP network with integrated voice and data communications, and to which various types of terminals are connected, the realization of QoS functions is vital for the protection of traffic which is sensitive to delays and traffic which is of high priority for business. As means of realizing QoS, Int-Serv and Diff-Serv methods have been proposed; of these, Diff-Serv support, with its lower overhead for carrier networks and backbones, is regarded as the more promising.

However, there are the problems that Diff-Serve requires that policies be set on network devices on the route, and that network management is complex using Diff-Serv alone. Consequently the concept of PBN (Policy-Based Networking) was proposed, in which policy settings for network equipment is set all at once on a server called a policy server. However, in a seamless global network comprising various providers and carriers supporting mobile nodes, it must be possible for all local networks to determine policies, and set information in network equipment, for all users who may possibly connect to the network. In order to accomplish this using PBN, either policy information for all users must be stored locally, or else information must be set in advance for all network equipment to which connection is possible. It is extremely inefficient and impractical to undertake this for users who may number in the hundreds of millions. Moreover, the continual storage in network equipment of policy information for all users will necessitate increases in the memory capacity of network equipment, and cause degradation of processing capability. Conversely, if a method of processing is used in which policy servers are always queried, overhead associated with queries will arise, and there is the problem of an increased possibility that SLAs (Service Level Agreements) cannot be fulfilled.

In the above-mentioned "integrated IP service control architecture", IP services implement a service control method for individual subscribers; but in providing services based on individual conditions in subscriber units, appropriate billing must be performed according to the services provided. Hence in this invention, a billing method is proposed which enables the setting of billing conditions in terminal units and in units of the services utilized by terminals, premised on cooperation with the above architecture. Specific problems 1 through 3 addressed by this billing method are listed below.

Problem 1: Flexible Introduction of Billing Functions

Currently, the units for billing services provided to mobile nodes take the form of either monthly fixed amounts, or amounts paid for specific items, and billing is performed only under fixed conditions determined by the service provider, rather than in user units.

Hereafter, it is anticipated that more high-quality content will be provided over the mobile Internet, the bandwidth of which will continue to increase; these services are expected to become practical under quality control of IP services in the core network. Hence it will be necessary to set appropriate pricing plans for high-quality applications, and in order to induce competition among content providers, diverse billing methods in user units and in service type units must be provided. As one basic market principle, in order to engender active competition among businesses, it is important that customers be offered a variety of choices with respect to billing methods.

When individual services are to be offered in terminal units (user units), rules for billing in terminal units (billing conditions) will differ.

Further, in order to set separate billing conditions for individual mobile nodes, and to enable application of these billing conditions in a destination network, the billing conditions for the mobile nodes must be set in all the billing devices (billing engines) within the network. In this case, if some innovation is not made, it becomes necessary to set in advance, for one billing device, the billing conditions for the vast number of all the terminals accommodated by the network; this is not practical from the standpoint of application to the large-scale network of a network control mechanism.

Further, one promising method to promote the emergence of diverse services is to offer a variety of billing conditions, making it easier for a service provider to put forward characteristic features of the service. To this end, permissible conditions for billing services in terminal units are stipulated, and service providers are offered a variety of billing conditions. By this means, it is possible to greatly expand the possible patterns of service conditions which can be offered, and services meeting user needs can be provided.

Problem 2: Application of Billing to Mobile Nodes

Currently, the principal technology for quality control in mobile nodes is smooth handoff technology. This technology aims at the continuation of data communication when a mobile node moves between base stations. However, current handoff technology executes transmission control in packet units in layer 3 (the IP layer), and is not linked with the authentication session information of the upper application level. On the other hand, in a fee-based service the billing function portion within the network must recognize session information related to the service. For this reason, when introducing a high-quality fee-based application, it becomes necessary to precisely understand and inherit billing information when a service is provided to a mobile node. For example, in the provision of a fee-based application which has begun between a server and a mobile node, functions are required so that billing information related to the fee-based application is exchanged between the new and old base stations at the time of handoff, and billing can be continued immediately after movement.

Problem 3: Realization of Proxy Billing

Many of the current fee-based services on the Internet are being developed by large-scale businesses by exploiting sophisticated facilities, data centers in particular. Among the pioneers of this business model were amazon.com of the U.S. and others; they are said to be driving existing store-based bookstores out of business. However, although the sales volume of amazon.com continues to grow, it cannot be called profitable. The reasons for this include the considerable costs incurred in the introduction and maintenance of an extremely high-cost infrastructure (servers, transmission lines); on the other hand, this acts as a barrier to the market entry of smaller-scale businesses.

In future, an inexpensive and highly reliable commercial transaction infrastructure will be necessary for businesses of all sizes, and in all industries, in order to enter the market as an IP service provider. In addition to adequate transmission line capacity and servers, in order to provide ASP (Application Service Provider) services, it will also be necessary to provide flexible billing functions.

Consequently, by providing billing functions and performing proxy billing for businesses planning to offer IP services, a network operator can facilitate the market entry of new and small-scale businesses. In order to perform proxy billing, billing devices must be deployed within the network, and packets related to the service which is to be billed must be observed and information extracted.

Problem 4: Billing Technologies which can be Applied to IPv4 and IPv6 Respectively It is necessary to provide both billing technology which solves the above problems 1 to 3 in a network configuration based on IPv4/Mobile IP, and billing technology which solves the above problems 1 to 3 in a network configuration based on IPv6, which is regarded as the basis of a future commercial Internet protocol.

SUMMARY OF THE INVENTION

In light of the above, an object of the present invention is to enable billing according to the service provided to each user.

Another object of the present invention is to enable the provision of various billing methods, in service type units.

Still another object of the present invention is to offer a billing system in which permissible conditions related to billing are prepared for both the user and the service provider, the permissible conditions for both parties are compared each other at the time of initiation of the service, billing conditions for the provided service are generated dynamically by the comparison, and billing is enabled according to these billing conditions.

Still another object of this invention is to enable proxy billing within the network for fee-based services.

Still another object of this invention is to enable support for billing control for a terminal even when the terminal moves. That is, even if handoff occurs as a result of terminal movement, support is provided for the handing over of billing conditions generated dynamically through a procedure for negotiation between user and service provider upon the initiation of the service, and for the continuation of service provision and of billing.

Still another object of this invention is to enable the execution of a procedure for price negotiation/setting of billing conditions, utilizing the location registration procedure.

Still another object of this invention is to provide billing technology which can be applied to a network based on IPv4/Mobile IP, and billing technology which can be applied to a network based on IPv6.

The first through fourth inventions are billing technologies which can be used in a network configuration based on IPv4/Mobile IP; the fifth and sixth invention are billing technologies which can be used in a network configuration based on IPv6.

The first invention is a billing system which performs processing to provide a user terminal with a service in cooperation with location registration processing of the user terminal, performs billing for the service provided to the user terminal, and comprises (1) a user billing profile registration unit, which stores a user billing profile for each service type and for each user terminal; (2) a billing condition generation unit, which generates billing conditions based on a user billing profile corresponding to a specified service type and user terminal; (3) a billing unit, provided within the network, which executes billing processing for each user terminal based on the above generated billing conditions; and, (4) a billing condition setting unit which sets, in the billing unit, the above generated billing conditions. By means of this billing system, permissible conditions relating to billing are prepared for both the user and the service provider, the permissible conditions for both parties are compared each other at the time of service initiation, billing conditions for the service provided are generated dynamically by the comparison, and billing can be performed according to the billing conditions. Further, proxy billing of fee-based services can be performed by the billing unit within the network.

The billing system of the first invention further comprises (5) a new billing unit, which, after handoff due to movement, executes billing processing according to newly set billing conditions, and (6) a new billing condition setting unit, which sets the above billing conditions in the new billing unit. The new billing condition setting unit acquires the billing conditions which had been applied in the old billing unit and sets these in the new billing unit, and the new billing unit executes billing processing under the same billing conditions as the old billing unit. By this means, even when a mobile node moves and a handoff occurs, the billing conditions which had been dynamically generated as a result of a negotiation procedure between user and service provider at the time of service initiation are handed over, and service provision and billing control can be supported.

The second invention is a billing condition determination server in a billing system which performs processing to provide a service to a user terminal in cooperation with the location registration processing of the user terminal and performs billing of the service provided to the user terminal, and the billing condition determination server comprises (1) a server billing profile registration unit, which saves one or more server billing profiles which describe service information in association with fees, (2) a billing condition generation unit, which determines billing conditions for a provided service by comparing a user billing profile corresponding to a specified service type and user terminal with each server billing profile, and (3) means for notifying the billing unit of the determined billing conditions. This billing condition determination server causes permissible conditions relating to billing to be prepared for both user and service provider, so that the permissible conditions for both parties are compared each other to generate billing conditions at the time of service initiation, billing conditions for the provided service can be generated dynamically, and the billing unit can be notified.

The third invention is a mobile node in a billing system which performs processing to provide a service to a mobile node in cooperation with the location registration processing of the mobile node and performs billing of the service provided to the mobile node, and the mobile node has means for sending a location registration message, including a service request, to the network. Based on this service request, the network performs, in parallel with the location registration procedure for each user terminal and for each requested service, processing to generate billing conditions and processing to start up a billing unit, so that billing conditions can be generated and startup of the billing unit can be completed prior to service execution.

The fourth invention is a router device in a billing system which performs processing to provide a service to a user terminal in cooperation with the location registration processing of the user terminal and performs billing of the service provided to the user terminal, and the router device comprises (1) a billing unit which executes billing processing for each user terminal based on billing conditions generated by a billing condition generation unit, and (2) a billing condition setting unit which sets the above generated billing conditions in the billing unit. The billing unit executes billing according to the service provided to the user terminal. By means of this router device, proxy billing for fee-based services can be performed by a billing unit in the network.

The fifth invention is a billing system which performs billing for services provided to a user terminal via a network and comprises a service providing node, which provides a service to a user terminal; a billing control node, which compares a user billing profile in which are recorded the service provision conditions desired by the user terminal with the server billing profile in which are recorded service provision conditions permitted by the service provision node, and generates billing conditions relating to the service provided to the user terminal; an edge node, which, by attaching the above user billing profile to a message passing through based on the service provision request from the user terminal, sends the billing profile to the above billing control node, either directly, or indirectly via the service providing node; and, a proxy billing unit, which performs billing for the service provided to the user terminal by the service provision node in place of the service providing node, according to the above billing conditions. By means of the fifth invention, functions similar to the billing technology of the first invention are realized, while dispensing with the functions appended to the network and terminals. Moreover, by means of the billing technology of the fifth invention, the transmission route for billing control messages can be optimized compared with the billing technology of the first invention. Further, by means of the billing technology of the fifth invention, by separating the service providing node XSPN as a service provider-side device and the billing control node BCN, billing can be performed even for a service provision mode in which a service is provided by a plurality of distributed servers.

A sixth invention is a billing system which performs billing for service provided to a user terminal over a network, and comprises a service provider node, which provides service to a user terminal; a billing control node, which compares a user billing profile in which are recorded service provision conditions desired by the user terminal and a server billing profile in which are recorded service provision conditions permitted by the service provider node, and generates billing conditions relating to the service provided to the user; and, a proxy billing unit, which, in place of the service provider node, performs billing according to the above billing conditions relating to the service provided by the service provider node to the user terminal. In this sixth invention, because the service provider node XSPN or billing control node BCN directly acquires the user billing profile from a billing information database, the load on the edge node can be alleviated.

Other features and advantages of the present invention will be apparent from the following description taken in conjunction with the accompanying drawings.

BRIEF DESCRIPTION OF THE DRAWINGS

FIG. 6 is an example of an anycast address connection table;
FIG. 7 is an example of a routing table;
FIG. 8 is an example of a binding cache;
FIG. 9 is an example of a service control filter;
FIG. 13 is an example of a control table for AAAH server service control transactions;
FIG. 14 is an example of a service control database;
FIG. 20 is an example of an NAI registration table of a mobile node retained by a foreign agent FA;
FIG. 21 is an example of an NAI prefix table;
FIG. 23A and FIG. 23B are examples of a user billing profile and server billing profile used in this invention.

FIG. 55 is a figure explaining the network configuration and linking method when direct linking the billing information database and billing control node BCN;

FIG. 56 is a table explaining the types of messages exchanged between the billing control node BCN and billing information database;

FIG. 57 shows the flow of processing when the billing control node BCN directly acquires a user billing profile;

FIG. 58 is a figure explaining the network configuration and linking method when directly linking the billing information database and service provider node XSPN;

FIG. 59 is a table explaining the types of messages exchanged between the service provider node XSPN and billing information database;

FIG. 62 is an example of the basic configuration of a user billing profile;

FIG. 63 is an example of description of specific conditions of a billing profile;

FIGS. 66A and 66B are examples of a user billing profile and server billing profile;

FIGS. 67A and 67B are examples of comparison results and of a candidate billing condition presented to the user;

FIG. 68 is another example of a user billing profile;

FIG. 69 is another example of a server billing profile; and,

FIG. 70 is a figure explaining billing conditions presented to the user.

FIG. 73 is an example of a billing condition identifier management table within an edge node;

FIG. 86 is a message example;

Figure 1:
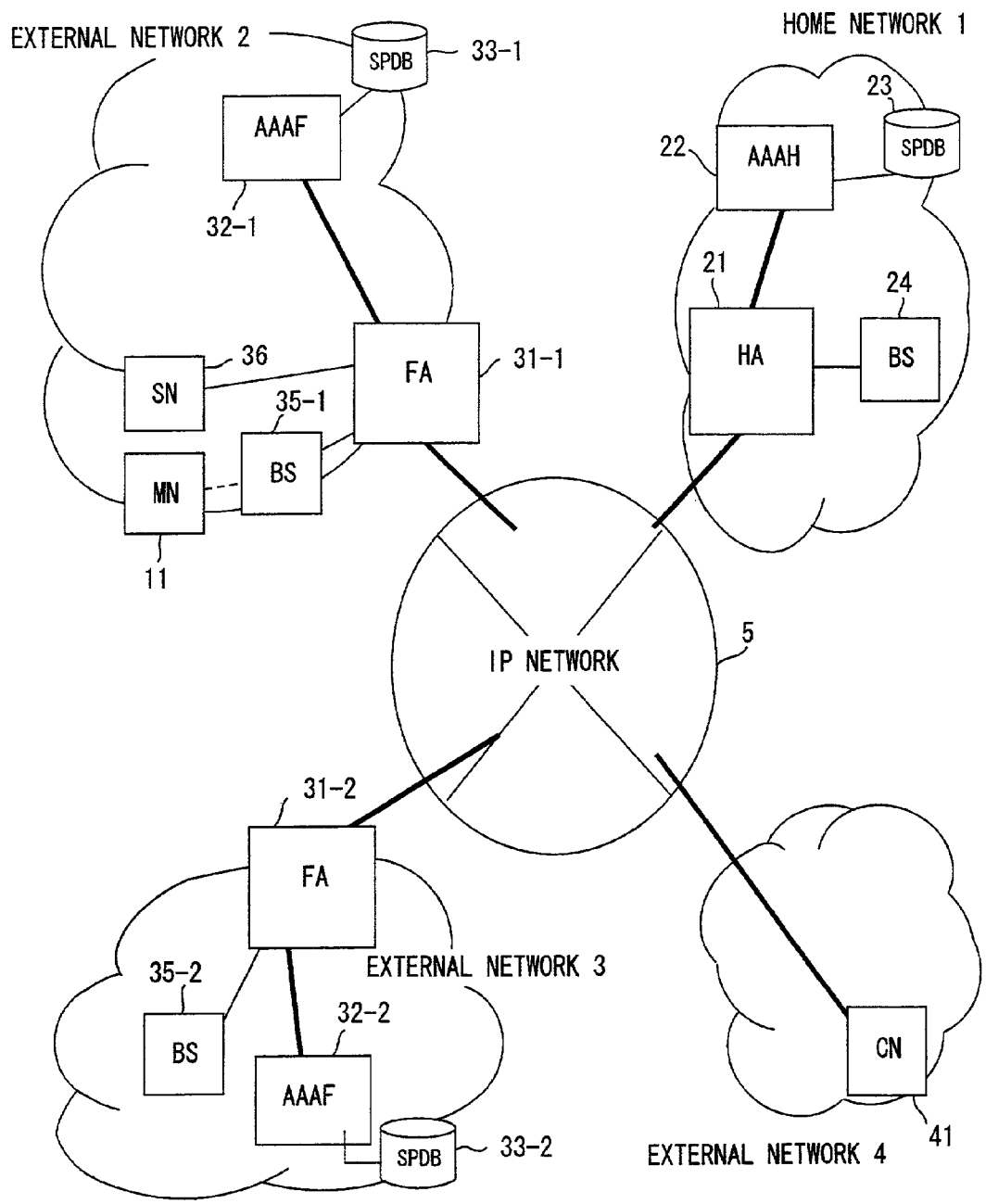
FIG. 1 is a figure of the overall configuration of a network to which this invention can be applied.

DESCRIPTION OF THE PREFERRED EMBODIMENTS (A) Summary of the First Billing Technology of This Invention Terminal-unit contract services may be broadly divided into two:
(1) Basic services
(2) Additional services (fee-based services)

Basic services are determined to be services provided to a terminal at the time of conclusion of a contract, and conform to the service profile adopted at the time of contract. Additional services are fee-based services provided according to conditions set by the service provider. This invention provides means of resolving problems relating to the billing functions which are necessary for provision of additional services.

Price Negotiation Between Users and Service Providers

As additional services, it is desirable that the service provider itself freely sets prices and billing conditions over a fixed range, and that a user selects a prescribed service, taking price into consideration. It is also desirable that proxy billing of the fees collected here be performed by a network operator (carrier), facilitating the market entry of service providers.

Hence in the present invention, (1) billing profiles (user billing profiles, server billing profiles) in which are described individual fee conditions are placed on both the user side and the service provider side, both billing profiles are referenced prior to service execution, and billing conditions which an be provided are automatically extracted and generated; (2) also, billing information is collected by a device in the network (a billing engine) in order to perform proxy billing.

Support for Billing of Mobile Nodes

Billing of mobile nodes must be supported even when a mobile node moves among base stations. That is, even when a handoff occurs, a fee-based service for which fee negotiations have been completed must not be interrupted, quality must be maintained, and billing must be continued under the same billing conditions.

In the present invention, when a handoff occurs, connection information exchanged between the new and old base stations is used to transmit billing information. The billing information and application-level session information are exchanged among the new and old base stations and referenced. By this means, application session information and billing information issued at the time of initial registration can be handed over in the event of terminal movement between base stations.

Occasions for Execution of Price Negotiation and Billing Preparation Procedures

In order to enable billing for additional services, the occasions for execution of certain operations must be determined.

(1) The occasion for execution of a price negotiation procedure between user and service provider must be determined.

(2) Similarly to existing telephone networks, in addition to billing information, a history of utilization corresponding to call information must be precisely collected and the occasion for execution of the collection must be determined.

These must be completed prior to service execution; performing them after the detection of a service packet would be inadequate.

Hence in the first billing technology of this invention, the above procedure is included in the location registration procedure for a mobile node. In general, the interest of the user of a mobile node lies in execution of the service itself, and a user is not aware of location registration of a terminal, which is an operation of the network layer. It is desirable that the above two procedures to provide fee-based additional services be executed with a timing which does not require the awareness of the user.

(B) Network Configuration (a) Overall Configuration

FIG. 1 is a figure of the overall configuration of a network, based on IPv4/Mobile IP, to which the first billing technology of this invention can be applied. A home network 1, managed by the service provider of mobile node (MN) 11, and external networks 2 to 4, each managed by other service providers, are connected via an IP relay network 5.

A home agent (HA) 21 and AAAH (Authentication, Authorization, Accounting Home) server 22 are provided in the home network 1 of the mobile node (mobile node) 11. The home agent 21 is a functional entity defined by RFC2002, and is realized by, for example, a router device. Also, the home agent 21 possesses and manages a home address allocated to the mobile node 11, and manages the location of the mobile node. The AAAH server 22 is a server device which executes processing related to authentication, permission, and billing for the mobile node; "AAAH" is a name used within the IETF. A plurality of AAAH servers and a plurality of home agents HA may be provided in the home network 1, but in the figure, only one of each is shown.

The service profile database (SPDB) 23 stores service control information (service profiles) in order to provide communication services to each mobile node; it can be accessed only by the AAAH server 22. There are no particular limits imposed on the search protocol for the service profile database (SPDB) 23; for example, the LDAP (Lightweight Directory Access Protocol) may be used. To each home agent 21 is connected a base station (BS) 24. A base station 24 comprises a wireless interface, and a wireless transmission channel with terminal devices (including mobile nodes) is established. As the wireless access method, for example, MCCDMA (Multi-Carrier Code Division Multiple Access) may be adopted.

Foreign agents (FAs) 31-1, 31-2, AAAF (Authentication, Authorization, Accounting Foreign) servers 32-1, 32-2, service profile databases (SPDBs) 33-1, 33-2, base stations 35-1, 35-2, a stationary terminal (SN, for "Stationary Node") 36, and similar are provided in the external networks 2 to 4. The foreign agent 31 is a functional entity defined in RFC2002, and is realized by a router device. This foreign agent 31 provides the functions of a home agent HA to a mobile node (a managed mobile node) to which is assigned its own home address as a result of a contract, and provides the functions of a foreign agent FA to other mobile nodes.

Like the AAAH server 22, the AAAF server 32 executes processing related to authentication, permission, and billing for mobile nodes. However, the AAAH server and AAAF server (referred to collectively as "AAA servers") each execute processing related to authentication, permission, and billing only for the mobile nodes they manage. Hence when an AAA server receives an access request (for example, an authentication request) from a mobile node which it does not manage, it issues an order for the AAA server managing the mobile node to perform the processing related to the request; on receiving this order, the AAA server processes the above access request. To the mobile node issuing the access request, the AAA server which has sent the order is an AAAF server, and the AAA server receiving the order is the AAAH server for the mobile node.

While moving, the mobile node 11 is accommodated by the home agent HA 21, and due to its motion is accommodated by an arbitrary edge router (foreign agent) 31-1 to communicate with other terminal devices. A terminal device which communicates with the mobile node 11 is called a communication node (CN). Such a communication node CN 41 may exist, for example, within the external network 4. When the mobile node 11 utilizes a wireless transmission channel for communication, it is accommodated by an edge router (foreign agent) 31-1 via the base station 35-1, as shown in the figure.

(b) Detailed Configuration of Principal Portions

Figure 2:
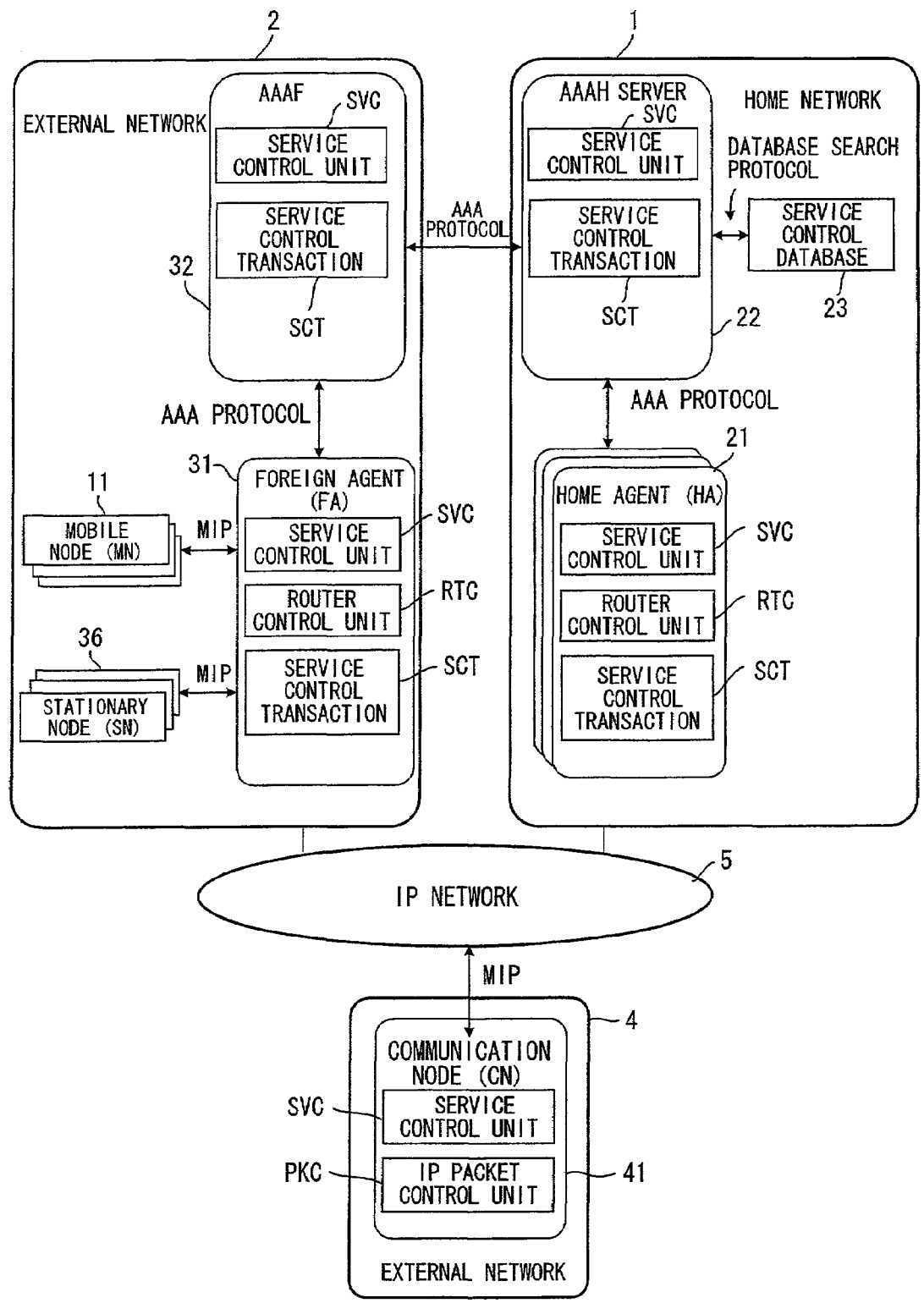
FIG. 2 is a detailed figure of the principal portions of FIG. 1.

FIG. 2 is a detailed figure of the principal portions of the home network 1 and external networks 2, 4 in FIG. 1. The home network (service provider) 1 comprises the home agent 21, AAAH server 22, and service control database (service profile database) 23; the AAAH server 22 is connected to at least one home agent 21 by an AAA protocol or similar. As the AAA protocol, the DIAMETER protocol currently being studied by IETF can be used. The AAAH server 22 is connected to the service control database 23 by the LDAP database search protocol; in this service control database 23 are registered [1] information relating to mobile nodes, stationary terminals, and the users of these terminals; [2] QoS information (service quality information); [3] the order of priority for packet transmission; [4] packet filtering information used to prohibit access to harmful WWW information or similar; [5] security information; and [6] information related to Diff-Serv. The AAAH server 22 can use the LDAP database search protocol to obtain service profile information for a prescribed terminal from the service control database 23.

The external network (access provider) 2 comprises the foreign agent 31 and AAAF server 32; the foreign agent 31 is connected to the mobile node (mobile node MN) 11 and stationary terminal (stationary node SN) 36. The AAAF server 32 is connected to the foreign agent 31 by the AAA protocol; the mobile node 11 and stationary terminal 36 are connected to the foreign agent 31 via MIP (Mobile IP). The mobile node 11 is outside the range in which communication with the contracting service provider (home network) 1 is possible, and located within the range of possible communication of the access provider (external network) 2, and is connected with the foreign agent 31 via the MIP protocol.

The AAAH server 22 is connected to the AAAF server 32 of the access provider 2, which is an external network, via the AAA protocol; but these may also be connected via the IP network 5.

(c) Agents

Agent Functions

The IP addresses of mobile nodes are managed by the corresponding home agents HA, and packets are transferred based on the IP addresses. That is, a packet addressed to the mobile node 11 is first transferred to the home agent 21. If the mobile node 11 exists within the home network, the home agent 21 transfers the packet to the mobile node 11.

However, if the mobile node 11 has moved from the home network 1 to an external network 2, as shown in the figure, by means of a registration request from the mobile node 11, the foreign agent 31 performs location registration with the home agent 21. When, as a result, the home agent 21 receives a packet addressed to the mobile node 11, this packet is encapsulated (a new IP header, in which the foreign agent 31 is set as the destination, is appended to the received packet) according to the above-mentioned location registration notification, and the packet is transferred to the foreign agent 31. By deleting the newly appended IP header from the received packet, the foreign agent 31 decapsulates the packet, and transfers the packet to the address of the original header, that is, the address of the mobile node 11. By this means, even if the mobile node 11 moves, the above packet is sent to the mobile node 11. When transferring a packet, a link layer address corresponding to the home address of the mobile node 11 can also be used for packet transfer. The correspondence between the IP address and link layer address is managed by a table called a visitor list (described below).

Functional Block Diagram of Agents

Figure 3:
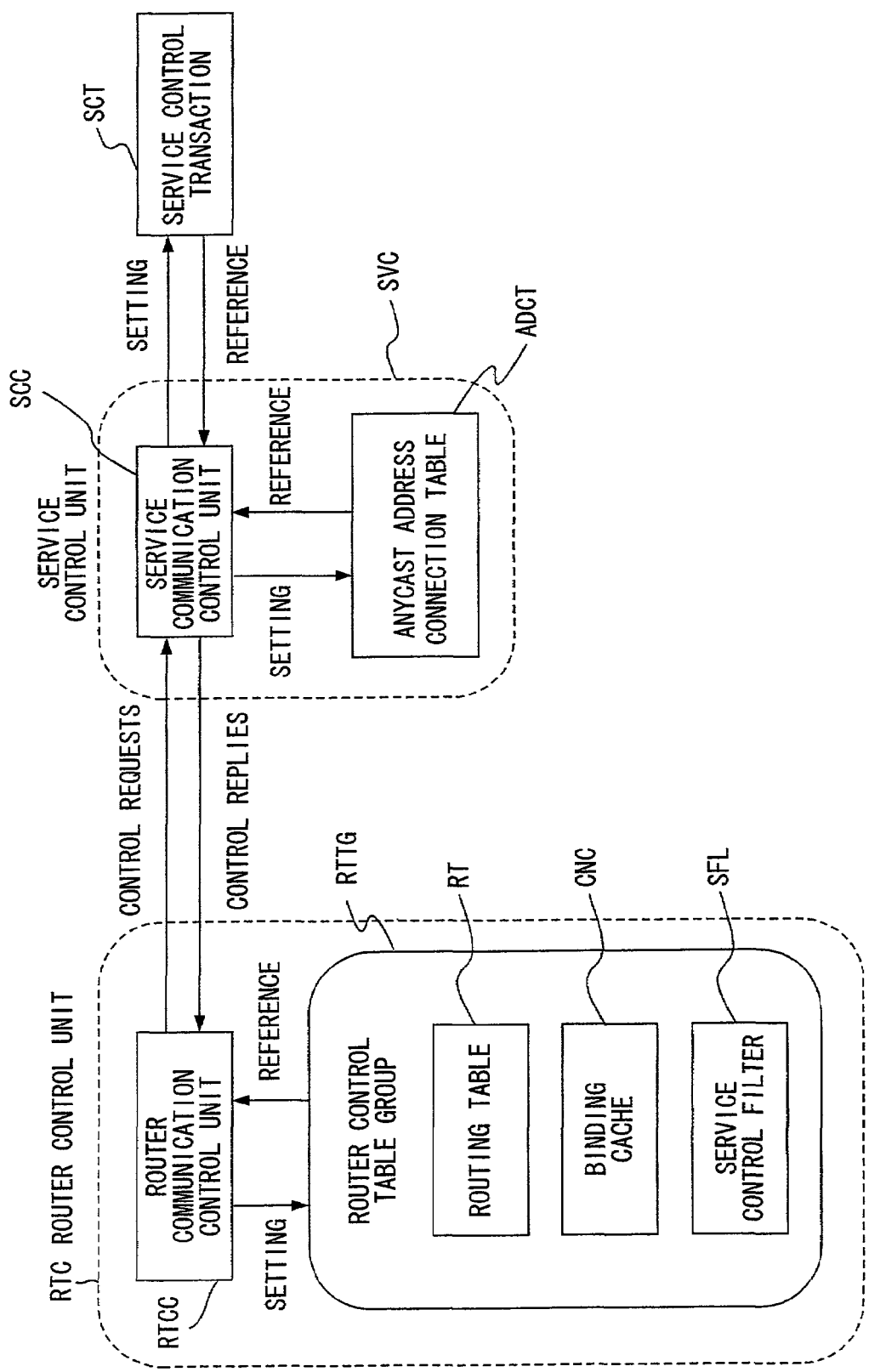
FIG. 3 is a functional block diagram of a home agent and a foreign agent.

FIG. 3 is a functional block diagram which can be applied to both a home agent 21 and to a foreign agent 31. In other words, a home agent 21 and foreign agent 31 have essentially the same configuration. When a mobile node is connected to a service provider 1 with which it has a contract, the agent device of the service provider acts as a home agent HA for the mobile node; when the mobile node is connected with a service provider with which it has no contract, the agent device of the service provider acts as a foreign agent FA for the mobile node. In the following, the home agent 21 and foreign agent 31 are explained as devices having the same functions.

The home agent 21 (foreign agent 31) has a router control unit RTC, service control unit SVC, and service control transaction table SCT. The router control unit RTC has a router communication control unit RTCC which controls communication with the service control unit SVC, and a router control table group RTTG. The router control table group RTTG has a routing table RT which is referenced when determining the transmission path for a received packet, a binding cache CNC which is a temporary routing table, and a service control filter SFL which passes only specific packets.

The service control unit SVC has a service communication control unit SCC which controls communication with the router control unit RTC and service control transaction table SCT, and an anycast address connection table ADCT. The anycast address connection table ADCT is set/referenced by the home agent HA/foreign agent FA as a table for determining and managing packet destinations.

Figure 4:
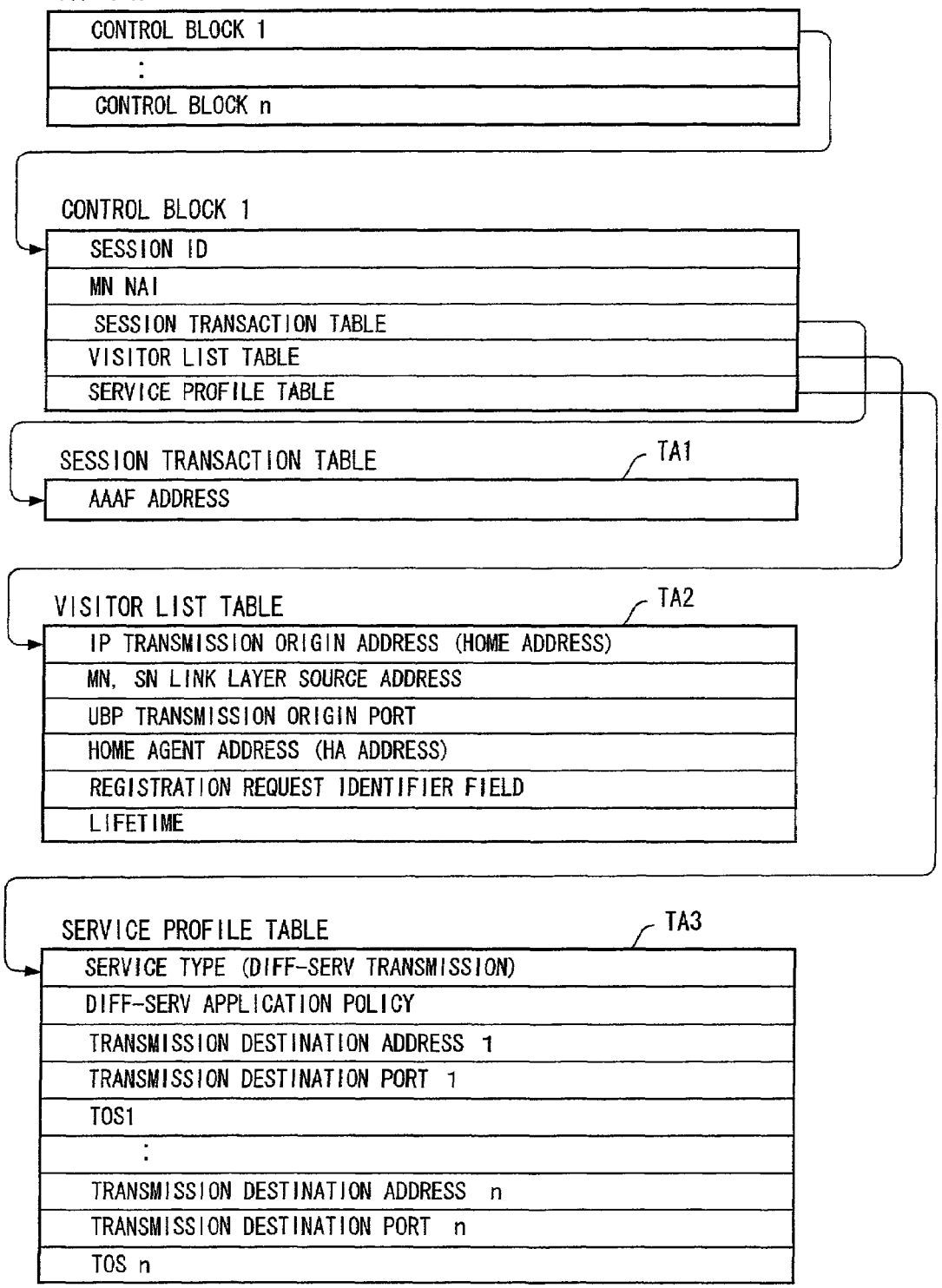
FIG. 4 is an example of a control table for FA service control transactions.
Figure 5:
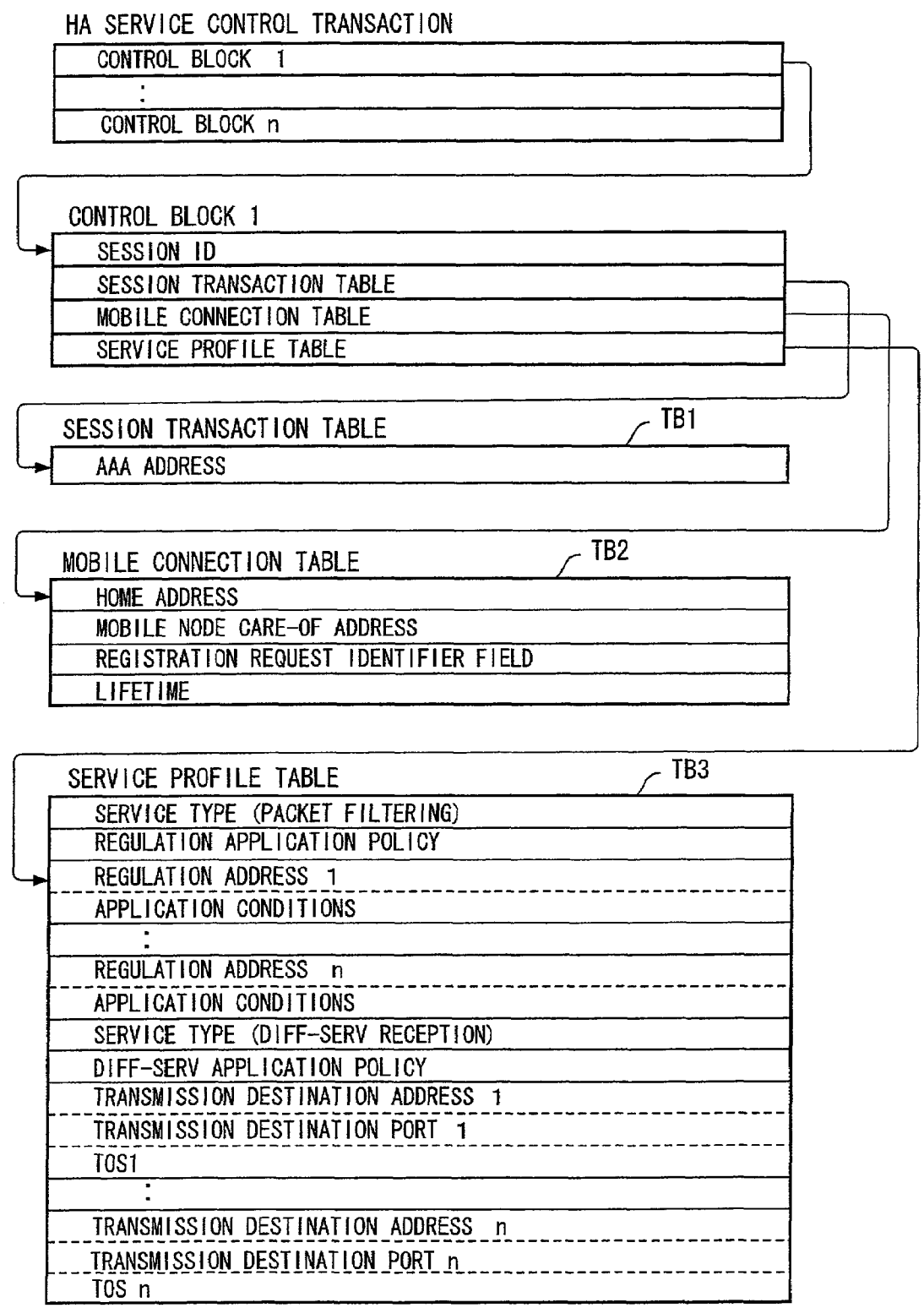
FIG. 5 is an example of a control table for HA service control transactions.

The service control transaction table SCT is a control table, the format of which differs for a foreign agent FA and home agent HA. FIG. 4 shows the service control transaction table SCT of the foreign agent FA 31, and FIG. 5 shows the service control transaction table SCT of the home agent HA 21.

Control Table of the Service Control Transaction

The control table of the service control transaction SCT in the foreign agent FA 31 of FIG. 4 has a hierarchical structure; in the uppermost layer there are descriptions of pointers to the leading addresses of control blocks 1 to n. If the mobile node 11 is connected to the foreign agent 31, then in one control block, for example the control block 1, there are set [1] the session ID, [2] the network access identifier NAI assigned to the mobile node MN, [3] the leading address of the session transaction table TA1, [4] the leading address of the visitor list table TA2, and [5] the leading address of the service profile table TA3. The session ID is the unique value when a registration request message is received from the mobile node MN 11; the visitor list table is a table used to manage the mobile node MN 11 when the mobile node connects with a foreign agent 31.

Relations with other entities (foreign agents FA, the home agent HA, AAA servers) are recorded in the session transaction table TA1. Here, the AAA address of the AAAF server 32 (AAAF server address) is set as the address of the AMR (Authentication Request) message sent from the foreign agent 31.

In the visitor list table TA2 are set [1] the IP transmission address (home address) of the mobile node 11, allocated by the home network 1; [2] the MN or SN link layer address (for example, a MAC address) used when sending a registration reply message to a mobile node MN or to a stationary node SN; [3] UBP transmission origin ports; [4] the address of the home agent HA 21 to which the mobile node 11 belongs; [5] the value of the registration request identifier field included in the registration request message sent from the mobile node MN 11; and, [6] network information related to the mobile node and user, and information equivalent to the expiration date (lifetime) for service profile and other information.

In the service profile table TA3 are set [1] the type of service to be provided; [2] the Diff-Serv application policy; [3] packet destination addresses; [4] packet destination ports; and [5] information on the TOS (Type of Service) of the IP header sent to the destination address. As the service type, for example, QoS (Quality of Service) may be supposed. Int-Serv and Diff-Serve are proposed as methods for achieving QoS. In this embodiment, Diff-Serv, with its lower overhead for QoS processing, is assumed to be adopted. In setting the Diff-Serve application policy, for example, a policy may be set by stipulating that "packets inclding data related to FTP (File Transfer Protocol) are given the lowest priority for transmission". Here, different policies can be set for each combination of packet destination address and port. In Diff-Serv, priority control is executed based on the TOS value.

Next, the service control transaction table SCT of the home agent HA is explained, referring to FIG. 5. An explanation as the service control transaction table of a foreign agent 31 is omitted.

If it is supposed that a mobile node 11 is connected to a foreign agent 31 in one control block, for example, control block 1, then [1] the session ID, [2] the leading address of the session transaction table TB1, [3] the leading address of the mobile connection table TB2, and [4] the leading address of the service profile table TB3, are set.

Relations with other entities are recorded in the session transaction table TB1. Here, the AAA address (AAAH server address) of the AAAH server 22 for the home network 1 is set.

In the connection table TB2, [1] the home address of the mobile node, [2] the care-of address of the mobile node, [3] the value of the registration request identifier field, and [4] expiration date (lifetime) information, are set. When the home agent 21 receives a packet to be transmitted to the home address of the mobile node 11, it uses the care-of address to encapsulate the packet, and by this means transmits the received packet to the foreign agent 31 accommodating the mobile node 11.

The service type (packet filtering), regulation and operation policy, regulation address, application conditions and similar are set in the service profile table TB3. The service type is information specifying the type of service; in the example of FIG. 5, information is set which specifies packet filtering so as to discard packets corresponding to specified regulation conditions. The regulation and operation policy, regulation address, and application conditions specify information necessary to stipulate the type of regulation application policy, for example, to regulate packets containing harmful contents, access to specific server addresses, access to specific network domains, and the use of specific ports.

Anycast Address Connection Table

FIG. 6 is a figure explaining an anycast address connection table ADCT provided in a service control unit SVC, containing a plurality of connection blocks and pointers to the leading addresses of each connection block. In each connection block, [1] an anycast address, [2] an anycast address selection policy, [3] NAI1 to NAIn, and [4] states relating to NAIs are set. The anycast address is a transmission destination address; NAI1 to NAIn are NAIs (Network Access Identifiers) corresponding to terminal devices specified in advance by users receiving anycast services. An anycast address selection policy stipulates procedures or conditions for selecting one or a plurality of NAIs from among NAI1 to NAIn. If the destination address of a received packet coincides with an anycast address registered in the anycast address connection table ADCT, the home agent 21 or foreign agent 31 selects one or a plurality of NAIs according to the anycast address selection policy, and transfers the above packet to the terminal device(s) corresponding to the selected NAI(s).

Routing Table

The routing table RT is used to determine the next hop address necessary for transmission of a packet to a destination address (router or similar) based on the receiver address; as shown in FIG. 7, the correspondence between receiver addresses and next-hop addresses is stored.

Binding Cache

The binding cache CNC is used as a temporary routing table, and is given preference over the routing table of FIG. 7 in referencing. It includes information necessary for the efficient transfer of packets, that is, [1] the transmission origin address, [2] the transmission origin port, [3] the receiver address, [4] the receiver port, [5] encapsulation information, [6] the care-of address, and [7] the TOS.

Service Control Filter

The service control filter SFL stores information to specify packets satisfying stipulated regulation conditions (packets for processing), that is, [1] the transmission origin address, [2] the transmission origin port, [3] the receiver address, and [4] the receiver port. A home agent HA and foreign agent FA extract packets for processing from among received packets according to the conditions set in this table, and perform the prescribed filtering processing.

(d) AAA Servers

AAAF Servers

When the foreign agent FA 31 receives a registration request message from the mobile node 11, it analyzes the registration request message, and sends to the AAAF server 32 an AMR (Authentication Request) message which includes information stored in the registration request message. When the AAAF server 32 receives the authentication request message, it judges whether there is a need to perform allocation of the prescribed home agent 21, and whether there is a need to delete the service control information of the old home agent HA for which allocation is already completed, and sends the necessary protocol message to the AAAH server 21.

Figure 10:
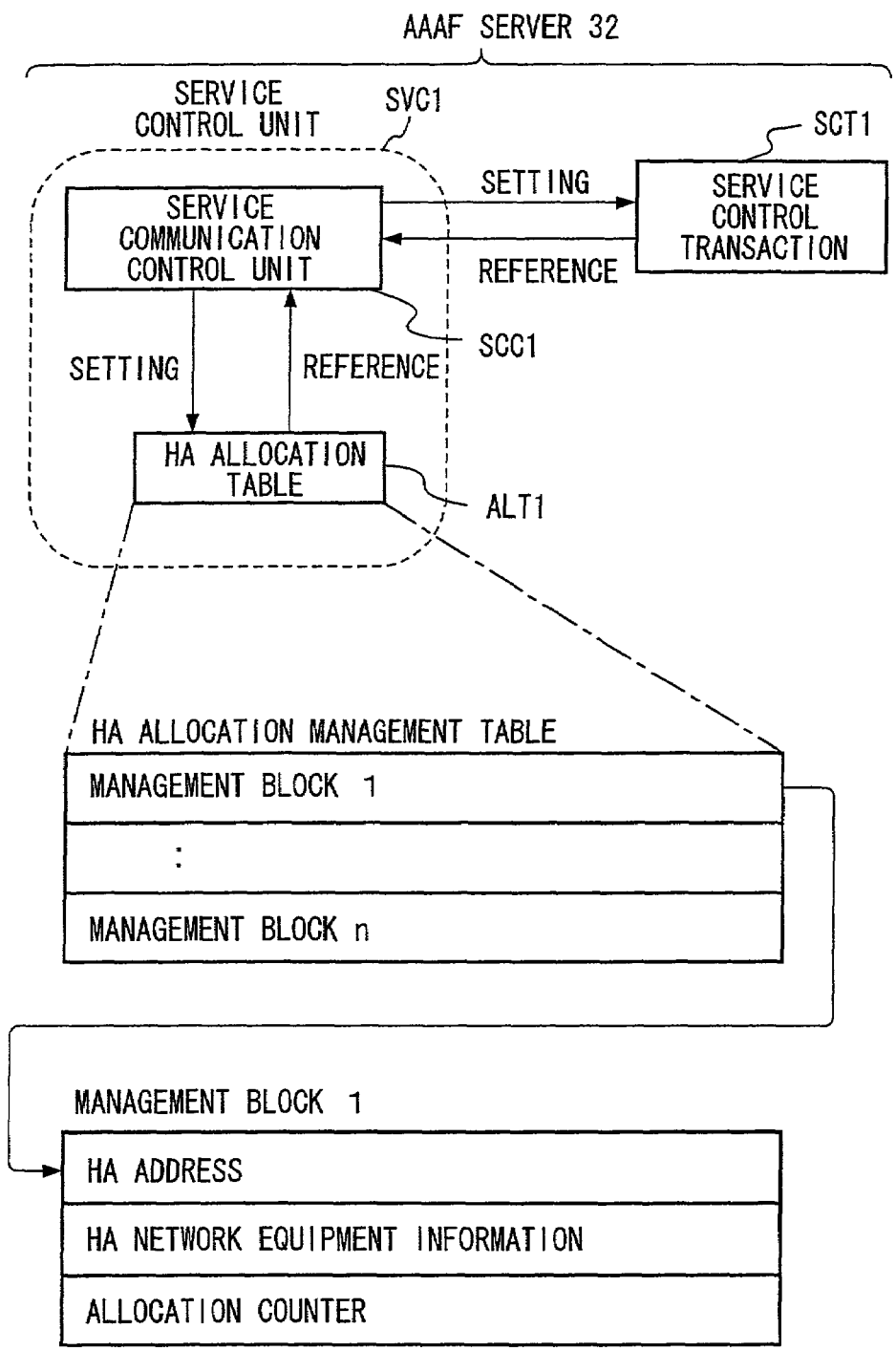
FIG. 10 is a functional block diagram of an AAAF server.

FIG. 10 is a functional block diagram of the AAAF server 32, comprising the service control unit SVC1 and the service control transaction table SCT1. The service control unit SVC1 has service communication control unit SCC1 which controls communication with the service control transaction table SCT1, and an HA allocation table ALT1. The address of home agents HA assigned by the AAAF server 32, HA network equipment information, and similar are set in the HA allocation table ALT1.

The service control unit SVC1 performs setting, retrieval, updating, and deleting of the service control transaction table SCT1 and HA allocation table ALT1, according to the received protocol message. The service control unit SVC1 comprises functions which operate according to the DIAMETER protocol, and has general protocol processing functions which use a message reception buffer and message transmission buffer.

Figure 11:
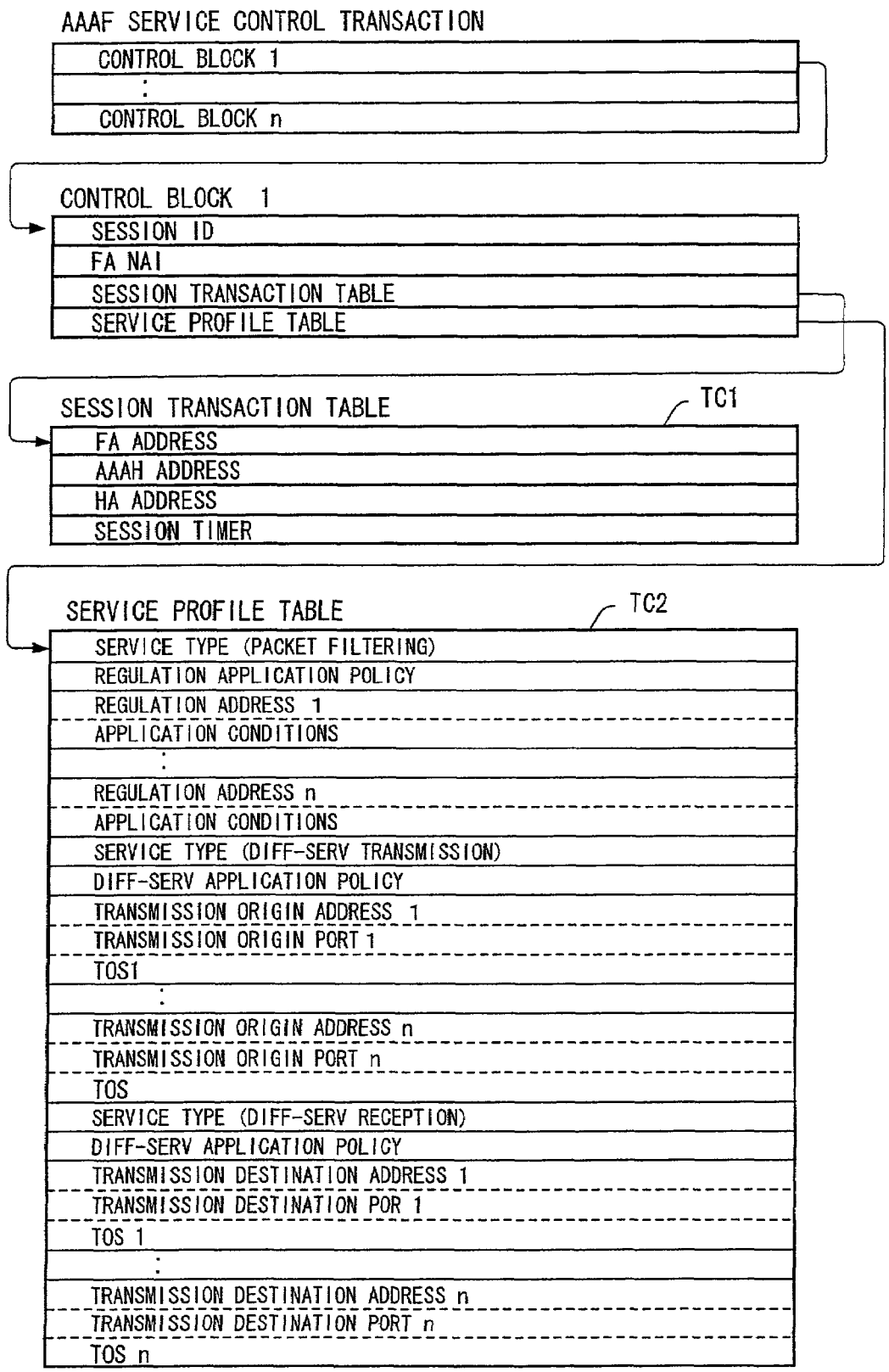
FIG. 11 is an example of a control table for ARAF server service control transactions.

The service control transaction table SCT1 is configured similarly to that of the service control transaction table SCT of the agents 21, 31, as shown in FIG. 11. Differences are [1] the fact that the NAIs of foreign agents FA are set in the control block, [2] that FA addresses, AAAH server addresses, HA addresses, and session timers are set in the session transaction table TC1, and [3] that a plurality of service types are set in the service profile table TC2.

AAAH Servers

Figure 12:
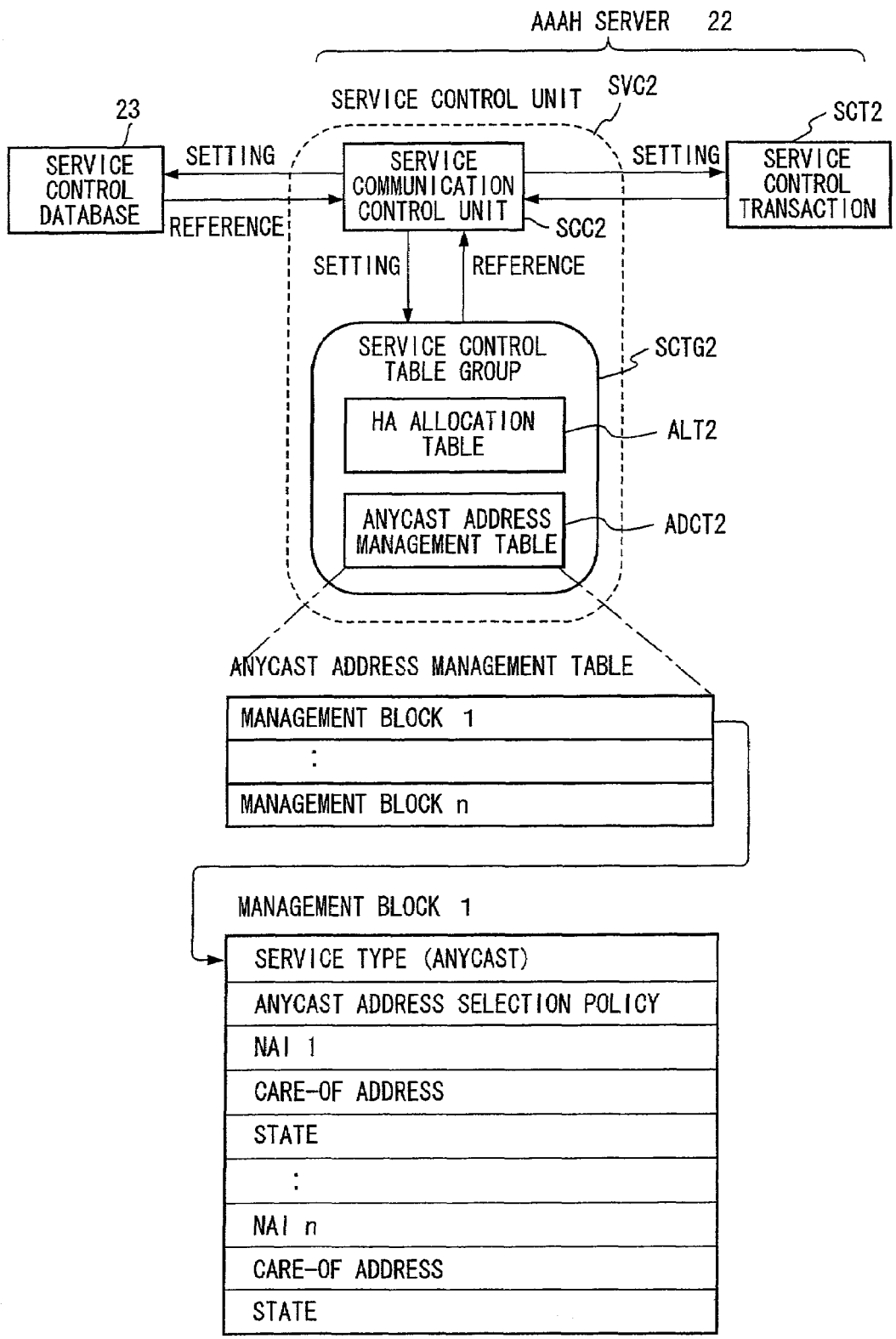
FIG. 12 is a functional block diagram of an AAAH server.

FIG. 12 is a functional block diagram of an AAAH server 22, comprising a service control unit SVC2 and a service control transaction table SCT2. The service control unit SVC2 has a service communication control unit SCC2 which controls communication with the service control transaction table SCT2, and a service control table group SCTG2. The service control table group SCTG2 has an HA allocation table ALT2 and an anycast address management table ADCT2. The service control unit SVC2 performs setting, searching, updating, and deleting of the service control transaction table SCT2 and service control table group SCTG2, according to the received protocol message. The service control unit SVC2 comprises functions to operate according to the DIAMETER protocol, and has general protocol processing functions which use a message reception buffer and message transmission buffer. The anycast address management table ADCT comprises blocks 1 through n for management in anycast address units; in each management block are set [1] the service type (anycast), [2] the anycast address selection policy, [3] one or more NAIs using the anycast address, [4] the care-of address, and [5] the state (online, offline, failure, congested, or similar).

The service control transaction table SCT2 has a configuration similar to that of the service control transaction table of the agents 21, 31, as shown in FIG. 13. Differences are [1] the fact that the NAI of the mobile node MN is set in the control block, [2] that the HA address, AAAF server address, and session timer are set in the session transaction table TD1, and [3] that a plurality of service types are set in the service profile table TD2.

(e) Service Control Database

The service control database (service profile database) 23 is used to prepare user profiles for each subscriber, storing various information for these profiles, in order to provide services to subscribers, as shown in FIG. 14. A user profile is configured using an NAI (mobile node identifier) identifying the subscriber as a keyword. Security services, roaming services, QoS services, multicast services, and various other services can be provided as additional services; the figure shows an example in which a Diff-Serv service, anycast service, and packet filtering service are provided as additional services.

(f) Communication Nodes

Figure 15:
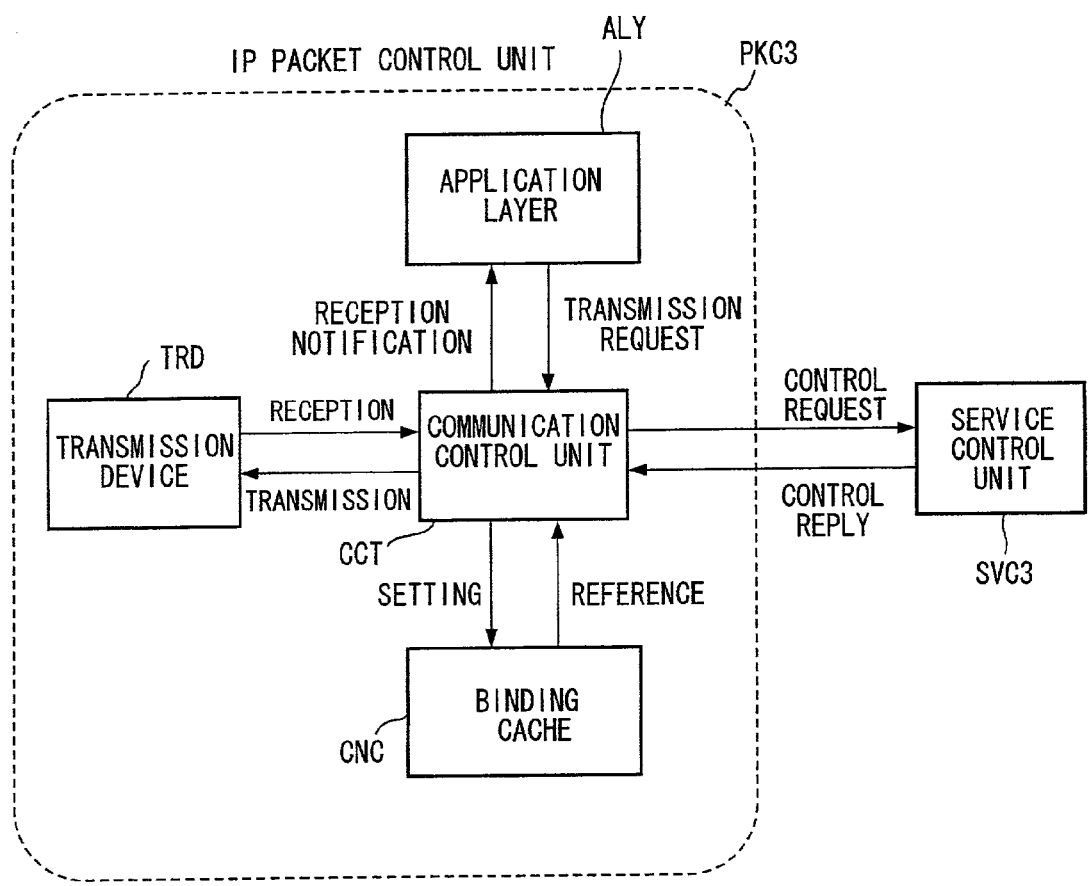
FIG. 15 is a functional block diagram of a communication node.

The communication node 41 is a node which supports Mobile IP (MIP) functions, and is connected to the IP network 5 via the access provider (external network) 4 using MIP. FIG. 15 is a functional block diagram of the communication node 41, which has a service control unit SVC3 and IP packet control unit PKC3. This IP packet control unit PKC3 has a binding cache CNC which temporarily stores packet editing information, transmission equipment TRD which may be for example a LAN card mounted in a workstation or similar, an application layer ALY, and a communication control unit CCT which controls communication with the service control unit SVC3. The service control unit SVC3 has functions for operating according to the MIP protocol, and in addition has general protocol processing functions which use a message reception buffer and a message transmission buffer.

(C) Various Processing Sequences (a) Initial Location Registration Sequence

Figure 16:
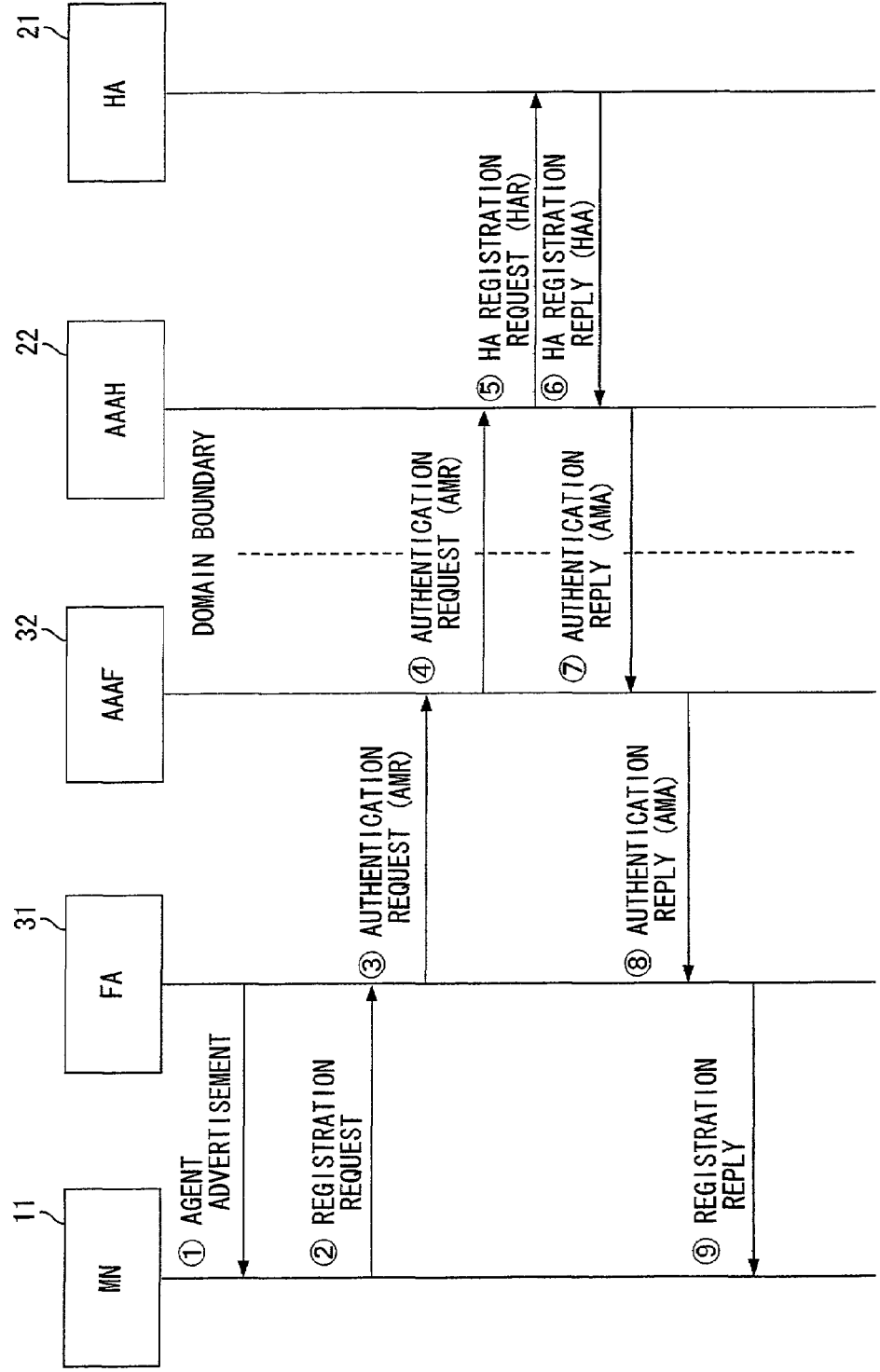
FIG. 16 is an example of an initial location registration sequence when an AAAH server allocates a home agent HA.

FIG. 16 is a figure explaining the initial location registration sequence when the AAAH server 22 allocates a home agent 21 based on a registration request message sent from the mobile node MN 11.

① By receiving agent advertisements (Mobile IP messages) sent periodically from the foreign agent 31, the mobile node 11 recognizes that it is within the communication area of the foreign agent 31.

② When the mobile node 11 moves outside the range of possible communication of the home agent 21 administered by the provider with which the mobile node has a contract, the mobile node 11 sends a registration request message to the foreign agent 31 of the provider in the range within which communication is possible from that location.

③ The foreign agent 31 which has received the registration request message from the mobile node 11 obtains a unique session ID, and extracts the necessary information from the registration request message (the home address of the mobile node 11, the transmission origin link layer address, the UBP transmission origin port, the home agent address, the registration request identifier field and lifetime). Based on the acquired session ID and the information extracted from the registration request message, the service control transaction SCT shown in FIG. 4 is created. Also, an AMR (Authentication Request) message which encapsulates the registration request message is sent to the AAAF server 32, according to the AAA protocol.

④ When the AAAF server 32 receives the AMR message from the foreign agent 31, it extracts necessary information from the AMR message, and generates service control information, including the service control transaction SCT1 shown in FIG. 11 and similar. The address corresponding to the user NAI contained in the received AMR message is determined, and the AAAH server 22 having responsibility for authentication of the mobile node 11 is determined. The AAAF server 32 sends the above AMR message to the AAAH server 22.

⑤ When the AAAH server 22 receives the AMR message, it performs authentication of the mobile node 11 according to the AMR message authentication procedure. When this authentication ends normally, subsequent processing is continued. On the other hand, if the authentication fails, an appropriate reason code is set, and an AMA (Authentication Reply) message is returned to the AAAF 32.

The AAAH server 22 searches the service control database 23 shown in FIG. 14, using as a key the NAI of the mobile node 11 stored in the authentication request (AMR) message received from the AAAF server 32, and extracts the corresponding user profile. A service control transaction SCT2 (FIG. 13) is generated from the session ID extracted from the authentication request (AMR) message, the transmission origin address of the AMR message, and from the user profile obtained from the service control database 23, and in addition the HA 21 is specified according to the HA allocation procedure.

The AAAH server 22 retrieves only the information necessary for the home agent HA 21 from the above user profile, and sends an HAR (HA registration request) message to the home agent HA 21.

When the home agent HA 21 receives the HAR message, it extracts the necessary information (session ID, HAR transmission origin address, care-of address, registration request identifier field, lifetime, service profile) from the message, and based on this creates a service control transaction SCT shown in FIG. 5 as control information. It then sets the receiver address (home address) in the service control filter SFL of FIG. 3.

⑥ The home agent 21 returns a HA registration reply message (HAA message) to the AAAH server 22.

⑦ When the AAAH server 22 receives the HAA message, it retrieves only the information necessary for the foreign agent 31, creates an authentication reply (AMA) message, and sends the AMA message to the authentication request address (AAAF address) registered in the session transaction table shown in FIG. 13.

⑧ When the AAAF server 32 receives the AMA message, it searches the session transaction table shown in FIG. 11, using the session ID set in the message as a key, and transfers the AMA message to the FA address obtained.

⑨ When the foreign agent FA 31 receives the authentication reply (AMA) message from the AAAF server 32, it sets the home address, HA address and service profile distributed by the AMA message in the service control transaction SCT as shown in FIG. 4. Also, the transmission origin address (home address) is set in the service control filter SFL of the router control unit RTC. And, the foreign agent FA 31 sends a registration reply message to the link layer address of the mobile node MN indicated by the service control transaction SCT.

(b) Data Packet Delivery Sequence

Figure 17:
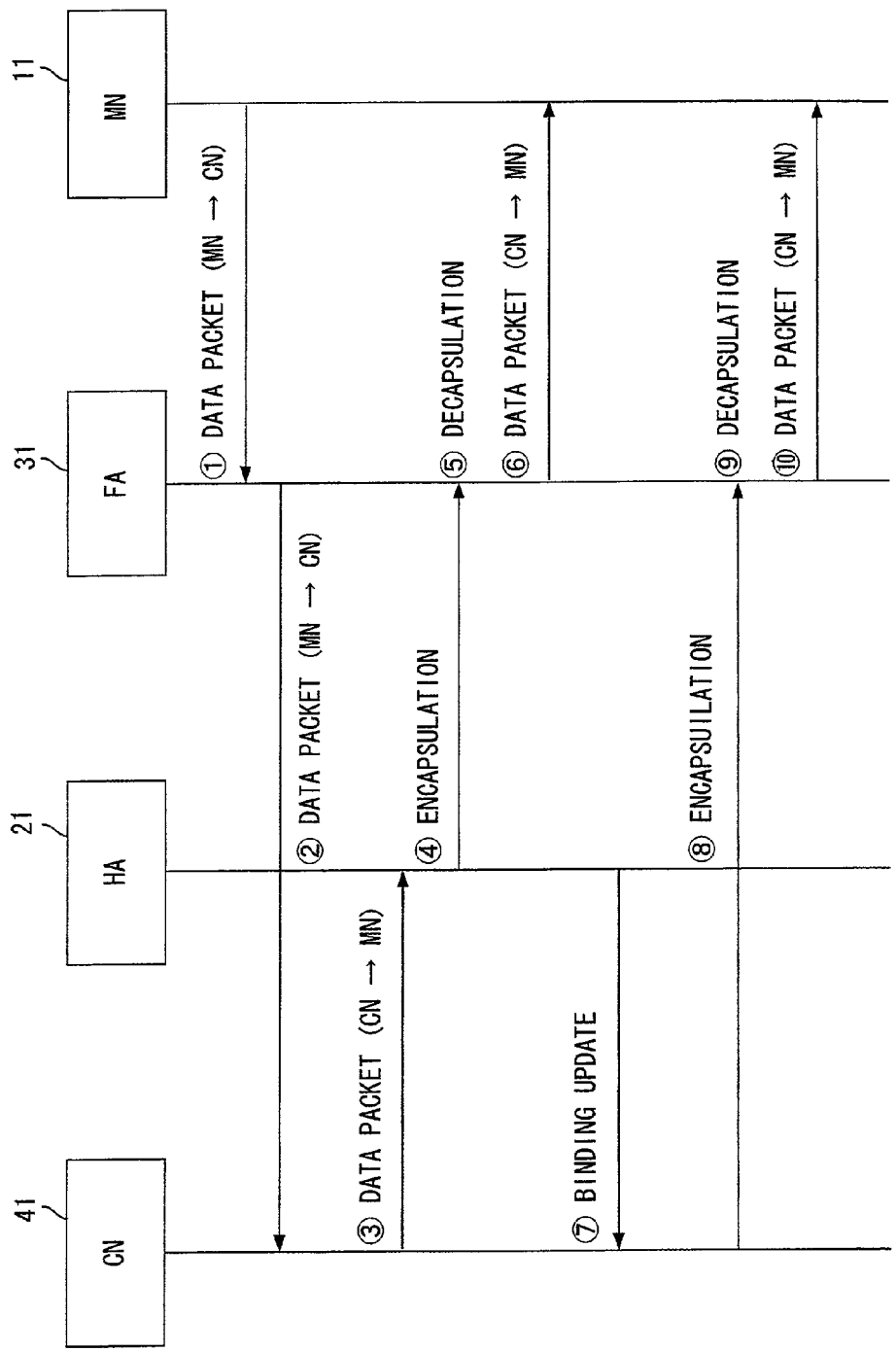
FIG. 17 is an example of the delivery sequence for transmission and reception of packets between a mobile node and a communication node.

FIG. 17 explains the sequence for delivery of data packets to the communication node 41 from the mobile node MN 11. Here a case is assumed in which the mobile node MN 11, initial location registration of which has been completed according to the above-described procedure, communicates with a communication node 41 connected to an IP network. In addition, Diff-Serv is provided as an additional service.

① The mobile node MN 11 initiates transmission of a data packet to the communication node CN 41. This packet is initially received by the foreign agent FA 31 accommodating the mobile node 11.

② When the foreign agent FA 31 receives the packet from the mobile node MN 11 for which location registration is completed, because the transmission origin address for the packet is registered in the service control filter SFL of the foreign agent FA 31, the transmission origin address of the IP header of the packet is used to search the visitor list shown in FIG. 4. Lookup of the service type (Diff-Serv transmission) in the service profile table linked to the visitor list in which the same address as the above transmission origin address is set is performed, and the related information set [in this table] is referenced. In this embodiment, it is assumed that a policy is set such that "Assured Forwarding Class 1 (highest priority)" is assigned as the TOS value for all packets sent from the mobile node MN 11. Hence the foreign agent FA 31 sets the above value as the TOS value of the IP header for the received packet, and sends the packet to the destination address indicated by the IP header. At this time, the foreign agent FA 31 creates a binding cache CNC based on the packet editing information.

③ When the communication node CN 41 receives the above data packet, it sends the packet to the transmission origin address stored in the packet. The communication node 41 stores, for example, information specified by the mobile node MN 11 (for example, a Web page) in the packet, and sends the packet. At this time, the address of the mobile node MN 11 is set as the destination address of the packet sent from the communication node CN 41. Here the address of the mobile node MN 11 is managed by the home agent HA 21. Hence a packet sent from the communication node CN 41 is first transferred to the home agent HA 21. At this stage, the corresponding QoS (priority transfer control) is not applied to the mobile node MN 11.

④ When the home agent HA 21 receives the packet from the communication node CN 41, because the receiver address of the packet is registered in the service control filter SFL of the home agent HA 21, the receiver address stored in the packet header is used to search the service control transaction table SCT shown in FIG. 5. Lookup of the service type (Diff-Serv reception) of the service control transaction for which the receiver address is registered is performed, and related settings information is referenced. In this embodiment, it is assumed that a policy is set which provides "Assured Forwarding Class 1" to all packets addressed to the mobile node MN 11. In this case, the home agent HA 21 assigns values corresponding to class 1 as the TOS value for all packets addressed to mobile node MN 11. Specifically, the home agent HA 21 first uses the care-of address of the mobile node MN 11 extracted from the service control transaction SCT to encapsulate the packet received from the communication node CN 41, and then assigns the above TOS value to the encapsulated packet, and sends the packet to the care-of address. Here the care-of address of the mobile node MN 11 is the address of the foreign agent FA 31 directly accommodating the mobile node 11. The home agent HA 21 is notified of the address of the foreign agent FA 31 accommodating the mobile node MN 11 by the AMR message and HAR message in the location registration procedure for the mobile node MN 11.

Thereafter, the home agent HA 21 creates a binding cache CNC in which is set the header editing information for this packet.

⑤ When the foreign agent FA 31 receives the data packet encapsulated by the home agent HA 21, it decapsulates the packet.

⑥ Then, using the destination address extracted from the header information of the decapsulated packet, the corresponding link layer address is looked up in the service control transaction SCT. The decapsulated data packet is then sent to the extracted link layer address.

⑦ When the home agent HA 21 encapsulates the data packet addressed to the mobile node MN 11 and begins transfer to the foreign agent FA 31, the communication node CN 41 is notified of the care-of address of the mobile node MN 11 using a binding update message, in order to optimize the transfer route. By this means, the communication node CN subsequently encapsulates and sends data packets directly to the care-of address of the mobile node MN 11, without mediation by the home agent HA 21.

By extending the binding update message, the communication node CN can also be notified of the currently applied TOS value.

⑧ When the communication node CN 41 receives the binding update message, it creates a binding cache CNC to store the home address, care-of address, and TOS value for the mobile node MN 11 as notified in the message. When sending a packet, the communication node CN 41 searches the binding cache CNC, and if a home address is registered which matches the destination address set in the packet header, similarly to the home agent HA 21, it uses the care-of address registered in the binding cache CNC to encapsulate the packet, and assigns the registered TOS value to the packet. Then, the communication node CN 41 sends the packet to the care-of address.

As a result, subsequent packets from the communication node CN 41 addressed to the mobile node MN 11 are transferred directly to the foreign agent FA 31 accommodating the mobile node MN, according to the care-of address of the mobile node MN 11. At this time, the above TOS value is assigned to a packet from the communication node CN 41 addressed to the mobile node MN 11, so that Diff-Serv service is provided not only for packets from the mobile node MN 11 to the communication node CN 41, but also for packets from the communication node CN to the mobile node MN 11.

⑨ When the foreign agent FA 31 receives the data packet encapsulated by the communication node CN 41, it decapsulates the packet.

⑩ The foreign agent FA 31 also extracts the destination address from the header information of the decapsulated packet, and extracts the corresponding link layer address from the service control transaction SCT. It then forwards the decapsulated data packet to the extracted link layer address.

(c) Sequence When a Mobile Node Moves from the Communication Area of a Foreign Agent to the Communication Area of Another Foreign Agent in the Same AAAF Server.

Figure 18:
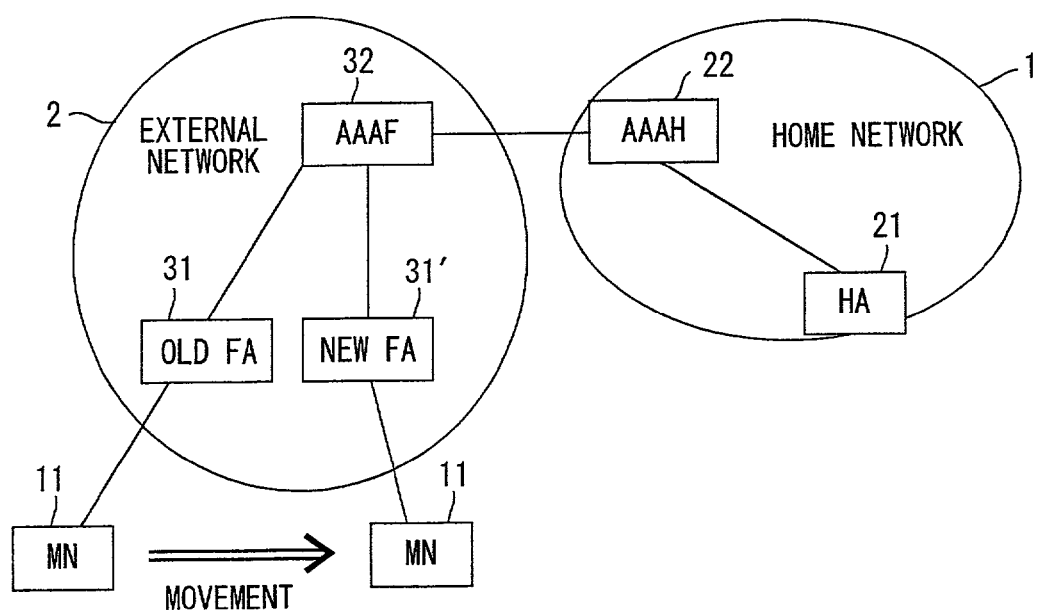
FIG. 18 is an explanatory figure showing an example of movement of a mobile node.

FIG. 18 explains the location registration procedure when the mobile node MN 11 moves from the communication area of the foreign agent FA 31 within the AAAF server 32 to the communication area of another foreign agent FA 31'. In the following, "the old FA 31" refers to the foreign agent accommodating the mobile node MN 11 before the movement of the mobile node MN 11; "the new FA 31'" refers to the foreign agent which accommodates the mobile node MN after the movement of the mobile node MN 11.

Figure 19:
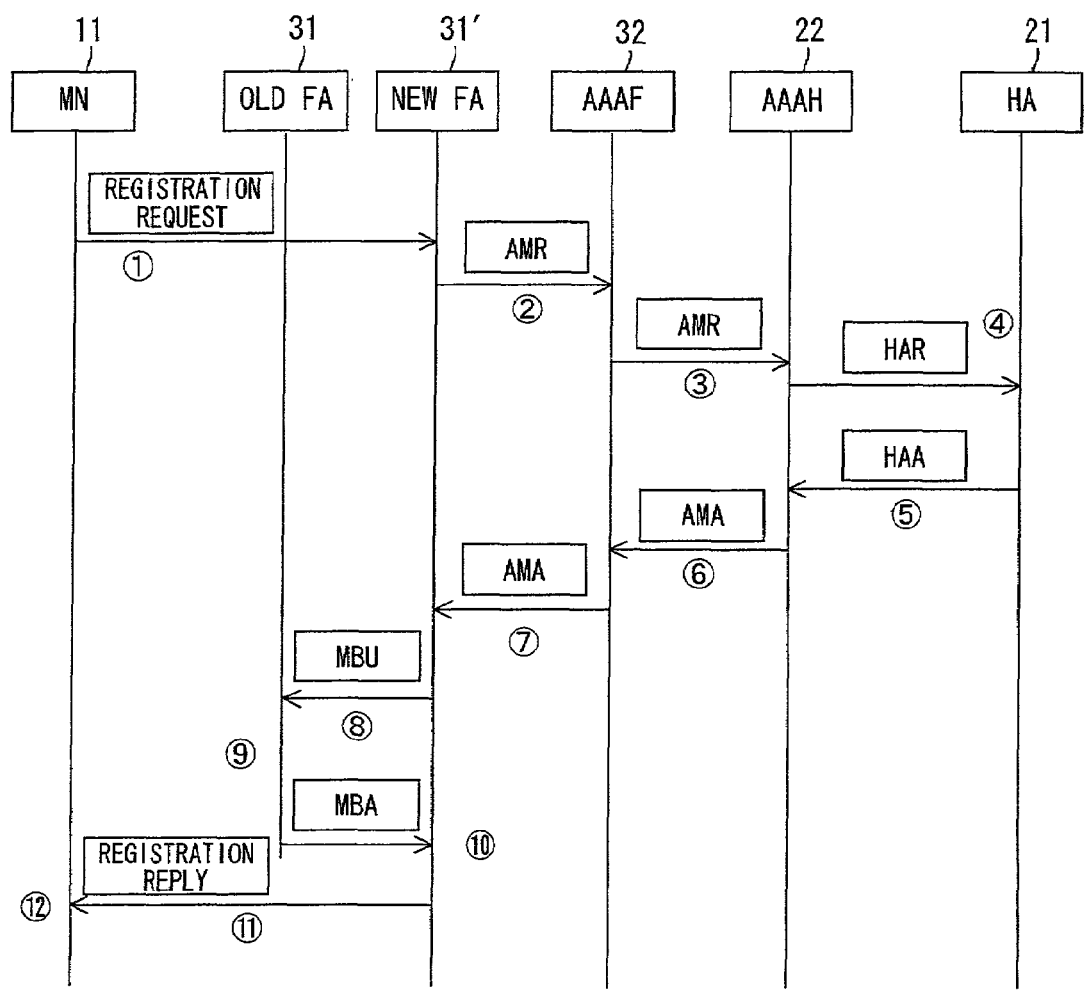
FIG. 19 is an example of the sequence during movement of a mobile node.

FIG. 19 shows the sequence when the mobile node MN 11 moves from the communication area of the old FA 31 to the communication area of the new FA 31'. FIG. 20 is an example of an NAI registration table used by a foreign agent FA; FIG. 21 is an example of a table which converts agent IP addresses into NAI prefixes.

① When the mobile node MN 11 moves from the communication area of the old FA 31 to the communication area of the new FA 31', and receives a mobile IP advertisement from the new FA 31', it sends a registration request message to the new FA 31'. The registration request message contains the IP address of the old FA 31 and the NAI (Network Access Identifier) of the mobile node MN 11.

② On receiving the registration request message, the new FA 31' extracts the necessary information from the message, and generates the service control transaction SCT shown in FIG. 4. Also, by referencing the NAI prefix table shown in FIG. 21 using the IP address of the old FA 31, the new FA 31' determines the NAI prefix of the old FA 31. Here the NAI prefix can, for example, identify the domain. Then, the new FA 31' encapsulates the registration request message from the mobile node MN 11, and sends this to the AAAF server 32 as an authentication request (AMR) message. The AMR message contains the NAI prefix of the old FA 31 and the NAI of the mobile node MN 11.

③ On receiving the AMR message, the AAAF server 32 creates a provisional session transaction table which has as an index the NAI of the mobile node MN 11. By referencing the NAI registration table, the address of the AAAH server 22 is determined, and the above AMR message is sent to the AAAH server 22.

④ On receiving the AMR message, the AAAH server 22 searches the control block of the service control transaction SCT2, using as an index the NAI of the mobile node MN 11, contained in the message. If the corresponding service profile (and session ID) are found, a registration request (HAR) message including the service profile (and session ID) is sent to the home agent HA 21.

⑤ Having received the HAR message, the home agent HA 21 searches the session transaction (cf. FIG. 5) for the mobile node MN 11, using the session ID as an index. If the search yields a hit, the address of the new FA 31' is registered as the care-of address. When location registration processing for the mobile node MN 11 is finished, the home agent HA 21 edits only the information required by the new FA 31', and sends a registration reply (HAA) message to the AAAH server 22. At this time, the home agent HA 21 may also store information required by the new FA 31' in the HAA message.

⑥ Having received the HAA message, the AAAH server 22 uses the session ID contained in the message to search the session transaction, and sends an authentication reply (AMA) message to the address of the new FA 31' extracted by means of this search. At this time, the AAAH server 22 may also store information required by the new FA 31' in the AMA message.

⑦ Having received the AMA message, the AAAF server 32 extracts necessary service profile and other information from the message, and relays the AMA message to the new FA 31' based on service transaction information. At this time, information required by the new FA 31' may also be stored in the AMA message sent to the new FA.

⑧ Having received the AMA message, the new FA 31' obtains necessary information from the message, and also sends a binding update (MBU: MIP Binding Update) message to the old FA 31.

⑨ Having received the MBU message, the old FA 31 deletes service control information corresponding to the session ID stored in the message. Also, the routing table is set to send messages addressed to the mobile node MN 11 to the new FA 31', and an MBA (MIP Binding Acknowledge) message is sent to the new FA 31'.

⑩ Having received the MBA message, the new FA 31' recognizes that the service control information in the old FA 31 has been deleted.

⑪ The new FA 31' decapsulates the DIAMETER element portion, and sends a registration reply message to the mobile node MN 11.

⑫ Having received the registration reply message, the mobile node MN 11 recognizes that processing of the registration request message has ended, completing the series of processing for location registration.

Figure 22:
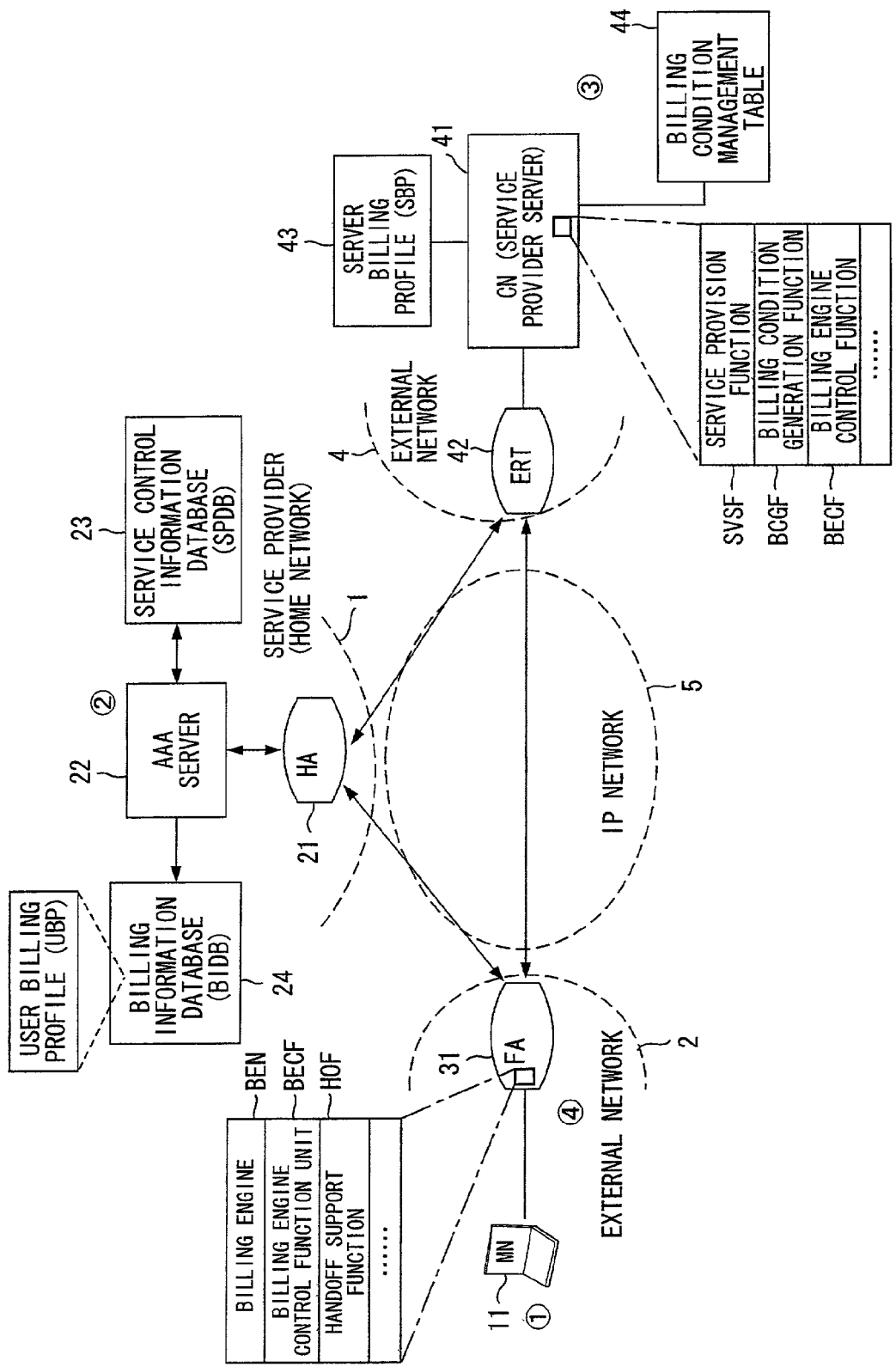
FIG. 22 is a network configuration diagram explaining the billing functions and their deployment in this invention.

(D) First Network Configuration in which Billing Functions are Deployed (a) Configuration FIG. 22 is a network configuration diagram explaining the billing functions related to the first billing technology of this invention, and their deployment. The figure corresponds with the configurations and functions explained in FIGS. 1 through 21, but places emphasis on billing functions.

The mobile node MN 11 has concluded a contract with the service provider 1, and the service provider is the home network for the mobile node MN 11. In the figure, the mobile node MN 11 is able to move from the home network to an external network 2 which is an access network, and to communicate with the foreign agent FA 31. A communication node (service provider server) CN 41 is connected to the foreign network 4 via an edge router ERT 42. This service provider server CN 41 has service provision functions SVSF to provide information (for example, Web pages) requested by the mobile node MN 11, billing condition generation functions BCGF to generate billing conditions, and billing device control functions BECF, described below. A storage unit 43 to store server billing profiles SBPs, and a billing condition management table 44, are provided in the service provider server CN 41.

A home agent HA 21, AAAH server (hereafter simply called an "AAA server" or "authentication server") 22, service control database SPDB 23, and billing information database BIDB 24, are provided in the home network 1. Service control information, such as quality control information QoS and other services, is registered in the service control database SPDB 23 for each contracting terminal. User billing profiles UBPs are registered in the billing information database BIDB 24. The home network 1 and external networks 2 to 4, managed by other respective service providers, are mutually connected by an IP relay network 5.

(b) Billing Functions

Billing functions include [1] service request function (SRQF); [2] Billing Information Server Function (BISF); [3] Billing Condition Generation Function (BCGF); [4] Billing Engine Control Function (BECF); and [5] Handoff Function (HOF).

[1] Service Request Function (SRQF)

In this invention, the service request function SRQF provides an occasion to start up a billed service. An application on the user terminal includes the network resources and other conditions necessary for service execution, as well as information related to the service such as the service provider server, in the procedure for location registration of the terminal with the network, according to the service request function SRQF; the connected server recognizes this information and creates the conditions (such as fee conditions) necessary to initiate service.

In addition, a billing condition identifier issued by the server providing the service according to the service request function SRQF is held as key information for the service contract, and is used in periodic operations to confirm the continuation of service, in operations to modify or halt the service, and as authentication information to hold the application session during handoff.

The implementation positions of the service request function SRQF are at the mobile node MN 11 and service provider server CN 41. In addition, a function is implemented to send and receive messages, between the server CN and the mobile node MN, with billing conditions and other information necessary for provision of the service requested by the mobile node application. Specifically, a "service request" message, "billing conditions", and other information necessary for service execution are included in the Mobile IP or other location registration messages which are sent and received.

[2] Billing Information Server Function (BISF)

The billing information server function (BISF) is implemented in the AAA server 22. By means of this billing information server function BISF, the AAA server 22 extracts a billing profile (service permission conditions) for a user terminal requesting authentication from a billing information database (BIDB) 24. In other words, if billing conditions (the UBP, user billing profile) for the user terminal in question are set in the billing information database (BIDB) 24, the AAA server 22 extracts the billing profile UBP for the user terminal upon the occasion of an authentication request. The position for implementation of this function is within the AAA server 22, or in a position which can be linked with the AAA server 22.

[3] Billing Condition Generation Function (BCGF)

The billing condition generation function (BCGF) compares the user billing profile UBP and server billing profile SBP held by the user and by the service provider, to generate and output billing conditions which can be provided. This is the principal function for determining billing conditions each time a mobile node starts a service, or for each connected service provider. The position for implementation of this service is often linked with the server CN 41 of the service provider. However, in the case of providers of services for which there is heavy demand, this function may be deployed within a network, in a form in which the network operator performs proxy operation of the function.

[4] Billing Engine Control Function (BECF)

The billing engine control function (BECF) sets billing conditions determined by the service provider server CN 41, based on the billing condition generation function, in the billing device (billing engine), enabling the billing device to initialize and execute billing processing. The means of realization of this function (billing engine control function unit) is deployed in a position which can be linked with the billing engine deployed in the network (for example, in the foreign agent FA and service provider server CN). However, the billing engine control function (BECF) is not related to the billing device which collects information on packets for billing according to the policy stipulated for each terminal. The billing engine BEN is deployed in a position within the network where billing is necessary, for example, within a foreign agent FA.

[5] Handoff Function (HOF)

The handoff function (HOF) exchanges billing data with the billing engine before and after handoff of the mobile node MN, and transmits billing conditions to the billing engine BEN of the destination network. The means of realization of the handoff function HOF (handoff function unit) is deployed in a device which executes handoff control for the mobile node MN (for example, a foreign agent FA), and is linked with the billing engine.

(c) Basic Sequence

① The mobile node MN 11 includes service request information (server name, service conditions) in the location registration request message to be issued.

② The device to which the location registration request is to be transmitted (foreign agent FA 31, home agent HA 21) searches for the service request information contained in the location registration request message, and notifies the AAA server 22. The AAA server 22 extracts the billing profile UBP for the user in question from the billing information database BIDB 24, and transfers this to the service provider server CN 41 via the home agent HA 21 and edge router ERT 42.

③ The service provider server CN 41 compares the user billing profile UBP with the server billing profile SBP, and determines the billing conditions.

④ The billing conditions thus determined are set in the billing engine BEN within the network by means of location registration reply processing, and billing processing is executed.

To summarize the above, service fee conditions are determined dynamically by the billing condition generation function, based on conditions stipulated in advance (the billing profile) between the user and the service provider (server) for each service type and in user units; these billing conditions are set in a billing engine BEN within a network capable of interpretation, so that subsequently billing can be performed in the billing engine for packets provided to the user.

(d) User Billing Profile/Server Billing Profile

In order to perform billing in terminal units, and in service units, files describing billing information are necessary. In this invention, in order to provide numerous selections and to realize flexible billing functions, a user billing profile UBP and server billing profile SBP are provided for user terminals and for service providers, and billing conditions are determined by comparing these [profiles].

FIG. 23A and FIG. 23B are examples of a user billing profile UBP and server billing profile SBP for QoS service; provisions are also made for other services, but an explanation is here omitted. Conditions (parameters) relating to services permitted by the user for each user terminal are described in the user billing profile UBP. For example, as shown in FIG. 23A, for a prescribed user, [1] 64 kbps and 512 kbps are set as transmission speeds for QoS service; [2] 8:00 to 17:00 is set as the service time period; [3] packet volume-based, AAA authentication session units, and time units are set as the permitted billing methods; and [4] a monthly fee of 2000 yen is set as the permitted information volume. This user billing profile UBP is used together with the service profile; contents are determined in terminal units at contract time (with customization at a later date possible), and when receiving services, this is presented to the service provider CN.

The billing conditions upon provision of service by the service provider server 41 are described in the server billing profile SBP. For example, as shown in FIG. 23B, [1] 64 kbps, [2] 128 kbps, [3] 256 kbps, and [4] 512 kbps are set as possible transmission speeds for QoS service; for each of these, the time period during which provision is possible, the billing method, and the unit fee are set.

In this invention, in order to dynamically determine billing conditions related to services to be received by individual terminals and quality conditions for these services prior to the execution of services, the service provider server CN 41 compares the billing profiles for both, UBP and SBP, according to fixed rules, and determines the billing conditions; the billing device is notified of these billing conditions, services are executed in terminal units, and the billing device performs billing based on these billing conditions. In the examples of FIGS. 23A and 23B, the transmission speed of 512 kbps satisfies the permissible conditions of the user, and so a service ID of 0004 is determined as the billing conditions.

To summarize the above, in order to perform service fee negotiations between a user and a service provider, a user billing profile UBP describing the permissible conditions for payment on the user side, and a server billing profile SBP describing information on services which can be provided in association with fees on the service provider side, are maintained on the network. When the mobile node MN sends a service execution request message, by combining both these conditions, it is possible to determine fee conditions between the mobile node and the service provider.

(e) Billing Profile Server Function

The billing profile server function is linked with the billing information database BIDB, storing billing profiles UBP in terminal units, and with the authentication (AAA) server 22 performing terminal authentication processing.

On completing terminal authentication, the AAA server 22 queries the billing information database BIDB 24 for billing information related to the terminal in question. As the key used in this query, for example, the terminal NAI (Network Access Identifier) is used. Having received the user billing profile UBP relating to the user in question from the billing information database BIDB 24, the AAA server 22 converts the user billing profile UBP, together with authentication key and other information generated in terminal authentication, into a format which can be transmitted to an external device, in order to enable transmission to an external device (the service provider server CN 41) which determines the billing conditions.

Figure 24:
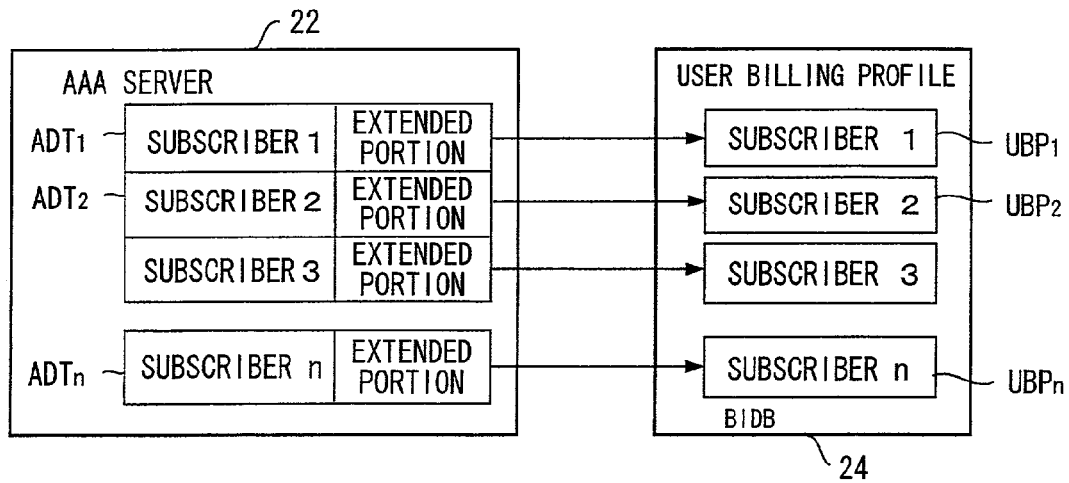
FIG. 24 is a figure explaining the relation between terminal authentication data and user billing profiles.
Figure 25:
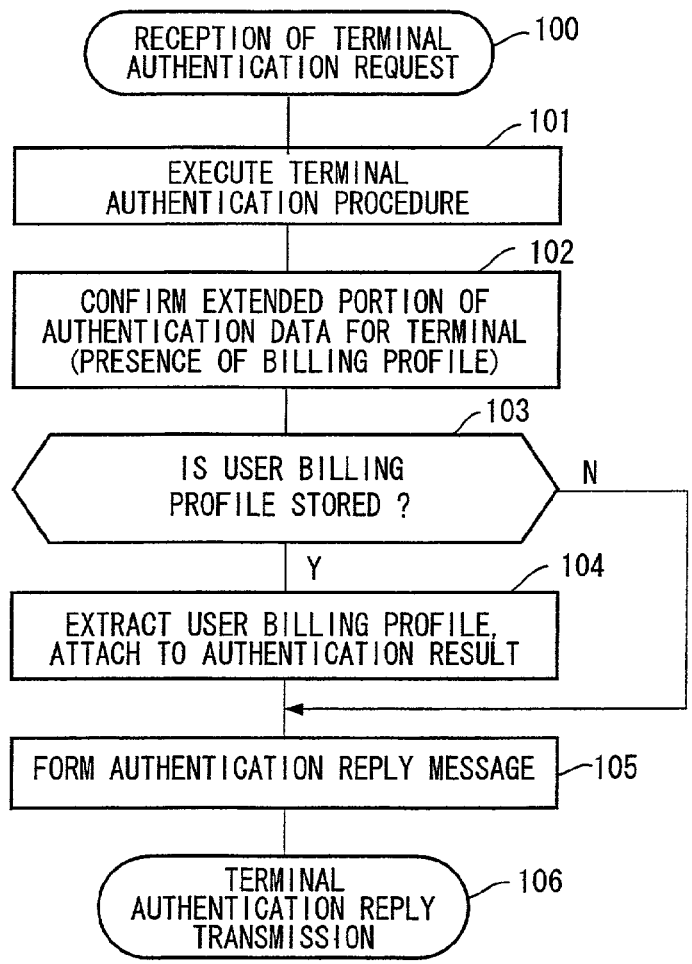
FIG. 25 shows the flow of terminal authentication processing and billing profile extraction processing in the AAA server.

FIG. 24 explains the relation between terminal authentication data managed by the AAA server and user billing profiles UBP; FIG. 25 shows the flow of terminal authentication processing and of billing profile extraction processing in the AAA server.

When the AAA server 22 receives an authentication request including a service binding request (step 100), first it executes the terminal authentication procedure (step 101). When the terminal authentication processing is completed, the AAA server 22 references the extended portion of the terminal authentication data ADT1 to ADTn managed for each terminal (subscriber) (step 102), and checks whether a user billing profile UBP1 to UBPn is set for the terminal in question (step 103). If a user billing profile is set, the AAA server 22 reads the user billing profile for the terminal sending the location registration request from the billing information database BIDB 24, extracts only the entry for the required service category, and assigns this to the authentication result (step 104). Also, the user billing profile is included in a billing initiation request message (in a Mobile IP base implementation, a terminal location registration message) as a portion of the authentication result (step 105), and transmits this to the home agent HA 21 (step 106). Subsequently, the home agent HA 21 transmits billing initiation request messages to the service provider server CN 41 with which the terminal is requesting connection, via the edge router ERT 42. In step 103, if the user billing profile UBP is not set, the location registration message is transmitted to the external device without appending the user billing profile to the authentication result.

To summarize the above, if service request information is contained in a received terminal authentication request message, the AAA server 22 retrieves this and issues a request for a search of the billing profile UBP for the user in question to the billing information database BIDB 24. Also, when a billing profile for the user in question is received as the search result, this is transmitted to the device which determines billing conditions (the service provider server CN)

(f) Billing Condition Generation Function

If the service provider server CN 41 receives a billing initiation request message, that is, a location registration message, it compares the server billing profile SBP which it holds itself with the user billing profile UBP contained in the message, generates service conditions (billing conditions) which can be provided, and notifies the billing engine BEN.

FIG. 25 shows the flow of processing for billing condition generation.

The service provider server CN 41 receives a binding update message containing a user billing profile and authentication result, based on a location registration request sent from the mobile node (step 151). The constituent components of the content of the received message are searched (step 152), connection information (terminal location information) is extracted as a component, and the optimal path for the terminal is set (step 153).

Next, the server CN checks whether the user billing profile (UBP) for the terminal in question is contained in the received message (step 154), and if it is not contained therein, returns to the beginning and awaits reception of a message, without performing billing condition generation processing.

On the other hand, when the user billing profile UBP (cf. FIG. 23A) is contained in the message, the server billing profile SBP (cf. FIG. 23B) is read (step 155), and the two billing profiles are compared (step 156). At this time, each of the items used in comparison of conditions is compared. A judgment is made as to whether conditions match for the server billing profile SBP for all service IDs and the user billing profile UBP (step 157); if conditions do not match between the server billing profile SBP for all service IDs and the user billing profile UBP, the service provider server CN 41 judges that provision of service is impossible, and returns a reply message (connection message), containing error information and the default values of billing conditions, to the request origin (home agent HA) (step 158). By this means, even if conditions do not match between the server billing profile SBP for all service IDs and the user billing profile UBP, and provision of service is not possible, notification of the occurrence of an error can be issued, and moreover default values can be presented to the user, so that convenience to the user can be improved.

On the other hand, if conditions match between the server billing profile for at least one service ID and the user billing profile UBP, the server billing profile SBP for this service ID is determined as the service provision conditions (billing conditions), this is included in a reply message (connection message) (step 159), and billing condition generation processing ends.

Figure 26:
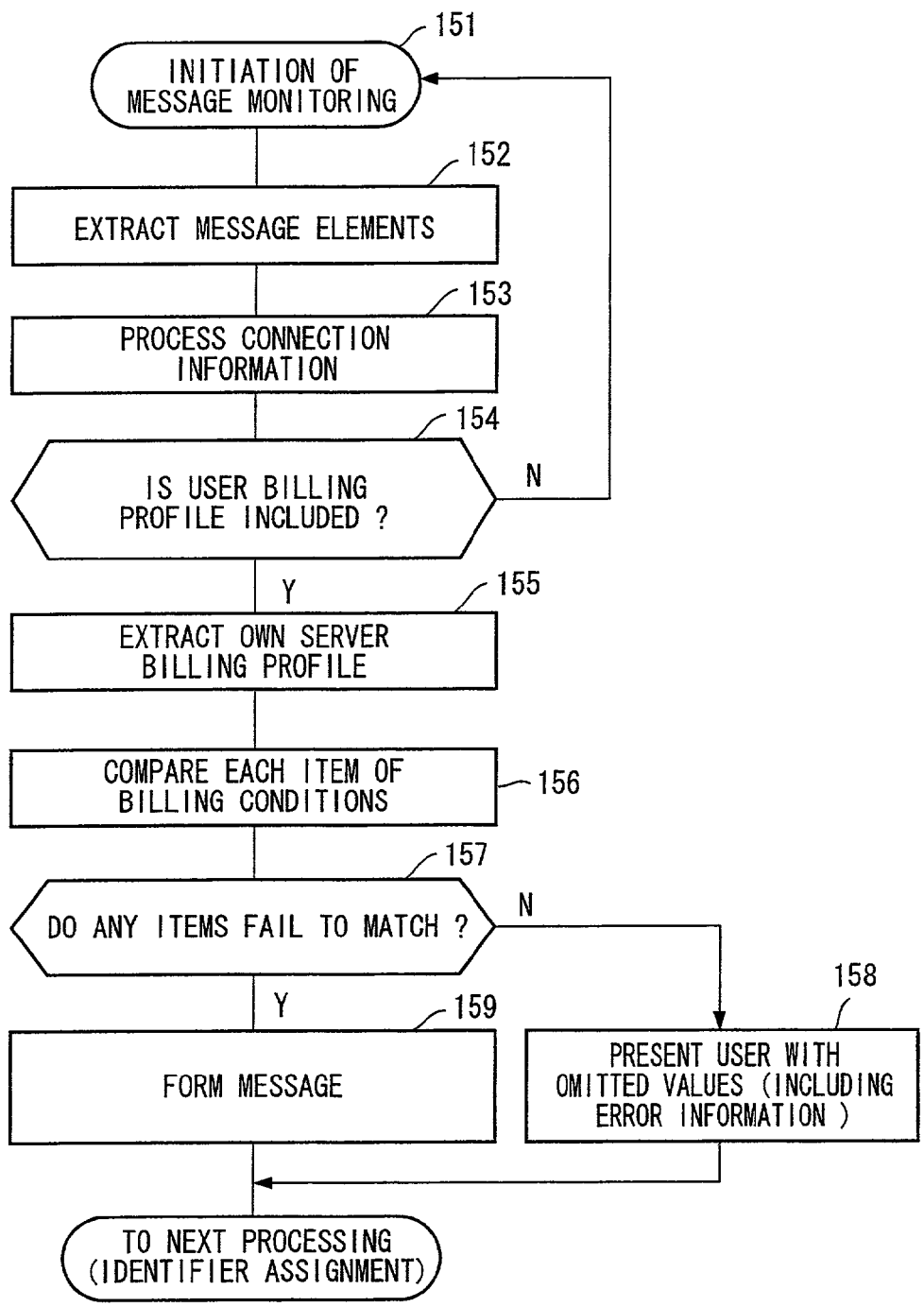
FIG. 26 shows the flow of processing for generation of service provision conditions (billing conditions)
Figure 27:
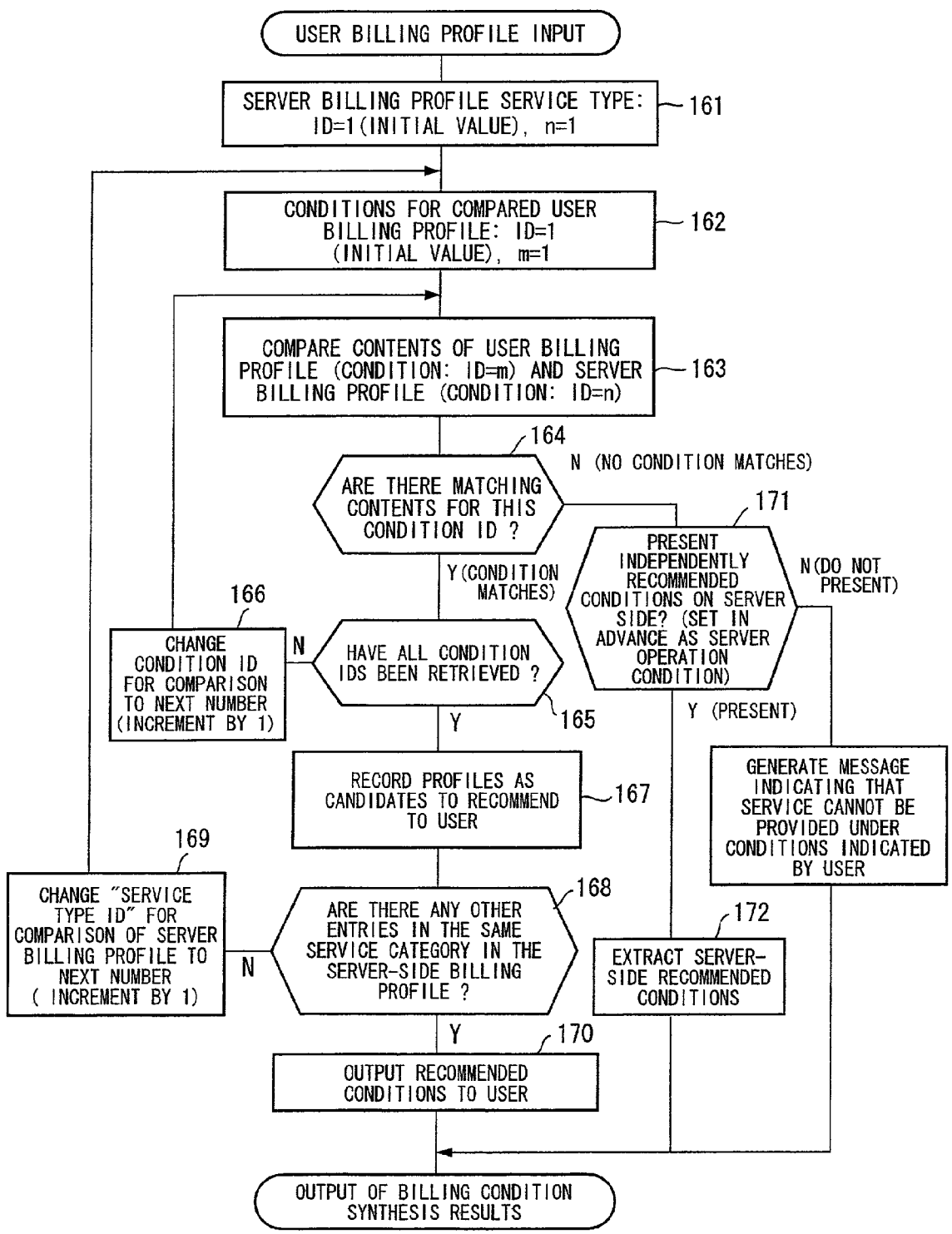
FIG. 27 shows a portion of the detailed flow of processing for generation of billing conditions.

FIG. 27 shows the detailed flow of processing of steps 155 to 159 in FIG. 26.

When a user billing profile UBP is input, the server CN initializes the service type ID of the server billing profile SBP to 1 (n=1, step 161), and also initializes the condition ID of the user billing profile for comparison to 1 (m=1, step 162). Then, the contents of the mth condition item of the user billing profile UBP and of the mth condition item of the nth server billing profile SBP are compared (step 163). A check is performed to determine whether there is a match of the contents of the mth condition (step 164); if there is a match, a check is performed to determine whether comparisons are completed for all condition IDs (step 165). If the result is "NO", m is incremented (step 166), and the processing beginning with step 163 is repeated.

In step 165, if comparisons for all condition IDs are completed, the nth server billing profile is recorded as the recommended candidate for conditions (billing conditions) for providing service to the user (step 167).

Next, a check is performed to determine whether there exists another entry for the same service category within the server billing profile SBP (step 168). If such an entry exists, n is incremented (step 169), and the processing beginning with step 162 is repeated. On the other hand, if in step 168 comparison processing for all service type IDs is ended, the recorded billing conditions are output as recommended conditions for the user (step 170), and billing condition generation processing is ended.

In step 164, if there are no matches on conditions for the server billing profile of all service type IDs with the user billing profile in any of the items, a judgment is made as to whether to present recommended conditions set in advance independently on the server side (step 171). If settings stipulate presentation, the server-side recommended conditions are extracted and output (step 172). However, if settings do not stipulate presentation, a message is generated indicating that service cannot be provided under the conditions indicated by the user (step 173), and processing is ended.

(g) Cache Function for Billing Conditions for High-frequency Services

In essence, the procedure for billing condition generation by comparing a user billing profile UBP and server billing profile SBP is executed for each terminal and for each service; but in some cases the frequency of use of a fee-based service is extremely high, or there are few points with respect to which the billing profiles are compared, and there appear no differences in billing conditions among terminals requesting services. In other words, as a result of generation of billing conditions for numerous terminals, the same billing conditions may be generated.

On the other hand, because a service is provided by a comparatively large-scale business, it is desirable that the load imposed on the server of the service provider by generation of billing conditions be alleviated, and that the response time for service startup be shortened.

When there are no differences in billing conditions for each terminal requesting services, the billing conditions (service provision conditions) for the service in question are generated in advance, and are stored (cached) in the billing information database BIDB 24. In other words, billing conditions corresponding to a service provider server and a service type, as well as a service ID specifying the billing conditions, are registered in advance. In this state, when a service request is issued by a user to a prescribed server, by presenting the billing conditions stored (cached) in the billing information database BIDB 24, that is, the service ID, the load on the service provider server CN 41 for generating billing conditions is alleviated, and the response time for service startup is shortened.

Figure 28:
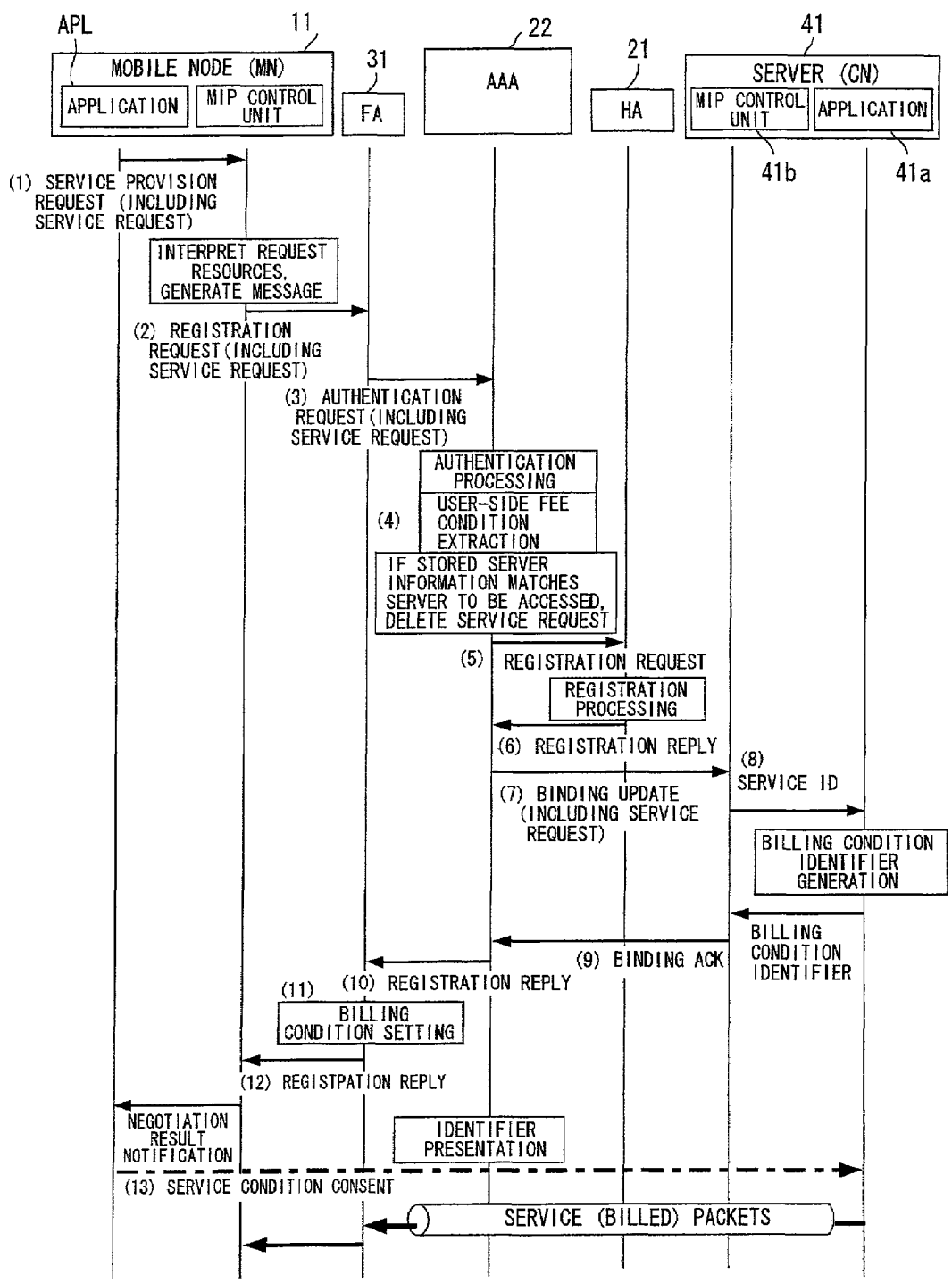
FIG. 28 is an example of the sequence for a case in which cached billing conditions are applied.

FIG. 28 explains the sequence in the entire network when applying cached billing conditions.

[1] The MIP control unit within the mobile node MN 11 detects a service provision request from the user or from an application APL.

[2] The mobile node (MN) 11 sends a location registration request message containing a service request to the foreign agent FA 31.

[3] When the foreign agent FA 31 receives the registration request message, it sends an authentication request message containing the service request to the AAA server 22.

[4] The AAA server 22 extracts the authentication request and server information (server name and service type for the service request) from the authentication request message. Also, the extracted server information and the server information (server name, service type) held by the AAA server 22 are compared, and if they match, the service request is deleted.

[5] Then, the AAA server 22 sends a location registration request message, with the service request deleted, to the home agent HA 21.

[6] After location registration processing, the home agent HA 21 sends a registration reply message to the AAA server 22.

[7] Then, the AAA server 22 sends a binding update message to the service provider server CN 41. The AAA server 22 includes in this binding update message the service request (service ID specifying billing conditions) extracted from the server information, which the AAA server itself holds.

[8] The service provider server CN 41 processes the connection information and extracts the service ID, identifies the billing conditions from the service ID, and generates a billing condition identifier.

[9] Then, the service provider server CN 41 adds the billing condition identifier to a binding ack, and sends this to the AAA server 22.

[10] On receiving the binding ack, the AAA server 22 sends a registration reply message, to which is appended the billing conditions extracted from the server information held by [the AAA server], to the foreign agent FA 31.

[11] The billing engine control function unit BECF of the foreign agent FA 31 extracts the billing conditions appended to the registration reply message, and sets the billing conditions in the billing engine BEN.

[12] Then, the foreign agent FA 31 sends the registration reply message to the mobile node MN 11, and the MIP control unit notifies the application of the negotiation result.

[13] Subsequently, if the mobile node MN 11 sends the billing condition identifier to the service provider server CN 41, issuing notification of acceptance of the service conditions, the server sends service packets addressed to the mobile node.

Figure 29:
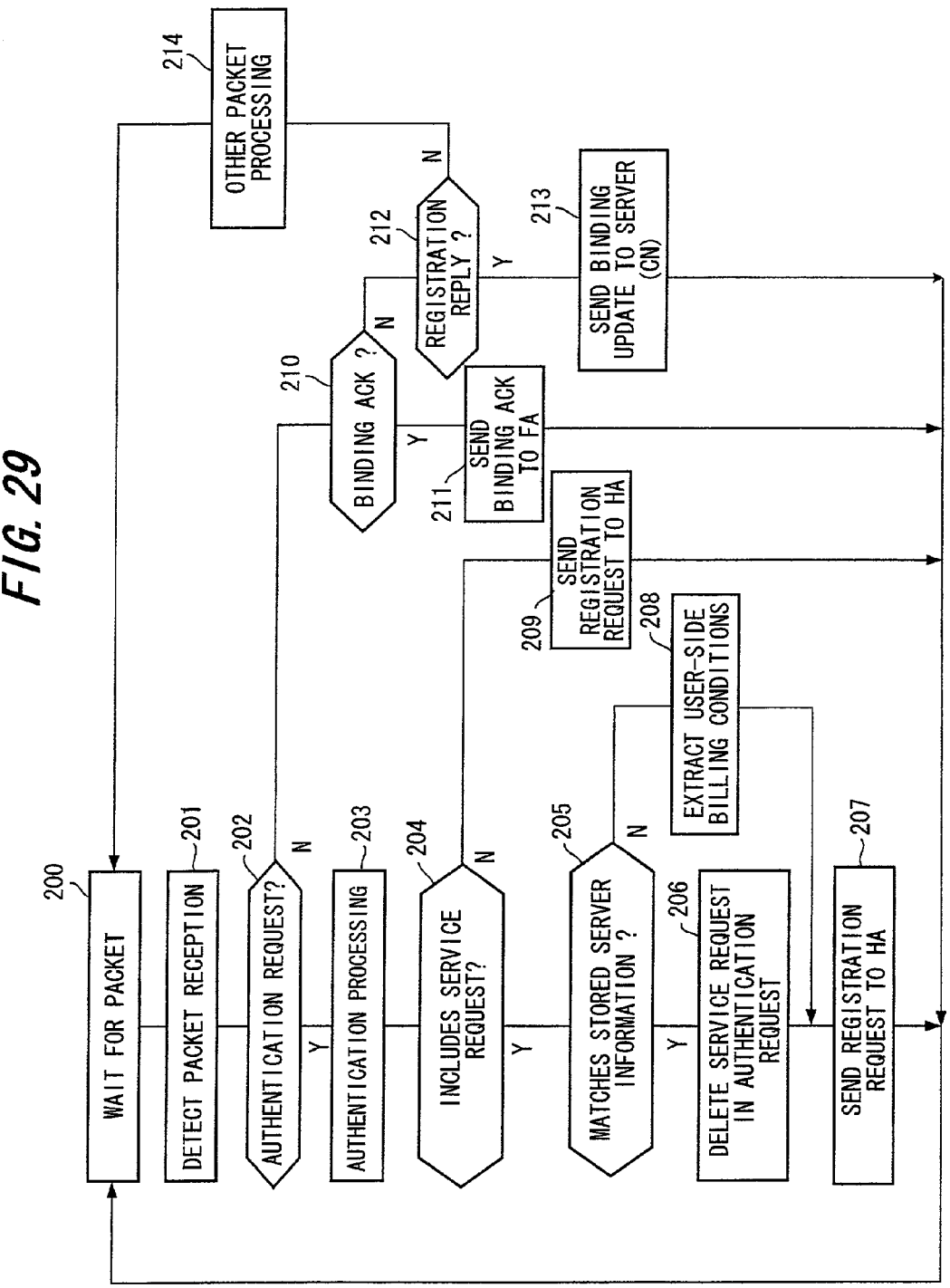
FIG. 29 shows the flow of processing in the AAA server when applying cached billing conditions.

FIG. 29 shows the flow of processing in the AAA server 22 when applying cached billing conditions.

In the packet-waiting state (step 200), when the AAA server 22 receives a packet (step 201), it checks to determine whether the packet contains an authentication request message (step 202); if such a message is present, it executes authentication processing (step 203), and checks whether a service request is contained in the above packet (step 204).

If a service request is contained in the packet, a check is performed to determine whether the server information (server name, service type) contained in the service request matches server information held by the AAA server (step 205); if there is a match, the service request in the authentication request is deleted (step 206), and a location registration request message is sent to the home agent HA 21 (step 207). However, if in step 205 there is no match on server information, the user billing profile UBP corresponding to the service request is extracted from the billing information database BIDB 24 (step 208), the user billing profile UBP is appended to the authentication result, and a registration request message is sent to the home agent HA 21 (step 207).

On the other hand, if in step 204 a service request is not included in the packet, a location registration request message is sent to the home agent HA 21 (step 209). If in step 202 the packet does not contain an authentication request, a check is performed to determine whether the packet contains a binding ack (step 210); if a binding ack is present, a registration reply message is sent to the foreign agent FA 31 (step 211). However, if no binding ack is contained in the packet, a check is performed to determine whether a registration reply is contained in the packet (step 212), and if a registration reply is present, a binding update message is sent to the server CN (step 213), and if no registration reply is present, other processing is performed, and receipt of the next packet is awaited.

(h) Billing Condition Identifier Assignment

Billing condition data generated by the billing condition generation function satisfies the conditions of both the user and the service provider; but the fee-payer (terminal user) must still decide whether or not to execute the service. Consequently on the service provider side, a unique billing condition identifier is generated for the billing condition data which has been generated, in order to associate the service in question with user information, such as approval for execution of the service. In other words, after billing condition generation, the service provider generates information (billing condition identifier) which uniquely identifies this billing condition data ([8] in FIG. 28), and includes this billing condition identifier, together with billing condition data, in a reply message to the origin of the service request.

Figures 30, 31:
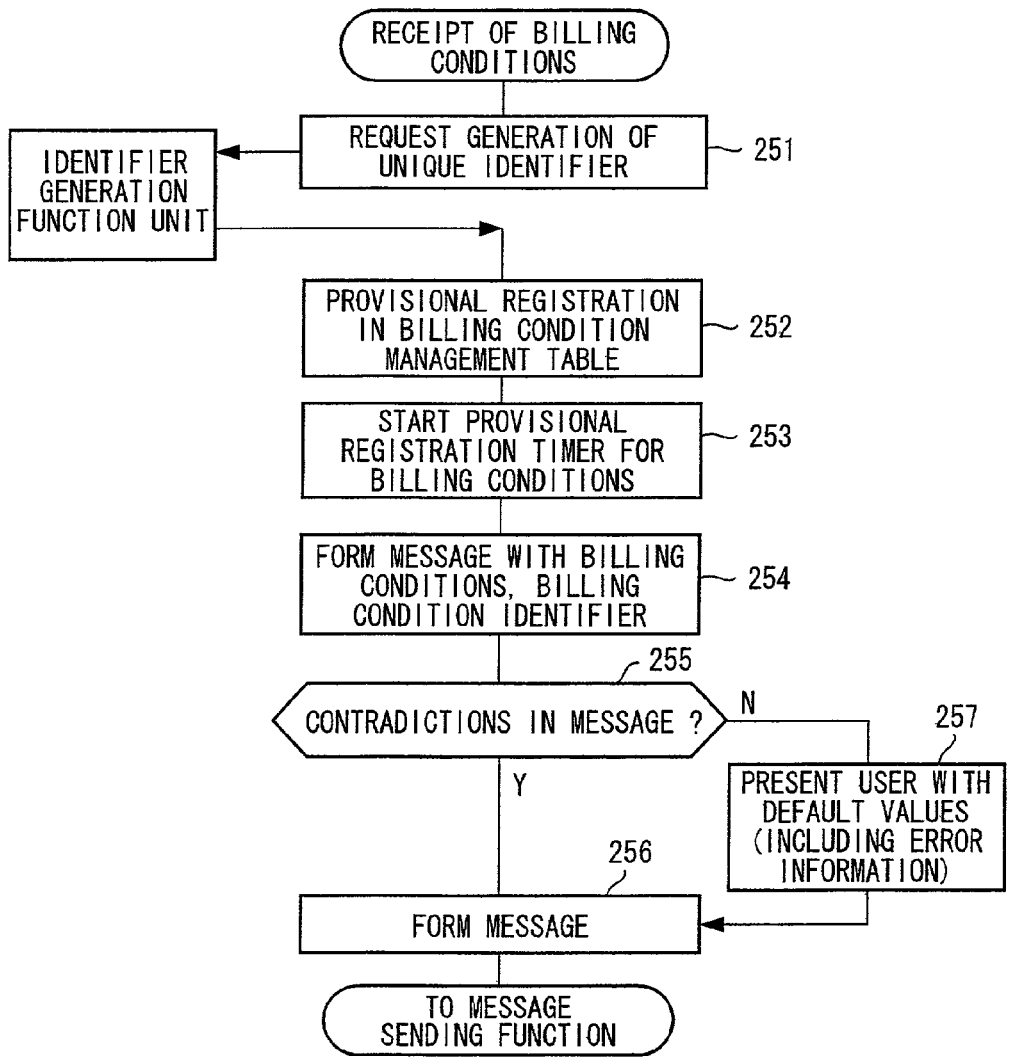
FIG. 30 is an example of a billing condition management table.
FIG. 31 shows the flow of processing to assign a billing condition identifier.

The generated billing condition identifier is stored in the billing condition management table 44 (cf. FIG. 22) managed by the service provider server CN 41. Because at the time of storage, the billing conditions have not yet been approved by the user, a "provisional registration" state is also recorded. FIG. 30 explains the information held by the billing condition management table 44, which includes [1] identification information (IP address, NAI (Network Access Identifier), or similar) for the terminal requesting the service, [2] billing conditions, [3] an identifier of the billing conditions (billing condition identifier), and [4] state of acceptance of the billing conditions (registration state indicating either provisional registration, or approval by the user).

FIG. 31 shows the flow of processing to assign a billing condition identifier.

When the service provider server CN 41 receives a service ID specifying billing conditions, it identifies the billing conditions, and also requests generation of a billing condition identifier by the identifier generation function unit (step 251); when a billing condition identifier is obtained from the identifier generation function unit, the billing conditions, billing condition identifier and similar are provisionally registered in the billing condition management table 44 (step 252). Then, a provisional registration timer for the billing conditions is started (step 253). Also, a binding ack message containing user identification data, billing conditions, and the [billing condition] identifier is created (step 254). Then, a check is performed for inconsistencies in the message (step 255), and if there are no inconsistencies, a message is formed and sent (step 256); if there are inconsistencies, the billing condition default values (including error information) are included in the message, which is sent (step 257). By this means, if inconsistencies are present, error notification is possible, and in addition default values can be presented to the user, thereby enhancing convenience.

(i) Billing Engine Control Function

The billing engine BEN, which collects billing information, is provided in the foreign agent FA or at some other appropriate point for setting billing information. This billing engine BEN must know the billing conditions of packets to be billed when collecting billing information. Hence billing condition data is transferred to the billing engine and set in advance, and by this means preparations are completed for observation by the billing engine of packets to be billed, and for execution of billing processing.

The billing engine control function unit BECF (provided in the service provider server CN and foreign agent FA) performs the following overall processing in order to transfer and set billing conditions in the billing engine BEN:

(1) The billing conditions for the terminal in question are registered in the billing condition management table 44, in user units.

(2) The billing conditions are converted into a format which can be interpreted by the billing engine.

(3) Billing conditions are transferred to and set in the billing engine.

(4) The expiration date for billing conditions is set, a timer is used to monitor elapsed time, and if a packet arrives prior to the expiration date, it is handled assuming that the billing conditions are valid. Even if the expiration date has passed, if no packets arrive, the billing conditions are regarded as invalid, and the entry is deleted from the billing condition management table 44. That is, billing conditions which have become valid and for which billing operations have begun are deleted from the billing condition management table 44 if packets do not arrive over a prescribed continuous period of time.

Figure 32:
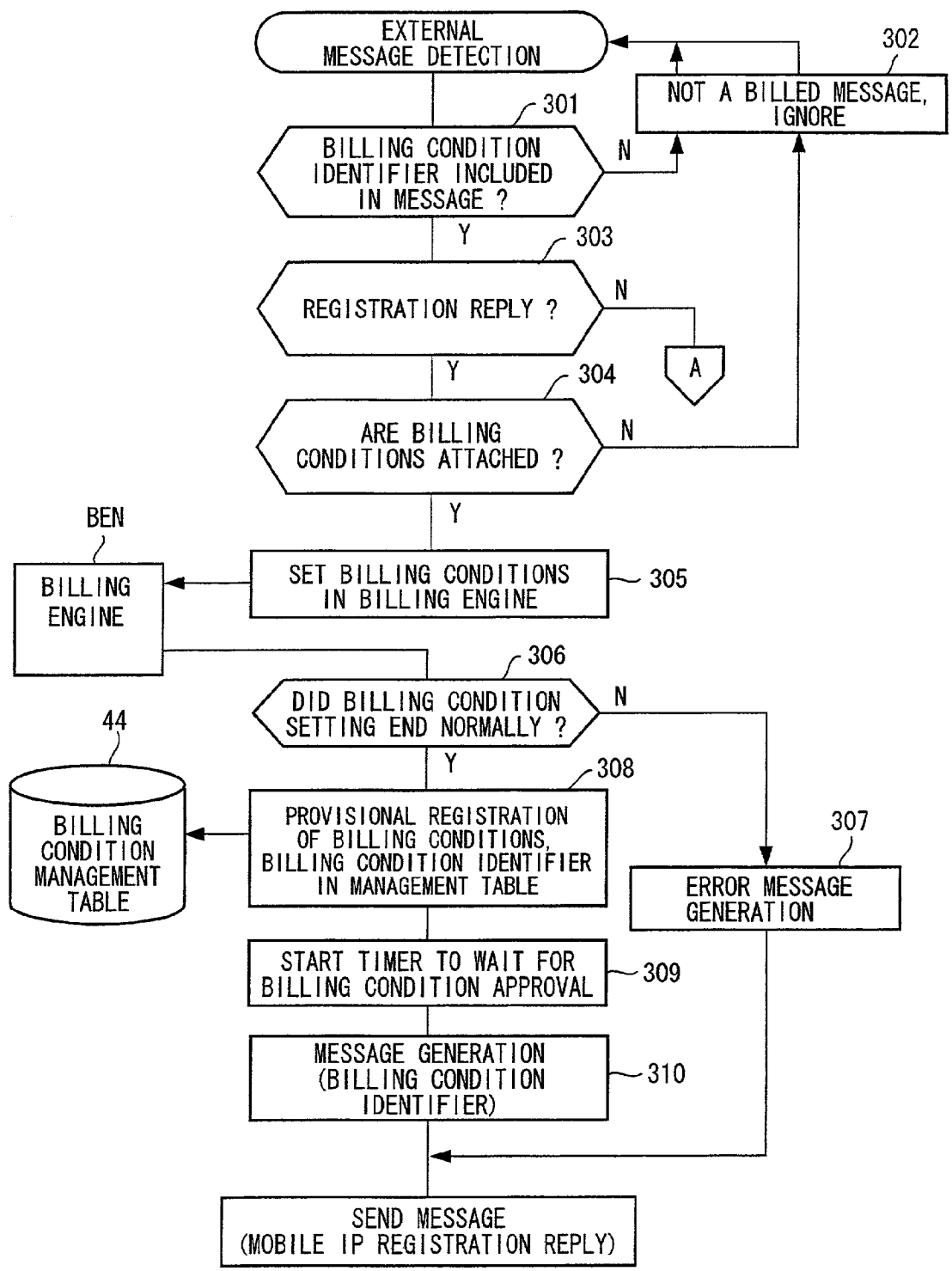
FIG. 32 shows the processing flow (provisional setting of billing conditions) of the billing device control function unit.
Figure 33:
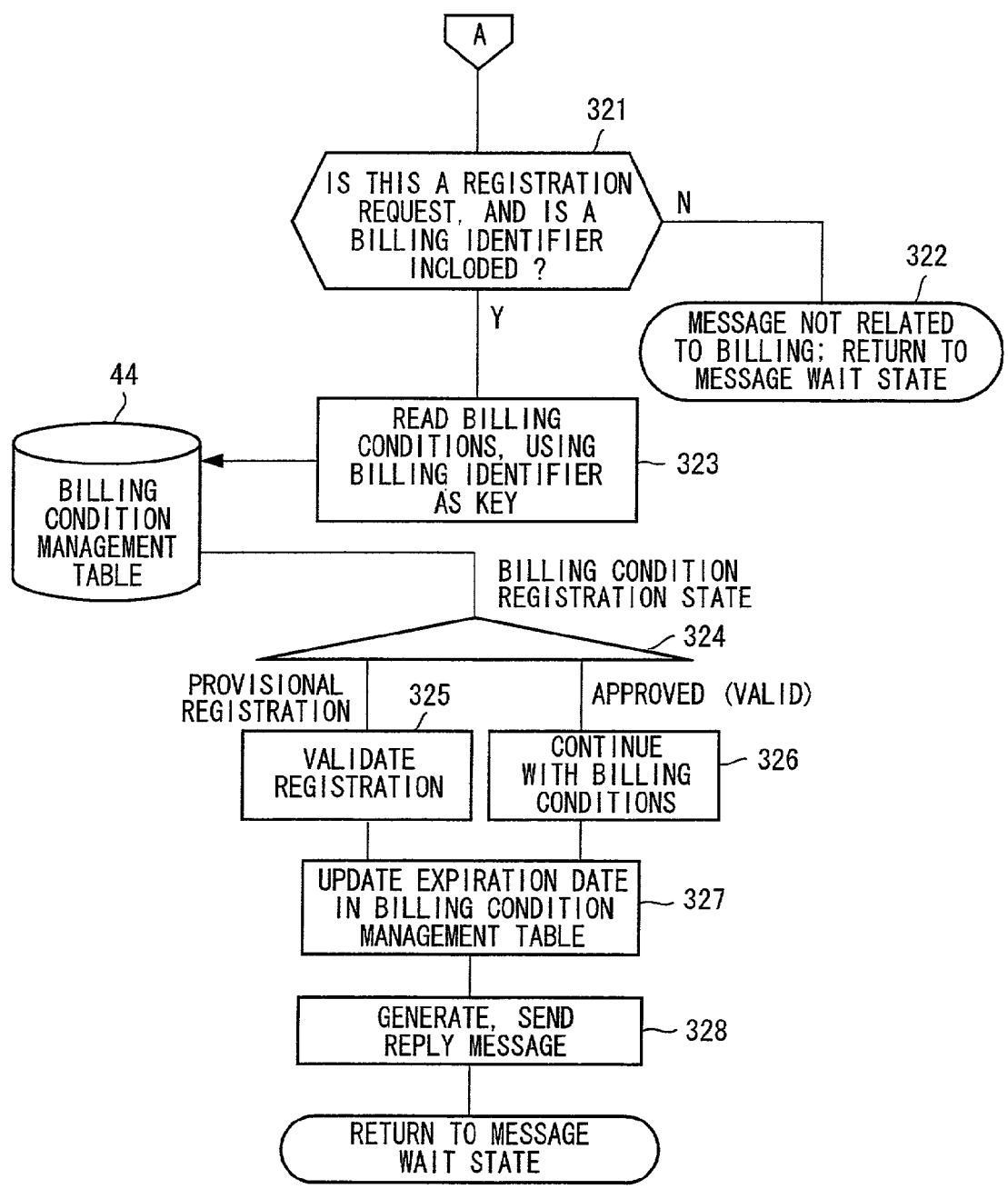
FIG. 33 shows the processing flow of the billing device control function unit (updating of billing conditions related to a service being executed)

FIG. 32 shows the flow of processing for provisional setting of billing conditions in the billing engine control function unit BECF; FIG. 33 shows the flow of processing to update billing conditions related to a service being executed.

The billing engine control function unit BECF of the foreign agent FA checks whether a billing condition identifier is contained in a received message (step 301), and if an identifier is not contained, ignores the message because it is not to be billed (step 302), and awaits reception of the next message.

If a billing condition identifier is included, a check is performed to determine whether the message is a registration reply (step 303). If a registration reply message has been received, it is judged that the billing conditions and billing condition identifier of the service provider server CN have been assigned to this message for sending.

If the message is a registration reply, the message is checked for billing conditions (step 304), and if these are not included, the message is ignored as not an object for billing (step 302), and reception of the next message is awaited.

If billing conditions are included, the billing conditions are set in the billing engine BEN (step 305). Next, monitoring of whether billing condition setting is concluded normally is performed (step 306), and if setting in the billing engine BEN fails, billing is not possible, and an error message is created and included in the registration reply message, which is sent to the mobile node MN (step 307).

On the other hand, if setting in the billing engine BEN concludes normally, the billing engine control function unit BECF within the service provider server CN appends the billing conditions, billing condition identifier and similar to the billing condition management table 44 (step 308). At this time, the registration state is set as "provisional registration".

When registration in the billing condition management table 44 ends normally, the billing engine control function unit BECF starts the timer indicating the expiration date for the entry in question, and begins subtraction (step 309). The purpose of this timer is to provide an expiration date for a provisionally set billing condition; for a fixed length of time, consent to service fee conditions from the user of the terminal is awaited. During this timer interval, if information on consent to the billing conditions does not arrive from the user of the terminal, the billing condition entry is autonomously deleted.

Next, the billing information identifier of the billing engine control function unit BECF of the foreign agent FA is included in a registration reply message, which is sent to the mobile node MN (step 310).

In step 303, if the message is not a location registration reply, a check is performed to determine whether it is a location registration request, and simultaneously whether it contains a billing identifier (step 321). If it is not a registration request, or if it does not contain a billing identifier, it is a message unrelated to billing, and so processing returns to the beginning (step 322), and reception of the next message is awaited.

On the other hand, if the message is a registration request, and also contains a billing identifier, the billing conditions in question are read from the billing condition management table 44, using the billing identifier as a keyword (step 323). Then, a check is performed to determine whether the registration state of the billing conditions is provisional registration, or approved (step 324); if the state is provisional registration, the registration state is updated to approved (step 325), and if approved, registration of the service being executed is continued (step 326). Following this, the expiration date of the billing condition management table is updated (step 327), and a reply message is generated and sent to the mobile node MN (step 328).

To summarize the above, the billing conditions are set in the billing engine BEN, the billing engine monitors arriving packets to check for matches with the requested service details of the user in question, and if such a packet arrives, billing is initiated. Further, even if a fixed amount of time elapses after setting billing conditions in the billing engine BEN, if no packets are observed, the billing conditions are regarded as having been revoked, and settings are deleted.

(j) Approval of Billing Conditions

Billing conditions from the service provider server CN are presented to the user terminal; but in some cases, a plurality of billing conditions are presented. In such cases, the user must select one of the presented billing conditions, and notify the service provider server CN of this selection. Even when only one billing condition is presented, the user must notify the service provider server CN of consent to the presented billing condition. However, a relationship of trust between the user and the service provider is not guaranteed, and so the user must directly notify the billing engine within the network executing the billing itself of the consent to the billing condition.

Figure 34:
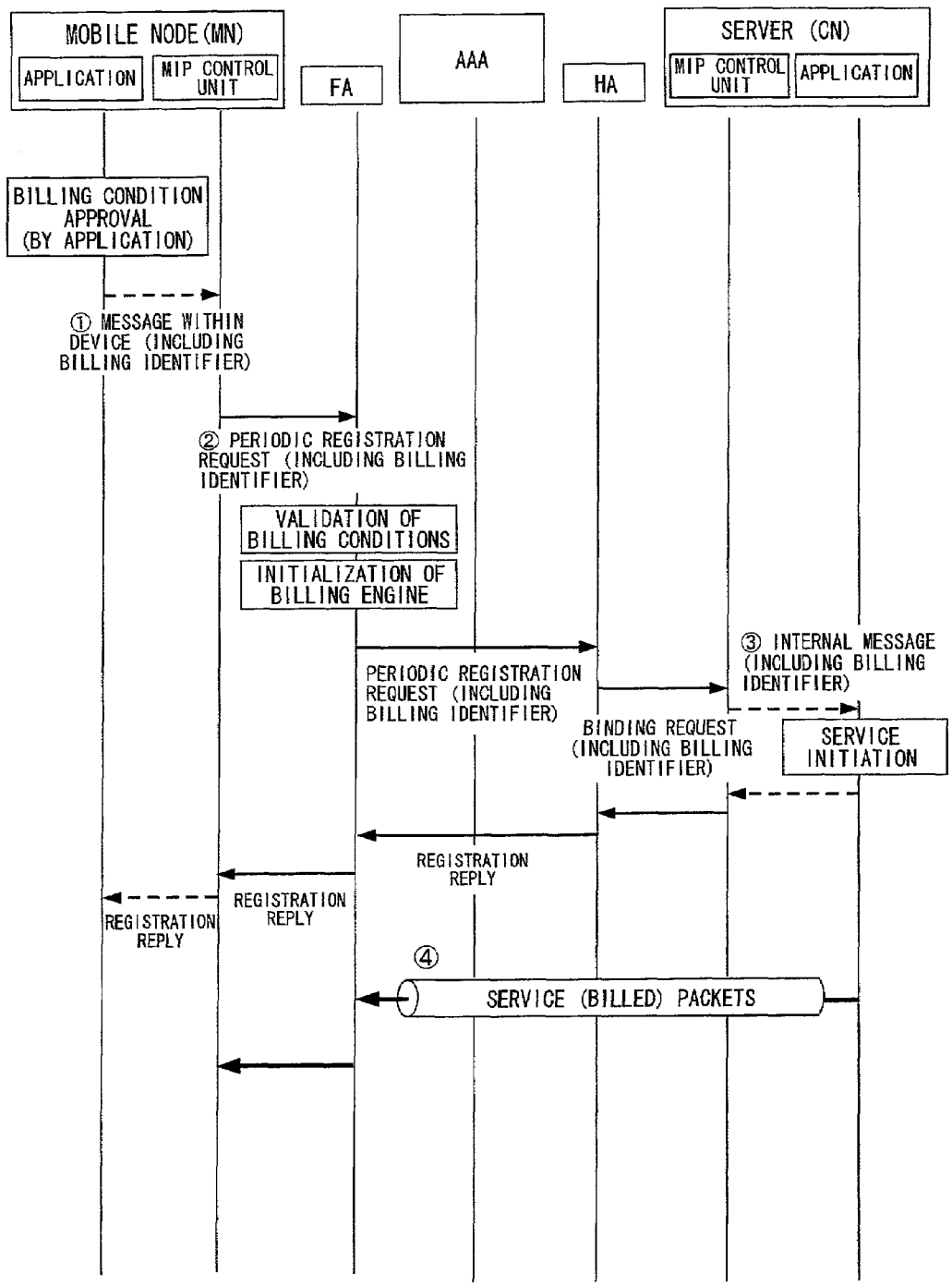
FIG. 34 is an example of a billing condition approval sequence.

FIG. 34 explains the sequence for approval of billing conditions.

① The mobile node MN is notified, in a location registration reply message, of information (fees and similar) for one or more billing condition generated by the service provider server CN. Two pieces of information are contained in the registration reply message: (a) one or more billing condition, and (b) a billing condition identifier. The application APL of the mobile node MN presents choices of billing conditions to the user; the user agrees to one billing condition, or selects a prescribed billing condition.

② Then, the MIP control unit issues a periodic registration message, with arbitrary timing, including in the message the billing condition identifier received, and sends the message. In the network, this periodic registration message must be interpreted by the billing engine control function unit BECF within the foreign agent FA.

The billing engine control function unit BECF in the foreign agent FA inputs the billing condition identifier contained in the periodic registration message into the billing engine BEN. The billing engine BEN changes internal settings so that the billing conditions indicated by the billing condition identifier become valid, and enters a state in which billing is possible.

③ When this periodic registration message arrives at the service provider server CN, the server CN recognizes that consent has been obtained for the billing conditions, and billing preparations in the network have been completed.

④ Subsequently, that is, on the occasion of receipt of a message, the service provider server CN begins service.

As another method of notification of billing condition consent, it is also possible to notify the server CN of the initiation of service at the application level (for example HTTPS) in advance, taking into account the propagation delay for the above message to reach the service provider server CN, and for preparations necessary for service initiation to be completed on the server side.

Figure 35:
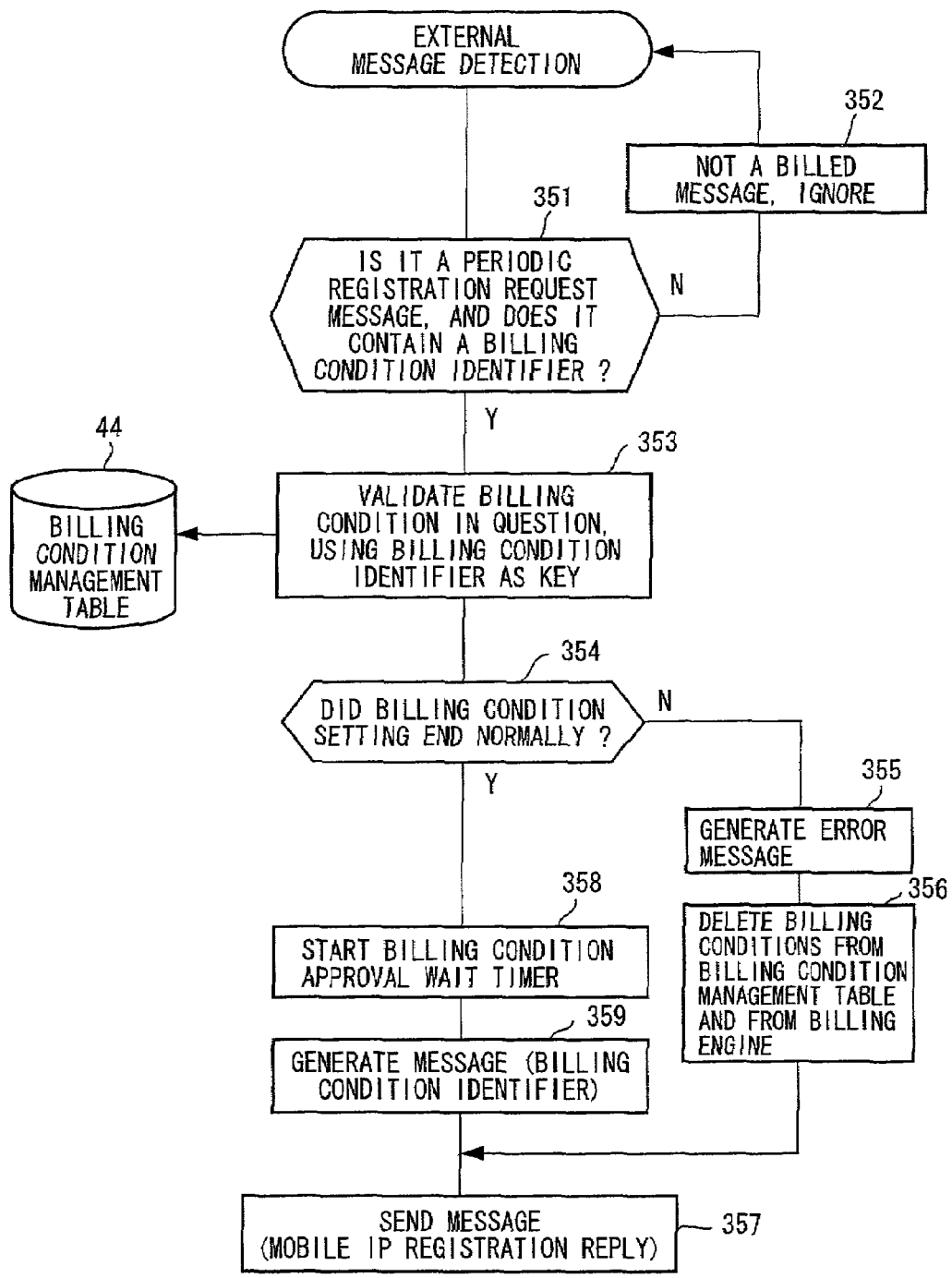
FIG. 35 shows the processing flow for billing condition approval.

FIG. 35 shows the flow of processing for billing condition approval by the billing engine control function unit BECF.

When an external message is received, a check is performed to determine whether it is a periodic registration request message, and also whether it contains a billing condition identifier (step 351); if "NO", the message is ignored as a message not subject to billing (step 352), and reception of the next message is awaited.

In step 351, if the message is a periodic registration request message and in addition contains a billing condition identifier, the billing condition identifier is used as a keyword to modify the relevant billing condition in the billing condition management table 44 from provisional registration to full registration (valid) (step 353). Next, normal conclusion of billing condition setting is checked (step 354); if the setting operation has failed, billing is not possible, so that an error message is created (step 355), the billing condition in question is deleted from the billing condition management table 44 and billing engine BEN (step 356), and the error message is included in the registration reply message, which is sent to the mobile node MN (step 357).

On the other hand, if billing condition setting ends normally, the billing condition approval wait timer is started, and subtraction is begun (step 358). Then, the billing condition identifier is included in the registration reply message (step 359), which is sent to the mobile node MN.

In this way, by including a billing condition identifier issued by the service provider in a registration message and sending the message, the user terminal can notify the network that the user has consented to the billing condition.

(k) Service Continuation Confirmation Function

Once service is begun, it is necessary to periodically confirm the user's intention to continue the service. As means to do so, a "periodic registration" procedure, which is one procedure for location registration of a mobile node MN, is used. Specifically, the procedure described below is followed.

(1) When beginning the periodic registration procedure, the mobile node MN appends the address of the connected server CN and the billing condition identifier to the periodic registration message, and sends the message.

(2) The device which receives the registration request message (for example, a foreign agent FA which accommodates the mobile node and controls the billing engine) detects the above appended information.

(3) On detection of the above appended information, the billing engine control function unit BECF judges that the mobile node MN in question desires continuation of provision of the service, and updates the billing condition expiration date.

(4) If some problem arises with the user terminal MN, so that periodic registration is not generated, billing operations for the user terminal in question are interrupted. At this time, transmission of packets for billing continues up until the time of final confirmation of periodic registration.

Figure 36:
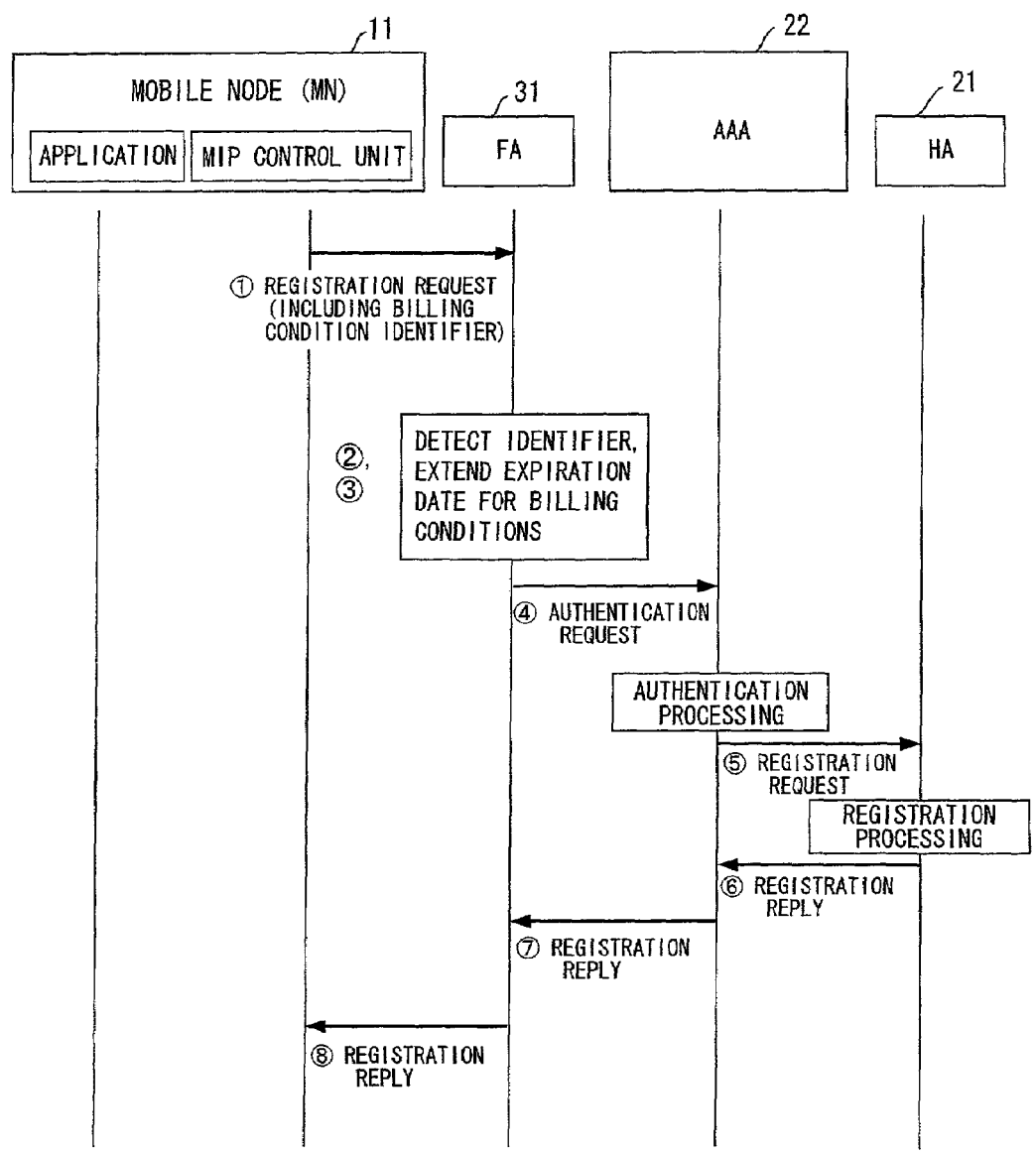
FIG. 36 is an example of a sequence when continuing billing (when the AAA session does not remain)

FIG. 36 explains the sequence for billing continuation when the mobile node AAA (location registration authentication) session does not remain.

① The mobile node (MN) sends a registration request (periodic registration message) containing a billing condition identifier.

② The device receiving the registration request (the router controlling the billing engine accommodating the mobile node; for example, a foreign agent FA) detects the billing condition identifier in the received message.

③ The billing engine control function unit BECF of the foreign agent FA recognizes the detected billing condition identifier, and understanding that the user in question wishes to continue service, extends the expiration date of the billing conditions.

④ The foreign agent FA 31 sends an authentication request to the AAA server 22.

⑤ After authentication, the AAA server 22 sends a registration request to the home agent HA 21.

⑥ After authentication processing ends, the home agent HA 21 sends a registration reply to the AAA server 22.

⑦ The AAA server 22 sends the registration reply to the foreign agent FA 31.

⑧ The foreign agent FA 31 sends the registration reply to the mobile node MN.

Figure 37:
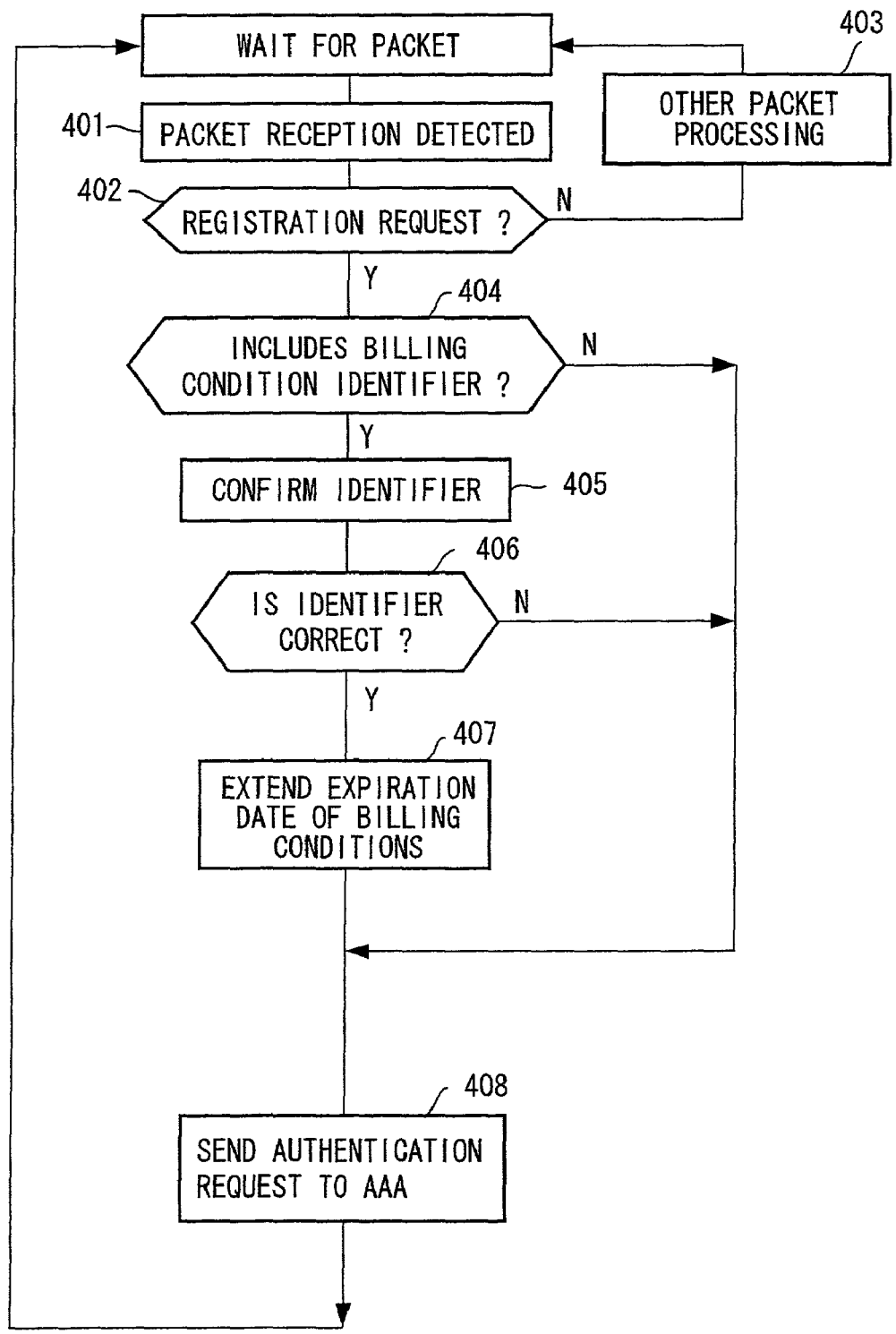
FIG. 37 shows the processing flow in the FA of a sequence when continuing billing (when the AAA session does not remain)

FIG. 37 shows the flow of processing of the foreign agent FA when continuing billing, for the case in which the mobile node AAA session remains.

If a packet is received (step 401), the foreign agent FA checks whether it is a registration request packet (step 402); if it is not a registration request packet, the processing for packets other than packets for billing continuation processing is executed (step 403), and reception of the next packet is awaited.

On the other hand, if it is a registration request packet, a check is performed to determine whether a billing condition identifier is included in the packet (step 404), and if included, the billing condition identifier is confirmed, and a check is performed to determine whether the identifier is correct (steps 405, 406). If the identifier is correct, the expiration date of the billing conditions is extended (step 407), an authentication request is sent to the AAA server 22 (step 408), and processing then returns to the beginning, and subsequent processing is repeated. If a billing condition identifier is not included, or if the identifier is not correct, an authentication request is sent to the AAA server 22, without extending the expiration date of the billing conditions (step 408).

Figure 38:
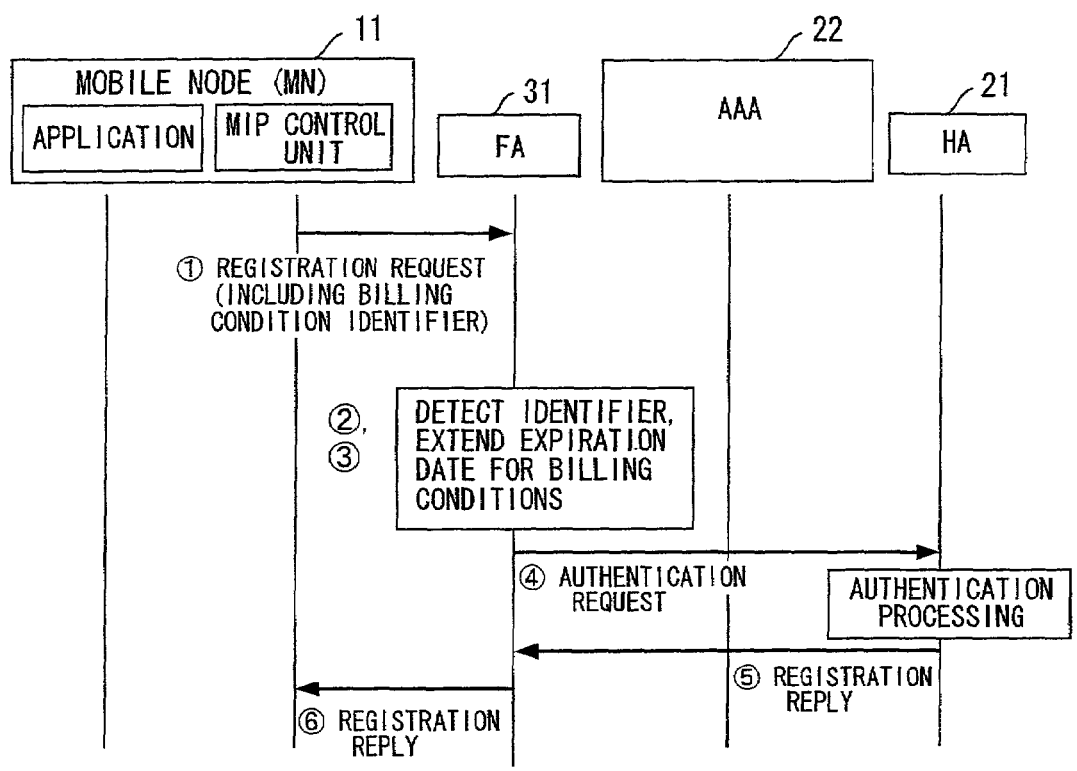
FIG. 38 is an example of a sequence when continuing billing (when the AAA session remains)

FIG. 38 explains the sequence for billing continuation, in cases where the mobile node AAA session remains.

① The mobile node (MN) sends a registration request (periodic registration message) containing a billing condition identifier to the foreign agent FA 31.

② Having received the registration request, the foreign agent FA 31 detects the billing condition identifier in the received message.

③ The billing engine control function unit BECF of the foreign agent FA confirms the detected billing condition identifier, recognizes that the user in question wishes to continue service, and extends the billing condition expiration date.

④ Then, the foreign agent FA 31 sends a registration request to the home agent HA 21.

⑤ After registration processing ends, the home agent HA 21 sends a registration reply to the foreign agent FA 31.

⑥ The foreign agent FA 31 sends the registration reply to the mobile node MN 11.

Figure 39:
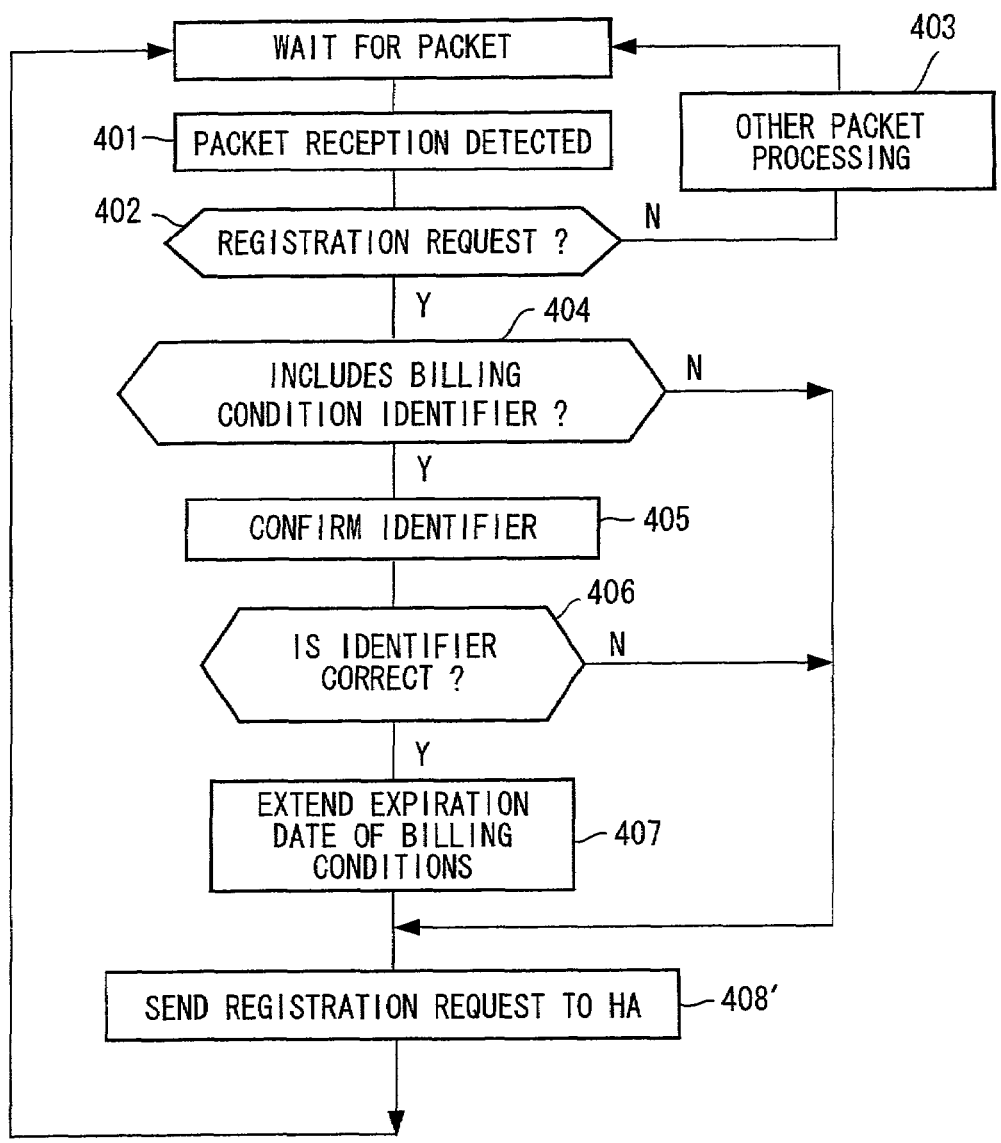
FIG. 39 shows the processing flow in the FA of a sequence when continuing billing (when the AAA session remains)

FIG. 39 shows the flow of processing of the foreign agent FA when continuing billing, in cases where the mobile node AAA session remains; steps which are the same as in FIG. 37 are assigned the same numbers. One difference is the fact that, after extension of the billing condition expiration date, an authentication request is sent to the home agent HA 21 (step 408'); processing then returns to the beginning and subsequent processing is repeated.

Thus in order to notify the billing engine BEN of the desire to continue service, the mobile node periodic registration procedure is used to send a registration request to which is assigned the billing condition identifier issued by the service provider; this identifier is detected by the billing engine control function unit BECF of the foreign agent FA, and the billing engine BEN is notified of the continuation of billing service for the user in question. However, if the periodic registration message itself is not issued, or if a billing condition identifier is not included in the periodic registration message, it is judged that there is no intention of continuing the service, the billing engine BEN is instructed to end billing collection operation, and discontinuation of service is confirmed by a device within the network.

(m) Resetting Billing Conditions for Service Currently being Executed

In some cases, the mobile node MN and service provider CN may reach agreement regarding billing conditions (fee conditions) for service execution, and in the state in which service has begun and is being executed, the user may desire to modify the service conditions (billing conditions) himself. In such a case, it must be possible to reset the billing conditions being applied during service execution. Further, the user may desire to explicitly interrupt service without waiting for the normal end of service, and may explicitly request service interruption; on this occasion, it is necessary that service and billing operations can be interrupted.

In order to perform this control, the periodic registration operation of the mobile node MN is used. Below, functions used when modifying service conditions and interrupting service are described.

(1) Case in which Service Conditions are Changed

By default, the following information is added to a periodic location registration message issued by a terminal MN during use of service: [1] connected server information, [2] billing condition identifier. On the other hand, when changing service conditions, [3] service request information (resources to be used or similar) is added as new information. By including this information, devices related to billing operations in the network recognize that a service change is being requested.

(2) Interruption of Service

When requesting interruption of service, flag information enabling identification of service interruption is inserted in the above service request information. By this means, devices on the network related to billing recognize that service has been interrupted for the terminal in question. When the billing engine control function unit BECF controlling the billing engine BEN detects this flag information, an instruction to interrupt billing operations for the terminal in question is immediately issued to the billing engine BEN, and information relating to the service in question is deleted from the billing condition management table 44. Also, the server CN 41 providing service interrupts service provision operations.

Figure 40:
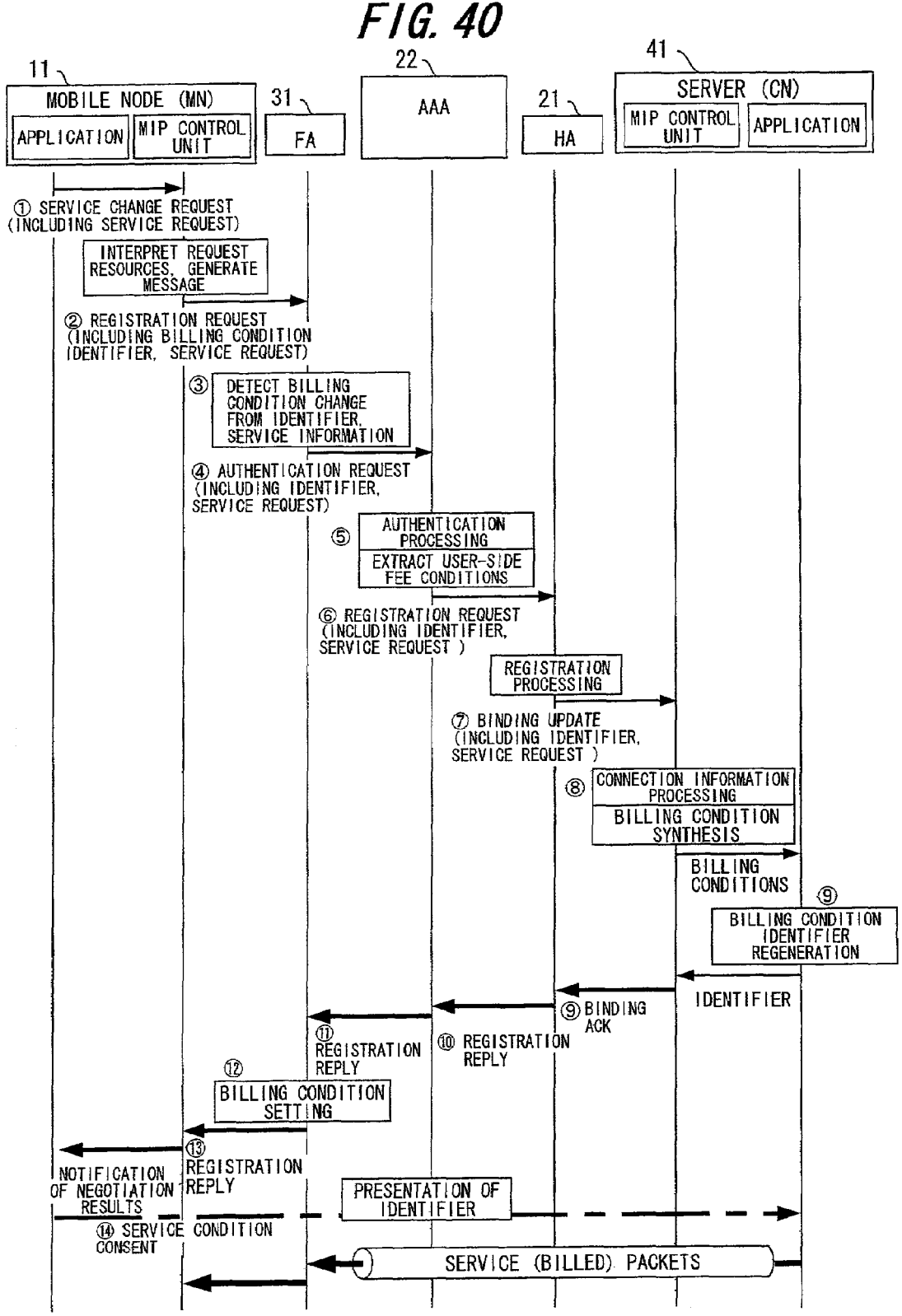
FIG. 40 is an example of a sequence when the billing conditions are changed.

FIG. 40 explains the sequence to change billing conditions.

① The MIP control unit detects a service change request from the user or application.

② The mobile node (MN) sends a registration request (periodic registration request) containing the service provider server name, billing condition identifier, and service request to the foreign agent FA 31.

③ The foreign agent FA 31 detects a service change through the billing condition identifier and service request.

④ Then, the foreign agent FA 31 sends an authentication request containing the billing condition identifier and service request to the AAA server 22.

⑤ The AAA server 22 performs authentication processing, and also extracts the user billing profile UBP from the billing information database BIDB 24.

⑥ The AAA server 22 sends a registration request containing the service provider server name, billing condition identifier, and user billing profile UBP to the home agent HA 21.

⑦ After the end of registration processing, the home agent HA 21 sends a binding update message containing the billing condition identifier and user billing profile UBP to the service provider server CN 41.

⑧ The service provider server CN 41 processes the connection information, and generates billing conditions, comparing the user billing profile UBP and server billing profile SBP.

⑨ Then, the service provider server CN 41 regenerates a new identifier for the generated billing conditions, and attaches this information to a binding ack, which is sent to the home agent HA 21.

⑩ The home agent HA 21 sends a registration reply to the AAA server 22.

⑪ The AAA server 22 sends a registration reply to the foreign agent FA 31.

⑫ The billing engine control function unit BECF of the foreign agent FA 31 extracts the billing conditions and billing condition identifier attached to the registration reply, and sets these in the billing engine BEN.

⑬ The foreign agent FA 31 sends the registration reply to the mobile node MN 11. The MIP control unit notifies the application of the negotiation result.

⑭ Subsequently, if the mobile node MN 11 sends the billing condition identifier to the service provider server CN 41 as notification of acceptance of service conditions, the server sends service packets addressed to the mobile node, and the billing engine performs billing processing according to the new billing conditions.

Figure 41:
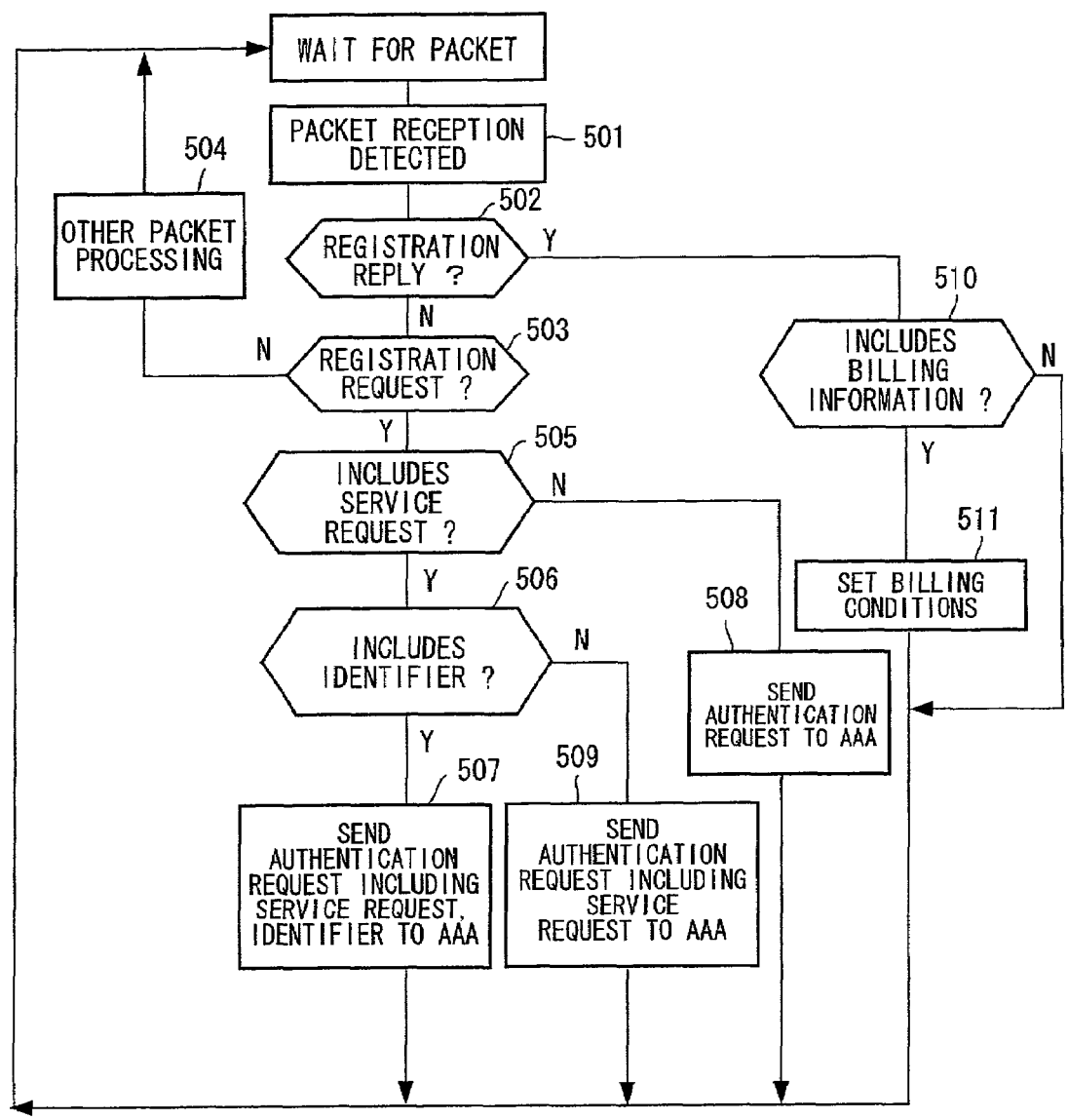
FIG. 41 shows the processing flow in the FA when the billing conditions are changed.

FIG. 41 shows the flow of processing of the foreign agent FA, when changing the billing conditions. When a packet is received (step 501), the foreign agent FA checks whether it is a registration reply packet (step 502); if it is not a registration reply packet, checks whether it is a registration request packet (step 503); and, if it is not a registration request packet, executes processing for packets not related to billing condition change processing (step 504), and awaits reception of the next packet. On the other hand, if the packet is a registration request packet, the foreign agent FA checks whether the packet contains a service request (step 505); if no service request is contained, checks whether a billing condition identifier is contained (step 506); and if a billing condition identifier is contained, sends an authentication request containing the service request and billing condition identifier to the AAA server 22 (step 507).

In step 505, if a service request is not contained in the packet, an authentication request is sent to the AAA server 22 (step 508), and if in step 506 a billing condition identifier is not contained in the packet, an authentication request containing a service request is sent to the AAA server 22 (step 509). Further, if in step 502 the packet is a registration reply, the foreign agent FA checks whether it contains billing conditions (step 510), and if billing conditions are contained, sets the billing conditions in the billing engine BEN (step 511).

Figure 42:
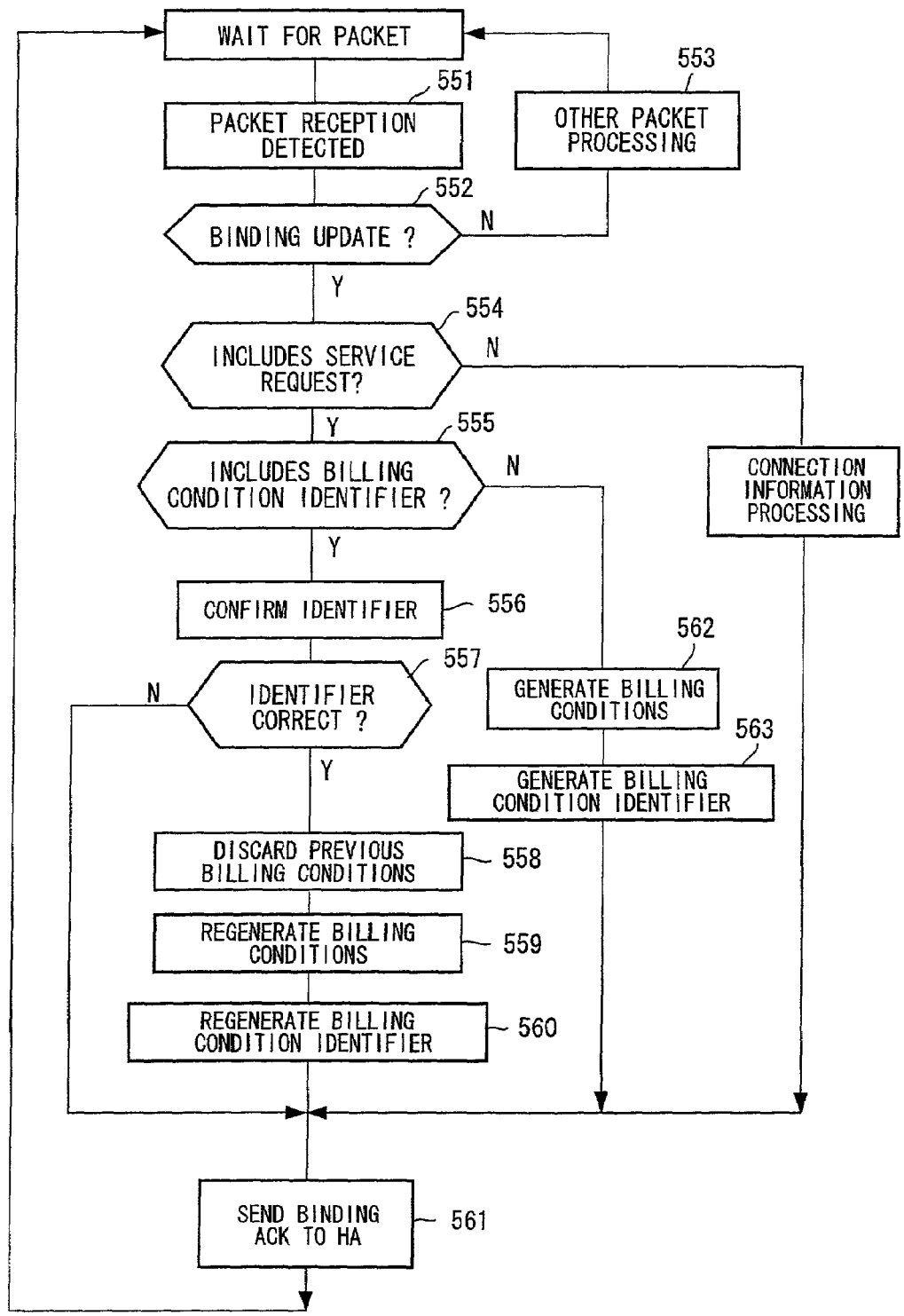
FIG. 42 shows the processing flow in the CN (server) when the billing conditions are changed.

FIG. 42 shows the flow of processing of the service provider server CN when changing the billing conditions.

On receiving a packet (step 551), the server CN checks whether the packet is a binding update packet (step 552); if it is not a binding update packet, processing for packets not related to billing condition changes is executed (step 553), and reception of the next packet is awaited.

If it is a binding update packet, the server CN checks whether it contains a service request (user billing profile UBP) (step 554); if the packet contains a service request, checks whether it also contains a billing condition identifier (step 555); if the packet also contains a billing condition identifier, confirms the billing condition identifier, and checks whether the identifier is correct (steps 556, 557); and if it is correct, revokes all billing conditions up to that point from the billing condition management table 44 (step 558). Then, the server CN compares the user billing profile UBP and server billing profile SBP, and regenerates new billing conditions (step 559). Then, the server CN 41 regenerates an identifier for the newly generated billing conditions (step 560), adds this information to the binding ack, and sends this to the home agent HA 21 (step 561).

On the other hand, in step 555, if a billing condition identifier is not included in the packet, there are no changes to billing conditions, and so the server CN compares the user billing profile UBP and server billing profile SBP, and generates billing conditions (step 562). Then, the server CN 41 generates an identifier for the generated billing conditions (step 563), adds this information to the binding ack, and sends this to the home agent HA 21 (step 561).

In step 554, if a service request (user billing profile) is not included in the packet, the server CN processes the connection information (step 564), and sends the binding ack to the home agent HA (step 561).

(n) Handoff Support Function (Billing Condition Transfer)

Suppose that a user terminal which receives a fee-based service has the capacity for smooth handoff. In this case, upon authentication accompanying terminal movement between foreign agents FAs, by transmitting and receiving billing information and similar relating to the service being executed between the new and old FAs, discarding of packets is prevented, and by having the new FA take over billing conditions after the move, collection of more accurate billing information becomes possible. In the following explanation, as the network configuration, the configuration of FIG. 18 is assumed.

Specifically, upon occurrence of a smooth handoff due to terminal movement, the mobile node MN (cf. FIG. 18) sends a registration request message to the foreign agent FA after movement (hereafter "new FA"). On receiving this registration request message, the new FA 31' sends a message called a binding update to the foreign agent FA 31 which had accommodated the mobile node MN prior to movement (the "old FA"), requesting that packets addressed to the terminal which arrive at the old FA be forwarded to the new FA.

On receiving the binding update message, the old FA performs settings to send packets addressed to the mobile node to the new FA, based on the connection information, and after settings are completed sends a binding ack message to the new FA, as notification of the receipt of connection information. However, if the mobile node MN is executing a fee-based service, the old FA 31 extracts the billing conditions which had been applied to the billing function within itself, and performs operations in order to include the billing conditions in the binding ack message.

The new FA detects the billing information message sent by the old FA, and immediately sets this in the new billing engine linked with the new FA. When registration in the new FA is completed, packets in this service are sent addressed to the new FA; and so the old FA monitors the final packet for a fixed period of time, and when no subsequent packets are detected, billing operations in the old FA are ended.

Figure 43:
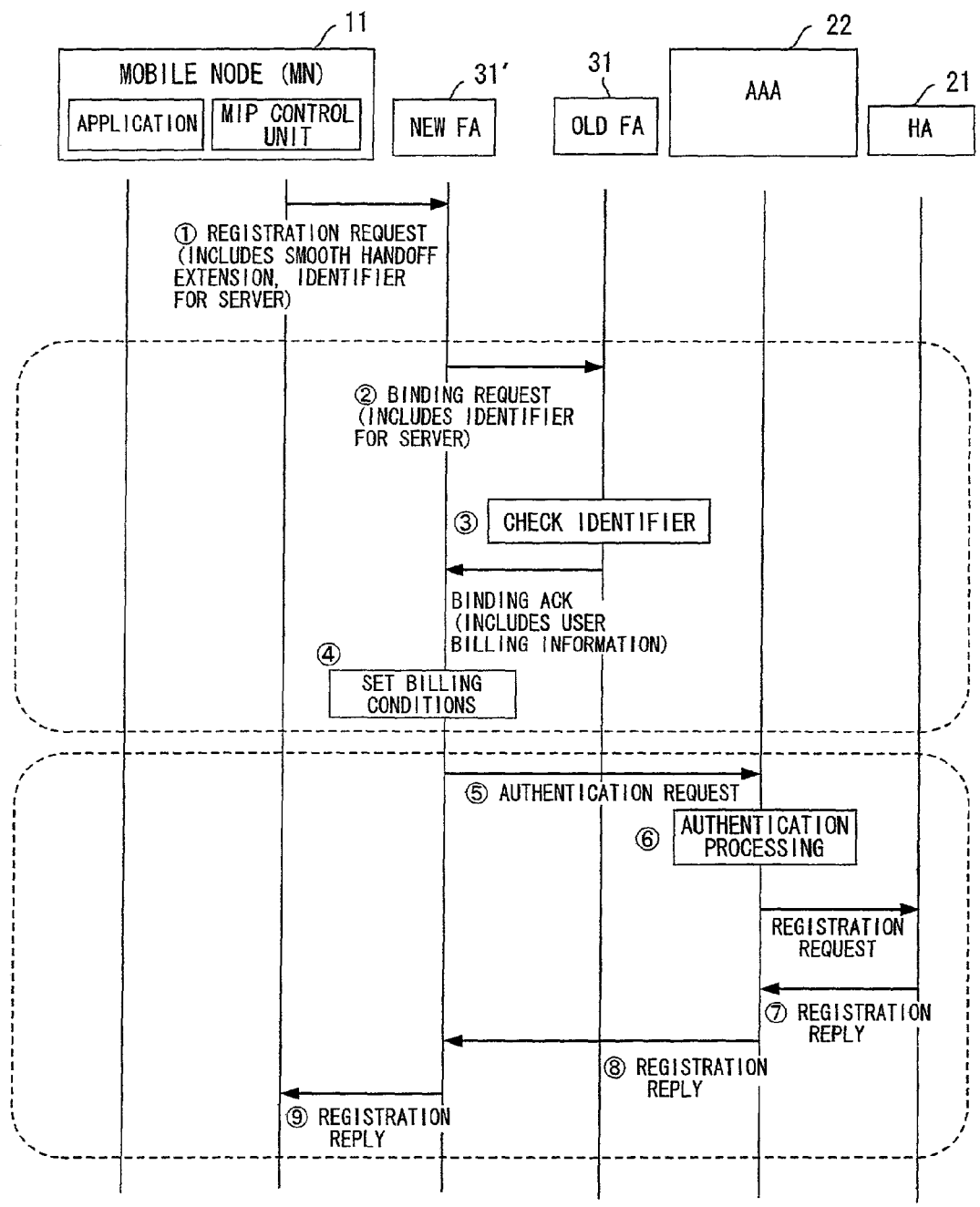
FIG. 43 is an example of a sequence for billing after movement (handoff)

FIG. 43 explains the sequence for billing after movement.

①  After detection of movement, the mobile node (MN) sends to the new FA 31' a registration request containing smooth handoff extension information and a billing condition identifier.

②  The new FA 31' sends a binding request message containing the billing condition identifier to the old FA 31.

③  The old FA checks the billing condition identifier contained in the binding request message, and if correct, sends a binding ack message containing the user's billing information to the new FA.

④  The new FA sets the billing information (billing conditions) contained in the received binding ack message in the new billing engine.

⑤  Then, the new FA sends an authentication request to the AAA server 22.

⑥  The AAA server 22 performs authentication processing, and sends a registration request to the home agent HA 21.

⑦  After registration processing, the home agent HA 21 sends a registration reply to the AAA server 22.

⑧  The AAA server 22 sends the registration reply to the new FA.

⑨  The new FA sends the registration reply to the mobile node MN.

There is also a pattern in which the sequence ② to ④ and the sequence ⑤ through ⑨ are processed in parallel.

Figure 44:
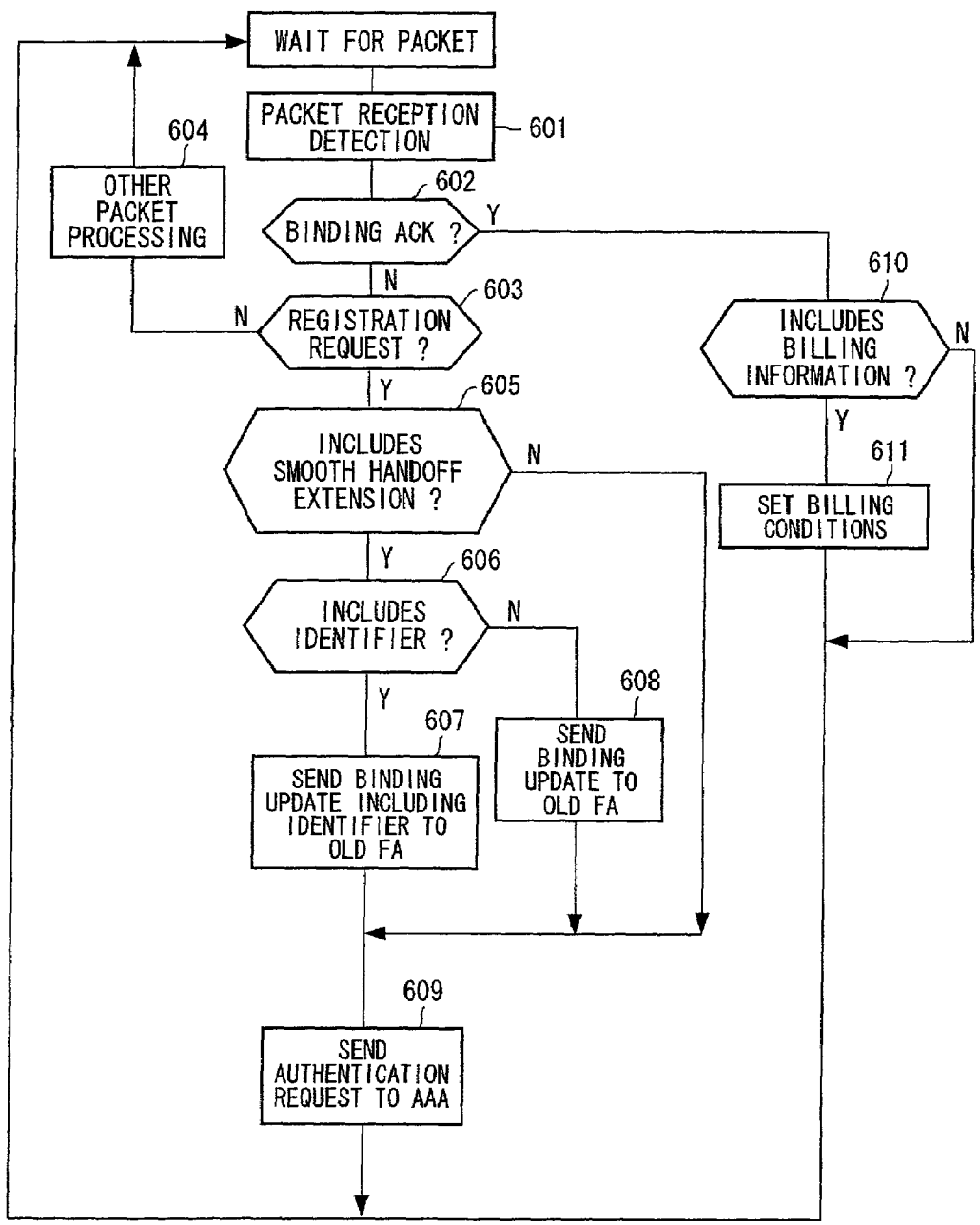
FIG. 44 shows the processing flow in the new FA for billing after movement.

FIG. 44 shows the flow of processing of the new FA for billing after movement.

When the new FA 31' receives a packet (step 601), it checks whether the packet is a binding ack packet (step 602); if it is not a binding ack packet, checks whether it is a registration request packet (step 603); and if it is not a registration request packet, executes processing other than handoff billing processing (step 604), and awaits reception of the next packet. If however the packet is a registration request packet, the new FA checks whether it contains smooth handoff extension information (step 605); if it does, checks whether the packet further contains a billing condition identifier (step 606); and if it does, sends a binding update message containing the billing condition identifier to the old FA 31 (step 607). By this means, the old FA performs settings for transfer of packets addressed to the mobile node to the new FA, and after settings are completed, sends a binding ack message to the new FA, as notification of the receipt of binding information. If fee-based service is being executed for the mobile node MN, the old FA extracts billing conditions applied to the billing function within itself, and includes the billing conditions in the binding ack message.

On the other hand, if in step 606 the packet does not contain a billing condition identifier, the new FA 31' sends a binding update message to the old FA 31 (step 608). By this means, the old FA performs settings to transfer packets addressed to the mobile node to the new FA, and after completion of settings, sends a binding ack message to the new FA, as notification of receipt of binding information. The old FA does not include the billing conditions applied to the billing function within itself in the binding ack message.

Then, the new FA sends an authentication request to the AAA server 22 (step 609). In step 605, if the packet does not contain smooth handoff extension information, the new FA immediately sends an authentication request to the AAA server 22.

Also, if in step 602 a binding ack message is not received, the new FA checks whether the packet contains billing information (step 610), and if so, sets the billing conditions in the new billing engine (steps 610, 611).

Figure 45:
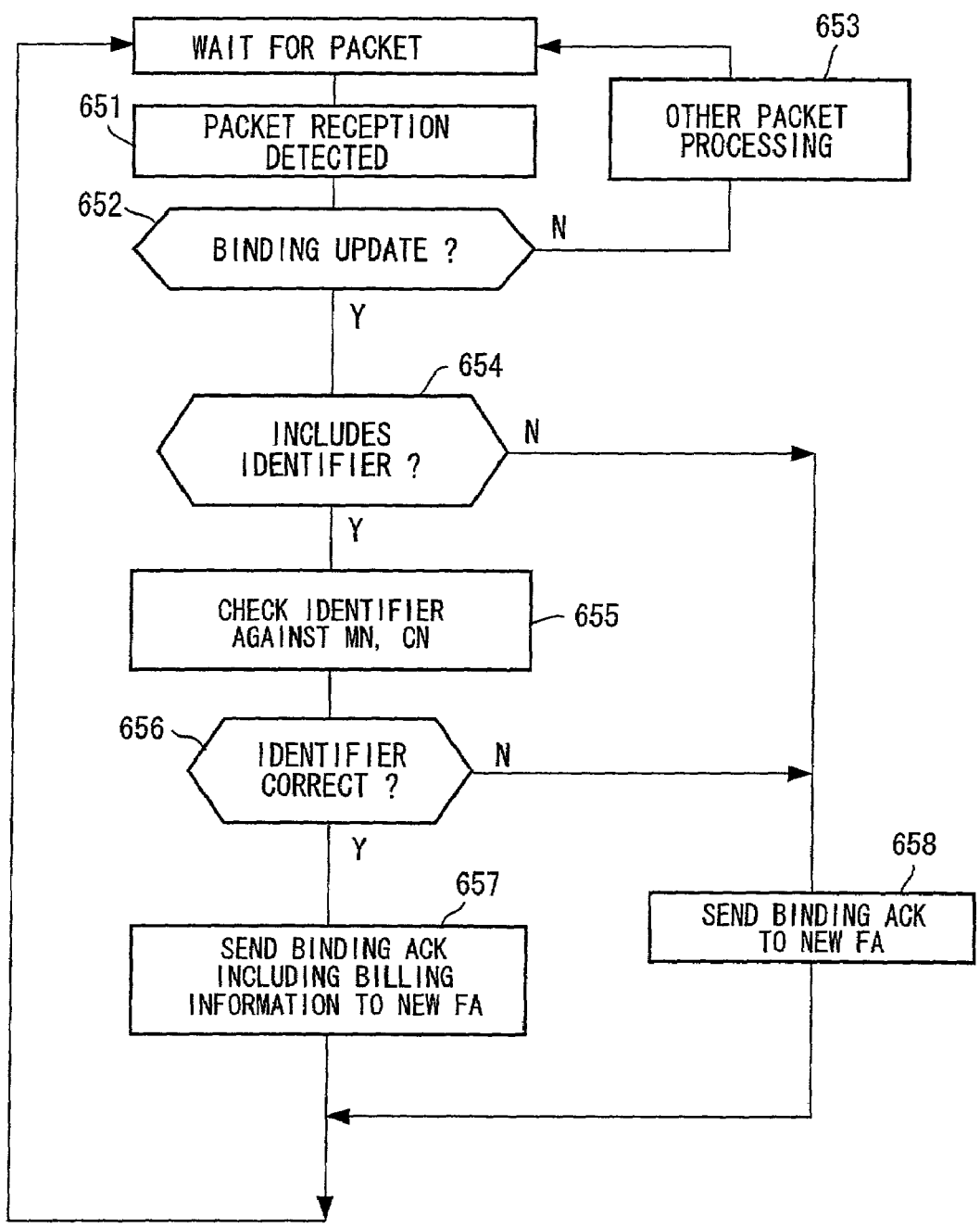
FIG. 45 shows the processing flow in the old FA for billing after movement.

FIG. 45 shows the flow of processing of the old FA for billing after movement.

When the old FA 31 receives a packet (step 651), it checks whether the packet is a binding update packet (step 652); if it is not a binding update packet, executes processing other than handoff billing processing (step 653); and awaits reception of the next packet. If on the other hand the packet is a binding update packet, the old FA checks whether it contains a billing condition identifier (step 654). If it contains a billing condition identifier, [the old FA] compares the billing condition identifiers of the mobile node MN and server CN, and checks for legitimacy (step 655). If the received billing condition identifier is correct (step 656), a binding ack packet containing billing information (billing conditions) is sent to the new FA 31' (step 657).

On the other hand, if in step 654 the packet does not contain a billing condition identifier, or, if in step 656 the received billing condition identifier is not correct, a binding ack packet not containing billing information is sent to the new FA 31' (step 658).

Thus in a network in which smooth handoff functions have been introduced, when a mobile node moves from an old FA to a new FA, the old FA notifies the new FA with a binding ack message including the fee conditions for the terminal in question, so that the new FA can continue providing service under the same fee conditions as the old FA.

(p) Handoff Support Functions (Authentication of Service Session Information)

Before and after mobile node handoff, it must be confirmed that a user issuing a registration request is the correct user for the service being used. When a mobile node moves between FAs during use of a fee-based service, the terminal, in attempting to perform location registration via the new FA, presents the billing condition identifier to enable maintenance of the session for the service in question. Even if an illicit user were to issue a registration request, by requiring presentation of the billing condition identifier retained by the terminal at the time of service initiation, it could be determined whether the user is an illicit user.

To explain in greater detail, referring to the sequence of FIG. 43, ① when a registration request is sent to the new FA, the billing condition identifier is included in this message. ② The new FA includes the billing condition identifier presented by the terminal in the binding request message sent during the smooth handoff procedure. ③ The billing engine control function unit of the old FA compares the billing condition identifier included in the received binding request message with the billing condition identifiers maintained in the billing condition management table 44, and if there is a match, confirms that the user is a legitimate user, includes the comparison result in the binding ack message, and responds to the new FA. ④ The new FA views the billing condition identifier comparison result included in the binding ack message, and on establishing that there is a match, sets the billing condition data contained in the message in the new billing engine, by means of the billing engine control function unit. If the comparison of billing condition identifiers does not result in a match, service for the terminal in question is interrupted.

In this way, when continuing billing operations, the legitimacy of the terminal issuing a location registration request to the new FA can be confirmed by having the router after the movement (the new FA) query the router before the movement (the old FA).

(q) Occasion for Setting Billing Conditions

It is desirable that the generation of billing conditions, and setting of billing conditions in the billing engine, be completed before a packet for billing is sent from the server. To this end, the procedure for preparation of billing operations is executed in parallel with the location registration procedure for the mobile node.

Specifically, terminal location registration has as its purpose the preparation of settings for the transfer of packets addressed to the mobile node in the network layer; by linking this registration procedure with the setting of billing-related information and distribution processing, it is possible to set billing information in advance, with adding individual messages.

Figure 46:
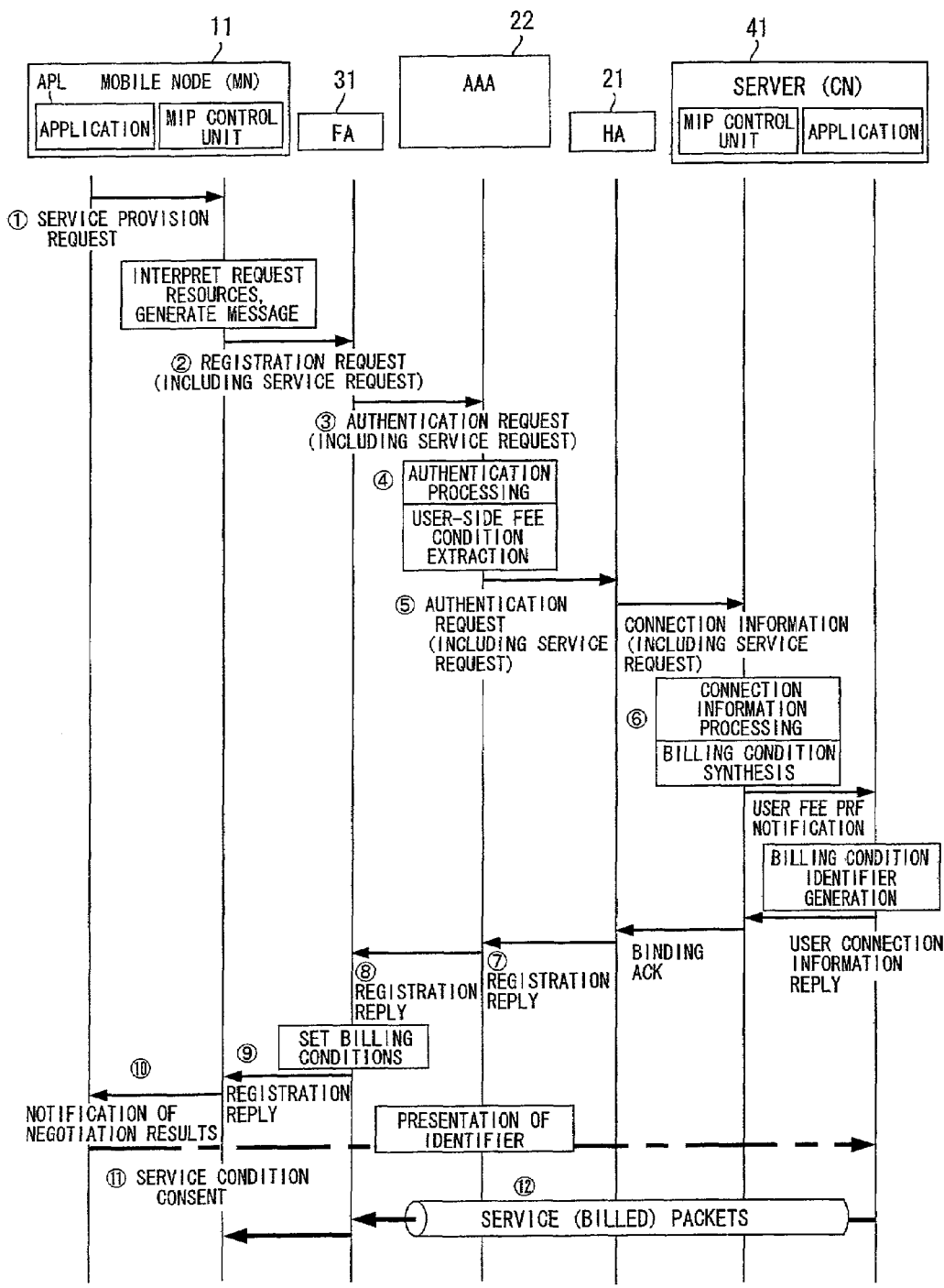
FIG. 46 is an example of the basic sequence to execute a service billing condition negotiation procedure, using the location registration procedure.

FIG. 46 explains the basic sequence for execution of the service billing condition negotiation procedure, using the location registration procedure.

① The mobile node MN11 attempts to connect to the service provider. At this time, the application APL instructs the location registration management function unit (MIP control unit) of its own terminal to send a service request information to the service provider server CN using a location registration request message. The service request information includes:

Information identifying the server for connection (for example:IP address, URL, or similar)

Request resource information (the resources required by the application APL for service execution; for example, transmission speed)

② The MIP control unit in the mobile node embeds service request information from the application APL in the location registration request message, and sends the location registration request message to the network. In the case of Mobile IP, the above data is embedded within a vendor/organization-specific extension.

③ On receiving the location registration request from the mobile node MN11, the foreign agent FA 31 forwards the request to the AAA server 22.

④ On receiving the registration request, the AAA server 22 executes terminal authentication for the mobile node MN, and at the same time queries the billing information database BIDB 24, and extracts the user billing profile UBP for the mobile node MN 11.

⑤ The AAA server 22 performs location registration with the home agent HA 21, and at the same time sends information relating to the mobile node MN 11 to the service provider server CN 41 as a binding message. This binding message contains the billing profile UBP and location information for the user in question.

⑥ On receiving the binding message, the server CN 41 compares the user billing profile UBP of the mobile node MN 11 and its own service provision conditions (server billing profile SBP), determines the possible billing conditions, and generates these expressed in a format which can be understood by the equipment which is the object of the billing. Also, a billing condition identifier for the mobile node MN is generated at the time of connection, and a binding ack message, in which are embedded the billing conditions and billing condition identifier, is sent to the home agent HA 21. Thereafter, the server CN sets a tunnel to the foreign agent FA accommodating the mobile node MN, and prepares for packet transmission. Also, the expiration date timer for the previously set identifier is started.

⑦ On receiving the binding ack message, the home agent HA 21 forwards it to the AAA server 22.

⑧ The AAA server 22 returns the message to the foreign agent FA 31 as an authentication reply.

⑨ On receiving the binding ack message, the billing engine control function unit BECF of the foreign agent FA 31 extracts the billing conditions from the message, and sets the conditions anew in the billing engine BEN within itself. At this point, billing for packets addressed to the application of the user terminal in question, via the foreign agent FA 31, becomes possible. However, if billing execution conditions have not been satisfied, information to this effect is included in the registration reply.

⑩ On receiving the registration reply from the foreign agent FA 31, if there is no problem in the IP layer, the MIP control unit transmits the results of billing negotiations and billing condition identifier contained in the message to the application APL, and the application retains these during the period of service execution.

⑪ The application APL on the mobile node displays the above results to the user in a message or similar. If the user approves, some manner of input operation is performed, and as a result a periodic location registration message containing the billing condition identifier is sent. The message showing this billing condition consent (the periodic location registration request) arrives at the foreign agent FA, the billing engine control function unit BECF of which recognizes this consent and notifies the billing engine, and begins billing for the service in question.

⑫ The above billing condition consent message is further transmitted to the service provider server CN 41, and the server initiates service for the requesting user.

(r) Method for Extracting the User Billing Profile of a Terminal for which Location Registration is Completed If the mobile node MN has completed location registration prior to the initiation of service, the user billing profile UBP will already have been extracted upon AAA server authentication of the initial location registration. After completion of this location registration, in order to receive a new fee-based service, the mobile node may send a location registration message containing service request information. In such a case, if the authentication session period is valid, authentication processing for the terminal is not necessary, and the user billing profile UBP is the same as at the time of initial location registration. Despite this, in order to receive a new fee-based service, accessing the billing information database BIDB to acquire a user billing profile UBP with the same content as at the time of initial location registration results in an excessive load on the AAA server 22, and it is desirable that such an increased load be avoided.

To this end, in the initial location registration, an authentication request is sent to the AAA server 22, and in reply, a copy of the user billing profile UBP for the user terminal in question, extracted from the billing information database BIDB 24, is held (cached) in the home agent HA 21 existing on the path of transmission to the server. Subsequently, when there is a new service request before the expiration date of the terminal authentication session for the AAA server 22, the registration message, having passed through the foreign agent FA, arrives at the home agent HA 21 without passing through the AAA server 22; the user billing profile UBP cached by the home agent HA 21 is transferred to the server for the new connection, and billing conditions are generated within the server. Subsequent processing is similar to that of fee negotiations at the time of the initial location registration.

Figure 47:
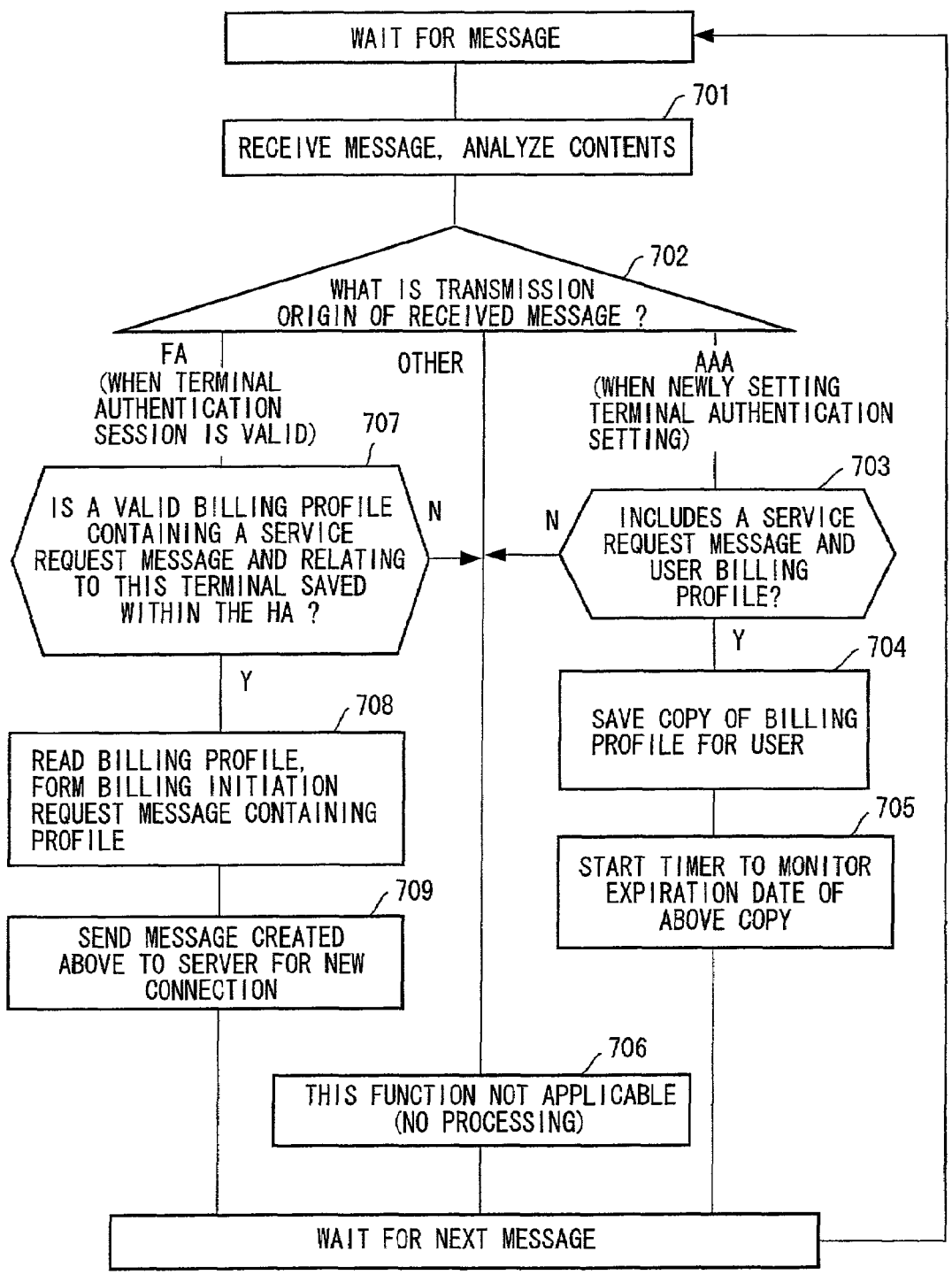
FIG. 47 shows the flow of processing for user billing profile caching and cache utilization by the home agent HA.

FIG. 47 shows the flow of user billing profile cache processing and of cache usage processing by the home agent HA; this can be broadly divided into:

[1] User billing profile UBP cache processing at the time of initial negotiation, and

[2] processing to avoid accessing the AAA server by referencing the cache within the home agent HA at the time of connected server switching.

When a user terminal sends a registration request packet containing a new service request to the network, the home agent HA receives the packet via the foreign agent FA and AAA server 22, and analyzes the contents (step 701). The transmission origin of the registration request packet is discriminates (step 702), and if the transmission origin is the AAA server 22, it is recognized as a registration request packet for the new setting of a terminal authentication session. Then, the packet is checked for inclusion of a service request message and user billing profile UBP (step 703), and if these are included, a copy of the user billing profile UBP is stored (cached) in internal memory (step 704). Also, the expiration date monitoring timer for the copy is started (step 705), and then reception of the next packet is awaited. In step 703, if the registration request packet does not include a service request message or a user billing profile UBP, then it is not a packet for cache processing, and so the prescribed processing is performed (step 706), and reception of the next packet is awaited. The above is user billing profile cache processing.

In step 702, if the transmission origin is the foreign agent FA, the home agent HA recognizes that the packet is a registration request packet during a valid terminal authentication session. The home agent HA then checks whether the registration request packet contains a service request message, and whether a copy of the user billing profile UBP for the terminal is stored (cached) within the home agent (step 707). The home agent HA detects a billing initiation request by the fact that a service request message is included in the registration request packet.

In this way, the home agent HA reads the copy of the user billing profile UBP, forms a billing initiation request message which includes the user billing profile UBP (step 708), and sends this message to the server to which the user is attempting a new connection (step 709); then, reception of the next packet is awaited. The above is cache usage processing.

In this way, the cache usage is effective in cases where authentication processing for the terminal MN is completed, and the user interrupts use of a certain service and connects to a different content server. In other words, when initiating a connection to a new server, if the period of terminal authentication by the AAA server has not expired, the procedure for terminal authentication is not necessary, and the AAA server 22 need not be accessed. By storing (caching) a copy of the user billing profile in the home agent HA and referencing/using this cached copy, the number of messages sent along the path FA→AAA→HA can be reduced, and processing to extract the billing profile, executed by the AAA server 22, can be eliminated.

(E) Second Network Configuration in which Billing Functions are Deployed (a) Issues In the billing technology (called the first billing technology) in the network configuration of FIG. 22, the billing conditions for the service are coordinated prior to execution between the user and the service provider, and if necessary, billing conditions are presented to the terminal user, and the user is made to select the desired conditions. However, this first billing technology has the following three issues related to generality.

The first issue arises as a result of the fact that, in order to realize these functions, Mobile IP is extended for use as a procedure for billing condition negotiations between the user and the service provider. It has the advantage of a high degree of compatibility with IPv4 and IPv4 EaseNet (Environment Adaptive Services Network); but there is the restriction that both the network and the terminal must be equipped with Mobile IP functions. Consequently a billing control technology is desired which does not use Mobile IP or another particular protocol, and does not require implementation of such a protocol.

The second issue arises from the fact that Mobile IP is extended and used as a procedure for billing condition negotiation, resulting in the following problems.

(1) Functions for control of billing control messages must be added to the home agent HA.

(2) In the billing negotiation procedure, because messages unconditionally pass through the home agent HA, the path from the user host to the service provider becomes excessively long.

Consequently, a billing technology is desired which can optimize the path for control messages.

As the third issue, it is assumed that physically, the service provider server which provides one service is a single system which incorporates billing control functions. Such a configuration is not suited to a system arrangement in which service provider servers are distributed regionally, while billing control is centralized. Such a system arrangement is conceivable in, for example, a network-based car navigation system; hereafter there is a strong possibility that such systems will be commercialized. Consequently, a billing technology is desired in which distributed service provider nodes provide a common service.

A billing technology of this invention (called the second billing technology) resolves the above issues in the first billing technology, and realizes, more efficiently and with greater generality, the following three basic concepts of the first billing technology:

(1) Stipulation of a billing profile on the user side and on the server side (2) Dynamic determination of fee conditions for each service startup request, according to the service to be provided to each user (3) Measures enabling the user to confirm billing conditions prior to service execution In addition, the second billing technology is compatible with IPv6, which is expected to become the core of the future commercial Internet protocol.

(b) Network Configuration

Figure 48:
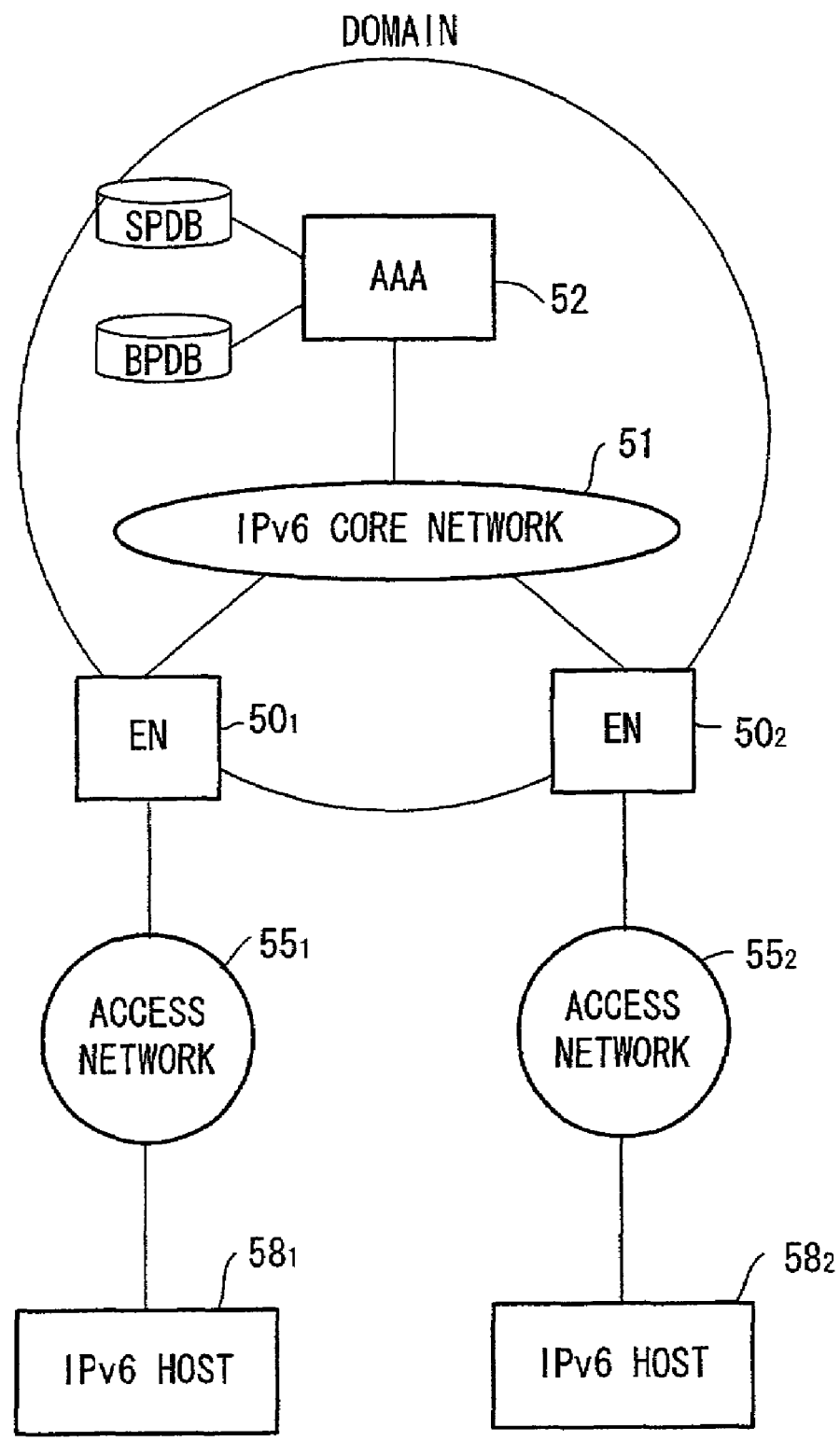
FIG. 48 is a diagram of the configuration of a network to which the second billing technology of this invention can be applied.

FIG. 48 is a diagram of the configuration of a network to which the second billing technology of this invention, based on IPv6, can be applied. The core network comprises an IPv6 network 51; an AAA server 52 and edge nodes $50_1$, $50_2$ are connected to this network as communication nodes constituting an IPv6 network, and the IPv6 hosts $58_1$, $58_2$ are connected to the IPv6 network 51 as terminal devices via the access networks $55_1$, $55_2$. The network of FIG. 48 constitutes a single domain, and this domain is managed by a given service provider. The IPv6 hosts $58_1$, $58_2$ belonging to this domain are authenticated by the AAA server 52.

The IPv6 hosts $58_1$, $58_2$ are terminal devices comprising functions for communication according to the IPv6 protocol, and each belongs to this domain. Users of the IPv6 hosts $58_1$, $58_2$ have concluded subscriber contracts with the service provider managing this domain. The IPv6 hosts $58_1$, $58_2$ are accommodated by the edge nodes $50_1$, $50_2$ respectively.

Figure 49:
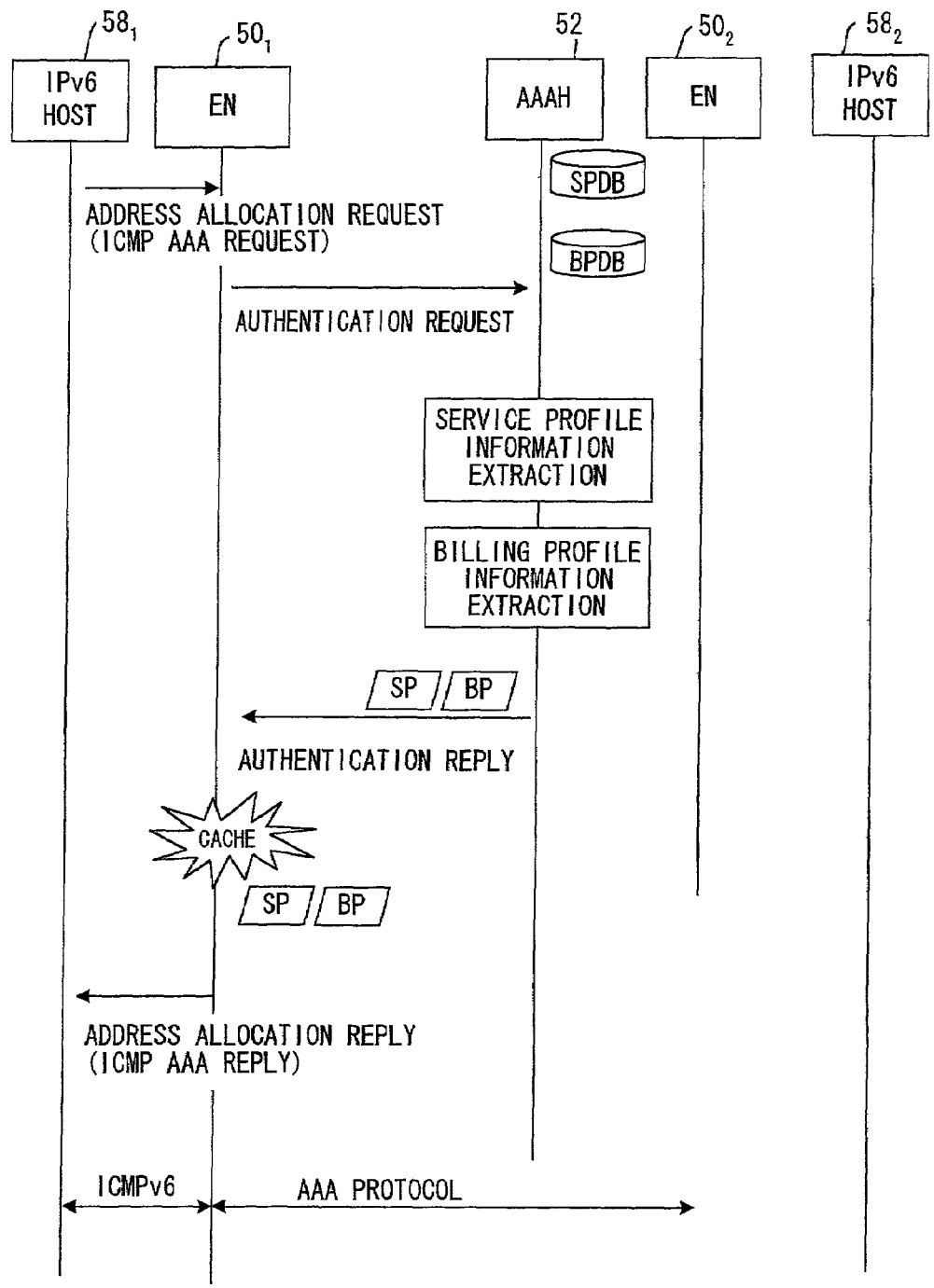
FIG. 49 shows the basic sequence for distribution from the AAA server to edge nodes of service profile information and billing profile information.

FIG. 49 shows the basic sequence for distribution of service profile information and billing profile information from the AAA server 52 to the edge node $50_1$. Service profile information is stored in a service profile database SPDB which can be accessed by the AAA server 52; billing profile information is stored in a billing profile database BPDB.

The IPv6 host $58_1$ periodically receives ICMP advertisements from the network. An ICMP advertisement is a message sent to each terminal by, for example, an edge node EN; here, ICMP advertisements are sent from the edge node $50_1$ to the IPv6 host $58_1$.

On receiving an ICMP advertisement, the IPv6 host $58_1$ sends, as necessary, an address allocation request (ICMP-AAA request) for requesting allocation and authentication of an address to the edge node $50_1$. The IPv6 host $58_1$ outputs an address allocation request when, for example, [1] it does not have an IP address, [2] the previously allocated IP address lapses, or [3] there is movement from the communication area of an edge node to the communication area of another edge node.

When the edge node $50_1$ receives an address allocation request, it determines the IP address to be allocated to the IPv6 host $58_1$, and at the same time sends an authentication request for requesting authentication of the legitimacy of the IPv6 host to the AAA server 52; when the AAA server 52 receives the authentication request, it authenticates the IPv6 host $58_1$, and extracts service profile information SP and billing profile information BP from the SPDB and BPDB databases, respectively. The AAA server 52 sends, together with the authentication reply, the IPv6 host $58_1$ service profile SP and billing profile BP to the edge node $50_1$. When the edge node $50_1$ receives the authentication reply and the service profile SP and billing profile BP for the IPv6 host $58_1$, it stores the service profile and billing profile in internal cache memory. Then, if the IPv6 host $58_1$ is legitimate, as a reply to the address allocation request, the edge node $50_1$ returns the address allocation reply (ICMP-AAA reply) including an allocated address to the IPv6 host $58_1$.

Through the above procedure, a new IPv6 address is allocated to the IPv6 host $58_1$. Linked with this address allocation procedure, the IPv6 host $58_1$ is authenticated by the AAA server 52, and the service profile SP and billing profile BP of the IPv6 host $58_1$ are distributed to the edge node $50_1$ accommodating the IPv6 host $58_1$. In this way, in the network configuration of FIG. 48, the ICMPv6 and AAA protocol are interlinked.

(c) Network Configuration when Billing Functions are Implemented

Figure 50:
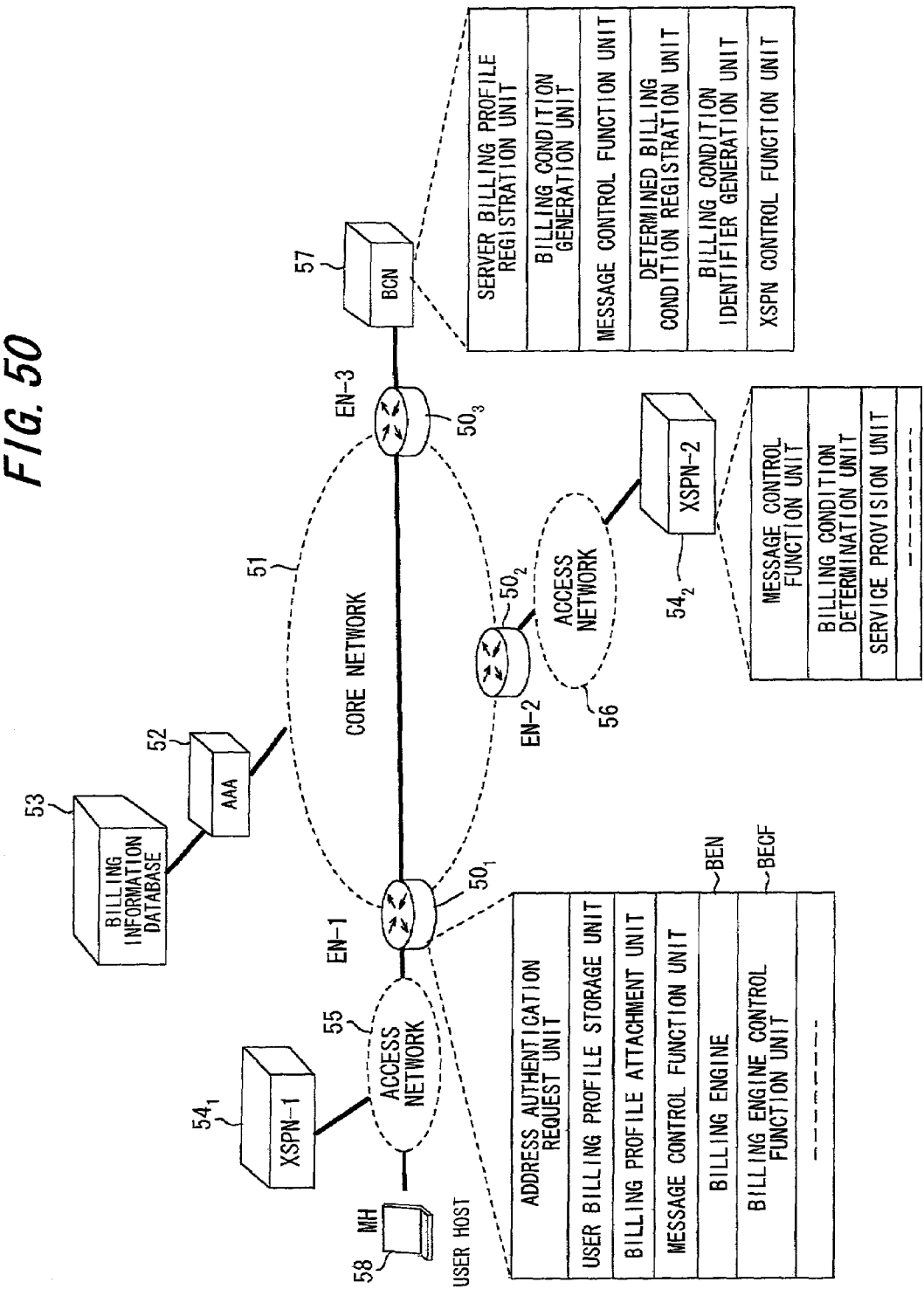
FIG. 50 is a diagram of the network configuration when billing functions are deployed.

FIG. 50 is the network configuration for the network of FIG. 48 with billing functions deployed; on the periphery of the core network 51, which is an IPv6 network, there are provided edge ndoes (EN-1 to EN-3), $50_1$ to $50_3$. The edge nodes EN-1 to EN-3 are configured based on router functions, and have:

[1] Functions to allocate addresses to user hosts, and to request authentication of these addresses by an AAA server 52

[2] Functions to hold and manage user billing profiles downloaded from the AAA server 52

[3] Functions to detect connection to a fee-based site from a user host packet

[4] Functions to add a user billing profile to a connection request after detection of a request for connection to the above fee-based site

[5] Functions for sending and receiving billing control messages (billing control message control function)

[6] Functions for managing distributed billing condition identifiers (billing condition identifier management function)

[7] Functions for managing a billing unit such as a billing engine BEN (billing unit management function BECF)

Further, the AAA server 52 is connected to the core network 51. The AAA server controls the usual authentication, authorization and accounting operations, and in addition has functions for extracting the service profile SP of the host (user) for authentication from a database (not shown) which manages service profiles, and for notification by appending to authentication results or similar. The AAA server 52 also has billing profile management functions, and extracts user billing profiles BP from a billing information database 53, which stores billing profiles for individual users, and downloads the billing profiles to edge nodes.

The service provider nodes XSPN-1, XSPN-2 (X-Service Provider Node) $54_1$, $54_2$ are servers which provide services to users, and are connected to the access networks 55, 56, respectively. Edge nodes EN-1, EN-2 are provided between the access networks 55, 56 and the core network 51. XSP is a general name for service providers at different levels and with different configurations on the Internet, among the ASPs (Application Service Providers), CSPs (Content Service Providers), and ISPs (Internet service providers). The service provider nodes XSPN have the following four functions:

[1] A function for providing services

[2] A function for controlling billing control messages, enabling the exchange of billing control messages

[3] A user interaction function (billing condition determination function), acting as a means of having the user confirm billing conditions

[4] A function for managing distributed billing condition identifiers (billing condition identifier management function)

The billing control node BCN 57 is a server which generates billing conditions; by referencing the billing profiles of both the user and the service provider, billing conditions, which include the service mode (quality and similar) which can be used when service is provided to the user, are generated. The billing control node BCN is managed by the service provider; there exists at least one for a provided service type. Also, depending on the mode of service provision, a plurality of XSPNs may be controlled by one billing control node BCN 57. This billing control node BCN 57 has the following six functions:

(1) A function to register and manage server billing profiles (2) A billing condition generation function, to compute billing conditions for individual users (3) A billing condition identifier generation function, to assign a billing condition identifier to generated billing conditions (4) A service provider node control function, to manage a plurality of distributed service provider nodes XSPN and to support user roaming (5) A billing control message control function, to send and receive billing control messages (6) A function to register and manage billing conditions determined through negotiations between user hosts and service provider nodes XSPN The user host 58 is, for example, a mobile host (user host) MH which can be connected to an IP network; the billing device (billing engine) is not shown, but is deployed within a user-side edge node (EN-1), and billing is executed for packets arriving at the edge node (EN-1). Because the billing engine control function unit must operate in concert with the billing engine, it is also deployed in the user-side edge node (EN-1). In the following description, user host, mobile host, user host and mobile host are synonyms.

Details of billing control are explained below, but using the EaseNet-v6 (EaseNet for IPv6) service control procedure, billing conditions are generated, and billing according to these billing conditions performed, essentially according to (1) through (3) below.

(1) Preparation stage: In the EaseNet-v6 service control procedure, the user-side billing profile is downloaded to the edge node EN-1 accommodating the user host 58.

(2) Startup stage: The edge node EN-1 detects that a request of the user host 58 for connection to the XSP server is a request for provision of a specific billing service, and attaches the billing profile for the user host retained by the edge node to the request, which is sent to the service provider node XSPN-2.

(3) Billing condition generation: The fee-based service node, that is, the service provider node XSPN-2 orders matching of billing conditions by the billing control node BCN through a billing condition matching request message; if billing condition candidates for the service to be provided to the user are obtained from the billing control node BCN, these are presented to the user, and if the user approves a billing condition candidate, service provision is initiated, and the billing engine initiates billing according to the billing conditions.

In the second billing technology, the billing control function to adjust billing conditions with the user and the function to actually present fee-based services to the user are separated, and these functions are performed by the billing control node BCN and by the service provider node XSPN, respectively. In the configuration of the first billing technology in FIG. 22, these are combined; but in this configuration, it is not possible to perform billing for a service provided over a wide range on the network using a plurality of servers, such as for example a network-based car navigation service which provides sequential geographical information via the network from a plurality of geographically distant servers. Using this second billing technology, billing for such services can be performed. However, because the billing control node and service provider nodes are separated, a mechanism for the unified management of billing conditions between them is needed. As the means to realize this, in the second billing technology, billing conditions and other information can be exchanged between the billing control node and service provider nodes using billing control messages. Specifically, the following four billing control messages are used.

(1) Billing condition matching request message (XSPN→BCN): This message requests the matching (generation) of billing conditions, and is sent together with the billing profile for the user host (user host MH). This message is used not only upon service initiation, but also when changing billing conditions during service execution.

(2) Billing condition matching reply message (BCN→XSPN): This message is a reply to the above billing condition matching request message, and includes billing condition candidates which are the result of billing condition matching. The billing control node BCN references billing conditions for individual users, extracts billing condition candidates which can be presented with respect to the service in question, and uses this message to send the candidates to the service provider node XSPN from which the request originated. If condition matching at this billing control node BCN have already been completed for this user host MH, a billing condition identifier indicating this is included in place of the billing conditions.

(3) Billing condition determination notification message (XSPN→BCN): After indicating the result of condition matching (billing condition candidates) to the user host, the user selects a desired candidate from among the billing condition candidates, and when this is recognized by the service provider node XSPN, this message is used to notify the billing control node BCN of the selection. On receiving this message, the billing control node BCN records the billing condition identifier for the selected billing condition, the identifier (NAI) of the mobile host, the identifier of the service provider node XSPN, and similar in a billing condition registration table, and erases the other candidates.

(4) Billing condition change notification message (BCN→XSPN): While the service provider node XSPN is providing service according to the service provision billing conditions, if the billing control node BCN updates the billing conditions, this message is used to deliver the new billing conditions to the service provider node XSPN.

Figure 51:
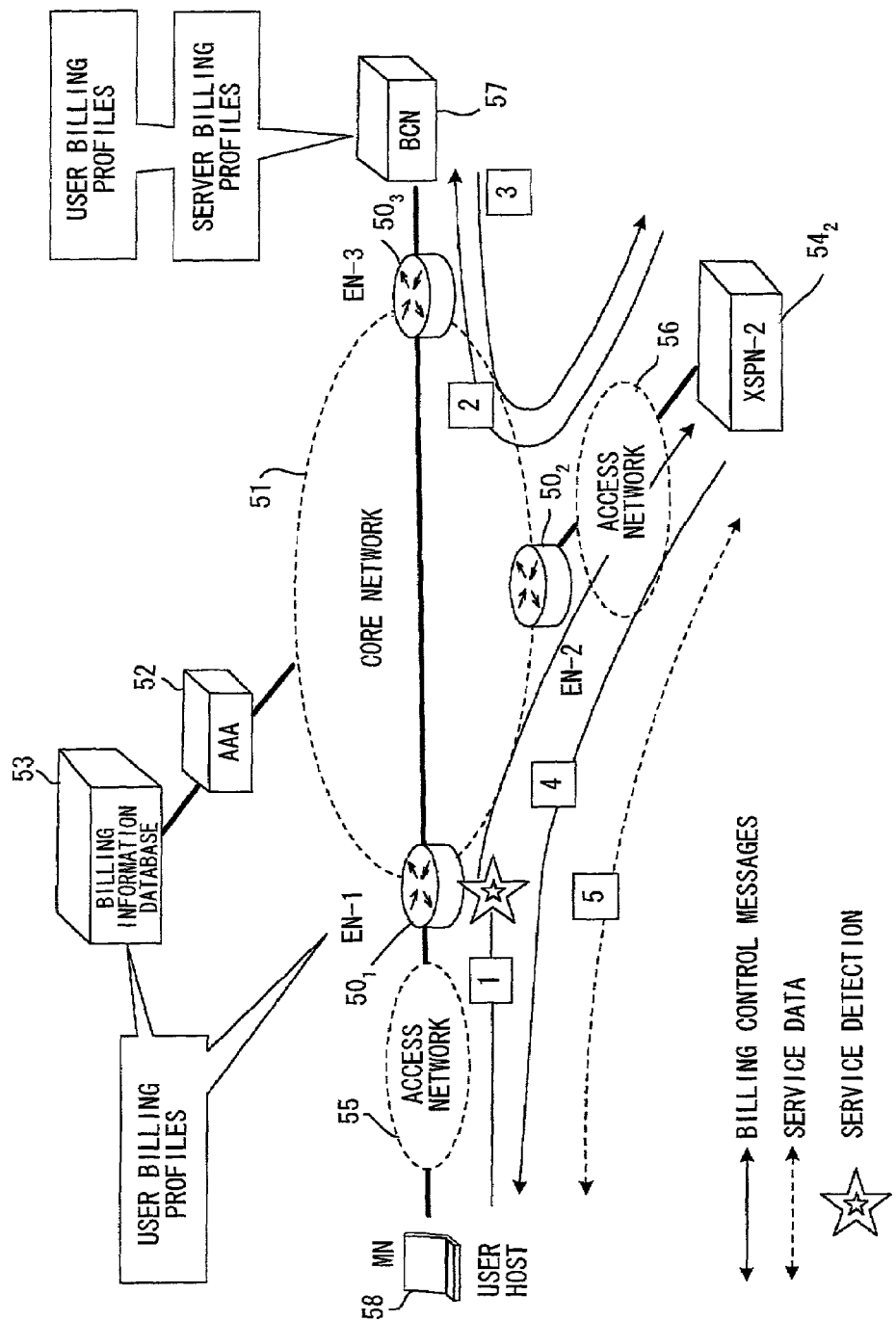
FIG. 51 is a figure explaining billing control when the user host and the service provider node XSPN exist in different sub-nets.
Figure 52:
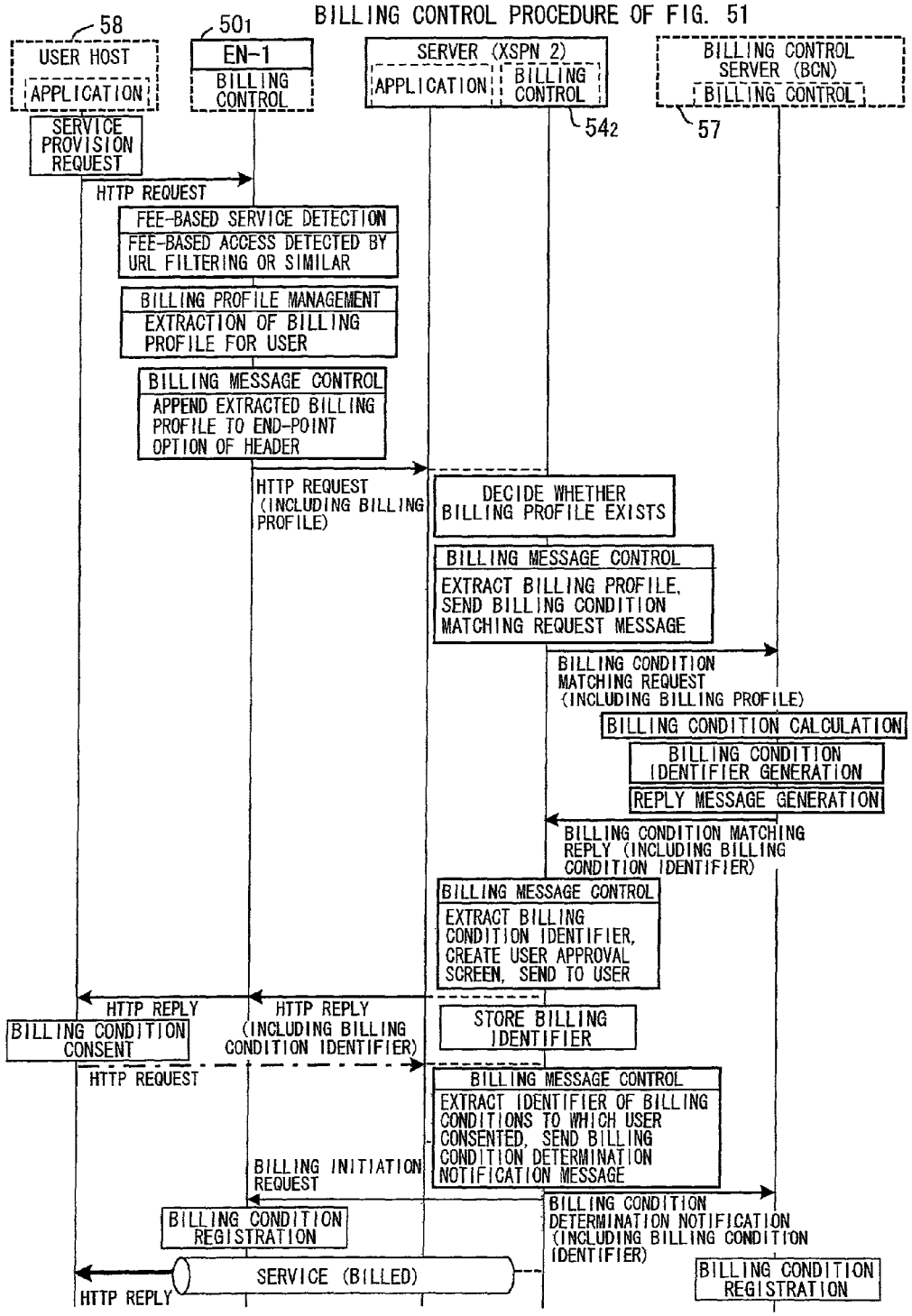
FIG. 52 is a diagram of the billing control procedure of FIG. 51.

(d) Billing Control Procedure (d-1) Case in which MH and XSPN Exist in different Sub-networks FIG. 51 explains billing control when a user host MH uses a fee-based service, for the case in which the user host MH and the service provider server XSPN exist in different subnets; FIG. 52 shows the billing control procedure. As an assumed condition, the billing profile of the user host MH has been downloaded to the edge node EN-1 accommodating the user host MH from the billing information database 53, and is retained in the edge node EN-1.

When the user host MH wishes to connect to a fee-based service, it issues a request for connection to the desired site. Various protocols might be used as the connection request protocol; as one example, an HTTP request may be used to access a Web site for fee-based services within the service provider server XSPN-2. Hence the user host MH accesses (by specifying the URL in a Web browser, or by similar means) the fee-based site use of which is desired. In the process of arriving at the site for connection, this HTTP packet reaches the edge node (EN-1) accommodating the user host MH, and the edge node EN-1 uses ordinary router functions to transfer the HTTP packet. On the occasion of this transfer, the edge node EN-1 uses its fee-based service detection function to recognize a request for connection to a fee-based service among the destination address and other information of the packet. As a specific example, on comparing the destination address of the HTTP request packet header with a list of fee-based service sites held in advance by the edge node EN-1, if there is a match with any of the addresses on the list, the packet is judged to be a request for connection to a fee-based service (URL filtering).

As described in the assumed condition, the edge node EN-1 has had delivered and retains a billing profile for the user host MH in question. Hence on the occasion of detection of the HTTP request packet, this billing profile is extracted, appended to the packet, and sent to the service provider node XSPN-2. Then, billing condition candidates are calculated by the service provider node and the billing control node, and these are presented to the user host.

A summary of the overall procedure is as follows.

(1) The user host MH accesses XSPN-2, which is a fee-based site. At this time, the edge node EN-1 through which this packet passes detects this access, extracts the billing profile for MH, and includes the billing profile in, for example, the end-point option header of the message, which is sent to the service provider node XSPN-2.

(2) When the service provider node XSPN-2 receives the billing profile of the user host MH, it uses a billing condition matching request message to send the billing profile to the billing control node BCN.

(3) The billing control node BCN computes the billing conditions, generates a billing condition identifier, and includes these billing conditions and the billing condition identifier in a billing condition matching reply message, which is returned to the service provider node XSPN-2.

(4) The service provider node XSPN-2 extracts and retains the billing condition identifier, and employs CGI (common gateway interface) or other means to generate a user approval input screen in order to present the billing conditions to the user; this and the billing condition identifier are included in an HTTP reply packet, which is sent to the user host MH. The billing engine control function unit BECF of the edge node EN-1 extracts and provisionally registers the billing condition identifier.

(5) If the billing conditions presented are satisfactory, the user host MH includes consent in an HTTP request packet, which is sent to the service provider node XSPN-2. The billing engine control function unit BECF of the edge node EN-1 detects the consent, and performs full registration of the billing condition identifier. The service provider node XSPN-2 extracts the billing condition identifier, and sends a billing condition determination message containing the billing condition identifier to the billing control node BCN. By this means, the billing control node BCN records the billing conditions thus determined, together with the billing condition identifier, the identifier (NAI) for the mobile host, an identifier for the service provider node XSPN, and similar in the billing condition registration table, and erases the other candidates.

Then, the service provider node XSPN-2 notifies a prescribed billing engine BEN of the billing conditions, and service is provided based on the billing conditions determined by the user host MH. The billing engine BEN within the edge node EN-1 performs billing according to the billing conditions of the notification.

(d-2) Case in which MH and XSPN Exist in the same Sub-network

Figure 53:
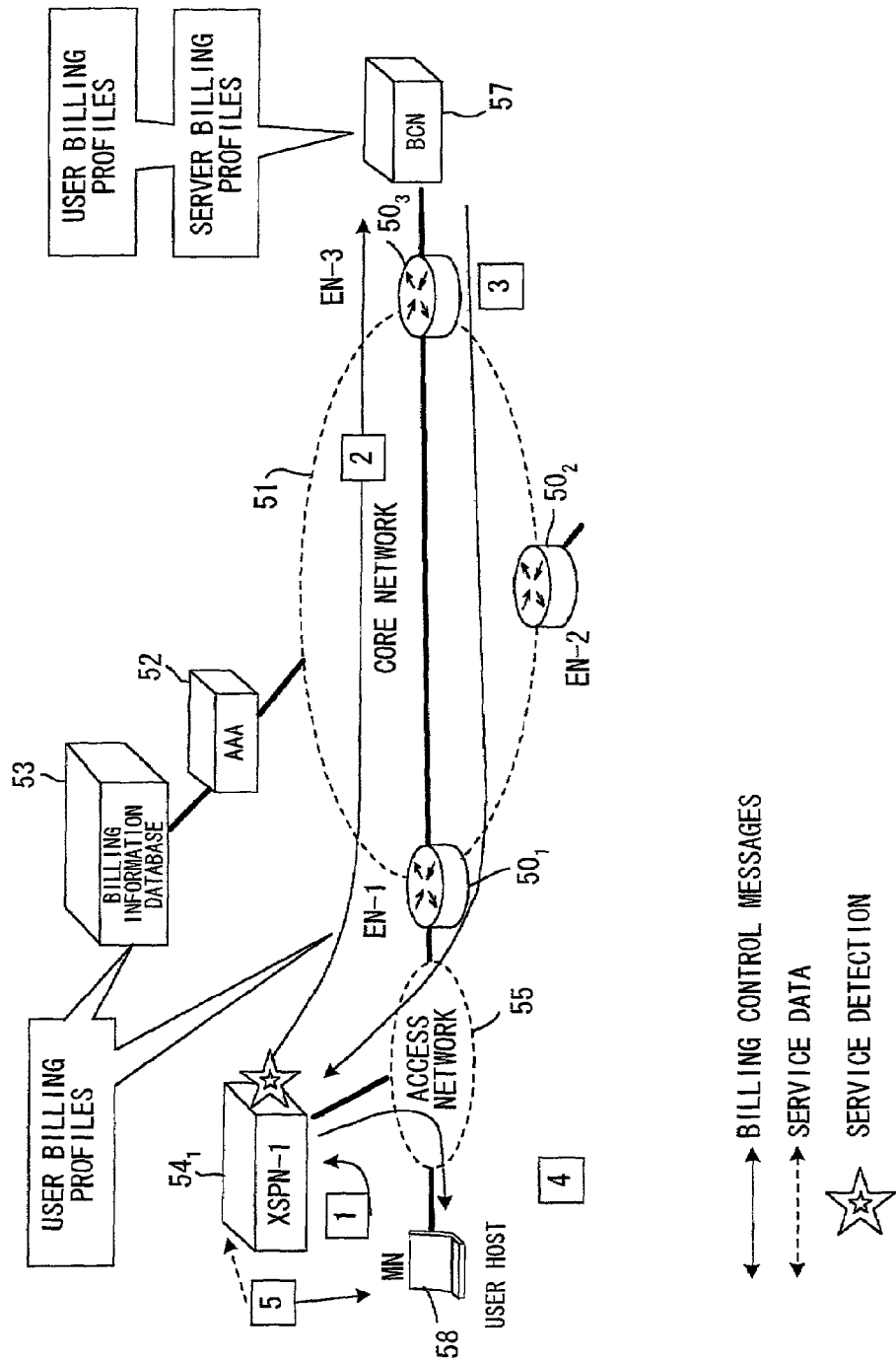
FIG. 53 is a figure explaining billing control when the user host MH and the service provider node XSPN-1 exist in the same sub-net.
Figure 54:
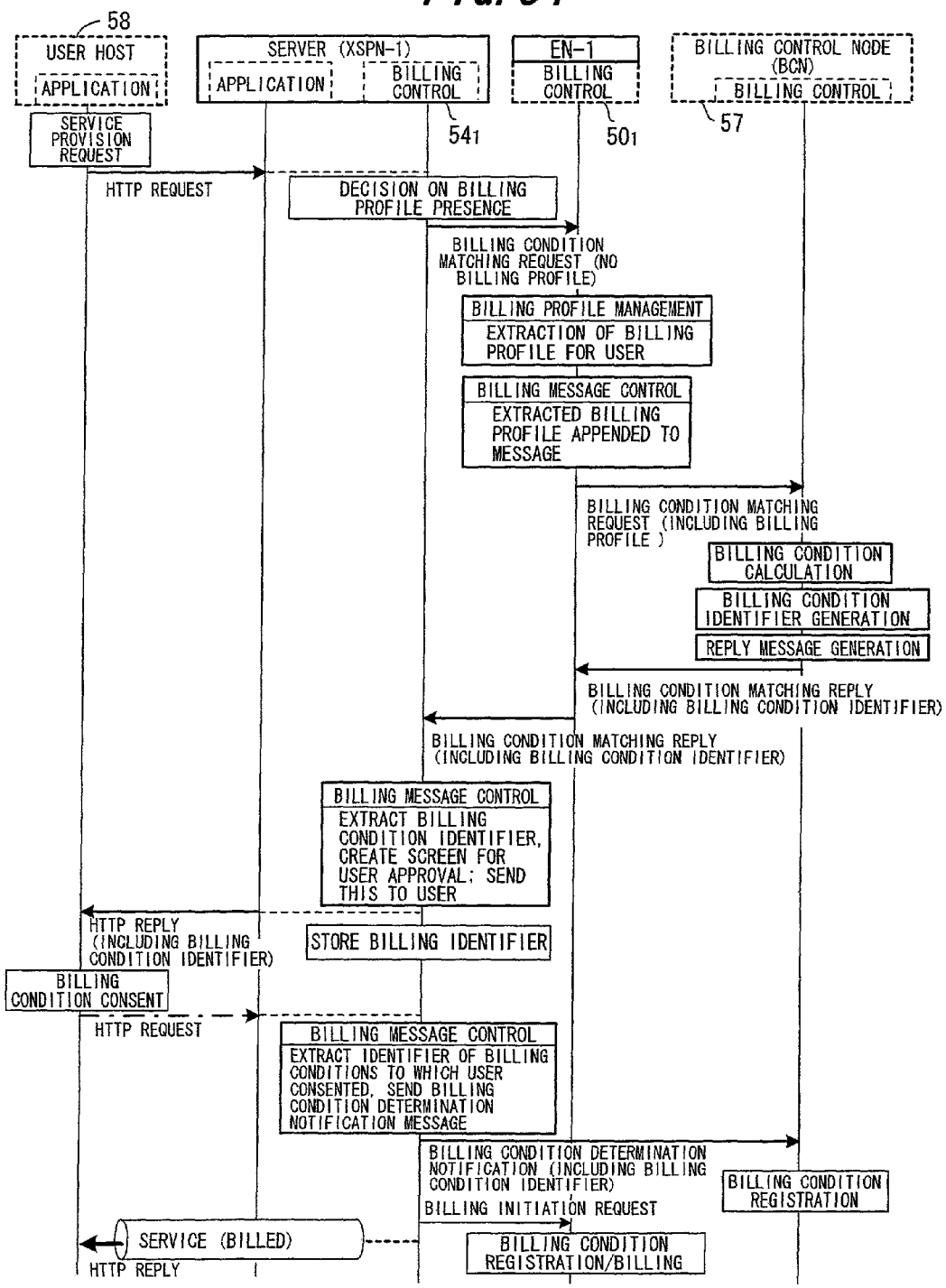
FIG. 54 is a diagram of the billing control procedure of FIG. 53.

FIG. 53 explains billing control when the user host MH uses a fee-based service, for the case in which the user host MH and service provider server XSPN-1 exist in the same sub-network 55; FIG. 54 shows the billing control procedure. A difference with the billing control of FIG. 51 is the fact that the request from the user host MH for connection to the fee-based service (MH→XSPN) passes through the edge node EN-1 accommodating the user host MH. This is because the user host MH and the service provider server XSPN-1 are positioned in the same sub-network 55.

The control procedure is explained below; as an assumed condition, the billing profile for the user host is downloaded and retained by the edge node EN-1 accommodating the user host MH from the billing information database 53.

The procedure for service use as seen from the user host MH is unchanged from that of FIG. 51. That is, the user host MH specifies an URL in a Web browser or uses similar means to access a Web site for the fee-based service that is to be used. Because both the user host and the service provider server are located in the same sub-net 55, the edge node EN-1 accommodating the user host MH does not exist on the transmission path of the service startup request packet HTTP sent from the user host MH to the service provider server XSPN-1. That is, the service startup request packet HTTP arrives directly at the service provider server XSPN-1 without passing through the edge node EN-1.

The service provider server XSPN-1 recognizes the service startup request packet as a request for a fee-based service; but in contrast with the case of FIG. 51, the request packet does not include a billing profile for the user host MH which is the origin of the request.

Next, the service provider server XSPN-1 judges, from the address of the user host MH, that the MH which is the origin of the request is located within the same sub-network, and so issues a billing condition matching request message to the billing control node BCN, without the billing profile of the user host MH.

This billing condition matching request message is relayed by the edge node EN-1 accommodating the user host MH in the path to the billing control node BCN. At this time, the edge node EN-1 judges that the destination is the billing control node BCN, and so extracts the billing profile for the user host MH which is the origin of the service request, appends this to the request message, and sends the message to the billing control node BCN. Subsequently, control similar to the billing control of FIG. 51 is performed.

The overall procedure may be summarized as follows.

(1) The mobile host MH accesses the service provider node XSPN-1, which is a fee-based site. At this time, the packet generated by the access arrives at the service provider node XSPN-1 without passing through the edge node EN-1.

(2) When there is an access request, the service provider node XSPN-1 checks whether a billing profile is attached, and if no billing profile is attached, sends a billing control matching request message not containing a billing profile to the billing control node BCN. The edge node EN-1 which is on the path of this message, judges that the message destination is the billing control node BCN, extracts the billing profile for the user host MH which is the origin of the service request, and appends this to the request message, which is sent to the billing control node BCN.

(3) The billing control node BCN computes one or more billing conditions, generates a billing condition identifier, includes these billing conditions and the billing condition identifier in a billing condition matching reply message, and returns this message to the service provider node XSPN-1. The billing engine control unit BECF of the edge node EN-1 extracts the billing condition identifier contained in the billing condition matching reply message, and performs provisional registration.

(4) The service provider node XSPN-1 extracts and retains the billing condition identifier, and uses CGI or other means to generate a user approval input screen to present the billing conditions to the user, and includes this in an HTTP reply packet which is sent to the user host MH.

(5) If the presented billing conditions are satisfactory, the user host MH includes consent in an HTTP request packet, which is sent to the service provider node XSPN-1. The service provider node XSPN-1 sends a billing condition determination message containing the billing condition identifier of the billing conditions to which the user host MH has consented to the billing control node BCN.

By this means, the billing engine control function UNIT BECF of the edge node EN-1 performs full registration of the billing control identifier. The billing control node BCN records the billing conditions determined in this way together with the billing condition identifier, mobile host identifier (NAI), identifier of the service provider node XSPN, and similar in the billing condition registration table, and erases the other candidates.

Then, the service provider node XSPN-1 notifies a prescribed billing engine BEN of the billing conditions, and based on the billing conditions thus determined, provides service to the user host MH. The billing engine BEN in the edge node EN-1 performs billing according to the billing conditions of the notification.

Thus by means of the second billing technology, the need to implement functions specific to the user host is eliminated, and it is possible to abolish specialized messages. Also, user service requests are sent directly to the XSP server, so that message paths are the shortest possible. And, it is possible to employ a single billing control node to control a plurality of service provider nodes.

(d-3) Case in which the Billing Control Node BCN Acquires the User Billing Profile The billing condition control procedure (called the basic method) explained in (d-1) and (d-2) has the restriction that the edge node EN-1 must detect access of a service provider node and attach a user billing profile thereto, resulting in that load on the edge node EN-1 is increased. Hence changes are made to enable the billing control node BCN to be able to directly acquire the required billing profile for a user from the billing information database (DB). As a result, the following two functions of the edge node EN-1 are no longer necessary:

① The user billing profile holding function

② The function to detect access of a service provider node XSPN from a user host, and append the billing profile This method enables reduction of the functions of the edge node EN-1 compared with the above basic method; but the service provider node XSPN must access the billing information database each time service is started, and so there is a large load incurred in accessing the billing information database. Depending on trends in use of service by users (whether the same XSPN is used, or numerous XSPNs are frequently used selectively), and depending on the extent of availability of service, it is possible to make selective use of this method and the basic method, in order to more efficiently utilize network resources.

FIG. 55 shows the network configuration and explains the operating sequence by which the billing control node BCN acquires a required user billing profile from the billing information database; FIG. 56 explains the message types exchanged between the billing information database 53 and billing control node BCN when a billing profile is delivered.

A user billing profile acquisition function unit is added to the billing control node BCN, and a user billing profile provision function unit is provided in the billing information database 53.

① The user host MH accesses the service provider node XSPN, which is a fee-based site, in order to request the provision of service.

② The service provider node XSPN sends to the billing control node BCN information indicating access by the user host MH.

③ In order to acquire the user billing profile for the user host MH in question, the billing control node BCN accesses the billing information database 53 via the core network 51. At this time the NAI (network access identifier) of the user host MH or IP address of the user host MH may be utilized as the search key for the user billing profile.

④ The billing information database 53 extracts the billing profile relating to the user host in question based on the NAI, and includes this in a reply message which is sent to the billing control node BCN.

⑤ The billing control node BCN uses the user billing profile and server billing profile to calculate and generate billing condition candidate which can be provided to the user host in question, and sends this to the service provider node XSPN.

⑥ The service provider node XSPN presents the billing condition candidate to the user host MH, and determines the billing conditions for the user host.

⑦ The service provider node XSPN notifies the billing engine BEN (as an example BEN is within the edge node EN-1) of the billing conditions thus determined, to complete preparations for operation of the billing function for the service. Subsequently, exchange of service data between the service provider node XSPN and user host MH is begun.

The above is an example in which the billing control node BCN unconditionally acquires the user billing profile from the billing information database 53; but a configuration is also possible in which the billing control node BCN acquires the user billing profile from the billing information database 53 when the user billing profile is not included in the billing condition matching request message from the service provider node XSPN. FIG. 57 shows the flow of processing in such a case.

The billing control node BCN awaits a "billing condition matching request message" sent from the service provider node XSPN (step 721). When the billing control node BCN receives a billing condition matching request message (step 722), it judges whether a user billing profile for the user host is included in the message (step 723).

If a billing profile is included, billing condition matching processing is performed according to the same procedure used in the basic method (step 724). However, if a billing profile is not included, the billing control node BCN judges that it must itself acquire the user billing profile from the billing information database 53. The billing control node BCN sends a "billing profile request message" to the billing information database 53 (step 725). This message contains an NAI as information to identify the user making the request.

The billing information database 53 extracts the user billing profile corresponding to the NAI of the requesting user, and returns this to the billing control node BCN (step 726).

The billing control node BCN references the contents of the "billing profile reply message" received from the billing information database 53, and checks whether the search results are normal or abnormal (step 727). If the search results are a "abnormal"—for example, if the user host in question is not registered in the billing information database 53 as a user of the billing condition matching procedure—the billing control node BCN includes a billing condition candidate recommended to the user host in the billing condition matching reply message (step 728). This billing condition candidate is later presented to the user host by the service provider node XSPN; if the user host MH accepts the billing condition candidate, service is provided under these conditions.

On the other hand, if the billing profile for the user corresponding to the requesting NAI is retrieved, on confirming the normality of the format of the message in question, the same billing condition matching procedure as in the basic method is executed (step 724). Then, a billing condition matching reply message is created and is sent to the service provider node XSPN (step 729).

(d-4) Case in which the Service Provider Node XSPN Acquires the User Billing Profile Whereas in the billing control procedure explained in (d-3) above, the billing control node BCN accesses the billing information database 53 to acquire the user billing profile, in this method the service provider node XSPN acquires the user billing profile from the billing information database 53.

At the time of a service provision request sent from a user host (when the service provider server XSPN is accessed), the service provider node XSPN directly requests the billing profile for the user host from the billing information database 53. The service provider node XSPN sends to the billing control node BCN a billing condition matching request message containing this acquired user billing profile, and the billing control node BCN uses this user billing profile and the server billing profile to execute billing condition matching processing for the service to be provided to the user host.

As a result of the above method, the following two functions of the edge node EN-1 accommodating the user host MH become unnecessary:

① The function to hold the user billing profile

② The function to detect access of the service provider node XSPN by the user host, and to append the billing profile Compared with the above-described basic method, this method enables reduction of the functions of the edge node EN-1; but there is a large load imposed on the service provider node XSPN when accessing the billing information database, because the billing information database must be accessed each time service is started. Depending on trends in use of service by users (whether the same XSPN is used, or numerous XSPNs are frequently used selectively), and depending on the extent of availability of service, it is possible to make selective use of this method and the basic method, in order to more efficiently utilize network resources.

FIG. 58 is a figure explaining the network configuration and operating sequence in order that the service provider node XSPN can directly acquire the required billing profile for the user host from the billing information database 53; FIG. 59 is a figure explaining the types of messages exchanged between the billing information database 53 and service provider node XSPN when a billing profile is delivered. A user billing profile acquisition function unit is added to the service provider node XSPN, and a user billing profile provision function unit is added to the billing information database 53.

(1) The user host MH accesses the service provider node XSPN, which is a fee-based site, in order to request the provision of service. At this time, information such as an NAI or IP address of the user host MH which identifies the request terminal must be included in the access message (e.g. HTTP request). The access message varies in conformity with an application.

(2) On receiving an access message (service provision request message) from the user host MH, the service provider node XSPN requests the billing profile for the user host MH from the billing information database 53. That is, the service provider node XSPN accesses the billing information database in order to obtain the billing profile for the user host MH. At this time, the search key for the billing profile is the NAI (network access identifier) of the user host.

(3) The billing information database 53 extracts the billing profile for the user host, and includes this in a reply message which it sends to the service provider node XSPN.

(4) The service provider node XSPN receives the user billing profile, includes this in a billing condition matching request message, and sends this message to the billing control node BCN.

(5) The billing control node BCN uses the user billing profile and server billing profile to calculate and generate billing condition candidates which can be provided to the user host, includes the billing condition candidates in a billing condition matching reply message, and returns this message to the service provider node XSPN.

(6) The service provider node XSPN presents the billing condition candidate to the user host, and determines the billing conditions.

(7) The service provider node XSPN notifies the billing engine BEN(as an example BEN is within the edge node EN-1) of the billing conditions thus determined, and completes preparations for operation of the function for billing for the service in question. Subsequently the service provider node XSPN and user host MH begin to exchange service data.

Figure 60:
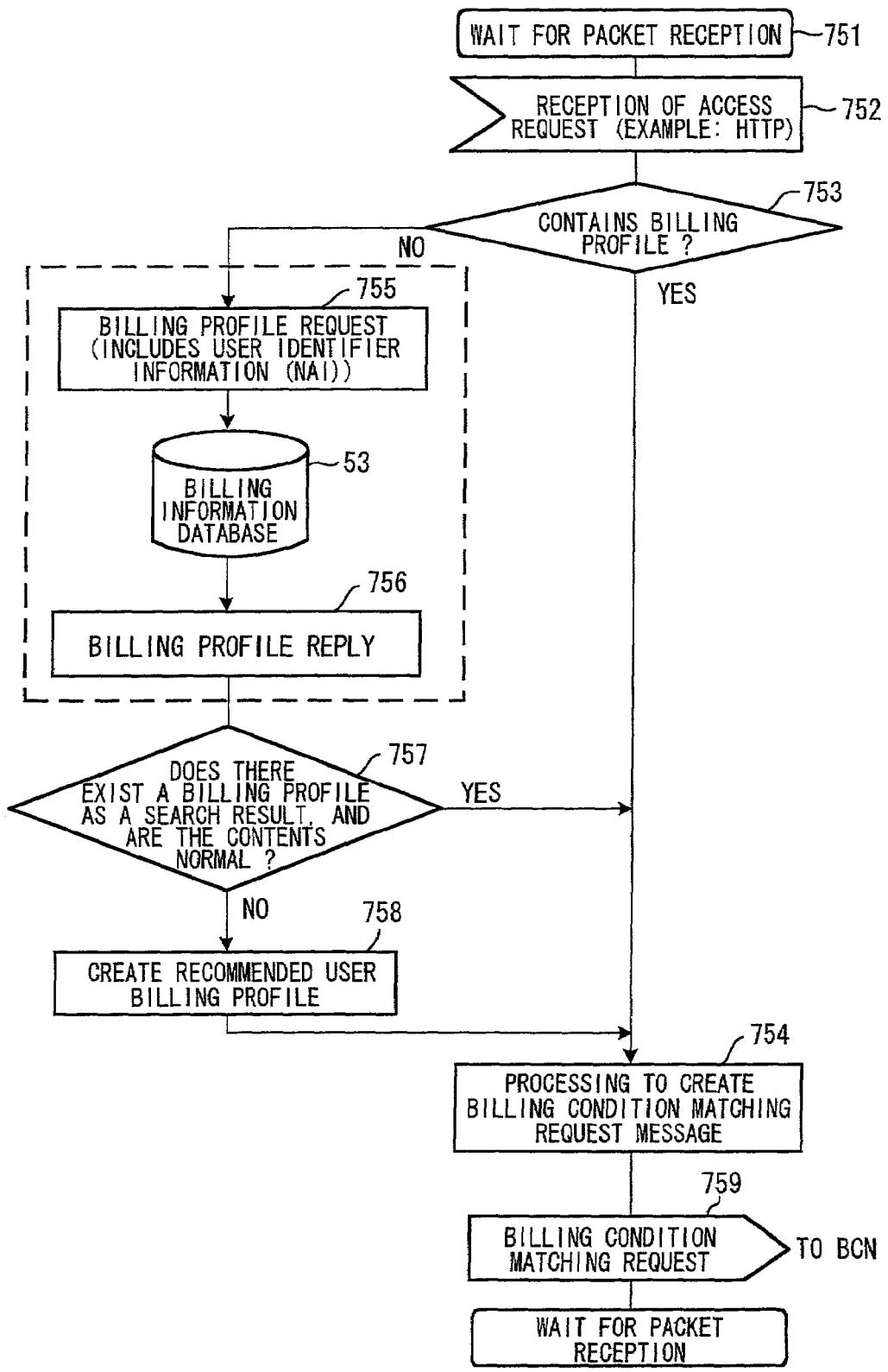
FIG. 60 shows the flow of processing when the service provider node XSPN directly acquires a user billing profile.

The above is an example in which the service provider node XSPN unconditionally acquires the user billing profile from the billing information database as the result of a service provision request from a user host MH; but a configuration is also possible in which the user billing profile is acquired from the billing information database only when the user billing profile is not included in the access message (service provision request message). FIG. 60 shows the flow of processing to acquire the user billing profile in such a case.

The service provider node XSPN awaits an access message (which differs depending on the application; for example, an HTTP request) sent from a user host MH (step 751). The service provider node XSPN, on receiving an access message (step 752), judges whether a "user billing profile" for the user host is included in the message (step 753).

If a billing profile is included in the access message, a billing condition matching request message is created and sent to the billing control node BCN using the same procedure as in the basic method (step 754).

On the other hand, if no billing profile is contained in the access message, the service provider node XSPN judges that it must itself acquire the user billing profile from the billing information database 53. The service provider node XSPN sends to the billing information database 53 a "billing profile request message" (step 755). This same message contains an NAI, as information used to identify the requesting user.

The billing information database 53 extracts the billing profile corresponding to the NAI of the requesting user, and returns it to the service provider node XSPN. The service provider node XSPN checks whether the search result is normal or abnormal, referring to the contents of the "billing profile reply message" received from the billing information database 53 (step 757). If the search result is "normal", the processing of step 754 is performed; if "abnormal" is indicated—for example, if the user host is not registered in the billing information database 53 as a user of the billing condition matching procedure—then a recommended user billing profile is created (step 758), and the same procedure as in the basic method is used to create a billing condition matching request message, which is sent to the billing control node BCN (step 754). Subsequent processing is the same as in the basic method.

(d-5) Billing Information Database Processing

Figure 61:
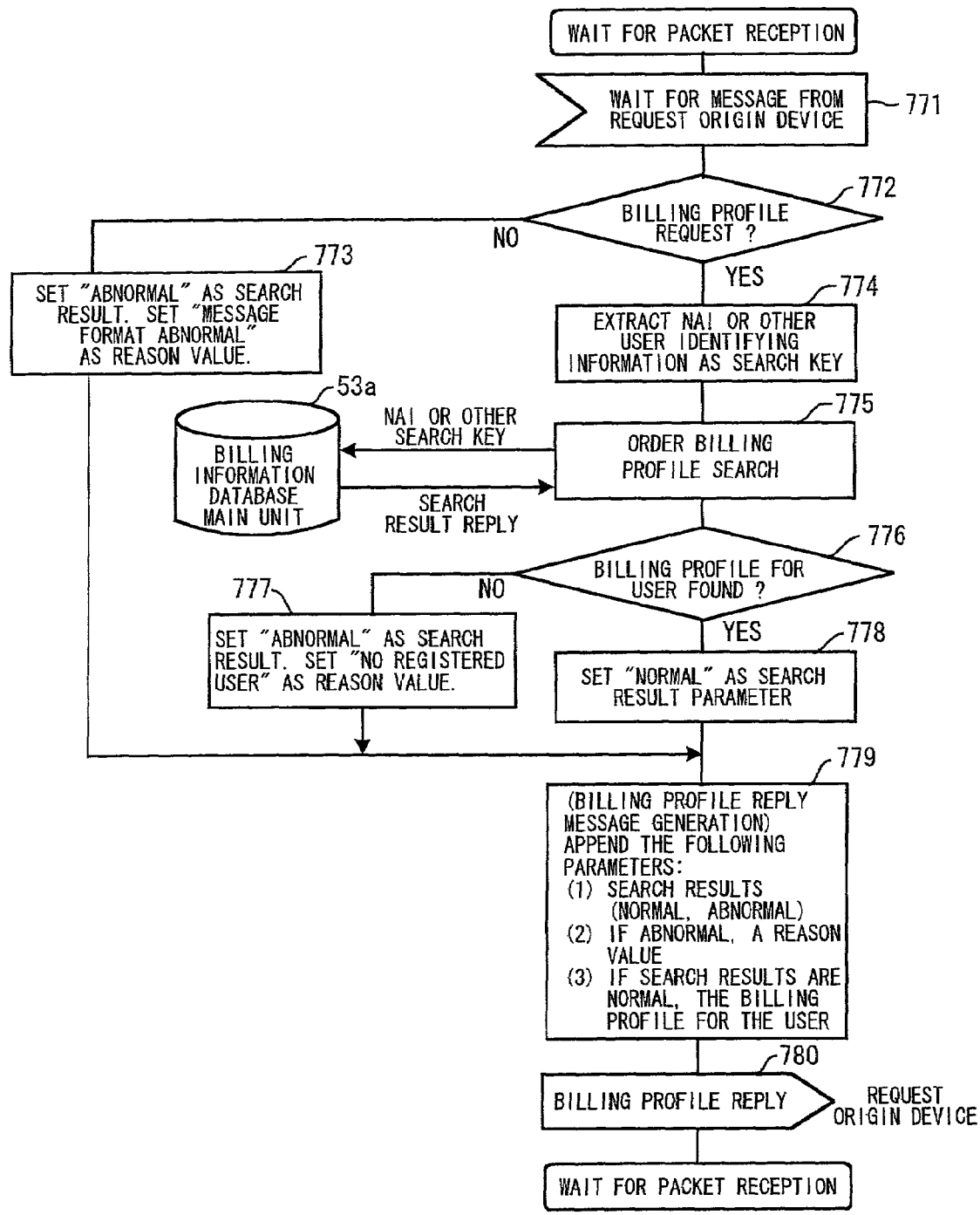
FIG. 61 shows the flow of processing of the billing information database when a user billing profile is requested.

FIG. 61 shows the flow of processing of the billing information database when a user billing profile is requested. The device (XSPN or BCN) requesting the billing profile from the billing information database is called the "request origin device".

The message control function unit incorporated in the billing information database (DB) 53 receives a billing profile request message sent by the request origin device, analyzes this message, extracts the user billing profile requested by the request origin device from the database, includes this profile in a billing profile reply message, and returns this message to the request origin device. The message control function unit need not necessarily be incorporated in the same device as the billing information database.

In greater detail, the message control function unit of the billing information database 53 is in a state of waiting for a billing profile request message from a request origin device (step 771). If some kind of message is received, the message control function unit checks whether the message format is that of a "billing profile request message" (step 772), and if the message is not a billing profile request message, sets the request result to "anomalous" and the reason value to "message format anomaly" as parameter values in the reply message, and returns this reply message (step 773).

On the other hand, if the message format is that of a "billing profile request message", the message control function unit extracts the host identifier information (NAI) contained in the message (step 774). Then, with the extracted NAI as a search key, a search request is sent to the main unit 53a of the billing information database. A check is performed to determine whether, as a result of the search, the billing profile is found for the user host (step 776); if not found, the search result is set to "anomalous" and the reason value to "no user host registration" as parameter values in the reply message, which is returned to the request origin device (step 777).

On the other hand, when the billing profile for the user host is retrieved, the search result is set to "normal" as a parameter value in the reply message (step 778). Then, a billing profile reply message containing the billing profile is created (step 779), and the billing profile reply message is sent to the request origin device (step 780).

(e) Billing Condition Generation Reply Function

On receiving a billing condition matching request message from the service provider node XSPN, the billing control node BCN must generate billing conditions and respond. The billing condition matching request message includes the user billing profile for the origin of the service request MH. The billing control node BCN attempts to compare the received user billing profile with the service provider-side billing profile managed within the BCN. If, as a result of this comparison, it is established that one or more service provision conditions (billing conditions) can be provided, a unique identifier is assigned to each billing condition candidate, and these candidate conditions are returned to the service provider node XSPN which is the origin of the request.

At this point, the billing control node BCN has one or more billing condition candidates, which are not finalized. In addition to these billing condition candidates, in order to identify the service provider server XSPN from which the billing condition matching request message is sent, identification information for the service provider node XSPN is held in an internal table, linked with the billing condition identifiers. By means of this identification information, when a single service is provided by a plurality of servers in a distributed arrangement, the XSPN currently providing service can be determined.

After the end of billing condition matching processing, the group of generated billing condition data, and the associated billing condition identifiers, are included in a billing condition matching reply message, which is returned to the service provider server XSPN.

(e-1) Example of a User Billing Profile Definition

FIG. 62 shows an example of the basic configuration of a user billing profile. Features of this user billing profile are as follows.

(1) The user billing profile is a collection of data containing as many sets of billing conditions and corresponding values as are needed.

(2) The format for representation of condition statements in the billing profile is made common between a carrier performing proxy billing, and the service provider server XSP providing a service. Also, in the event of linking among carriers, the format is also made common among carriers.

(3) The contents for comparison of billing profiles are classified into the three types of FIG. 62 (basic portion, service-dependent portion, XSP-defined portion).

A specific description of conditions in a billing profile appears in FIG. 63. In this example, the conditions ID:000 to 004 are the "basic portion"; 005 to 010 are the "service-dependent portion"; and 011 is the XSP-defined portion. The basic portion specifies the enterprise code, application type, XSP enterprise identifier code, service name, and prioritized conditions. The service-dependent portion specifies the transmission quality during provision of service, hours, object for billing, billing units, upper limit to the billed amount, and priority parameter. The independently defined portion is the content delivery method or other part defined by the XSP itself.

(e-2) Example of a Server Billing Profile Definition

Figure 64:
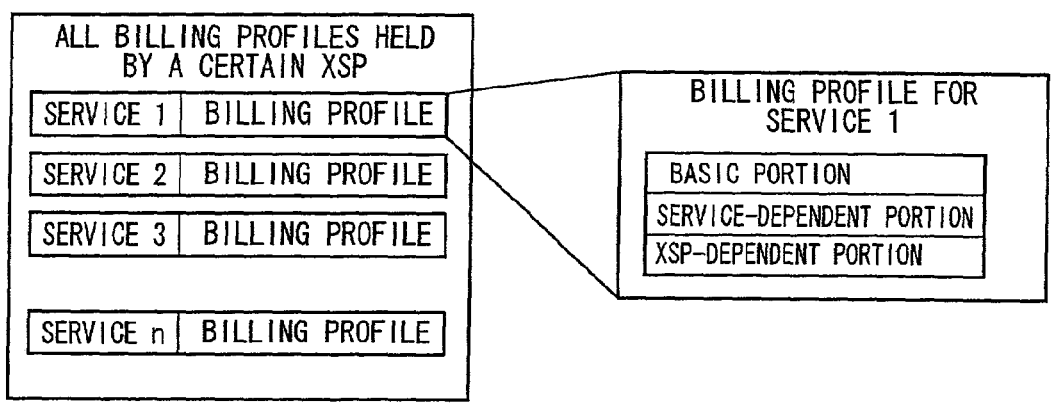
FIG. 64 is an example of the basic structure of a server billing profile.

FIG. 64 is an example of the basic structure of a server billing profile; as is clear from the figure, a single service provider server XSP prepares a billing profile in units of the service content provided by the company. The "user billing profile" presented upon a request for service initiation from a user is compared with a plurality of server billing profiles held by the service provider server XSP, and a prescribed server billing profile is detected as a candidate billing condition. The server billing profile has a configuration similar to that of the user billing profile of FIG. 63. Differences are (1) the ability to specify a "condition formula" stipulating a matching state for conditions, by which means a condition formula or threshold can be stipulated for complete matches or for matches within a fixed range, and (2) the ability of the service provider to specify concrete values, times and similar as the items of billing conditions, using "XSP-specified values".

(e-3) Example of a Billing Condition Matching Procedure

Figure 65:
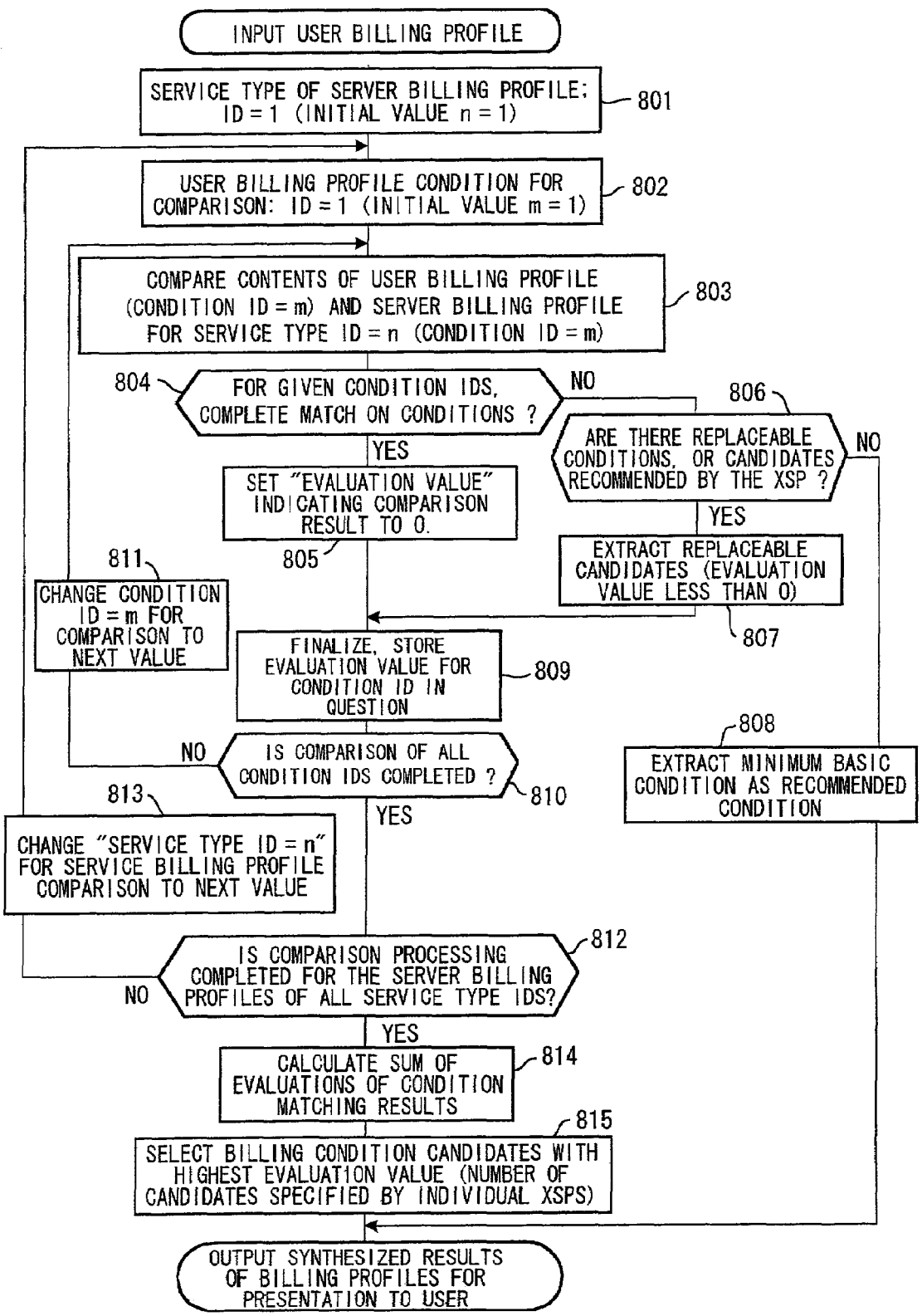
FIG. 65 shows the processing flow of the billing condition matching procedure.

FIG. 65 shows the flow of processing of the billing condition matching procedure. In general, the billing condition matching procedure does not exist uniquely; there are separate procedures for each service provider node XSPN. However, here a general procedure is adopted as an example in the explanation.

When the user billing profile is input, the billing control node BCN initializes the service type ID of the server billing profile to 1 (n=1, step 801), and then initializes the condition ID of the user billing profile which is to be compared to 1 (m=1, step 802). Following this, the contents of the mth condition item of the user billing profile and the contents of the mth condition item of the server billing profile with server type ID=n are compared (step 803). The contents of this mth condition are checked for a complete match (step 804), and if there is a complete match, the evaluation value for the mth condition is set to 0 (step 805). However, if there is not a complete match, a check is performed to determine whether there is a condition which can be substituted, or a candidate which is recommended by the service provider node XSPN (step 806); if "YES", the evaluation value for the mth condition is set to the prescribed value (step 807). If "NO", the smallest basic condition on the server side is extracted as the recommended condition and output (step 808), and processing ends.

After the processing of steps 805 and 807, the evaluation value for the mth condition is finalized and stored (step 809), and a check is performed to determine whether comparisons for all condition IDs are completed (step 810); if "NO", m is incremented (step 811), and processing is repeated from step 803.

In step 810, if comparisons are completed for all condition IDs, a check is performed to determine whether comparison processing is completed for server billing profiles for all service types IDs (step 812); if there exist server billing profiles for which comparison processing is not finished, n is incremented (step 813), and processing is repeated from step 802. On the other hand, if in step 812 comparisons are ended for all service type IDs, the sum of the evaluation values for the stored condition matching results is calculated for each service type ID (step 814), and billing condition candidates are selected in order of highest evaluation value. The number of selections is specified individually by each service provider node XSPN.

Then, billing condition identifiers are created for each billing condition candidate, a billing condition matching reply message containing the billing condition identifiers and billing conditions is created, and this message is sent to the service provider node XSPN.

As an example of billing condition matching processing, examples of a user billing profile and server billing profile are shown in FIG. 66A and FIG. 66B, and in FIGS. 67A and 68B, the comparison results, and an example of billing condition candidates presented to the user, are shown. A feature of the billing condition matching processing of the second billing technology of this invention is that match/mismatch comparison results for each of the conditions of the user and server billing profiles are represented numerically, and based on overall evaluation values, billing condition candidates are selected in keeping with the desires of both the server and the user, and are presented to the user.

As an example of another kind of billing condition matching processing, FIGS. 68 and 69 show an example of a user billing profile and a server billing profile, and FIG. 70 shows an example of candidates for billing conditions to be presented to the user. This example is for the case of using streaming to secure downlink-direction bandwidth. Because the XSP enterprise identifier code matches, the service provider server XSP is company B.

The specific procedure for determining billing conditions is as follows.

(1) The billing control unit BCN compares the condition IDs 000 to 0004 of the user billing profile (FIG. 68) and the server billing profile (FIG. 69), according to a billing condition matching program.

①The enterprise code (company A) specified by the user is included in the corresponding carriers (companies A and C) specified by the server, and so the provider carrier is the company A specified by the user.

②Priority conditions differ for user specification and server specification; hence priority is considered upon the next comparison of service.

(2) Then, the billing control unit BCN compares the conditions ID 005 to 010 of the user billing profile and server billing profile, according to the billing condition matching program.

①The user gives priority to the billing condition (low price), and so processing is performed assuming the following billing conditions.

②The billing unit specified by the user is 0.0001 yen/packet, and so evaluation values are:
 0.0001 yen/packet: 0
 0.0003 yen/packet: −1
 0.001 yen/packet: −2
It is possible to convert 128 bytes to one packet. Since 1280 bytes data corresponds to 10 packets, the date can be billed as 10 packets.

③The user transmission quality specified is 1 Mbps, so that evaluation values are:
 300 kbps: −1
 1 Mbps: 0
 3 Mbps: 0 (because this is equal to or greater than the specified quality)

④User and server specifications for other items are in agreement.

(3) Finally, points are totaled for all combinations of billing conditions and transmission quality, and sets of conditions are presented as recommended conditions beginning with those which satisfy prioritized conditions (cf. FIG. 70). Other conditions are displayed beginning with those with higher points.

The billing control node BCN individually compares each corresponding condition of the user billing profile (FIG. 66A) and the server billing profile (FIG. 66B), according to a billing condition matching program. In comparing services, conditions applying to the user billing profile are referenced for all conditions stipulated by the server billing profile. That is, each of the conditions U1, U2, U3 of the user billing profile in FIG. 66A is compared with S1, S2, S3 in the server billing profile in FIG. 66B.

If, as a result of the comparison, there is unique agreement between the specified values of the user billing profile and the conditions of the server billing profile, the result is evaluated numerically as 0. This numerical value is adopted as the "evaluation value" of condition matching. On the other hand, as the evaluation value of items for which there is not a match, values −i, −j, −k, . . . smaller than 0 (for example, −1, −2, −3) are assigned, in the order of proximity to the user billing profile value (or value recommended by the XSP). The sequence i, j, k is determined according to the strategy of the service provider XSP; these values may become one feature of the fee system. The above comparison results are shown in FIG. 67A.

When comparison of all conditions of the server billing profile is completed, and comparison results are obtained for each set of conditions, the billing control node BCN takes into consideration user demands and the strategy of the company, and derives the billing conditions thought to be most appropriate. Specifically, the billing condition with the highest matching evaluation value as described above (and a number of billing conditions with successively lower values) are presented to the user. More specifically, based on FIG. 67A, the contents of FIG. 67B are presented to the user as the results of matching of the conditions of both the user and the service provider node XSPN. The contents of FIG. 67B do not completely match the conditions of the user billing profile, but present conditions which can be provided on the basis of a point-system evaluation of the desires of both the user and the XSP.

(f) Function for Billing Profile Preparation

Figures 71, 72:
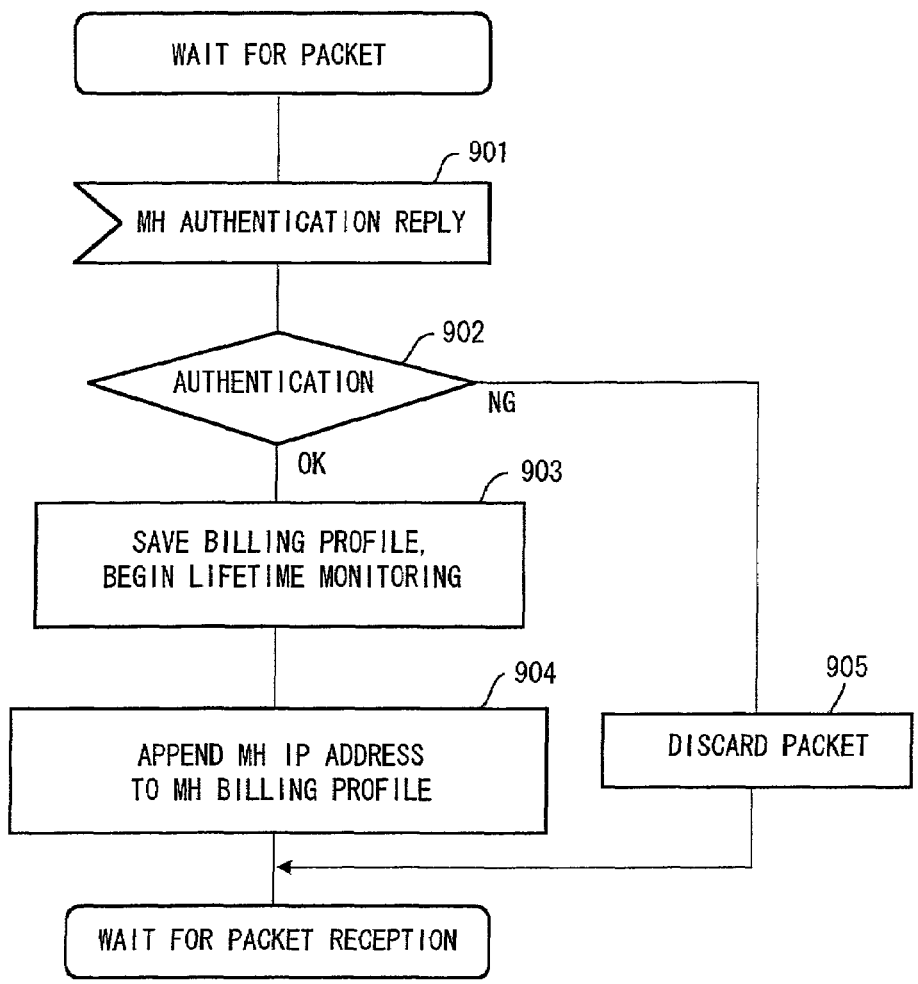
FIG. 71 is an example of a user billing profile of the user host MH.
FIG. 72 shows the processing flow of the billing profile storage procedure by an edge node.

The original copy of a user billing profile referenced at the time of startup of a fee-based service, by the edge node accommodating the user host MH is downloaded, together with the service profile and similar, from the AAA server 52 managing the profile on the occasion of MH host authentication. The procedure for downloading of these profiles at the time of authentication has already been explained, referring to FIG. 49. An example of the user billing profile of the user host MH is shown in FIG. 71.

Various kinds of information are conceivable to identify the user host MH in the MH billing profile; as one example, the NAI (Network Access Identifier) stipulated by IETF may be used to uniquely identify the user host. In general, the IP address is available as information enabling identification of a user host on an IP network; but in IPv6, in keeping with the plug-and-play concept, IP addresses are assigned dynamically on each connection to the network; hence the address value is different each time a connection is made, and so the IP address cannot be used as means of regularly identifying a host. Hence as host identification information in the billing profiles of this invention, the NAI, a fixed value of which is allocated, is employed. However, the information for identification need not be the NAI if it is assigned uniquely as a fixed value to a terminal.

As explained above, individual host addresses are given to for each network connection, but the billing engine which detects packets for billing and similar employs IP addresses to recognize the billed host. However, in billing condition matching decision processing within the billing control node BCN, the user host MH must be represented by a regular and unchanging NAI. This is necessary in order that, when the host moves to another service provider node XSPN under the management of the same billing control node BCN (and receives a different address assignment), the billing conditions that had previously been agreed upon via the service provider node XSPN before the move can continue to be used.

In this way, as the format for representation of the host in the billing profile, when managed by an AAA server within the network, the NAI or some other fixed value is employed; but in the billing control procedure, the IP address information is also necessary. Hence the billing profile is downloaded to the edge node EN, and at the same time the edge node EN acquires the IP address information currently assigned to the user host MH, and assigns this to the above billing profile to perform management, as shown in FIG. 71. The user billing profile includes the billing conditions AAA, BBB, CCC for each service.

FIG. 72 shows the flow of processing of the user billing profile storage procedure by the edge node.

When the user host MH is connected to an access network 55, an address allocation request is sent to the edge node EN-1. As a result, the edge node EN-1 allocates an address, and also requests address authentication of the AAA server 52. The AAA server 52 executes user host authentication processing by means of an authentication request, and also reads the billing profile for the user host MH from the billing information database 53, appends this to an authentication reply packet, and returns this to the edge node EN-1. The edge node EN-1 awaits reception of the authentication reply packet (step 901), and when the message is received, checks whether the authentication reply is "OK" or "NG" (step 902). If "OK", the billing profile for the user host MH is included in the message, and so the user billing profile is saved at the time authentication is concluded, and in addition the timer to monitor the authentication session for the user profile is started (step 903). Then, the IP address of the user host MH is appended to the user billing profile. On the other hand, if in step 902 the result is "NG", the packet is discarded (step 905), and reception of the next packet is awaited.

(g) Function for Management of Billing Condition Identifiers

A billing condition identifier is assigned to generated billing conditions; this identifier not only serves as a key for referencing billing condition data on which agreement has been reached between the user and service provider, but also is sent to the billing control node BCN to confirm the intention to continue service use for a fixed period during the provision of service. When the billing control node BCN receives a billing condition identifier, it references the identifier to confirm that the user is using the service, and continues the service. In other words, the billing condition identifier functions similarly to an order number.

The edge node EN-1 accommodating the user host MH performs proxy storage of the billing condition identifier in place of the user host MH receiving the service. By this means, billing condition data can be maintained and managed during service, without equipping the user host MH with any billing-specific functions.

In the first billing technology of this invention, as means of retaining the billing session during service, the billing condition identifier was stored in the user host(mobile node); in the second billing technology, the identifier is managed within the network (for example, by the edge node accommodating the user host), and by associating the user host and the identifier, recognition of a billing session is made possible (cf. FIG. 46).

Figure 74:
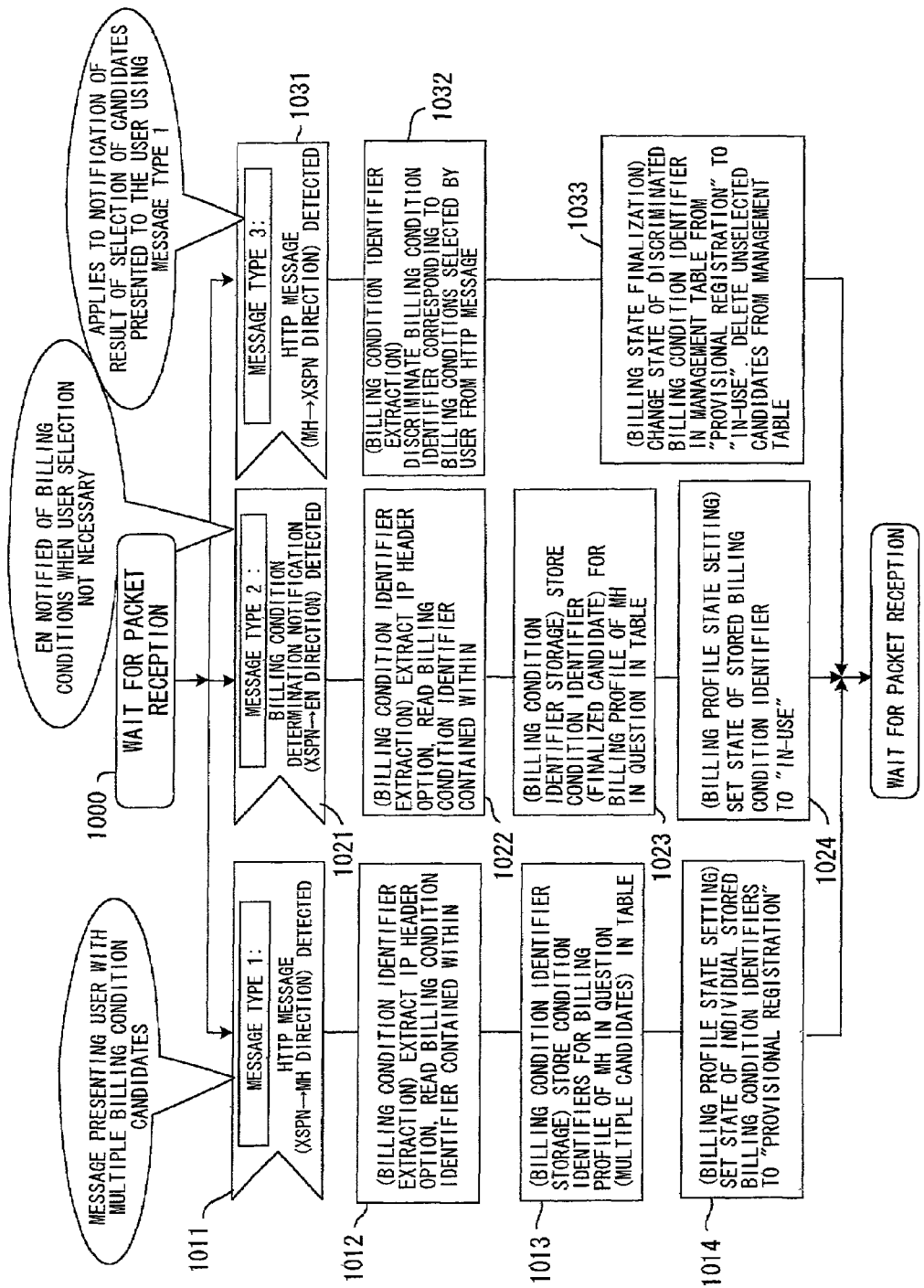
FIG. 74 shows the flow of processing for management of billing condition identifiers by an edge node.

FIG. 73 is an example of a billing condition identifier management table within an edge node EN; FIG. 74 shows the flow of processing in management of billing condition identifiers by an edge node EN. In the billing condition identifier management table, a group identifier assigned to each group of candidates of billing condition identifiers, billing condition identifiers which uniquely indicate each set of billing conditions, billing state flags indicating provisional registration/in-use/other states, and remaining periods of validity are managed.

In FIG. 74, the edge node EN is in a state of waiting for a packet (a billing control-related message) (step 1000); if in this state a packet is received, the type of received message (message type 1 to 3) is identified (steps 1011, 1021, 1031), and one of the following actions is taken, according to the message type.

Message type 1 is an http protocol message constituting a Web page screen, prompting the user to select from among a group of billing condition data candidates adjusted by the billing control node BCN. This message packet contains an IPv6 option header, in which is described a billing condition identifier group corresponding to the billing condition candidate group. When the edge node EN transfers this http protocol message to the user host MH, it removes the option header (step 1012), and stores it in the billing condition identifier management table (FIG. 73) held within the engine node EN (step 1013). At this time, the billing condition identifiers for all candidates are stored. However, there are management condition flags for the individual stored billing condition identifiers, and at this time, this flag is set to "provisional registration" (step 1014). Then, the edge node enters a state of waiting for the result of candidate selection by the user (message type 3, described below) (step 1015).

Message type 2 is a message used when there is only a single billing condition adjusted by the billing control node BCN, so that there are no other choices for the user to select, or when it is necessary to obtain confirmation from the user. In such cases, a "billing condition determination notification" message, which indicates that billing conditions have been uniquely determined, is sent from the service provider node XSPN to the edge node EN. As with message type 1, this message includes an IPv6 option header, but includes only one billing condition identifier. When the edge node EN receives a billing condition determination notification message, it extracts the billing condition identifier (step 1022), stores it in the identifier management table within the EN (step 1023), and changes the state to "in-use" (step 1024). The "in-use" state indicates that a billed service is being provided based on these conditions. Then, reception of another packet is awaited.

Message type 3 is an http reply message sent from the user host MH to the service provider node XSPN (also a Web server) when deciding on one desired candidate among the plurality of condition candidates presented to the user by the message type 1 of the figure. When transferring this message to the service provider node XSPN, the edge node EN decides which billing condition identifier candidate the user has selected from the contents of the http protocol message (step 1032). Then, the edge node EN changes the management state of the selected candidate in the identifier management table (FIG. 73) from "provisional registration" to "in-use", and at the same time deletes the unselected candidates from the management table (step 1033). Then, reception of another packet is awaited.

(h) Billing Condition Approval by the User Host

In the procedure for billing condition matching of feebased services addressed by this invention, when necessary it is possible to present to the user host (MH) for selection a plurality of billing condition candidates which can be offered, generated by the billing control node BCN. In reply to this presentation of billing condition candidates, the user host MH must respond by deciding which of the billing condition candidates to adopt. As a specific example, when a service provision request from the user host MH is made by WWW (HTTP) access, the service provider node XSPN dynamically generates a Web page with a screen to present billing conditions, and sends this as a reply to the request from the user host MH for fee-based service startup. On receiving this, the user host MH studies the service provision conditions which have been presented on the WWW browser screen of his own host, and returns a reply (approval).

Figure 75:
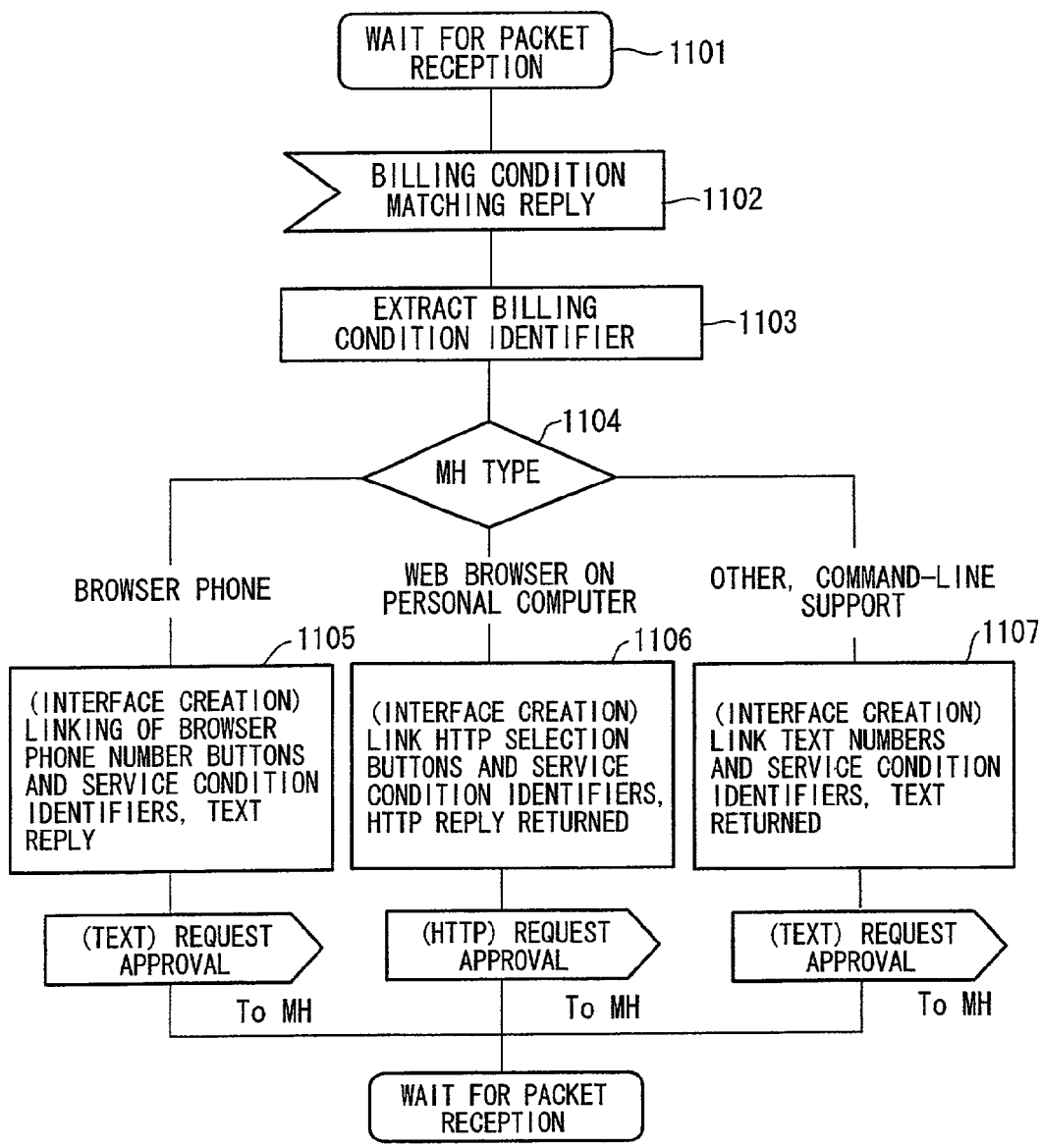
FIG. 75 shows the flow of processing of a service provider node XSPN when causing a user terminal to perform billing condition approval.

FIG. 75 shows the flow of processing of the service provider node XSPN when causing the user host to approve billing conditions.

In this procedure, billing condition data is generated as candidates in the billing control node BCN, this is presented to the user host MH, and the user's selection is awaited.

The service provider node XSPN awaits the sending, by means of a billing condition matching reply message, of a billing condition candidate for the user host MH from the billing control node BCN (step 1101). On receiving the billing condition matching reply message (step 1102), the billing condition identifier attached to the message is extracted (step 1103), and the billing condition candidate is sent to the origin of the service request to make preparations. That is, the means of access of the service provider node XSPN by the user host MH (for example, browser phone, a computer Web browser, or command-line interface) is recognized (step 1104), and a message to respond to the user host MH using this interface type is edited (steps 1105 to 1107). For example, when accessing using browser phone, the browser phone number buttons and service condition identifier are linked to create text; when accessing using a Web browser, Web pages for condition consent are created dynamically using CGI. Then, a packet containing the created text or Web page is sent to the user host MH (steps 1108 to 1110), and reception from the user of an approval packet is awaited (step 1111).

(i) First Confirmation of Continuation of Service

In the state in which billing condition negotiations for a fee-based service have been successful, and service is being provided, there may occur circumstances in which the service cannot be received, because the power supply to the user host MH has been interrupted (power failure or similar), or due to movement out of range, or for some other reason not intended by the user of the user host MH. A specific example involves streaming or other broadcast-type applications. In such services, which are provided in a unilateral broadcast format from the network side, billing processing (counting the number of applicable packets, or similar) is performed within the network. Hence data packets continue to be sent, regardless of whether the user host MH can receive the billed data or not, and so there is the problem that the user is billed for services that are not received.

Because of this, means are necessary for confirming that service is being received during a fixed period (whether billed packets are being received) during service provision, through a reply from the user host MH itself. Specifically, the expiration date (authentication session period) for authentication is set using the authentication function at the time of network connection, and the user host MH repeats authentication registration in a fixed period.

When the edge node EN-1 confirms periodic authentication registration, the edge node EN-1 judges that the user host MH intends to continue receiving the service, and so continues service provision under the relevant conditions. On the other hand, in the event of interruption of power to the user host MH or of connection to the network, or in the event of movement to another network, so that the authentication session is not updated, the edge node EN-1 accommodating the user host MH judges that interruption of service is necessary, and so stops billing operations for the user host MH by the billing engine.

Figure 76:
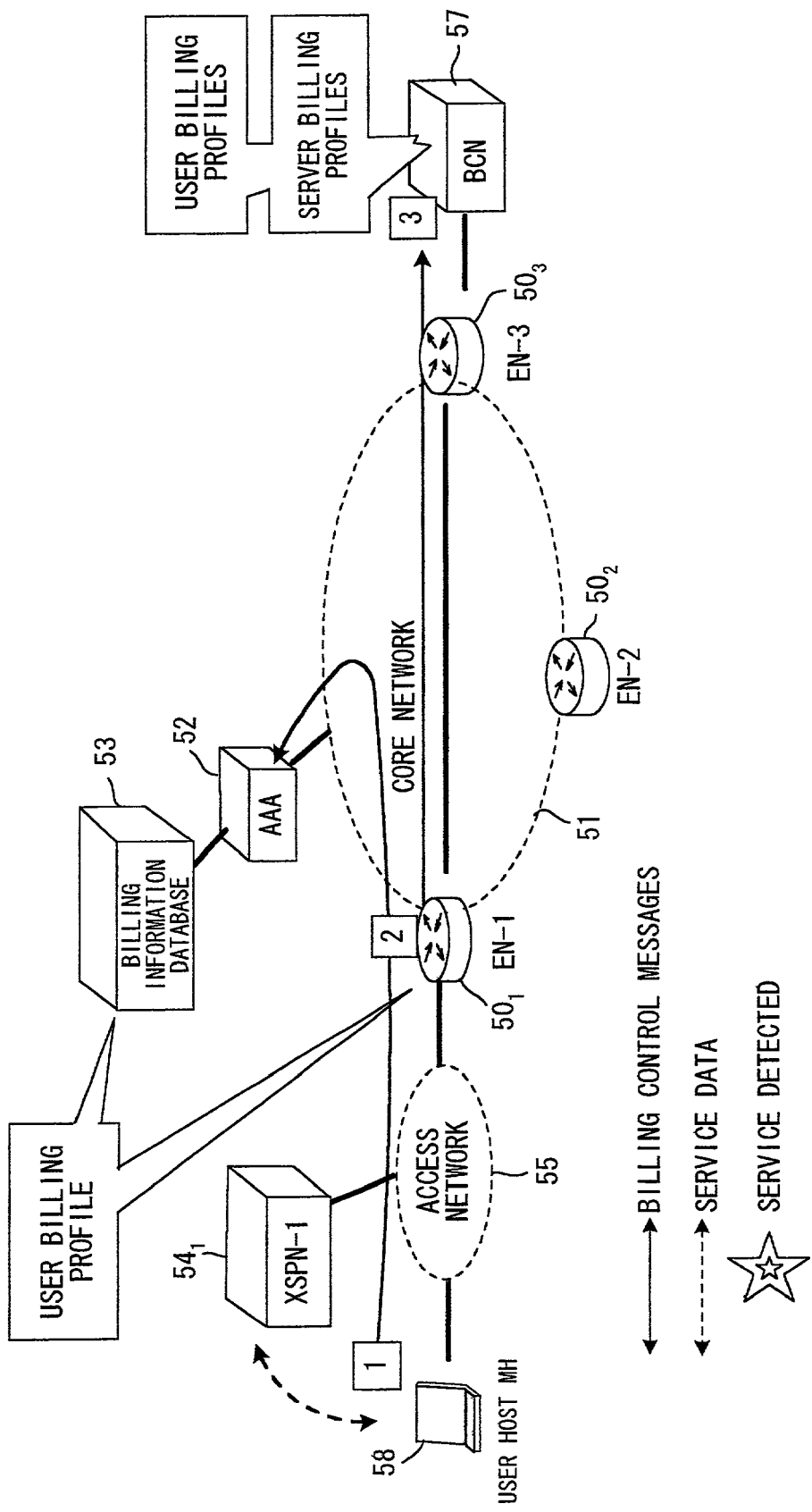
FIG. 76 is a figure explaining confirmation of service continuation.
Figure 77:
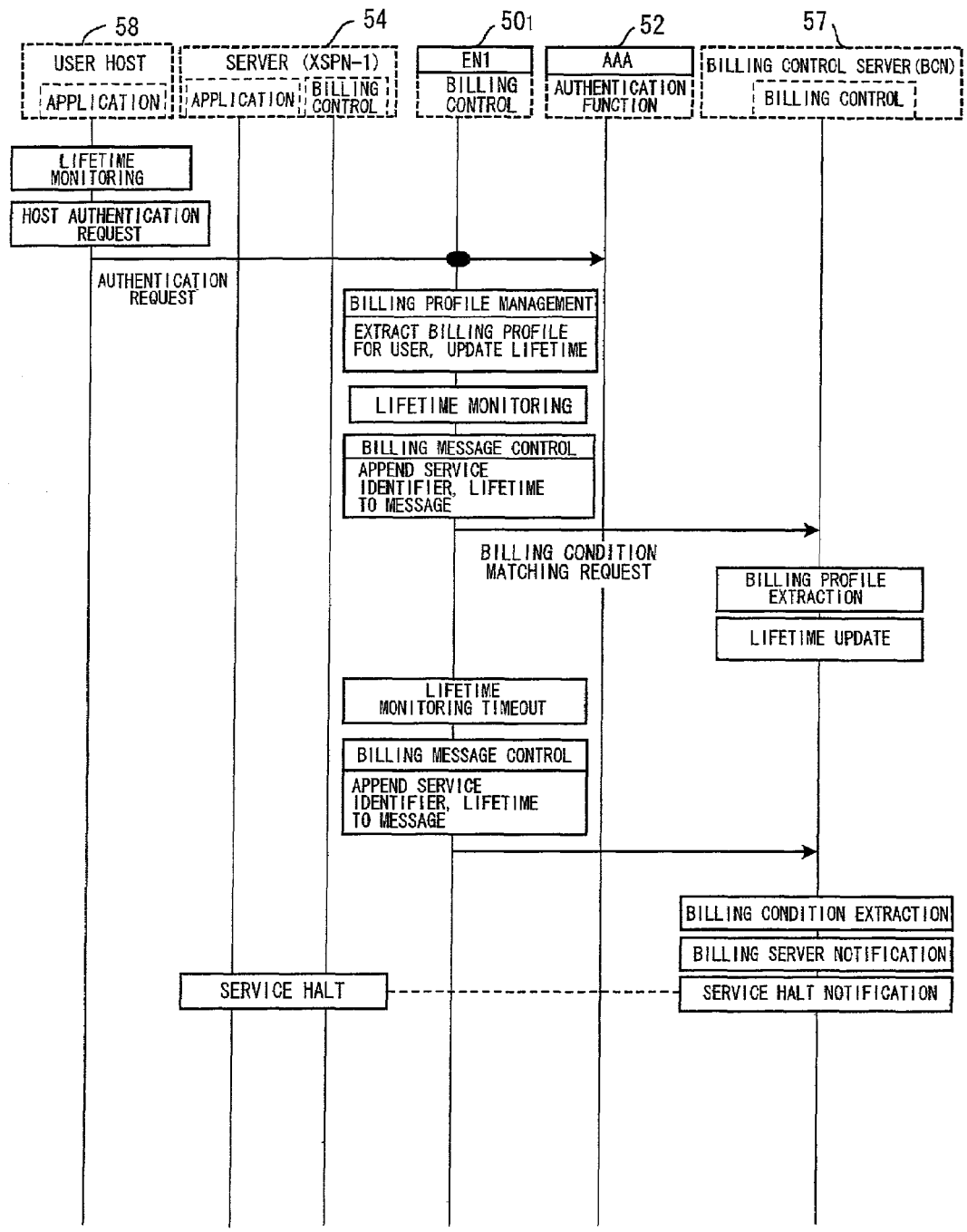
FIG. 77 is an example of a service confirmation procedure based on host authentication (linked with the session time)

FIG. 76 explains confirmation of service continuation; FIG. 77 is an example of a service confirmation procedure based on host authentication (linked to the session time).

(1) The user host MH performs host authentication accompanying movement. The authentication has an expiration date (session period: lifetime), and the user host MH performs authentication periodically.

(2) The edge node EN-1 updates the billing profile lifetime on the occasion of a periodic authentication request from the user host MH, and sends a message requesting service state update, and including a billing condition identifier, to the billing control node BCN. On the other hand, the edge node EN-1 monitors the lifetime of the billing profile which it holds. If the lifetime expires, the edge node judges that the user host MH is in a state in which service cannot be received, and sends a message requesting a state change (interruption), and including the billing condition identifier, to the billing control node BCN.

(3) On the receiving a service state update request periodically from the edge node EN-1, the billing control node BCN updates the lifetime of the billing conditions in question. On the other hand, if the billing control node BCN receives a request for a change in state to the interrupted state, the BCN notifies the billing unit and service provider node XSPN-1 of service interruption.

(j) Second Confirmation of Continuation of Service

In some cases, the user host MH may at a certain time explicitly choose interruption of a fee-based service during use. In this case, the billing session is immediately interrupted through prescribed operations by the user host MH, and computation of billed packets must be ended. In this invention, by accessing a prescribed address (URL or similar) of the service provider node XSPN, the user host MH can immediately end the billing session.

A difference with the first confirmation of service continuation is the explicit ending of service (the billing session) by the user. In the first billing technology, a function is necessary for insertion of a billing condition identifier or other individual information into a Mobile IP registration request message sent by the mobile node(user host). In the second billing technology, the service provider node XSPN recognizes the end of service as a result of accessing and prescribed operation of the front-end server (for example, WWW server) which handles services; hence only a general-use protocol is necessary.

Figure 78:
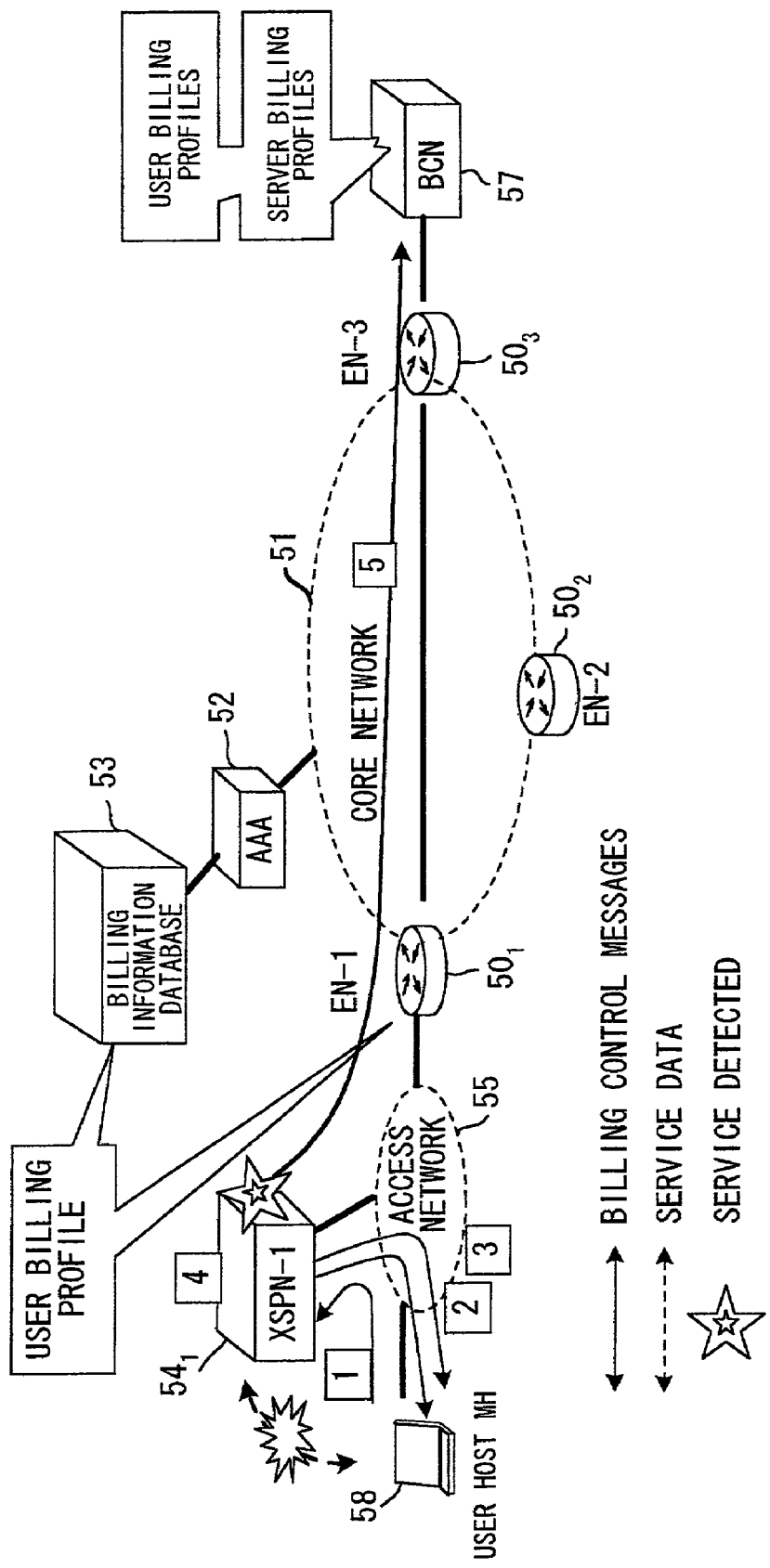
FIG. 78 is a figure explaining processing to stop operation of a billing service being executed, due to user startup.
Figure 79:
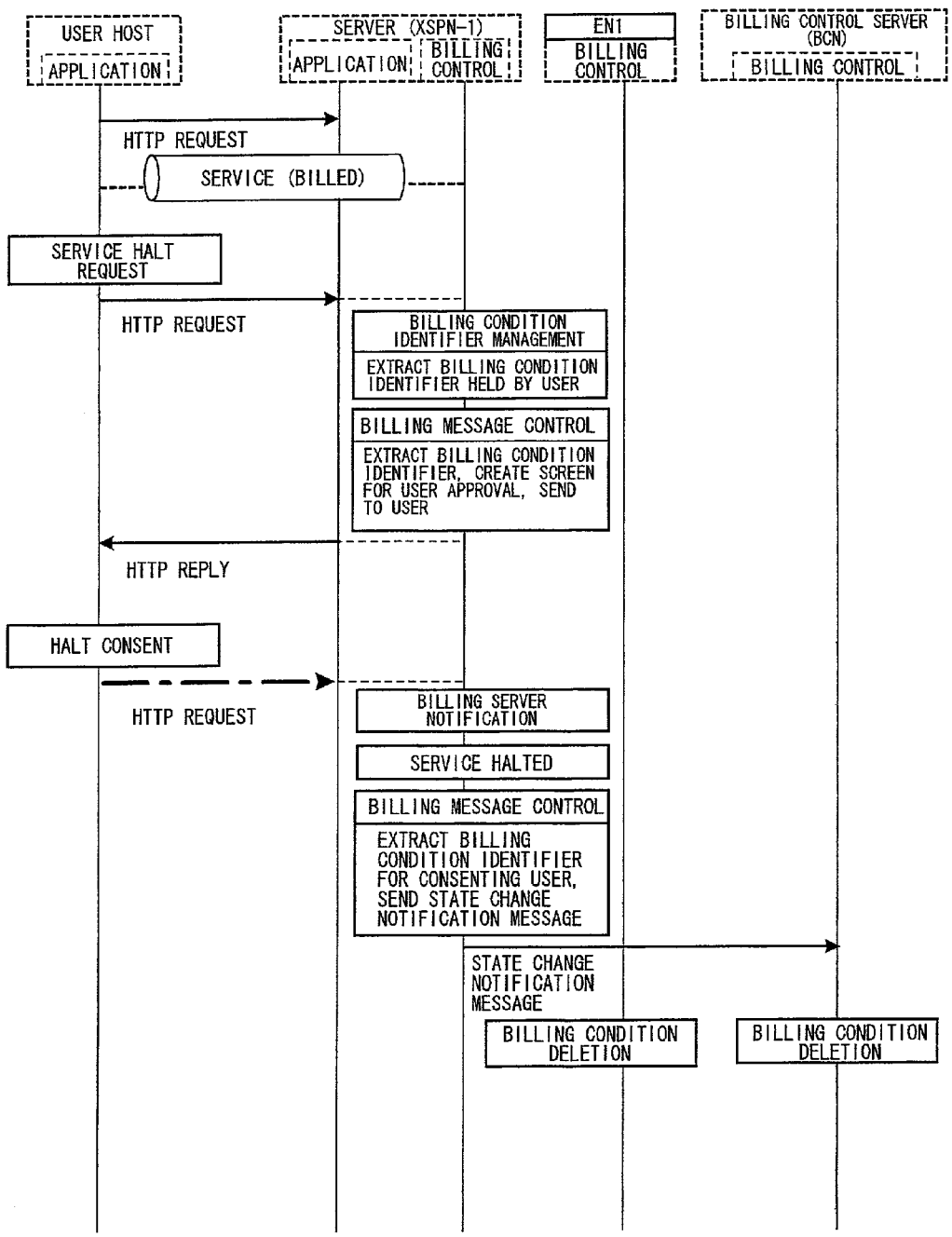
FIG. 79 shows a procedure to stop operation of a billing service being executed, due to user startup.

FIG. 78 explains processing to halt operation of a billing service being executed, as a result of user startup; FIG. 79 shows the procedure to halt operation of a billing service being executed, as a result of user startup.

(1) In order to halt service, the user host MH accesses the service change Web page of the service provider node XSPN-1 during service provision.

(2) As a result of this, the service provider node XSPN-1 extracts the billing condition identifier for the user in question, uses CGI or similar to generate an approval screen for presentation to the user to confirm interruption, and returns this to the user host MH.

(3) The user host MH selects interruption, and notifies the service provider node XSPN-1.

(4) As a result, the service provider node XSPN-1 notifies the billing engine BEN of the halting of billing, and halts service to the user host MH.

(5) The service provider node XSPN-1 notifies the billing control node BCN of the state change (interruption), and prompts deletion of registration information. Also, the edge node EN-1 extracts the message and deletes the identifier from the billing condition identifier management table, as well as deleting the billing condition data for the user host MH.

(k) Resetting Conditions During Execution

Means are necessary to reset billing conditions, in response to user needs, for a billing service currently being executed, without ending service. Specifically, in such cases a contract has been established, but the user host MH is dissatisfied with the quality of the service initiated by the provider, and wishes to change to higher-quality service conditions. Hence in this invention, a buffer device is prepared which resets billing conditions as a result of a request from the user host MH, and in addition temporarily holds the data group for the process of renegotiating billing conditions for the user host MH between the billing control node BCN and service provider node XSPN. If as a result of the renegotiation of billing conditions the user host MH accepts service provision under new billing conditions, this billing condition data is immediately substituted for the billing condition data currently in use.

Figure 80:
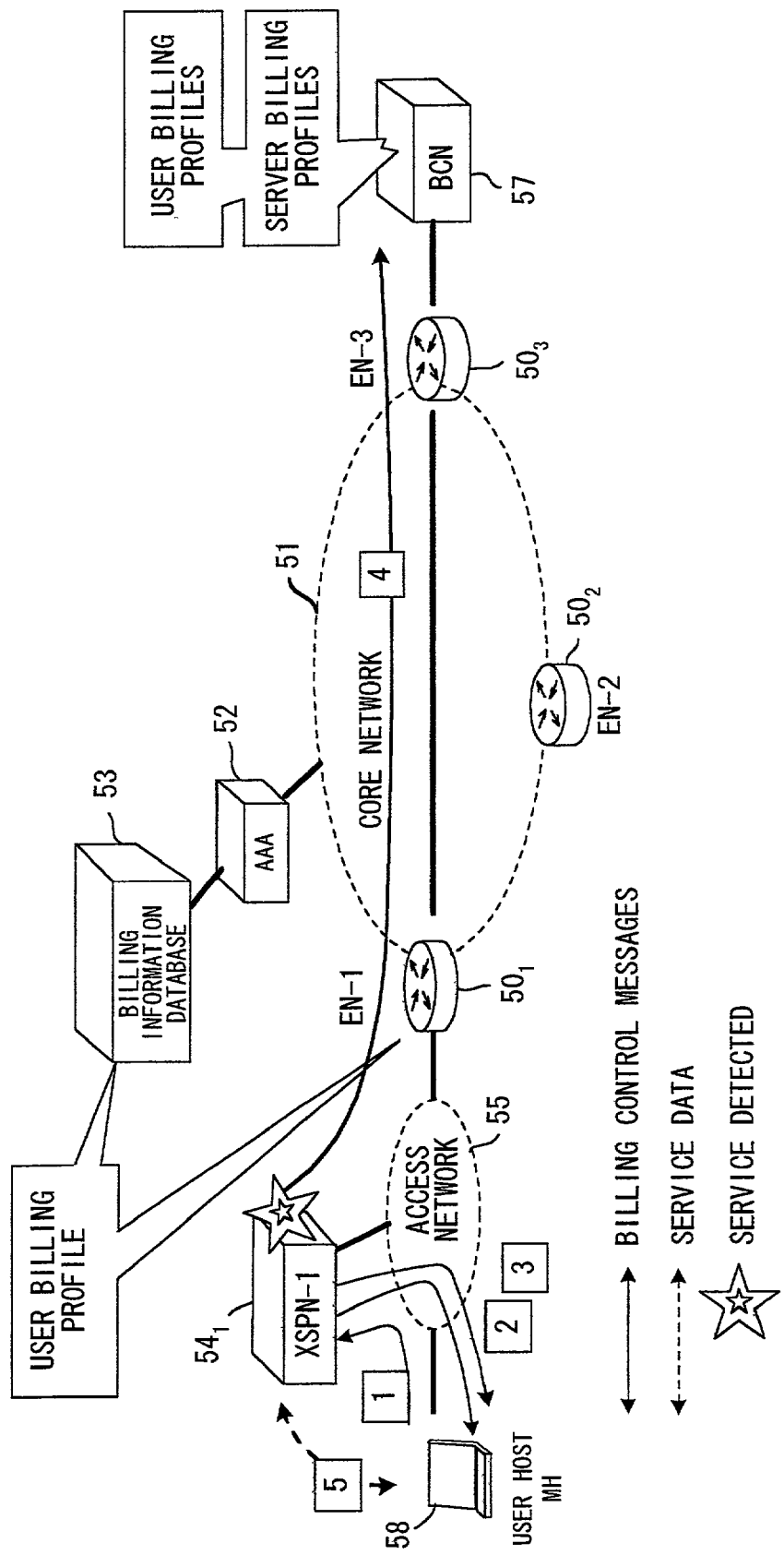
FIG. 80 is a figure explaining the resetting of billing conditions when billing conditions for a service being executed are changed, due to the intention of the user.
Figure 81:
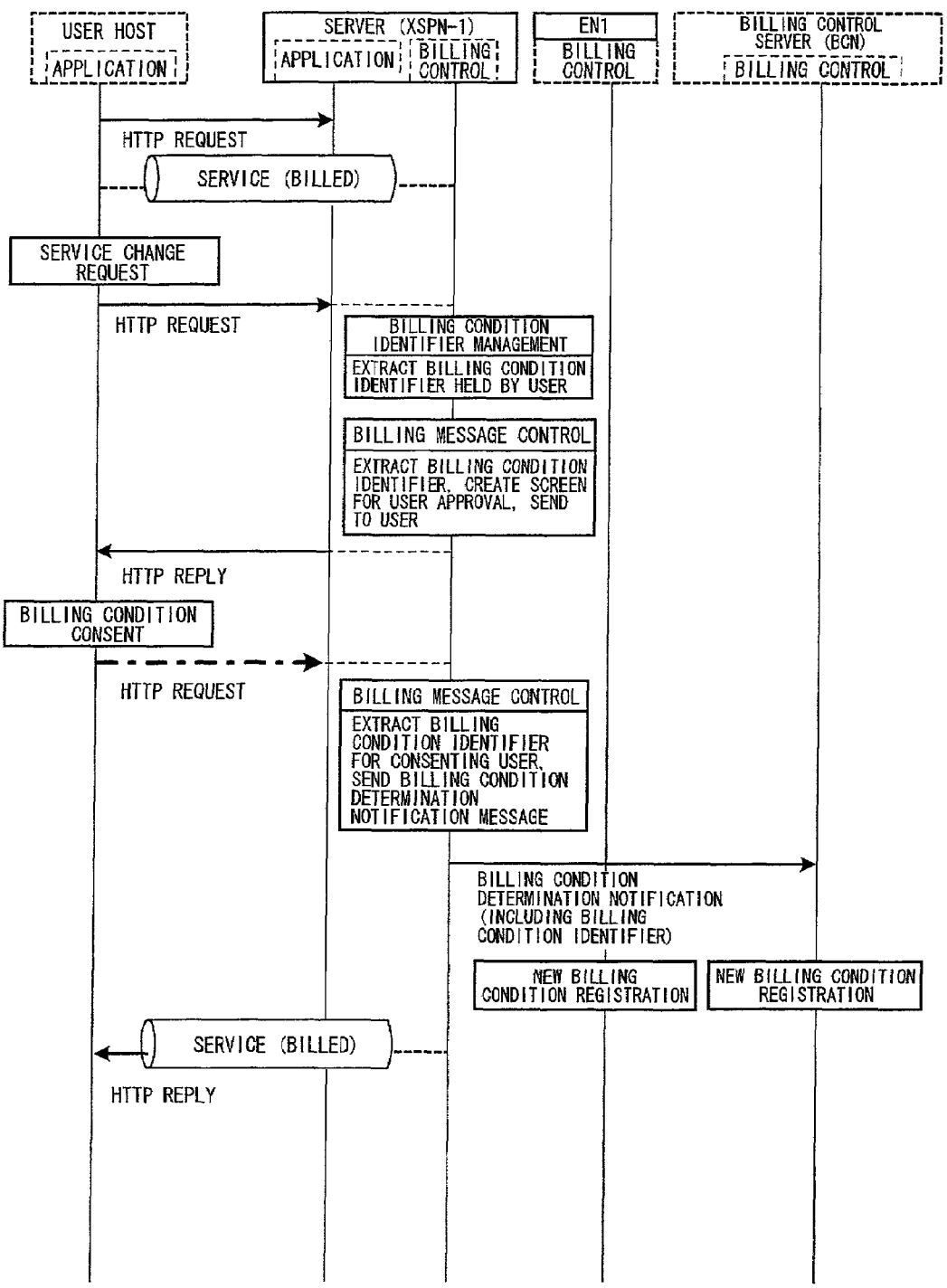
FIG. 81 shows a procedure for resetting of billing conditions when billing conditions for a service being executed are changed.

FIG. 80 explains the resetting of billing conditions when the billing conditions for service in execution are to be changed at the request of the user; FIG. 81 shows the procedure for resetting billing conditions when the billing conditions for service being executed are to be changed.

(1) In order to change to better-quality service conditions, the user host MH accesses the service change Web page of the service provider node XSPN-1 currently providing service.

(2) The service provider node XSPN-1 has a buffer device which temporarily holds a data group for the procedure of renegotiating billing conditions for the user host MH in question. The service provider node XSPN-1 dynamically creates a service change screen for the user, referring to the data group. This processing is the same as the processing performed on receiving a billing condition matching reply from the billing control node BCN. In order to present the billing conditions to the user, the service provider node XSPN-1 returns an approval screen generated by CGI or other means.

(3) MH selects conditions, and notifies the service provider node XSPN-1.

(4) The service provider node XSPN-1 notifies the billing control node BCN of the changed billing conditions, and the billing control node BCN updates the billing condition data stored in the billing condition registration table. The billing engine control function unit BECF of the edge node EN-1 detects the notification message sent to the billing control node BCN, and performs full registration of the billing condition identifier, according to the new billing conditions.

(5) Then, the service provider node XSPN-1 notifies the billing engine BEN of the new billing conditions, and provides service to the user host MH according to the new billing conditions. Also, the billing engine BEN performs billing according to the new billing conditions.

(m) Control of Movement Among a Plurality of XSPs

In a business model in which various content and services are provided over a network, in addition to the basic configuration in which a single server provides one service, there are also business models in which content divided among a plurality of servers, for example in region units, is provided, with the server group providing a single service. A specific example is a service to deliver geographical information over a network. As a mode for providing this type of service, service provider nodes XSPN distributed in different regions may be managed centrally by a single billing control node BCN. The reason for taking this form is that the size of the maps and other content data is generally expected to be large compared with the size of billing control messages. Consequently it is desirable that maps and other content with large data sizes be distributed in servers which are always close to the user host MH, to improve the speed of response and alleviate the burden on network traffic and the content servers.

Figure 82:
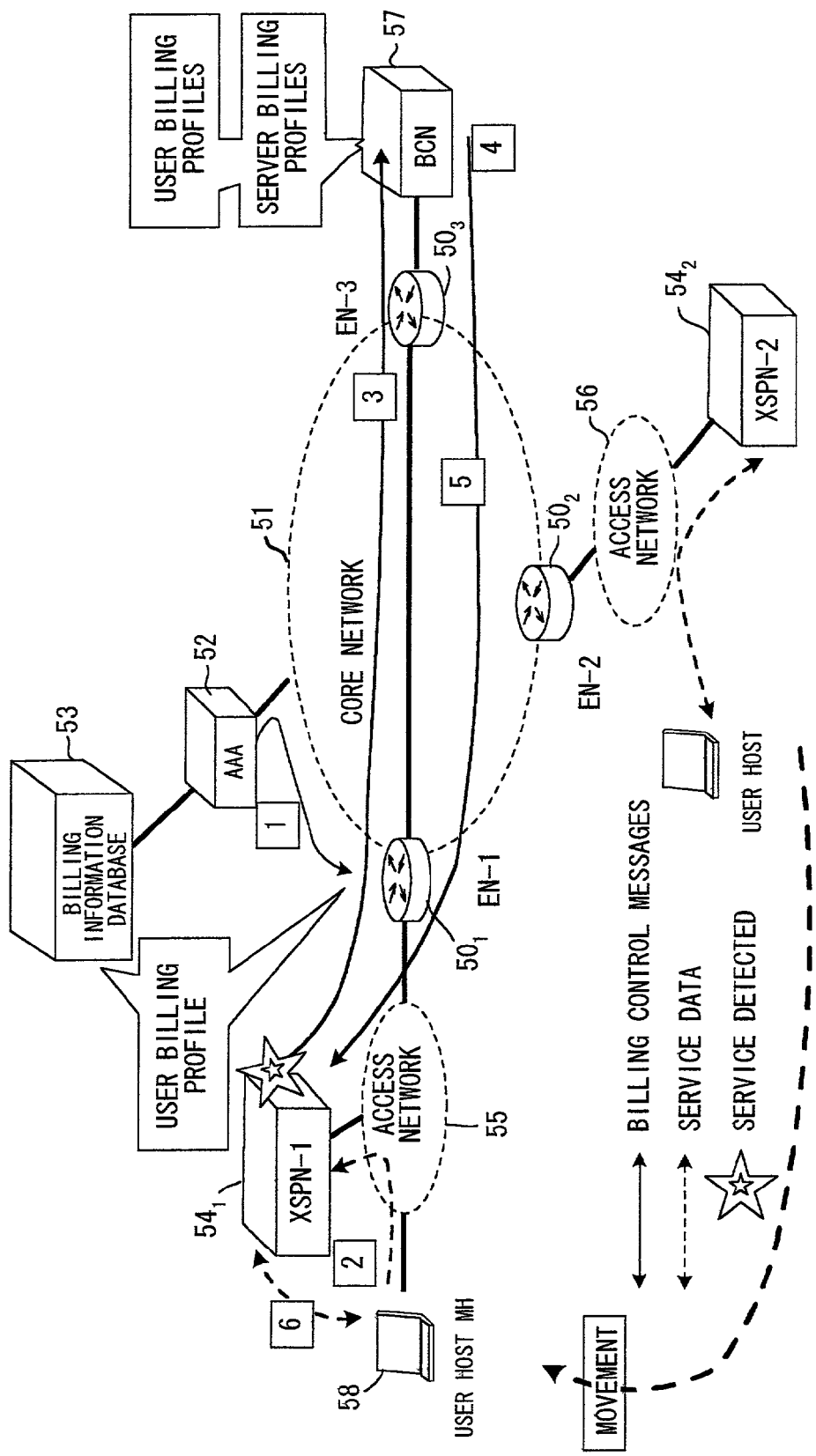
FIG. 82 is a figure explaining the setting of billing conditions when the same user continuously receives the same service from a plurality of service provision nodes XSPN according to [terminal] movement.
Figure 83:
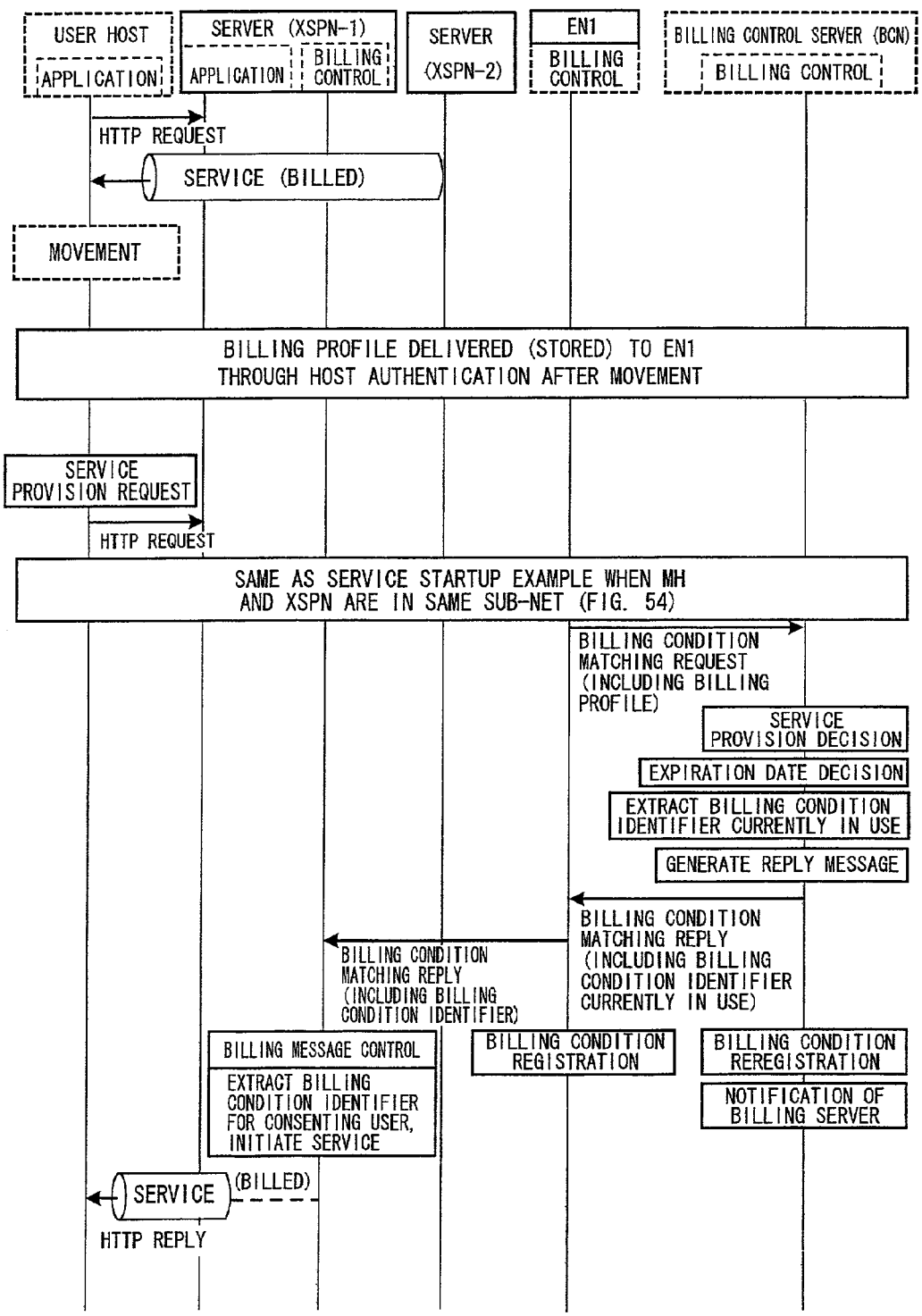
FIG. 83 shows a procedure for setting billing conditions when the same user continuously receives the same service from a plurality of service provision nodes XSPN according to [terminal] movement.

FIG. 82 explains billing condition setting when a single user continuously receives the same service from a plurality of service provider nodes XSPN-1, XSPN-2 according to the [user] movement; FIG. 83 shows the procedure for setting billing conditions. Taking as an example a service mode in which a single service is provided by a plurality of service provider nodes XSPN, the purpose of this billing condition setting procedure is so that, when the user host MH moves from under the control of the service provider node XSPN-2 which first finalized the billing conditions to another sub-network, and receives the same service from the service provider node XSPN-1 belonging to the destination sub-net, the billing conditions agreed to by the first service provider node XSPN-2 can be applied even at the service provider node XSPN-1 of the destination (without passing through normal billing condition negotiations).

(1) When the user host MH moves from a sub-network 56 [in which] it had been receiving a fee-based service to another sub-network 55, the network connection procedure (cf. FIG. 49) is started. When the AAA server 52 succeeds in host authentication, the user host MH billing profile is attached to the authentication reply, which is sent to the edge node EN-1, and this edge node EN-1 stores the billing profile for the user host MH. At the same time, the edge node EN-1 records the IP address obtained by the user host MH in the billing profile which it maintains.

(2) Then, the user host MH accesses, using an URL or similar, the service provider node XSPN-1 providing the same service as before the move within the destination sub-net 55, either through user operation, or through automatic processing by the application.

(3) The service provider node XSPN-1 that has been accessed sends a billing condition matching request to the linked billing control node BCN, according to the procedure shown in FIGS. 52 and 54. This operation is the same as when first accessing the service provider node XSPN-1.

(4) On receiving the billing condition matching request, the billing control node BCN references the billing condition registration table, and recognizes that the user host MH has already negotiated billing conditions for the service in question with a service provider node XSPN-2 existing in another sub-network. In this case, if the billing session has not reached the expiration date, the billing conditions already held within the billing control node BCN are used. Hence in this case, billing condition matching processing is not started.

(5) The billing control node BCN includes the billing conditions on which agreement with the previous service provider node XSPN-2 has already been reached in a message which is a reply to the above billing condition matching request message, and sends this to the new service provider node XSPN-1. At the same time, the billing control node BCN overwrites the XSPN identification information contained in the billing information registered in the billing condition registration table with the identification information of the new service provider node XSPN-1.

(6) On receiving the reply message, the new service provider node XSPN-1 omits the procedure to confirm billing conditions for normal user hosts, and initiates the provision of service under the billing conditions in question. Also, the new service provider node XSPN-1 or the billing control node BCN notifies the new billing engine of the billing conditions, and causes it to perform billing.

From the above, even when the IPv6 address changes due to terminal movement, by having the billing control node BCN perform central management of session information for the terminal, session information can be maintained even when the terminal moves to another edge node and the IP address changes. Moreover, because billing sessions within the network are managed centrally, this method is suitable for ensuring ease of introduction and for providing a single service using a plurality of servers.

(n) Changes in Billing Conditions from the Network Side

There are cases in which, during provision of service under billing conditions to which the user host MH and service provider node XSPN have agreed, billing conditions are changed from the network side as a result of the operation policy of the service provider (XSPN, BCN). Specifically, in some cases billing conditions may change depending on the time of day.

The above change request is initiated not by the user host MH or by the service provider node XSPN, but by the billing control node BCN. The billing control node BCN holds billing conditions (the billing profiles) for the service already being provided; in cases where these conditions include times or other parameters, changes in billing conditions with the time of day are detected, and the billing conditions changed.

Figure 84:
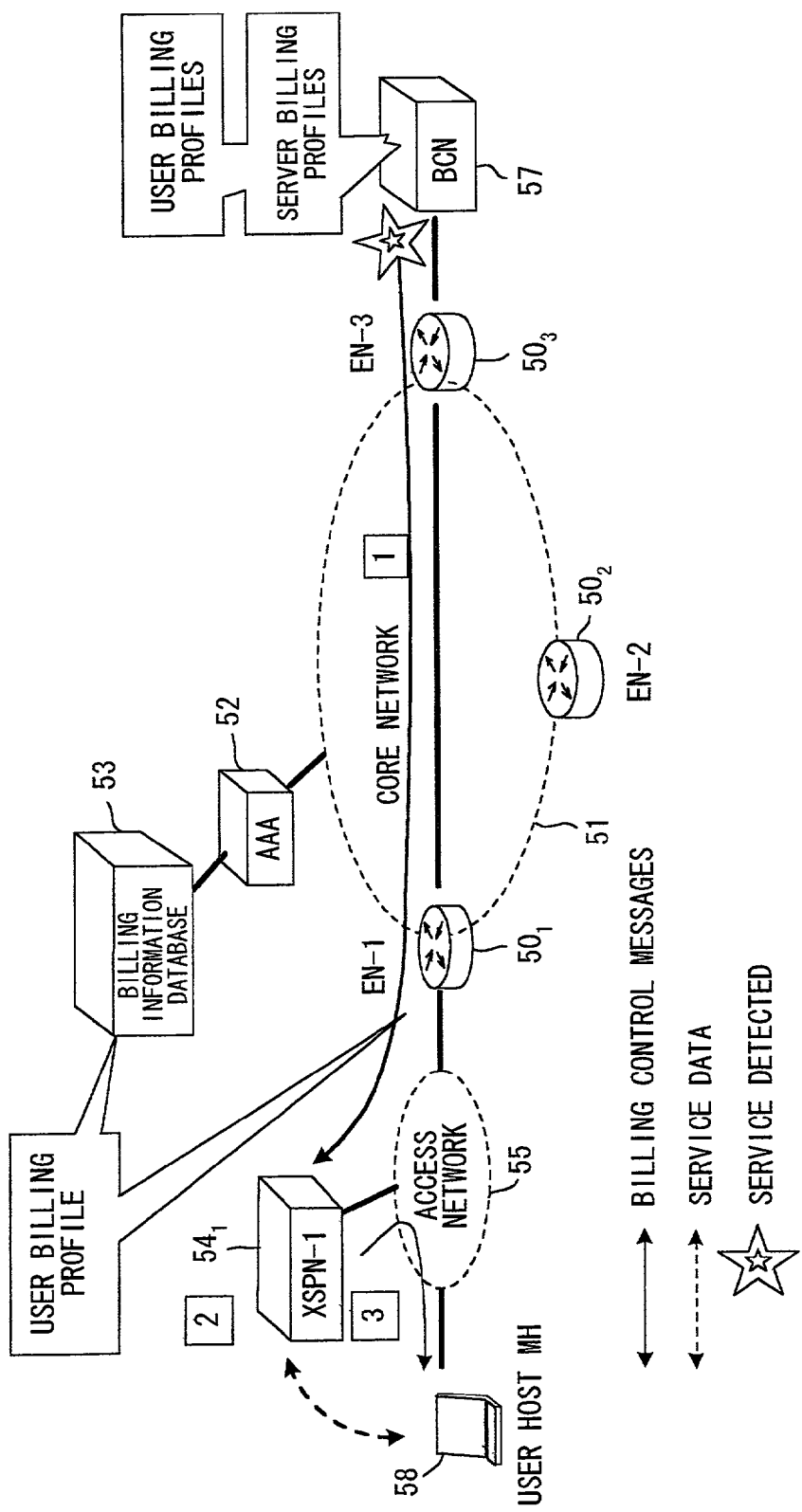
FIG. 84 is a figure explaining changes in billing conditions from the network side.
Figure 85:
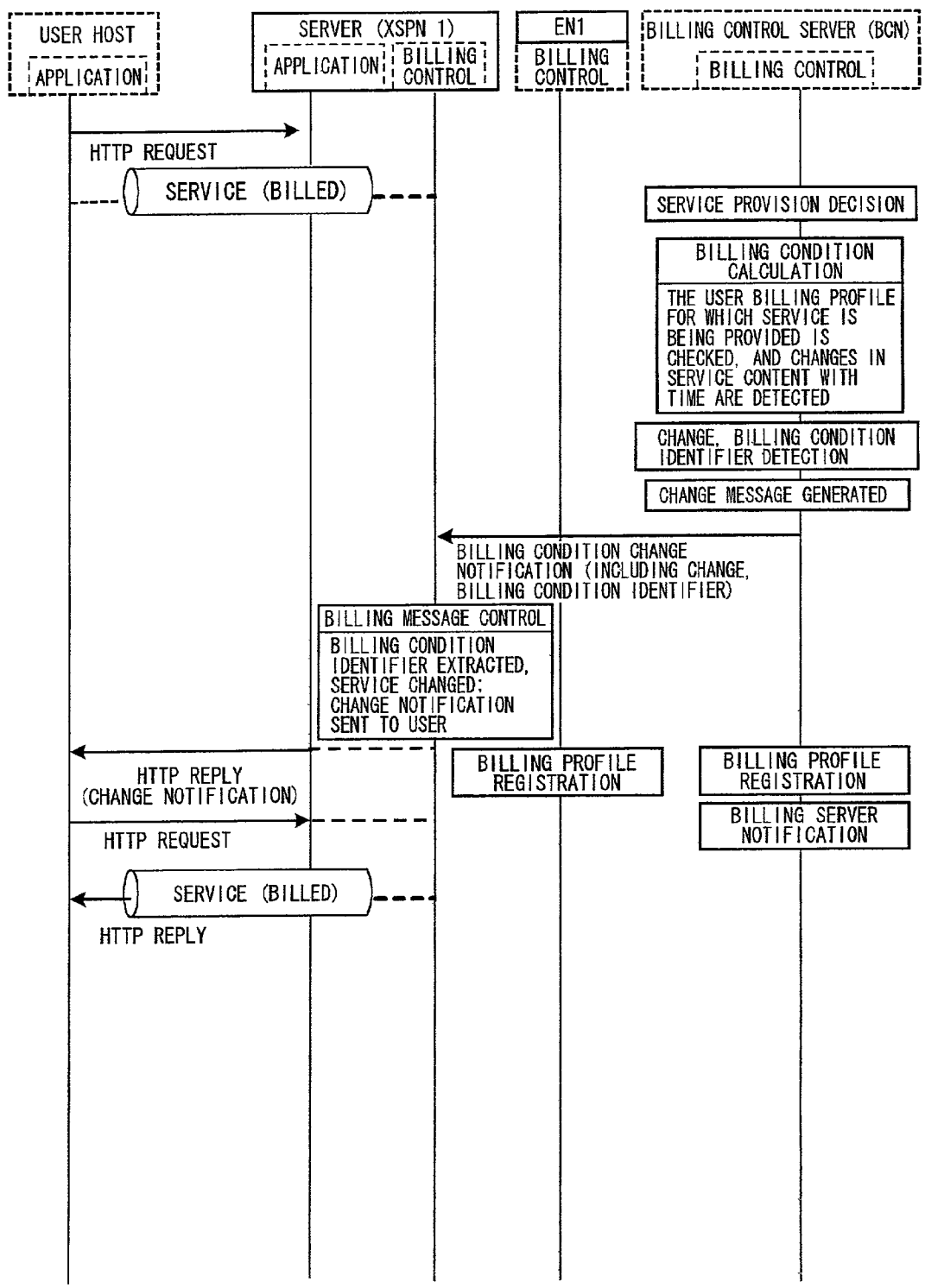
FIG. 85 shows a procedure for setting billing conditions when billing conditions are changed from the network side.

FIG. 84 explains changes in billing conditions from the network side; FIG. 85 shows the procedure for billing condition changes.

(1) In cases where billing conditions for billing conditions held by the billing condition node BCN change depending on the time of day or similar, so that changes become necessary, the billing control node BCN autonomously recalculates the billing conditions for the user host MH, creates a service condition change request message, and sends this message to the service provider node XSPN-1.

(2) On receiving the service condition change request message, the service provider node XSPN-1 notifies the user host MH of the billing condition change by means of an http request packet, and on receiving an approval http request packet from the user host, subsequently provides service according to the new billing conditions.

(3) Prior to service provision, the billing control node BCN or service provider node XSPN notifies the billing engine within the edge node EN-1 of billing conditions after the change, and the billing engine performs billing according to the new billing conditions of the notification.

This function enables dynamic changes to conditions to reflect time-related or other conditions. In the first billing technology based on IPv4/Mobile IP, the billing condition identifier which is the key to billing conditions must be sent to the terminal, and so this becomes a constraint on network processing. In the second billing technology based on IPv6, the range of distribution of the billing condition identifier is only within the core network, so that operation under a lighter load is possible.

(o) Sending of Finalized Billing Conditions to the Billing Engine

Billing conditions are generated by the billing control node BCN and transmitted to the service provider node XSPN. The ultimate use of the billing conditions is transmission to billing engines BEN (with functions for monitoring packet flow and other network resources) deployed within the network, for referencing and interpretation as parameters during billing, so that billing operations can be performed. In order to send billing conditions to a billing engine BEN, the various units must have the following functions.

(1) The billing control node (service provider) BCN can specify the billing engine which can be used, as one parameter of the provided billing means, through contract with the network operator (carrier).

(2) Billing condition data generated by the billing control node BCN is transmitted to the service provider node XSPN providing services to the user host MH, by means of a billing condition matching reply message.

(3) The service provider node XSPN references the billing engine ID from the billing condition data contained in the billing condition matching reply message, and recognizes the billing point in the network for the service in question.

(4) When billing conditions are determined through negotiations with the user host MH, the service provider node XSPN sends a "billing condition notification message", which is a message containing the determined billing condition data, addressed to the billing engine specified by the above billing engine ID.

(5) On receiving the billing condition notification message, the billing engine control function unit BECF sets the billing condition data in the billing engine BEN, so that the billing engine BEN can subsequently count the number of times packets to be billed pass through.

Figure 87:
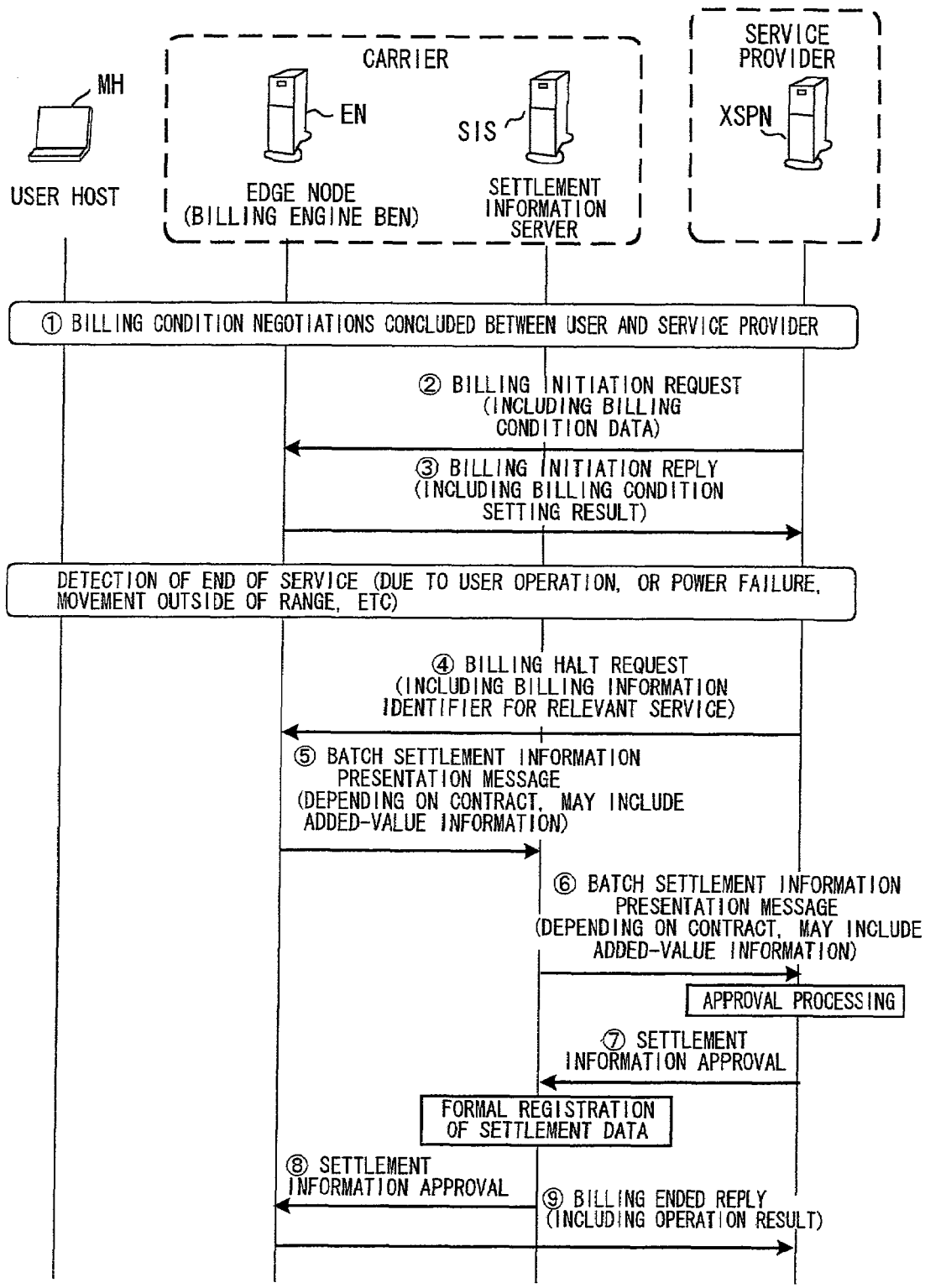
FIG. 87 shows a procedure for sending billing condition data to a billing engine.

FIG. 86 is an example of messages used to realize the above functions; FIG. 87 shows the procedure for sending billing condition data to the billing engine BEN. In FIG. 87, a summary of the procedure for proxy billing by the carrier is indicated after the billing condition data sending procedure. That is, in order for the carrier to perform proxy billing, a settlement information server SIS is introduced; a procedure is indicated in which the settlement information server SIS accumulates and organizes billing data collected by billing engines, and calculation of the amount by which the user is to be billed is performed. In FIG. 86, in addition to the messages [1] through [4] exchanged between the billing engine BEN and the service provider node XSPN, there are also the messages [5] and [6] the path of which is billing engine BEN→settlement information server SIS→service provider node XSPN, and the message [7] the path of which is service provider node XSPN→settlement information server SIS→billing engine BEN.

(1) It is assumed that billing condition negotiations between the user host MH and service provider node XSPN are completed, and that the service provider node XSPN providing the service in question holds the billing conditions.

(2) The billing condition data held by the service provider node XSPN is sent to the billing engine BEN (existing within an edge node EN) responsible for billing, by means of a billing initiation request message.

(3) On receiving the billing initiation request message, the billing engine sets the billing condition data, and returns a billing initiation reply message to the service provider node XSPN, and also initiates billing operations.

(4) During billed service execution, if due to a user host operation or for some other reason an interruption in billing operations is recognized, the service provider node XSPN sends a billing halt request message to the billing engine.

(5) On receiving the billing halt request message, the billing engine BEN sends a batch settlement information presentation message or a serial settlement information presentation message, in order to send billing data collected up till that time to the settlement information server SIS.

(6) On receiving a batch settlement information presentation message, the settlement information server SIS provisionally registers the received billing information, forwards it to the service provider node XSPN, and orders approval.

(7) In reply to the above order for approval, the service provider node XSPN performs content verification, and returns to the settlement information server SIS a reply message which includes the settlement approval result.

(8) If the settlement information server SIS receives a normal approval reply, the billing data that was provisionally registered in (6) is formally registered, and then the reply message, containing the registration result, is forwarded to the billing engine BEN.

(9) After confirming approval by means of the reply message, the billing engine BEN responds to the service provider node XSPN with a billing halt reply message which contains this result.

(p) Linking of Billing Information Collection by user and the Billing Engine

The linking of the billing engine BEN in which billing conditions are set, and the network operator's proxy billing system is explained. That is, the linking procedure in which billing data collected by the billing engine BEN is sent to the settlement information server SIS which manages proxy billing information is explained. The following three conditions are assumed.

First assumed condition: The billing engine is deployed at a position within the core network of the network operator performing proxy billing, on a path on which billed packets are transferred, so that these packets can be captured. As an example of a deployment position, any place on the above-mentioned path may be selected, but with the purpose of monitoring the quality of service provided to the end user, positioning within the edge node EN accommodating the end user is expected to be most common.

Second assumed condition: Using the messages of FIG. 86, the billing condition data agreed upon between the user host MH and service provider node XSPN is sent to and set in the billing engine BEN. Subsequently, the billing engine observes and counts billed packets.

Third assumed condition: When the network operator performs proxy billing, a settlement information server SIS (cf. FIG. 87) is introduced which accumulates and arranges billing data collected by the billing engine BEN, and calculates the amount by which the user is to be billed. The settlement information server SIS has an interface with the billing engine (refer to the three messages [5] to [7] in FIG. 86).

(p-1) Billing Condition Collection/Management in the Billing Engine

Figure 88:
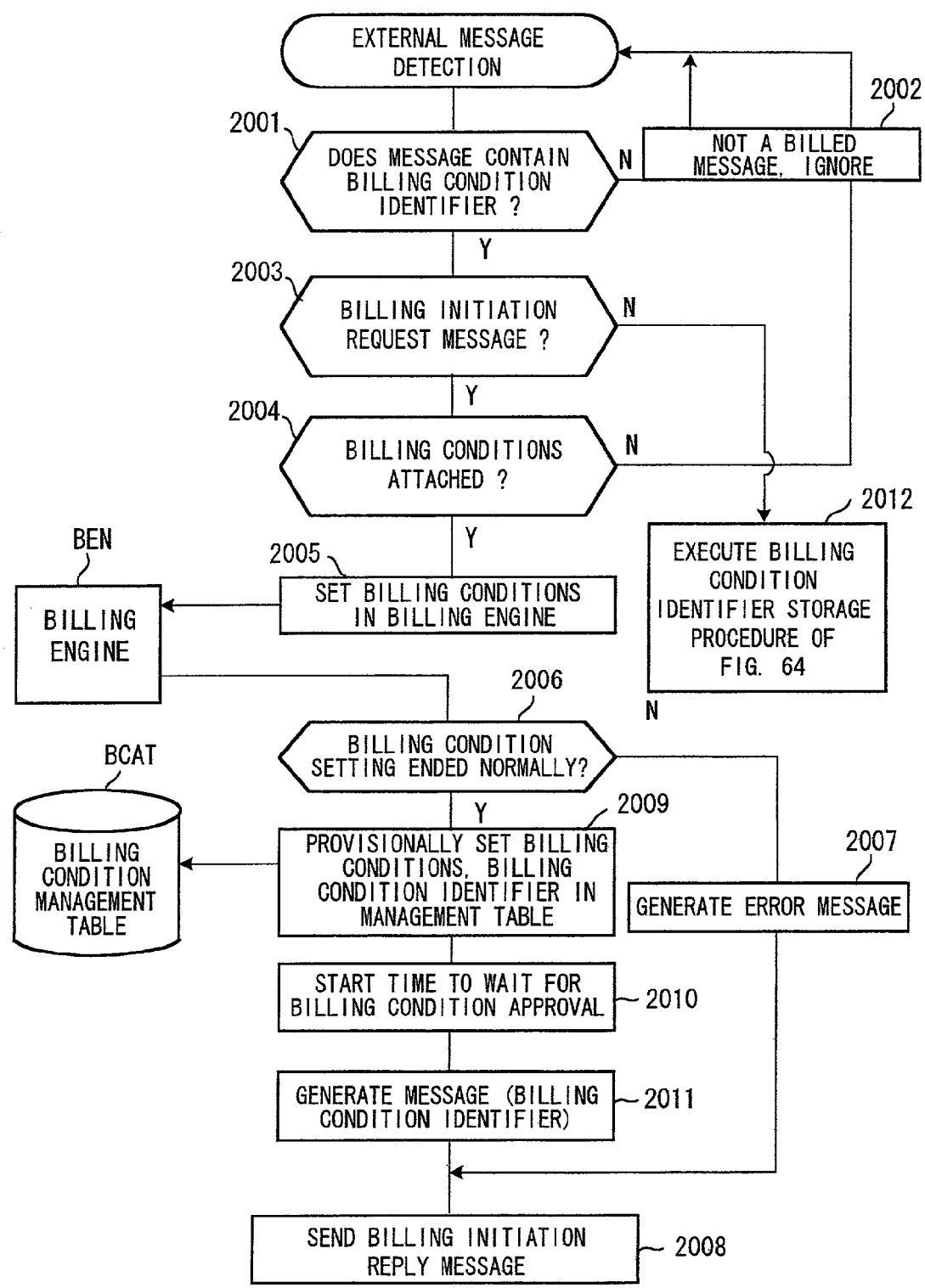
FIG. 88 shows the flow processing for billing condition collection/management of a billing engine control function portion in an edge node EN.

In this invention, billing conditions being collected are held and managed by the billing engine BEN control function unit BECF which controls the billing engine, without involving the structure of the billing engine itself. Billing condition data collected by the billing engine control function unit BECF is held within the billing condition management table BCAT (FIG. 88). This table is managed based on identifiers (NAI) in contracting party or user units.

FIG. 88 shows the flow of processing for billing condition collection/management by the billing engine control function unit BECF in an edge node EN.

The billing engine control function unit BECF of the edge node EN checks whether the received message contains a billing condition identifier (step 2001), and if an identifier is not present, ignores the message as not for billing (step 2002) and awaits reception of the next message.

If a billing condition identifier is contained [in the message], a check is performed to determine whether the received message is a billing initiation request message (cf. [2] in FIG. 87) (step 2003). If a billing initiation request message is received, it is judged that the service provider node XSPN has attached billing conditions and a billing condition identifier to this message before sending.

If the message is a billing initiation request message, it is checked for inclusion of billing conditions (step 2004); if billing conditions are not included, it is ignored as not a message for billing (step 2002), and reception of the next message is awaited.

If the message contains billing conditions, the billing conditions are set in the billing engine BEN (step 2005). Then, monitoring of the normal completion of billing condition setting is performed (step 2006), and if setting in the billing engine BEN fails, billing is not possible, and an error message is created (step 2007); this is included in a billing initiation reply message (cf. [3] in FIG. 87), which is sent to the service provider node XSPN (step 2008).

On the other hand, if setting in BEN is completed normally, the billing engine control function unit BECF appends the billing conditions, billing condition identifier and similar to the billing condition management table BCAT (step 2009). At this time, the registration state is set to "provisional registration".

When registration in the billing condition management table BCAT is completed normally, the billing engine control function unit starts a timer indicating the expiration date for the entry in question, and begins subtraction (step 2010). The purpose of this timer is to provide an expiration date for the billing conditions which have been provisionally set; the terminal user's consent to the service billing conditions is awaited for a fixed length of time. If, during the timer interval, no information indicating consent by the host user to the billing conditions arrives, the billing condition entry is autonomously deleted.

Then, the billing engine control function unit BECF includes the billing condition identifier in a billing initiation reply message (cf. [3] in FIG. 87), and sends this to the service provider node XSPN (steps 2011, 2008).

In step 2003, if the message is not a billing initiation request message, the billing condition identifier storage procedure of FIG. 74 is executed (step 2012).

(p-2) Transmission of Billing Condition Data from the Billing Engine to the Settlement Information Server The billing engine BEN performs counting in user and application units, according to the billing conditions set as described above. The billing engine BEN sends the collected data (for example, number of packets) as billing data to the settlement information server SIS when the billing session (fee-based service) ends, or when sending of billing data is requested during a continuing billing session. The lowest-level information which can be collected by the billing engine is the number of packets which have passed through; in addition to this, there are the number of packets passing through per unit time, and the number of packets passing through per unit session.

There are two types of timing for transmission of billing data collected by the billing engine BEN to the settlement information server SIS: batch transmission and serial transmission.

In the batch transmission method, after the end of a billing session, data is sent all at once from the billing engine BEN to the settlement information server SIS; the billing information is attached to a billing operation end reply message (batch settlement information presentation message).

In the serial transmission method, in order to present the user with billing information at fixed intervals, billing information collected over each fixed interval within an unexpired billing session is sent to the settlement information server SIS. The billing information is attached to an interim billing information transmission message (serial settlement information presentation message).

The information elements contained in batch settlement information presentation messages and in serial settlement information presentation messages are the same, and are as follows.

(1) Billing data proper: Billing data collected by the billing engine by the time of transmission (2) Added-value data: General-purpose data fields added in order to present added-value information (service quality feedback, or similar) from the network operator to the service provider node XSP, depending on contract conditions (3) Continuation identifier: This is set to either "last" or "continued"

In the case of a batch settlement information presentation message, or when in a serial settlement information presentation message the billing information is the last such information, this is set to "last"; in a serial settlement information presentation message which is not the last, this is set to "continued".

Figure 89:
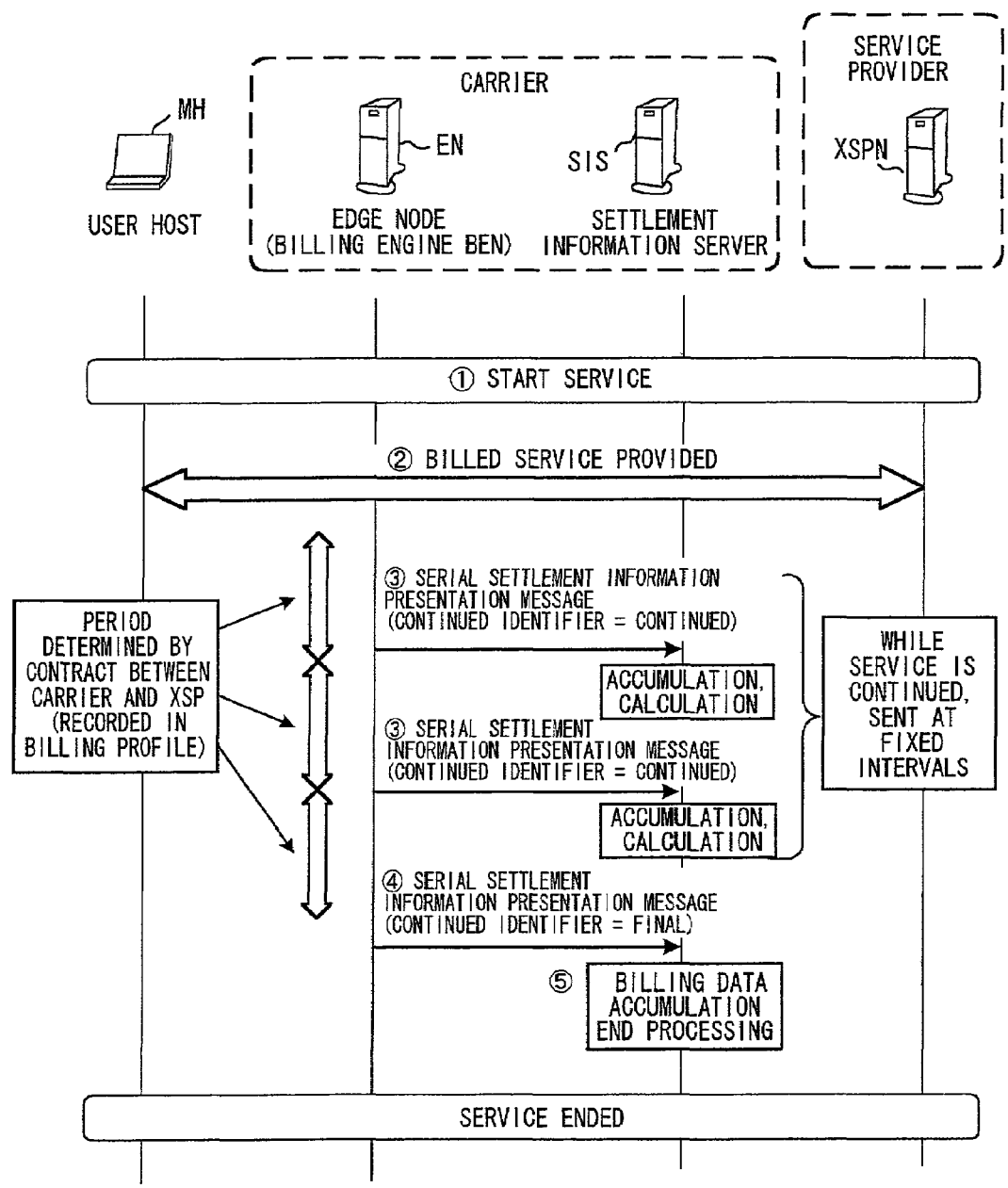
FIG. 89 is a figure explaining a settlement procedure.

FIG. 89 explains the settlement procedure. As an assumed condition, the method of transmission of billing data to the settlement information server SIS is the serial transmission method, and as the settlement method, the complete proxy billing method (described below) is used.

(1) Service is initiated according to the determined billing conditions.

(2) The billing engine control function unit BECF detects the method of transmission to the settlement information server SIS from the billing condition data. When the transmission method is the batch settlement information presentation method, the end of service is awaited, and billing data is then sent.

(3) When the transmission method is the serial settlement information presentation method, billing data is sent to the settlement information server SIS continuously until the end of service, based on the transmission period contained in the billing condition data.

(4) If the billing engine BEN detects the end of service, the last billing data is sent to the settlement information server SIS.

(5) If the last billing data is received, the settlement information server SIS performs proxy billing processing based on whether or not confirmation is required by the service provider node XSPN.

(p-3) Exchange of Settlement Information between the Service Provider Node XSPN and the Network Operator In carrier proxy billing, the service provider node XSPN provides the service, but is not involved in fee counting. The carrier, through the billing engine BEN, totals the billing data for each user, and based on this information bills the user for services. Specifically, in addition to a monthly basic communication fee, the user is billed for additional usage fees for the provision of the billed service.

The contract form for such carrier proxy billing operations can in essence be classified into two types: a complete proxy billing method, and an individual approval billing method.

In the complete proxy billing method, accumulation and calculation of billing information in service (billing session) units is all entrusted to the network operator, and the service provider node XSPN is not involved in settlements for individual services. However, the service provider node (service provider) XSPN can reference the settlement information of its company. In the complete proxy billing method, settlement data is exchanged at fixed intervals agreed on in advance by the service provider node XSPN and the network operator; for example, settlement data might be exchanged once each month. The complete proxy billing method is appropriate for comparatively simple services accompanied by assurance of the service provider node XSPN of service quality; a contract mode is possible in which only essential functions are provided in a basic billing proxy plan.

In the individual approval billing method, the network operator presents the service provider node XSPN with billing data at the end of each service (billing session), and awaits approval and a billing order for the billing data from the service provider node XSPN. When the service provider node XSPN approves this billing data, and this is confirmed by the network operator, the settlement information server SIS registers this as settlement information. The individual approval billing method is suitable for the following two applications. In the first application, in addition to referencing/confirming billing data, the service provider node XSPN als receives service quality data (for example, various QoS data) measured in the billing session in question, and employs this as feedback data for service operation and provision. In the second application, billing data received by the service provider node XSPN is employed in interaction with the user (for fee confirmation or similar). Contract types are possible as premium billing proxy plans in which value-added information is fed back to the XSP.

Figure 90:
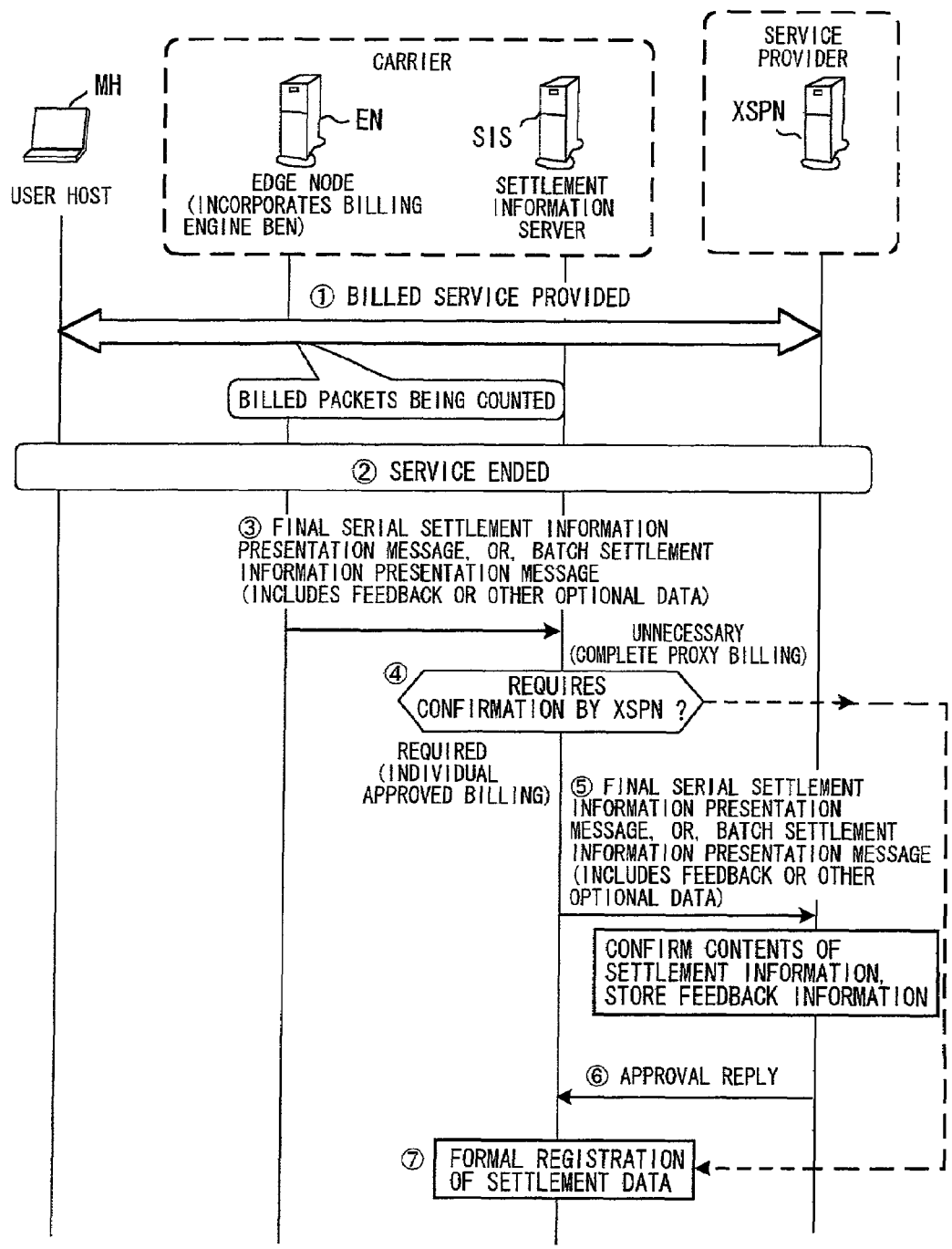
FIG. 90 is a figure explaining a procedure to exchange settlement information between a billing proxy carrier and a service provider.
Figure 91:
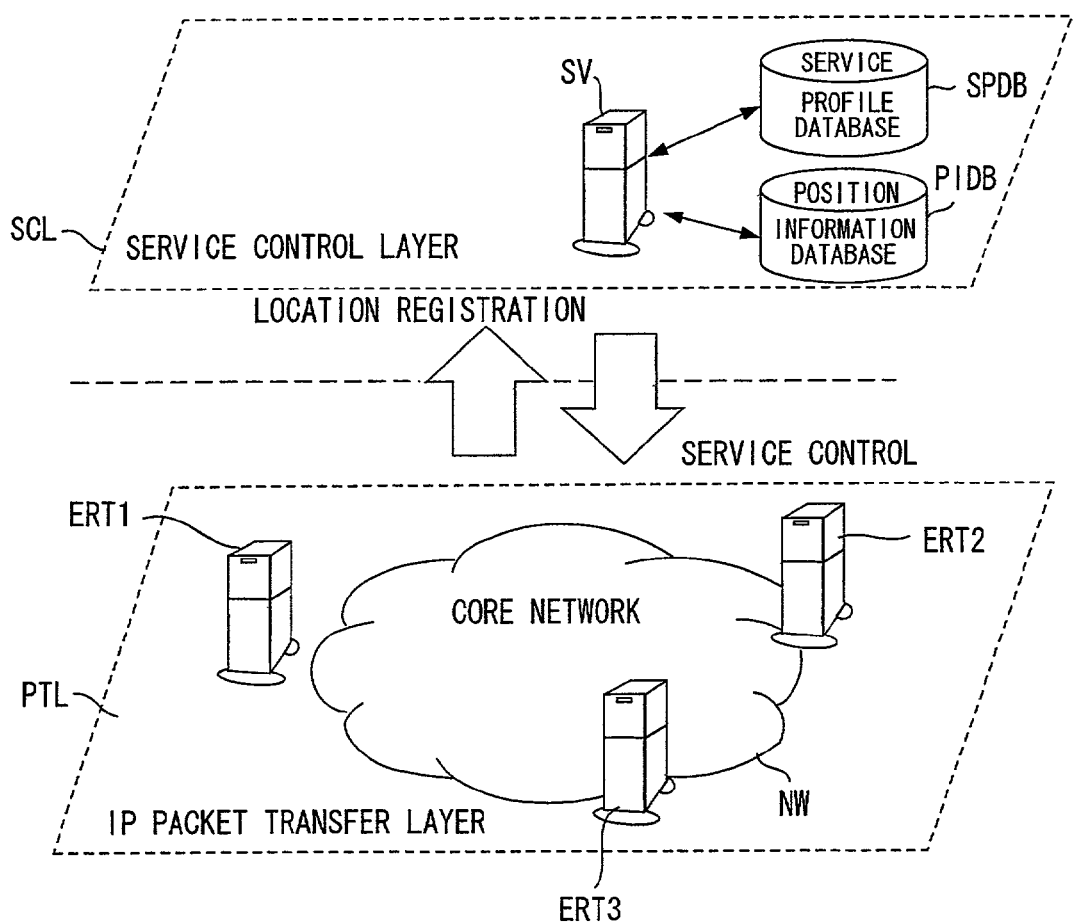
FIG. 91 is a figure explaining the layer structure of the integrated IP service control architecture.
Figure 92:
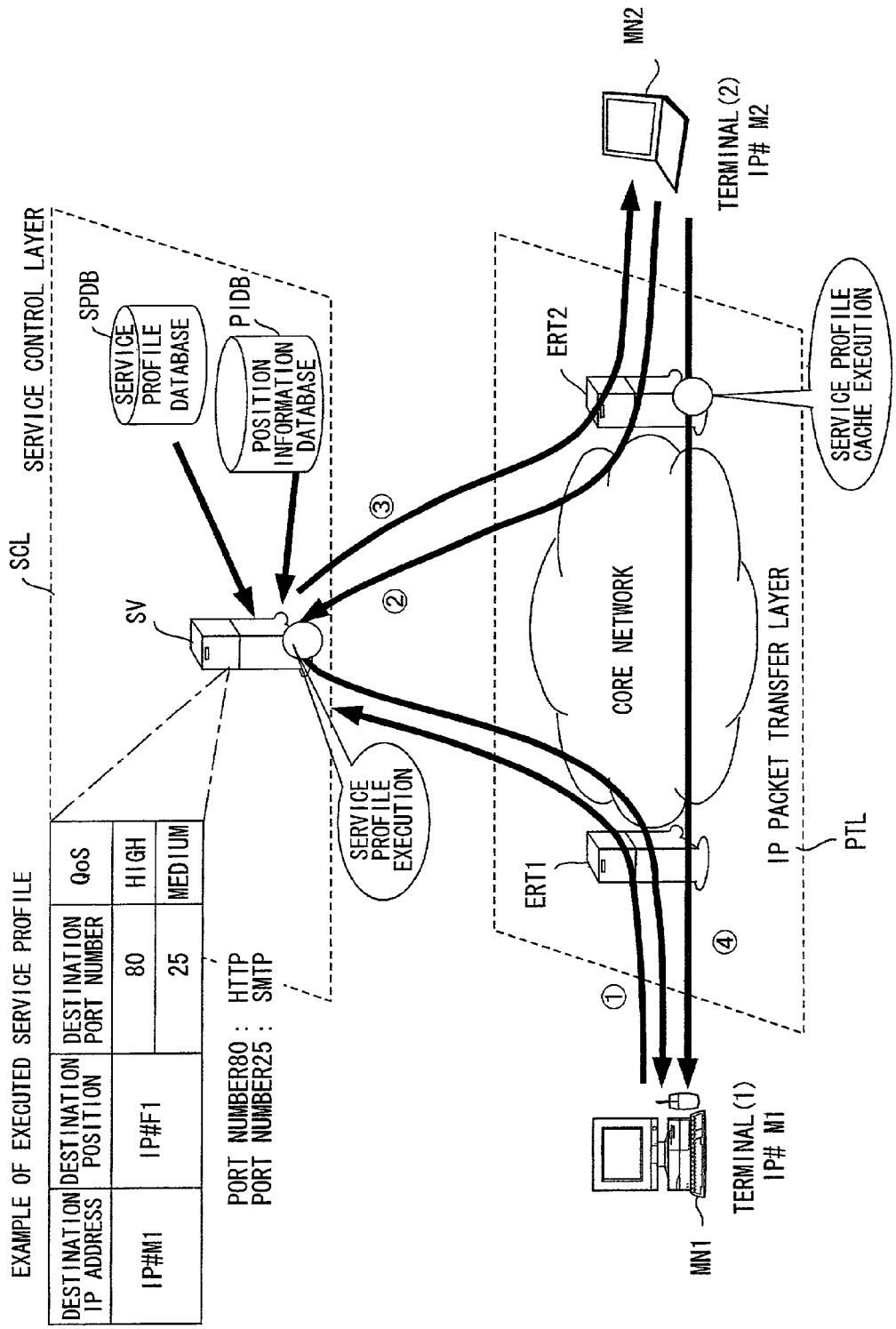
FIG. 92 is a figure explaining the service control method of the integrated IP service control architecture.
Figure 93:
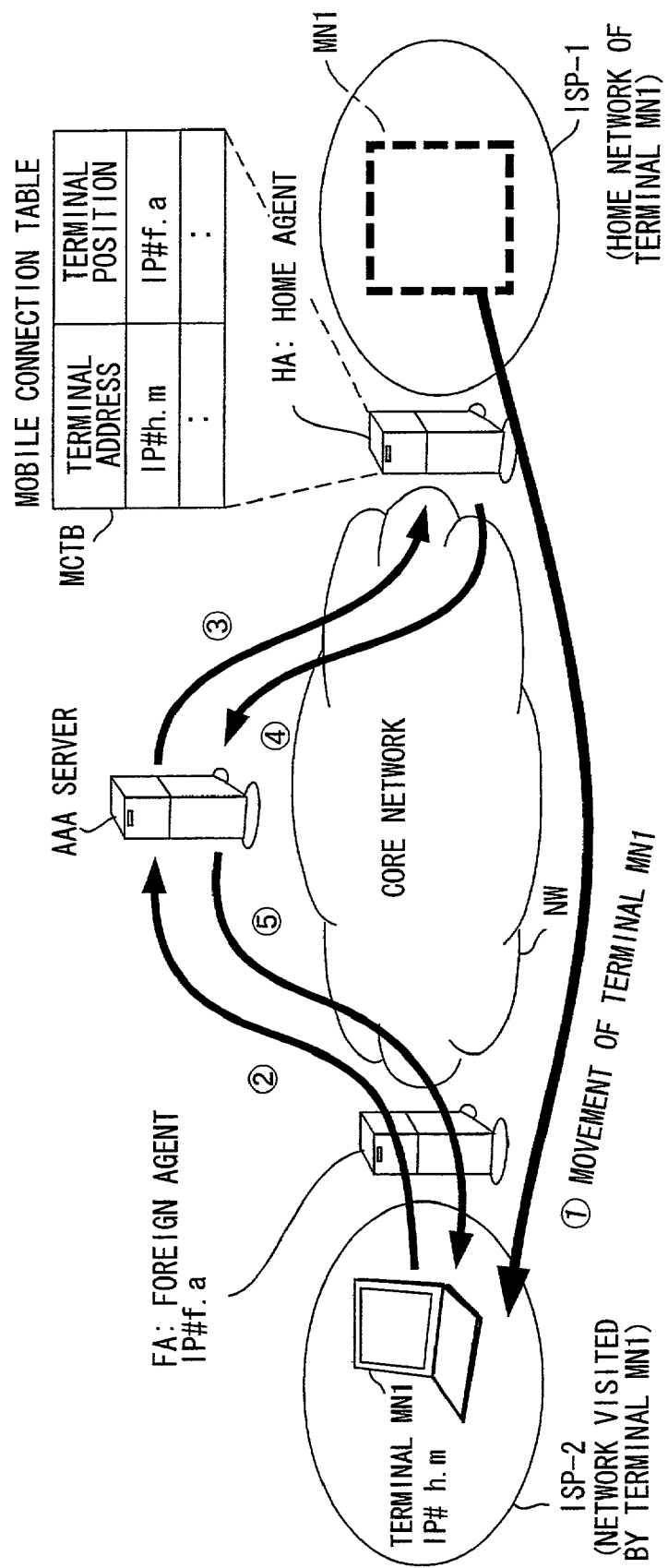
FIG. 93 is a figure explaining the principle of Mobile IP.
Figure 94:
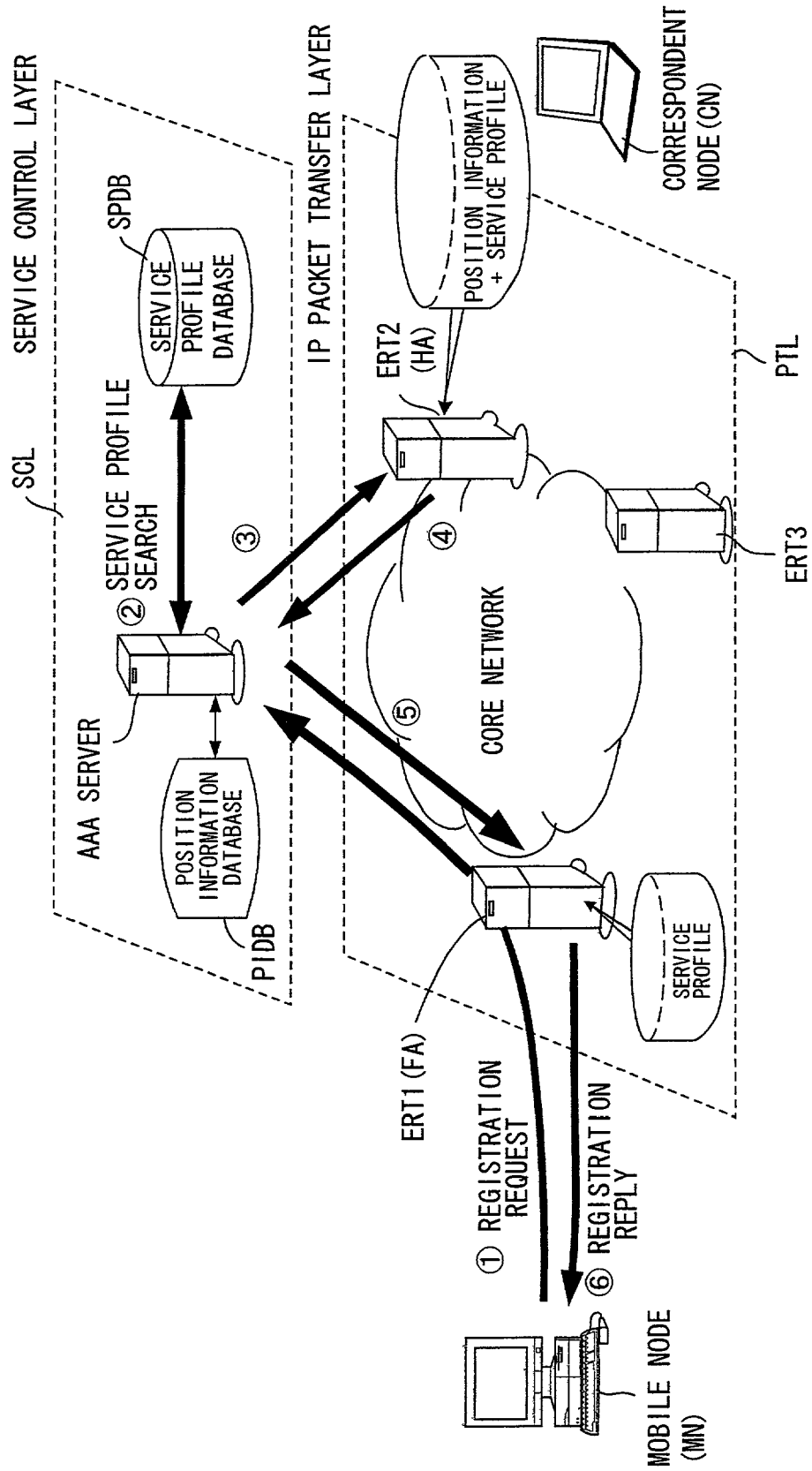
FIG. 94 is a figure explaining an example of application to Mobile IP (service profile distribution procedure); and, FIG. 95 is a figure explaining an example of application to Mobile IP (service execution procedure).
Figure 95:
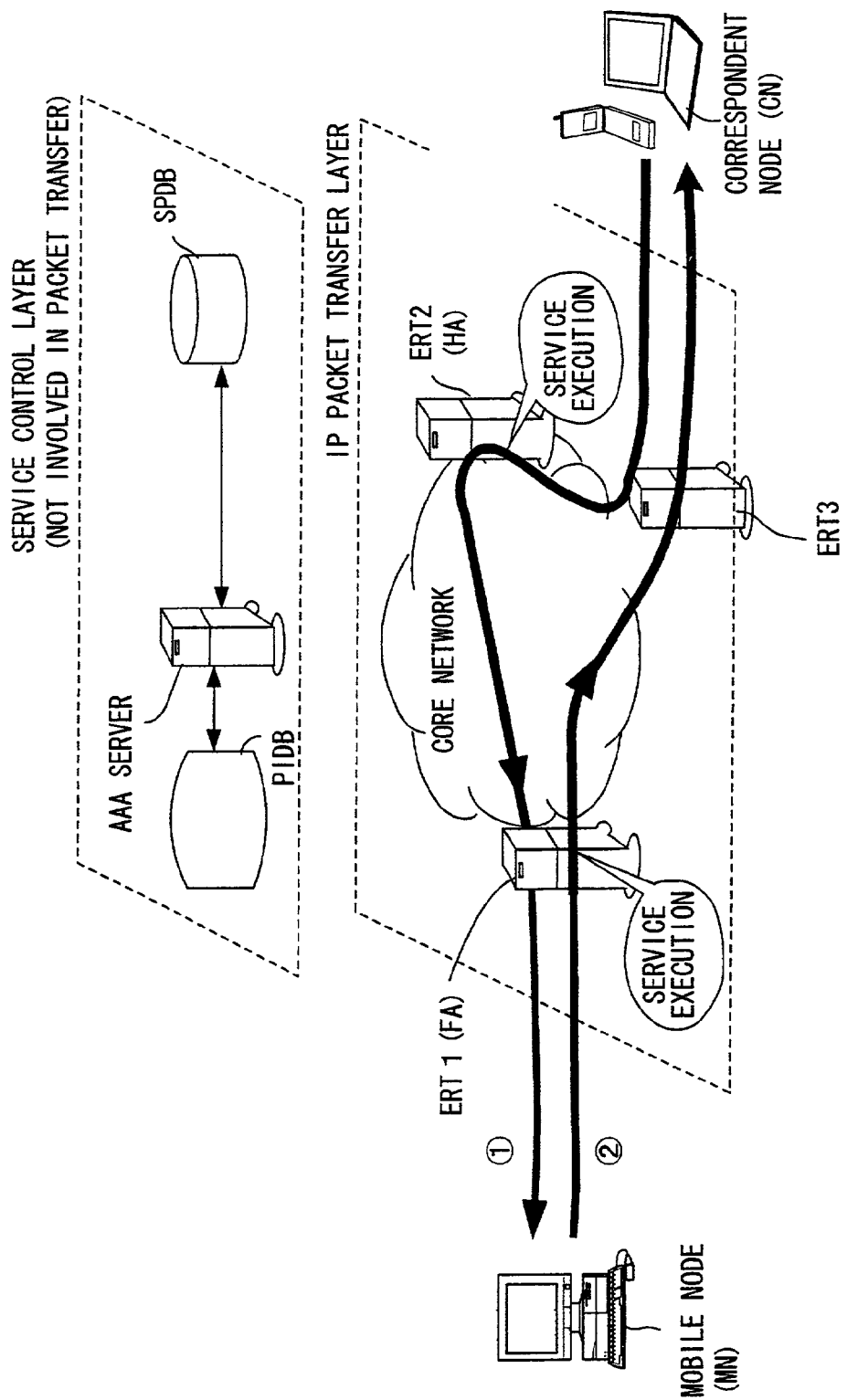

In order for the carrier to perform proxy billing, settlement information must be exchanged between the service provider node XSPN and the network operator. FIG. 90 explains the procedure for exchange of settlement information between the billing proxy network operator and the service provider. The method for transmission of billing data to the settlement information server SIS is assumed to be the batch transmission method, in which data is transmitted in a batch after the end of the billing session; the settlement method is assumed to be the individual approval billing method, in which billing data requires the approval of the service provider node.

(1) It is assumed that billed service is provided by the service provider node XSPN to the user host MH. The billing conditions have already been set in the billing engine BEN (incorporated in the edge node EN) through a billing condition negotiation procedure, and the billing engine performs billing according to these billing conditions.

(2) The billed service ends. This ending may be due to an explicit interruption request from the user, or due to user host MH power interruption (a power failure or similar) during the provision of service, or movement outside the range of service provision, or for some other reason not intended by the user. As a result of the end of service, the billing engine BEN receives a billing halt request message from the service provider node XSPN.

(3) The billing engine BEN sends collected billing data to the settlement information server SIS managed by the network operator. At this time, if the proxy billing contract between the service provider node XSPN and the network operator calls for individual approval billing, added-value information (quality data or similar) is also sent.

(4) The settlement information server SIS receives the billing data, and stores this in the form of provisional registration. Then, the settlement information server SIS checks whether the proxy billing contract conditions (settlement method) is the complete proxy billing method, or the individual approval billing method. If it is the complete proxy billing method, the provisionally registered billing data is formally registered.

(5) If on the other hand it is the individual approval billing method, the settlement information server SIS sends the billing data and added-value information data to the service provider node XSPN, and awaits a reply.

(6) On receiving the above billing data from the settlement information server SIS, the service provider node XSPN checks the contents of the received billing data, and if there are no problems, returns an approval reply to the settlement information server SIS. However, as an option the billing data may be presented to the user, and after receiving a reply consenting to this, the service provider node may return an approval reply to the settlement information server SIS.

(7) The settlement information server SIS receives a reply approving the billing data from the service provider node XSPN, and formally registers this billing data. That is, the billed amount for this data is added to the sum total for the user in question.

Thus by means of the second billing technology of this invention based on IPv6, functions similar to those of the first billing technology based on IPv4/Mobile IP can be realized, and in addition the need to add functions to the network and to terminals can be eliminated.

Also, by means of the second billing technology of this invention based on IPv6, the path for transfer of billing control messages can be optimized compared with the billing control procedure of the first billing technology based on IPv4/Mobile IP.

Also, by means of the second billing technology of this invention based on IPv6, by separating the service provider-side equipment into a service provider node XSPN and a billing control node BCN, billing control can be performed which enables support for a service provision format in which a single service is provided by a plurality of distributed servers.

In the above, the first billing technology of this invention was explained for a network configuration based on IPv4/Mobile IP; however, application to billing in a network configuration based on similar protocols is also possible.

Also, the second billing technology of this invention was explained for a network configuration based on IPv6; however, application to billing in a network configuration based on similar protocols is also possible.

By means of the first billing technology of this invention based on IPv4/Mobile IP, by preparing permissible conditions with respect to billing for both the user and the service provider, and by comparing both permissible conditions upon initiation of service, billing conditions for the provided service can be generated dynamically, and billing according to these billing conditions can be performed.

In addition, by means of the first billing technology of this invention, proxy billing of a fee-based service can be performed by a billing unit within the network.

By means of the first billing technology of this invention, billing of a terminal can be supported even when the terminal (mobile node) moves. That is, even if handoff occurs due to terminal movement, the billing conditions generated dynamically by a procedure for negotiation between the user and service provider at the time of service initiation can be taken over, and continuation of service provision and billing can be supported.

By means of the first billing technology of this invention, the procedure for price negotiation/billing condition setting can be executed by utilizing the location registration procedure of mobile IP.

By means of the second billing technology of this invention based on IPv6, functions equivalent to those of the first billing technology can be realized, and moreover the need to add functions to the network and terminals can be eliminated.

By means of the second billing technology, the path for transmission of billing control messages is optimized compared with the billing control procedure of the first billing technology.

By means of the second billing technology of this invention, by separating the service provider-side equipment into a service provider node XSPN and a billing control node BCN, billing control can be performed even for a service provision method in which a single service is provided by a plurality of distributed servers.

Also, in the second billing technology of this invention, by having the service provider node XSPN or billing control node BCN directly acquire user billing profiles from the billing information database, the load on the edge node can be reduced.

As many apparently widely different embodiments of the present invention can be made without departing from the spirit and scope thereof, it is to be understood that the invention is not limited to the specific embodiments thereof except as defined in the appended claims.

What is claimed is:

1. A billing system, which performs processing to provide service via a network to user terminals, and performs billing for the service provided to the user terminals, comprising:

a service providing server having a server billing profile registration unit which stores one or more server billing profiles in which service information associated with fees is recorded, and a billing condition generation unit, which generates billing conditions to the service provided to the user terminals by comparing a user billing profile with the server billing profile;

a router accommodating the user terminals;

an authentication server which includes a user billing profile registration unit that holds the user billing profile for each service type and for each user terminal, and which executes terminal authentication processing based on an authentication request message received from the router at the time of location registration of the user terminal, and which, if service request information is included in the authentication request message, acquires the user billing profile corresponding to the user terminal in question and the service type from said user billing profile registration unit, and transfers the user billing profile to said billing condition generation unit;

a billing unit which executes billing processing for the service provided to the user terminal for each user terminal based on said generated billing conditions; and a billing condition setting unit, which sets said billing condition in the billing unit, wherein permissible conditions for user payment are recorded in said user billing profile and said billing condition generation unit determines billing conditions for the service to be provided at the time the user terminal sends a service execution request message, by comparing said user billing profile and said server billing profile.

2. The billing system according to claim 1, wherein said billing condition generation unit performs comparison of conditions stipulated by a user billing profile with conditions stipulated by a server billing profile, determines a server billing profile satisfying each of the conditions contained in the user billing profile, and based on this server billing profile, generates the billing conditions.

3. The billing system according to claim 2, wherein billing condition generated in advance for a request for a prescribed service is stored in said authentication server, and when there is a service request from a user terminal, the authentication server transfers stored billing conditions corresponding to the service request to said billing condition generation unit.

4. The billing system according to claim 1, wherein said user terminal includes means for sending a location registration message containing a service request to a network, causing the network to perform processing to generate billing conditions for each user terminal and for each requested service in parallel with the location processing procedure and to start up the billing unit, thereby generating billing conditions prior to service provision, and completing startup of the billing unit.

5. The billing system according to claim 1, wherein when said billing conditions are set by said billing condition setting unit, the billing unit monitors the arrival of packets matching the service details requested by the user terminal, and if such a packet arrives, initiates billing according to said billing conditions; and after billing condition setting, if said packets are not observed before a fixed length of time has elapsed, said billing condition setting unit cancels the billing condition settings.

6. A billing system, which performs billing for services provided to user terminals via a network, comprising:

a service providing node, which provides services to user terminals;

a billing control node which includes a server billing profile registration unit that stores a server billing profile, in which service provision conditions permitted by the service providing node are recorded, and which compares a user billing profile, in which service provision conditions desired by a user terminal are recorded, with the server billing profile and generates billing conditions for a service to be provided to the user terminal;

an authentication node which performs authentication of the legitimacy of the user terminals and which manages the user billing profiles for the user terminals;

an edge node which allocates an address to a user terminal in reply to an address allocation request from the user terminal and requests the authentication node to perform authentication of the legitimacy of the user terminal, and which on receiving an authentication reply, stores the user billing profile for said user terminal, transferred from the authentication node, and further which detects a message passing through based on a service provision request from the user terminal, attaches the user billing profile for said user terminal to the message, and sends the message to said billing control node, either directly, or via the service providing node; and a proxy billing unit, which performs billing in place of the service providing node according to said billing conditions for service provided to the user terminals by the service providing node.

7. The billing system according to claim 6, wherein the billing control node includes:

a billing condition generation unit, which, based on a billing condition generation request from the service providing node, compares the user billing profile with said server billing profile, to generate billing conditions for the service to be provided to the user terminal;

means for attaching a billing condition identifier to the generated billing conditions and returning the billing conditions to the service providing node; and means for attaching identifier information for the service providing node and identifier information for the user terminal to the billing conditions determined through negotiations between the user terminal and the service providing node and registering said billing conditions.

8. The billing system according to claim 6, wherein the service providing node comprises:

means for requesting said billing control node to generate the billing conditions when there is a request for service provision from a user terminal;

a billing condition determination unit, which, on receiving one or more sets of billing conditions generated by the billing control node, conducts negotiations with the user terminal to determine the billing conditions; and, means for notifying the proxy billing unit of the billing conditions thus determined, and providing the service to the user terminal according to the billing conditions.

* * * * *